United States Patent
Holcomb et al.

(10) Patent No.: US 7,620,106 B2
(45) Date of Patent: Nov. 17, 2009

(54) JOINT CODING AND DECODING OF A REFERENCE FIELD SELECTION AND DIFFERENTIAL MOTION VECTOR INFORMATION

(75) Inventors: Thomas W. Holcomb, Bothell, WA (US); Sridhar Srinivasan, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 1048 days.

(21) Appl. No.: 10/933,881

(22) Filed: Sep. 2, 2004

(65) Prior Publication Data

US 2005/0053141 A1 Mar. 10, 2005

Related U.S. Application Data

(63) Continuation-in-part of application No. 10/857,473, filed on May 27, 2004.

(60) Provisional application No. 60/501,081, filed on Sep. 7, 2003.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.16

(58) Field of Classification Search ............. 375/240.16
See application file for complete search history.

(56) References Cited

U.S. PATENT DOCUMENTS

| | | |
|---|---|---|
| 4,454,546 A | 6/1984 | Mori |
| 4,661,849 A | 4/1987 | Hinman |
| 4,661,853 A | 4/1987 | Roeder et al. |
| 4,691,329 A | 9/1987 | Juri et al. |
| 4,695,882 A | 9/1987 | Wada et al. |
| 4,796,087 A | 1/1989 | Guichard et al. |
| 4,800,432 A | 1/1989 | Barnett et al. |
| 4,849,812 A | 7/1989 | Borgers et al. |
| 4,862,267 A | 8/1989 | Gillard et al. |
| 4,864,393 A | 9/1989 | Harradine et al. |
| 4,999,705 A | 3/1991 | Puri |

(Continued)

FOREIGN PATENT DOCUMENTS

EP 0 279 053 8/1988

(Continued)

OTHER PUBLICATIONS

ISO/IEC, "ISO/IEC 11172-2, Information technology—Coding of moving pictures and associated audio for digital storage media at up to about 1,5 Mbit/s—Part 2: Video," 112 pp. (1993).

(Continued)

*Primary Examiner*—Nhon T Diep
(74) *Attorney, Agent, or Firm*—Klarquist Sparkman, LLP

(57) ABSTRACT

Techniques and tools for joint coding and decoding of reference field selection information and differential motion vector information are described. For example, a video decoder decodes a variable length code that jointly represents differential motion vector information and a motion vector predictor selection for a motion vector. The decoder then reconstructs the motion vector based at least in part on the differential motion vector information and the motion vector predictor selection. A video encoder performs corresponding processing.

15 Claims, 82 Drawing Sheets

U.S. PATENT DOCUMENTS

| | | |
|---|---|---|
| 5,021,879 A | 6/1991 | Vogel |
| 5,068,724 A | 11/1991 | Krause et al. |
| 5,089,887 A | 2/1992 | Robert et al. |
| 5,091,782 A | 2/1992 | Krause et al. |
| 5,103,306 A | 4/1992 | Weiman et al. |
| 5,105,271 A | 4/1992 | Niihara |
| 5,111,292 A | 5/1992 | Kuriacose et al. |
| 5,117,287 A | 5/1992 | Koike et al. |
| 5,144,426 A | 9/1992 | Tanaka et al. |
| 5,155,594 A | 10/1992 | Bernstein et al. |
| 5,157,490 A | 10/1992 | Kawai et al. |
| 5,175,618 A | 12/1992 | Ueda |
| 5,193,004 A | 3/1993 | Wang et al. |
| 5,223,949 A | 6/1993 | Honjo |
| 5,227,878 A | 7/1993 | Puri et al. |
| 5,258,836 A | 11/1993 | Murata |
| 5,274,453 A | 12/1993 | Maeda |
| 5,287,420 A | 2/1994 | Barrett |
| 5,298,991 A | 3/1994 | Yagasaki et al. |
| 5,317,397 A | 5/1994 | Odaka et al. |
| 5,319,463 A | 6/1994 | Hongu et al. |
| 5,343,248 A | 8/1994 | Fujinami |
| 5,347,308 A | 9/1994 | Wai |
| 5,376,968 A | 12/1994 | Wu et al. |
| 5,376,971 A | 12/1994 | Kadono et al. |
| 5,379,351 A | 1/1995 | Fandrianto et al. |
| 5,386,234 A | 1/1995 | Veltman et al. |
| 5,400,075 A | 3/1995 | Savatier |
| 5,412,430 A | 5/1995 | Nagata |
| 5,412,435 A | 5/1995 | Nakajima |
| RE34,965 E | 6/1995 | Sugiyama |
| 5,422,676 A | 6/1995 | Herpel et al. |
| 5,424,779 A | 6/1995 | Odaka |
| 5,426,464 A | 6/1995 | Casavant et al. |
| 5,428,396 A | 6/1995 | Yagasaki |
| 5,442,400 A | 8/1995 | Sun |
| 5,448,297 A | 9/1995 | Alattar et al. |
| 5,453,799 A | 9/1995 | Yang et al. |
| 5,457,495 A | 10/1995 | Hartung |
| 5,461,421 A | 10/1995 | Moon |
| RE35,093 E | 11/1995 | Wang et al. |
| 5,465,118 A | 11/1995 | Hancock et al. |
| 5,467,086 A | 11/1995 | Jeong |
| 5,467,136 A | 11/1995 | Odaka |
| 5,477,272 A | 12/1995 | Zhang |
| RE35,158 E | 2/1996 | Sugiyama |
| 5,491,523 A | 2/1996 | Sato |
| 5,510,840 A | 4/1996 | Yonemitsu et al. |
| 5,517,327 A | 5/1996 | Nakatani et al. |
| 5,539,466 A | 7/1996 | Igarashi et al. |
| 5,544,286 A | 8/1996 | Laney |
| 5,546,129 A | 8/1996 | Lee |
| 5,550,541 A | 8/1996 | Todd |
| 5,550,847 A | 8/1996 | Zhu |
| 5,552,832 A | 9/1996 | Astle |
| 5,565,922 A | 10/1996 | Krause |
| 5,574,504 A | 11/1996 | Yagasaki et al. |
| 5,594,504 A | 1/1997 | Ebrahimi |
| 5,594,813 A | 1/1997 | Fandrianto et al. |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,648,819 A | 7/1997 | Tranchard |
| 5,650,829 A | 7/1997 | Sugimoto et al. |
| 5,654,771 A | 8/1997 | Tekalp et al. |
| 5,659,365 A | 8/1997 | Wilkinson |
| 5,666,461 A | 9/1997 | Igarashi et al. |
| 5,668,608 A | 9/1997 | Lee |
| 5,668,932 A | 9/1997 | Laney |
| 5,687,097 A | 11/1997 | Mizusawa et al. |
| 5,689,306 A | 11/1997 | Jung |
| 5,692,063 A | 11/1997 | Lee et al. |
| 5,694,173 A | 12/1997 | Kimura et al. |
| 5,699,476 A | 12/1997 | Van Der Meer |
| 5,701,164 A | 12/1997 | Kato |
| 5,715,005 A | 2/1998 | Masaki |
| 5,717,441 A | 2/1998 | Serizawa et al. |
| 5,731,850 A | 3/1998 | Maturi et al. |
| 5,748,784 A | 5/1998 | Sugiyama |
| 5,748,789 A | 5/1998 | Lee et al. |
| 5,767,898 A | 6/1998 | Urano et al. |
| 5,784,175 A | 7/1998 | Lee |
| 5,786,860 A | 7/1998 | Kim et al. |
| 5,787,203 A | 7/1998 | Lee et al. |
| 5,793,897 A | 8/1998 | Jo et al. |
| 5,796,855 A | 8/1998 | Lee |
| 5,799,113 A | 8/1998 | Lee |
| RE35,910 E | 9/1998 | Nagata et al. |
| 5,825,830 A | 10/1998 | Kopf |
| 5,825,929 A | 10/1998 | Chen et al. |
| 5,835,144 A | 11/1998 | Matsumura et al. |
| 5,835,146 A | 11/1998 | Stone |
| 5,835,149 A | 11/1998 | Astle |
| 5,844,613 A | 12/1998 | Chaddha |
| 5,847,776 A | 12/1998 | Khmelnitsky |
| 5,859,668 A | 1/1999 | Aono et al. |
| 5,874,995 A | 2/1999 | Naimpally et al. |
| 5,901,248 A | 5/1999 | Fandrianto et al. |
| 5,905,542 A | 5/1999 | Linzer |
| 5,923,375 A | 7/1999 | Pau |
| 5,929,940 A | 7/1999 | Jeannin |
| 5,946,042 A | 8/1999 | Kato |
| 5,946,043 A | 8/1999 | Lee et al. |
| 5,949,489 A | 9/1999 | Nishikawa et al. |
| 5,959,673 A | 9/1999 | Lee |
| 5,963,258 A | 10/1999 | Nishikawa et al. |
| 5,963,259 A | 10/1999 | Nakaya et al. |
| 5,963,673 A | 10/1999 | Kodama et al. |
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,982,437 A | 11/1999 | Okazaki et al. |
| 5,982,438 A | 11/1999 | Lin et al. |
| 5,990,960 A | 11/1999 | Murakami et al. |
| 5,991,447 A | 11/1999 | Eifrig et al. |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl |
| 6,026,195 A | 2/2000 | Eifrig et al. |
| 6,035,070 A | 3/2000 | Moon et al. |
| 6,040,863 A | 3/2000 | Kato |
| 6,052,150 A | 4/2000 | Kikuchi |
| 6,058,212 A | 5/2000 | Yokoyama |
| 6,067,322 A | 5/2000 | Wang |
| 6,081,209 A | 6/2000 | Schuyler et al. |
| 6,094,225 A | 7/2000 | Han |
| RE36,822 E | 8/2000 | Sugiyama |
| 6,097,759 A | 8/2000 | Murakami et al. |
| 6,111,914 A | 8/2000 | Bist |
| 6,130,963 A | 10/2000 | Uz et al. |
| 6,148,027 A | 11/2000 | Song et al. |
| 6,148,033 A | 11/2000 | Pearlstein et al. |
| 6,154,495 A | 11/2000 | Yamaguchi et al. |
| 6,167,090 A | 12/2000 | Iizuka |
| 6,188,725 B1 | 2/2001 | Sugiyama |
| 6,188,794 B1 | 2/2001 | Nishikawa et al. |
| 6,201,927 B1 | 3/2001 | Comer |
| 6,205,176 B1 | 3/2001 | Sugiyama |
| 6,208,761 B1 | 3/2001 | Passagio et al. |

| | | |
|---|---|---|
| 6,215,905 B1 | 4/2001 | Lee et al. |
| 6,219,070 B1 | 4/2001 | Baker et al. |
| 6,219,464 B1 | 4/2001 | Greggain et al. |
| 6,233,017 B1 | 5/2001 | Chaddha |
| 6,236,806 B1 | 5/2001 | Kojima et al. |
| RE37,222 E | 6/2001 | Yonemitsu |
| 6,243,418 B1 | 6/2001 | Kim |
| 6,259,741 B1 | 7/2001 | Chen et al. |
| 6,263,024 B1 | 7/2001 | Matsumoto |
| 6,263,065 B1 | 7/2001 | Durinovic-Johri et al. |
| 6,266,091 B1 | 7/2001 | Saha |
| 6,271,885 B2 | 8/2001 | Sugiyama |
| 6,272,179 B1 | 8/2001 | Kadono |
| 6,275,528 B1 | 8/2001 | Isozaki et al. |
| 6,275,531 B1 | 8/2001 | Li |
| 6,281,942 B1 | 8/2001 | Wang |
| 6,282,243 B1 | 8/2001 | Kazui et al. |
| 6,289,049 B1 | 9/2001 | Kim et al. |
| 6,289,132 B1 | 9/2001 | Goertzen |
| 6,292,585 B1 | 9/2001 | Yamaguchi et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,310,918 B1 | 10/2001 | Saha et al. |
| 6,320,593 B1 | 11/2001 | Sobel et al. |
| 6,324,216 B1 | 11/2001 | Igarashi |
| 6,337,881 B1 | 1/2002 | Chaddha |
| 6,339,656 B1 | 1/2002 | Marui |
| 6,377,628 B1 | 4/2002 | Schultz et al. |
| 6,381,277 B1 | 4/2002 | Chun et al. |
| 6,381,279 B1 | 4/2002 | Taubman |
| 6,393,059 B1 | 5/2002 | Sugiyama |
| 6,396,876 B1 | 5/2002 | Babonneau et al. |
| 6,404,813 B1 | 6/2002 | Haskell et al. |
| 6,408,029 B1 | 6/2002 | McVeigh et al. |
| 6,418,166 B1 | 7/2002 | Wu et al. |
| 6,421,383 B2 | 7/2002 | Beattie |
| 6,430,316 B1 | 8/2002 | Wilkinson |
| 6,441,842 B1 | 8/2002 | Fandrianto et al. |
| 6,442,204 B1 | 8/2002 | Snook et al. |
| 6,449,312 B1 | 9/2002 | Zhang et al. |
| 6,496,608 B1 | 12/2002 | Chui |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,647,061 B1 | 11/2003 | Panusopone et al. |
| 6,650,781 B2 | 11/2003 | Nakaya |
| 6,661,470 B1 | 12/2003 | Kawakami et al. |
| 6,671,323 B1 | 12/2003 | Tahara et al. |
| 6,704,360 B2 | 3/2004 | Haskell et al. |
| 6,728,317 B1 | 4/2004 | Demos |
| RE38,563 E | 8/2004 | Eifrig et al. |
| 6,778,610 B2 | 8/2004 | Lin |
| 6,950,469 B2 | 9/2005 | Karczewicz et al. |
| 6,968,008 B1 | 11/2005 | Ribas-Corbera et al. |
| 6,980,596 B2 * | 12/2005 | Wang et al. ............ 375/240.16 |
| 6,983,018 B1 | 1/2006 | Lin et al. |
| 7,020,200 B2 | 3/2006 | Winger |
| 7,023,919 B2 | 4/2006 | Cho et al. |
| 7,233,621 B2 | 6/2007 | Jeon |
| 7,295,616 B2 | 11/2007 | Sun et al. |
| 7,317,839 B2 | 1/2008 | Holcomb |
| 7,453,941 B1 | 11/2008 | Yamori et al. |
| 7,486,734 B2 | 2/2009 | Machida |
| 2001/0019586 A1 | 9/2001 | Kang et al. |
| 2001/0050957 A1 | 12/2001 | Nakaya et al. |
| 2002/0186890 A1 | 12/2002 | Lee et al. |
| 2003/0076883 A1 | 4/2003 | Bottreau et al. |
| 2003/0095603 A1 | 5/2003 | Lan et al. |
| 2003/0099292 A1 | 5/2003 | Wang et al. |
| 2003/0099294 A1 | 5/2003 | Wang et al. |
| 2003/0112864 A1 | 6/2003 | Karczewicz et al. |
| 2003/0113026 A1 | 6/2003 | Srinivasan et al. |
| 2003/0142748 A1 | 7/2003 | Tourapis |
| 2003/0152146 A1 | 8/2003 | Lin et al. |
| 2003/0156646 A1 | 8/2003 | Hsu et al. |
| 2003/0161402 A1 | 8/2003 | Horowitz |
| 2003/0202705 A1 | 10/2003 | Sun |
| 2004/0057523 A1 * | 3/2004 | Koto et al. ............ 375/240.26 |
| 2004/0136461 A1 | 7/2004 | Kondo et al. |
| 2005/0013497 A1 | 1/2005 | Hsu et al. |
| 2005/0013498 A1 | 1/2005 | Srinivasan |
| 2005/0036700 A1 | 2/2005 | Lan et al. |
| 2005/0036759 A1 | 2/2005 | Lin et al. |
| 2005/0053137 A1 | 3/2005 | Holcomb |
| 2005/0053147 A1 | 3/2005 | Mukerjee et al. |
| 2005/0053149 A1 | 3/2005 | Mukerjee et al. |
| 2005/0053292 A1 | 3/2005 | Mukerjee et al. |
| 2005/0058205 A1 | 3/2005 | Holcomb et al. |
| 2005/0100093 A1 | 5/2005 | Holcomb |
| 2005/0226335 A1 | 10/2005 | Lee et al. |
| 2006/0013307 A1 | 1/2006 | Olivier et al. |

FOREIGN PATENT DOCUMENTS

| | | |
|---|---|---|
| EP | 0 397 402 | 11/1990 |
| EP | 0 526 163 | 2/1993 |
| EP | 0 535 746 | 4/1993 |
| EP | 0535746 | 4/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 651 574 | 5/1995 |
| EP | 0 771 114 | 5/1997 |
| EP | 0 786 907 | 7/1997 |
| EP | 0 825 778 | 2/1998 |
| EP | 0 830 029 | 3/1998 |
| EP | 0 884 912 | 12/1998 |
| EP | 0 944 245 | 9/1999 |
| GB | 2328337 | 2/1999 |
| GB | 2332115 | 6/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 6 078 295 | 3/1994 |
| JP | 6 078 298 | 3/1994 |
| JP | 06-276481 | 9/1994 |
| JP | 06-276511 | 9/1994 |
| JP | 6292188 | 10/1994 |
| JP | 7-274171 | 10/1995 |
| JP | 08-140099 | 5/1996 |
| JP | 09-322163 | 12/1997 |
| JP | 10 056 644 | 2/1998 |
| WO | 98/03018 | 1/1998 |
| WO | WO 00/33581 | 8/2000 |
| WO | WO 03/026296 | 3/2003 |

OTHER PUBLICATIONS

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

U.S. Appl. No. 60/341,674, filed Dec. 17, 2001, Lee et al.

U.S. Appl. No. 60/488,710, filed Jul. 18, 2003, Srinivasan et al.

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Bartkowiak et al., "Color Video Compression Based on Chrominance Vector Quantization," 7th Int'l Workshop on Systems, Signals and Image Processing, IWSSIP 2000, Maribor 7-9 VI, pp. 107-110 (2000).

Benzler et al., "Improving multiresolution motion compensating hybrid coding by drift reduction," Picture Coding Symposium, 4 pp. (1996).

Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp. (document marked 1995).

Benzler, "Results of core experiments P8 (Motion and Aliasing Compensating Prediction)," ISO/IEC JTC1/SC29/WG11, MPEG 97/2625, 8 pp. (document marked 1997).

Borman et al., "Block-matching Sub-pixel Motion Estimation from Noisy, Under-Sampled Frames—an Empirical Performance Evaluation," SPIE Visual Comm. & Image Processing, 10 pp. (1999).

Conklin et al., "Multi-resolution Motion Estimation," Proc. ICASSP '97, Munich, Germany, 4 pp. (1997).

Davis et al., "Equivalence of subpixel motion estimators based on optical flow and block matching," Proc. IEEE Int'l Symposium on Computer Vision, pp. 7-12 (1995).

de Haan et al., "Sub-pixel motion estimation with 3-D recursive search block-matching," Signal Processing: Image Comm.6, pp. 229-239 (1994).

"DivX Multi Standard Video Encoder," 2 pp. (Downloaded from the World Wide Web on Jan. 24, 2006).

Ericsson, "Fixed and Adaptive Predictors for Hybrid Predictive/Transform Coding," IEEE Transactions on Comm., vol. COM-33, No. 12, pp. 1291-1302 (1985).

Flierl et al., "Multihypothesis Motion Estimation for Video Coding," Proc. DCC, 10 pp. (Mar. 2001).

Fogg, "Survey of Software and Hardware VLC Architectures," SPIE, vol. 2186, pp. 29-37 (Feb. 9-10, 1994).

Girod, "Efficiency Analysis of Multihypothesis Motion-Compensated Prediction for Video Coding," IEEE Transactions on Image Processing, vol. 9, No. 2, pp. 173-183 (Feb. 2000).

Girod, "Motion-Compensating Prediction with Fractional-Pel Accuracy," IEEE Transactions on Comm., vol. 41, No. 4, pp. 604-612 (1993).

Girod, "Motion Compensation: Visual Aspects, Accuracy, and Fundamental Limits," Motion Analysis and Image Sequence Processing, Kluwer Academic Publishers, pp. 125-152 (1993).

Horn et al., "Estimation of Motion Vector Fields for Multiscale Motion Compensation," Proc. Picture Coding Symp. (PCS 97), pp. 141-144 (Sep. 1997).

Hsu et al., "A Low Bit-Rate Video Codec Based on Two-Dimensional Mesh Motion Compensation with Adaptive Interpolation," IEEE Transactions on Circuits and Systems for Video Technology, vol. II, No. 1, pp. 111-117 (Jan. 2001).

IBM Technical Disclosure Bulletin, "Advanced Motion Estimation for Moving Picture Expert Group Encoders," vol. 39, No. 4, pp. 323-324 (Apr. 1996).

ISO/IEC, "MPEG-4 Video Verification Model Version 10.0," ISO/IEC JTC1/SC29/WG11, MPEG98/N1992, (ed. Ebrahimi) (document marked Feb. 1998).

ITU—Q15-F-24, "MVC Video Codec—Proposal for H.26L," Study Group 16, Video Coding Experts Group (Question 15), 28 pp. (document marked as generated in 1998).

ITU-T, "H.26L Test Model Long Term No. 5 (TML-5) draft0," Study Group 16, Video Coding Experts Group (Question 15), Document Q15-K-59, 35 pp. (ed. Gisle Bjontegaard) (Document dated Oct. 2000).

Iwahashi et al., "A Motion Compensation Technique for Downscaled Pictures in Layered Coding," IEICE Transactions on Comm., vol. E77-B, No. 8, pp. 1007-1012 (Aug. 1994).

Jeong et al., "Adaptive Huffman Coding of 2-D DCT Coefficients for Image Sequence Compression," Signal Processing: Image Communication, vol. 7, 11 pp. (1995).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001) [document marked "Generated: Jan. 18, 2002"].

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Keys, "Cubic Convolution Interpolation for Digital Image Processing," IEEE Transactions on Acoustics, Speech & Signal Processing, vol. ASSP-29, No. 6, pp. 1153-1160 (1981).

Konrad et al., "On Motion Modeling and Estimation for Very Low Bit Rate Video Coding," Visual Comm. & Image Processing (VCIP '95), 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lopes et al., "Analysis of Spatial Transform Motion Estimation with Overlapped Compensation and Fractional-pixel Accuracy," IEEE Proc. Visual Image Signal Processing, vol. 146, No. 6, pp. 339-344 (Dec. 1999).

Morimoto et al., "Fast Electronic Digital Image Stabilization," Proc. ICPR, Vienna, Austria, 5 pp. (1996).

"Overview of MPEG-2 Test Model 5," 5 pp. [Downloaded from the World Wide Web on Mar. 1, 2006].

Ribas-Corbera et al., "On the Optimal Block Size for Block-based Motion-Compensated Video Coders," SPIE Proc. of Visual Comm. & Image Processing, vol. 3024, 12 pp. (1997).

Ribas-Corbera et al., "On the Optimal Motion Vector Accuracy for Block-based Motion-Compensated Video Coders," Proc. SPIE Digital Video Compression, San Jose, CA, 13 pp. (1996).

Schultz et al., "Subpixel Motion Estimation for Super-Resolution Image Sequence Enhancement," Journal of Visual Comm. & Image Representation, vol. 9, No. 1, pp. 38-50 (Mar. 1998).

Sullivan et al., "The H.264/AVC Advanced Video Coding Standard: Overview and Introduction to the Fidelity Range Extensions," 21 pp. (Aug. 2004).

"The TML Project Web-Page and Archive," (including pages of code marked "image.cpp for H.26L decoder, Copyright 1999" and "image.c"), 24 pp. [Downloaded from the World Wide Web on Jun. 1, 2005].

Triggs, "Empirical Filter Estimation for Subpixel Interpolation and Matching," Int'l Conf. Computer Vision '01, Vancouver, Canada, 8 pp. (Jul. 2001).

Triggs, "Optimal Filters for Subpixel Interpolation and Matching," Int'l Conf. Computer Vision '01, Vancouver, Canada, 10 pp. (Jul. 2001).

"Video Coding Using Wavelet Decomposition for Very Low Bit-Rate Networks," 16 pp. (1997).

Wang et al., "Interlace Coding Tools for H.26L Video Coding," ITU-T SG16/Q.6 VCEG-O37, pp. 1-20 (Dec. 2001).

Wedi, "Complexity Reduced Motion Compensated Prediction with 1/8-pel Displacement Vector Resolution," ITU Study Group 16, Video Coding Experts Group (Question 6), Document VCEG-L20, 8 pp. (Document dated Dec. 2000).

Weiss et al., "Real Time Implementation of Subpixel Motion Estimation for Broadcast Applications," pp. 7/1-7/3 (1990).

Wiegand et al., "Long-term Memory Motion Compensated Prediction," IEEE Transactions on Circuits & Systems for Video Technology, vol. 9, No. 1, pp. 70-84 (Feb. 1999).

Wien, "Variable Block-Size Transforms for Hybrid Video Coding," Dissertation, 182 pp. (Feb. 2004).

Wu et al., "Joint estimation of forward and backward motion vectors for interpolative prediction of video," IEEE Transactions on Image Processing, vol. 3, No. 5, pp. 684-687 (Sep. 1994).

Yang et al., "Very High Efficiency VLSI Chip-pair for Full Search Block Matching with Fractional Precision," Proc. ICASSP/IEEE Int'l Conf. on Acoustics, Speech & Signal Processing, Glasgow, pp. 2437-2440 (May 1989).

Zhang et al., "Adaptive Field/Frame Selection for High Compression Coding," MERL TR-2003-29, 13 pp. (Jan. 2003).

Patel et al., "Performance of a Software MPEG Video Decoder," *Proc. of the First ACM Intl Conf on Multimedia*, pp. 75-82 (Aug. 1993).

Tourapis et al., "Predictive Motion Vector Field Adaptive Search Technique (PMVFAST)—Enhancing Block Based Motion Estimation," *Proc. Visual Communications and Image Processing*, 10 pp. (Jan. 2001).

Wang et al., "Adaptive frame/field coding for JVT Video Coding," ITU-T SG16 Q.6 JVT-B071, 24 pp. (Jan. 2002).

Zhu, "RTP Payload Format for H.263 Video Streams," *IEFT Request for Comments 2190*, 12 pp. (Sep. 1997).

International Search Report, Application No. PCT/USO4/29034, 4 pages, Oct. 21, 2008.

Written Opinion, Application No. PCT/US04/29034, 7 pages, Oct. 21, 2008.

Sun et al., "Improved TML Loop Filter with Lower Complexity," ITU-T VCEG-N17, 8 pp. (Aug. 2001).

* cited by examiner

Figure 1, prior art
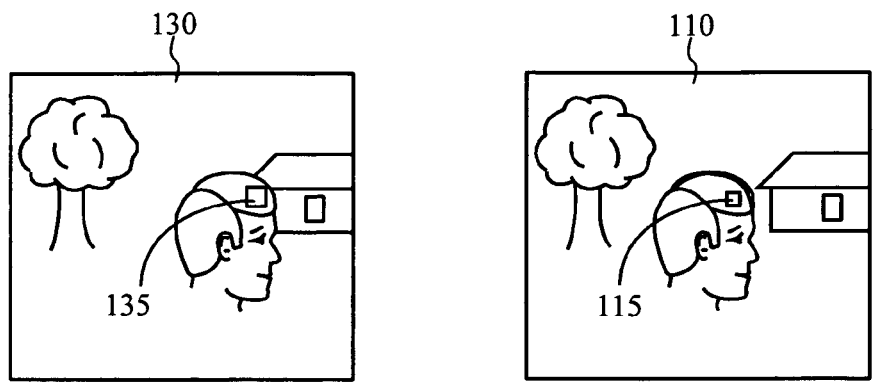
Figure 4, prior art
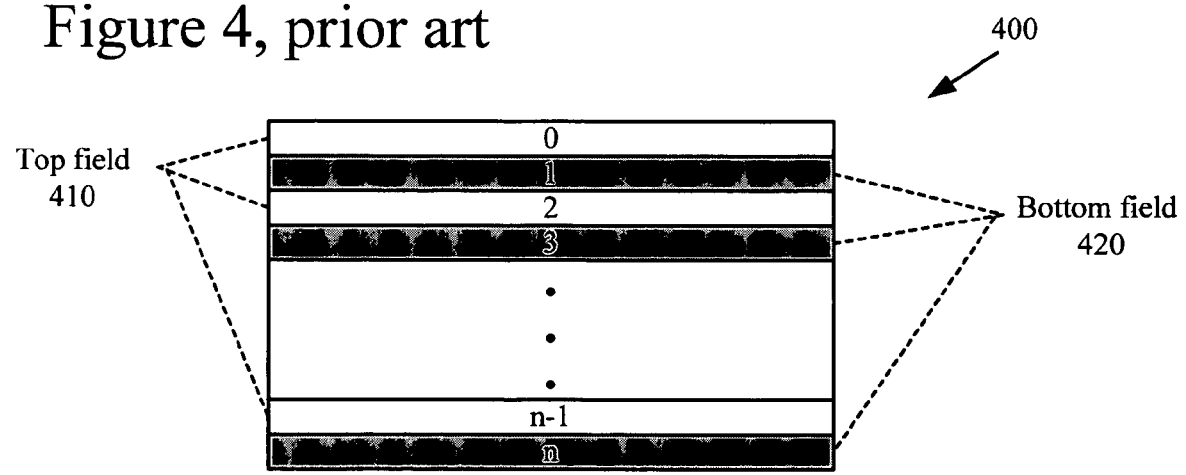

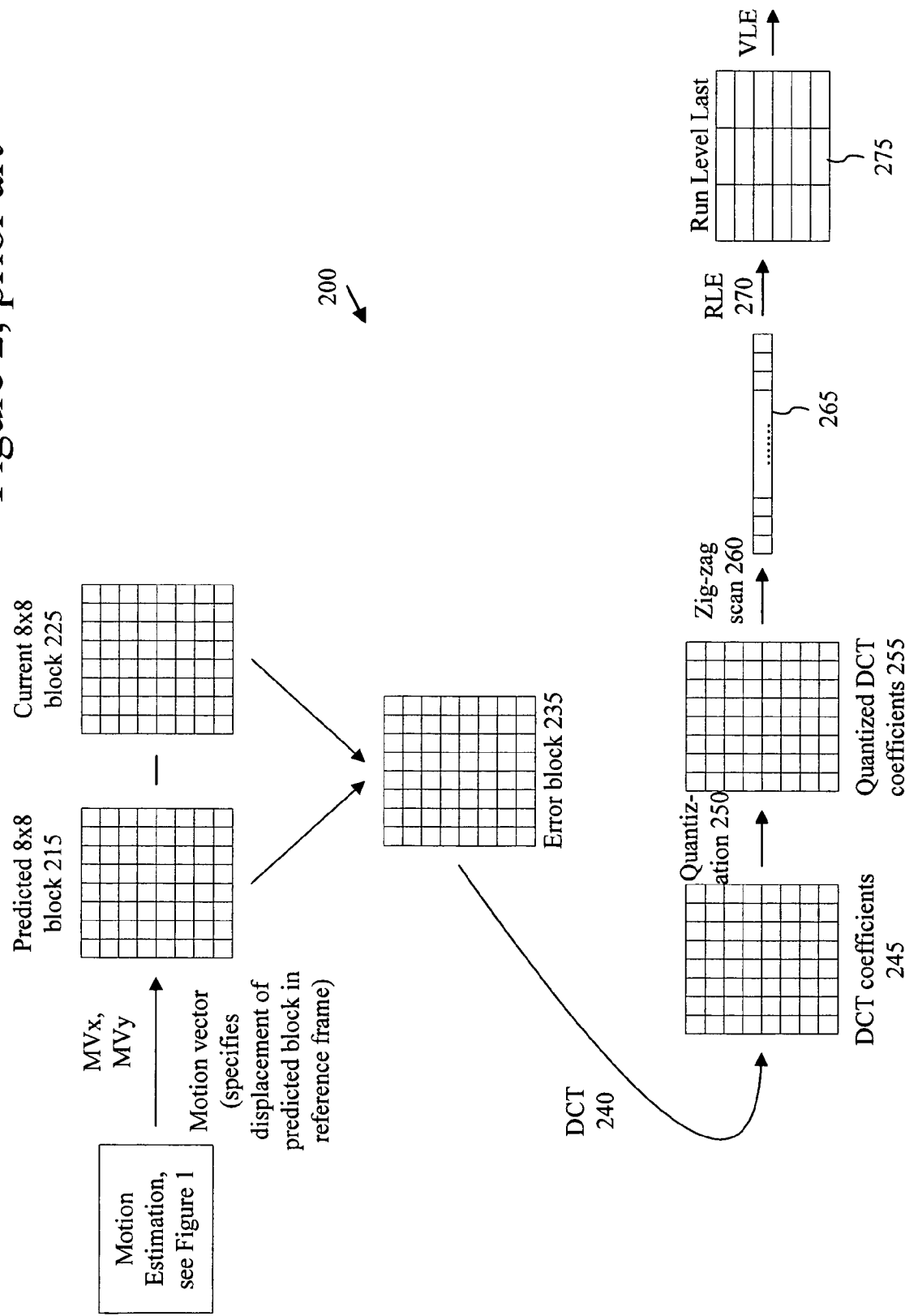
Figure 2, prior art

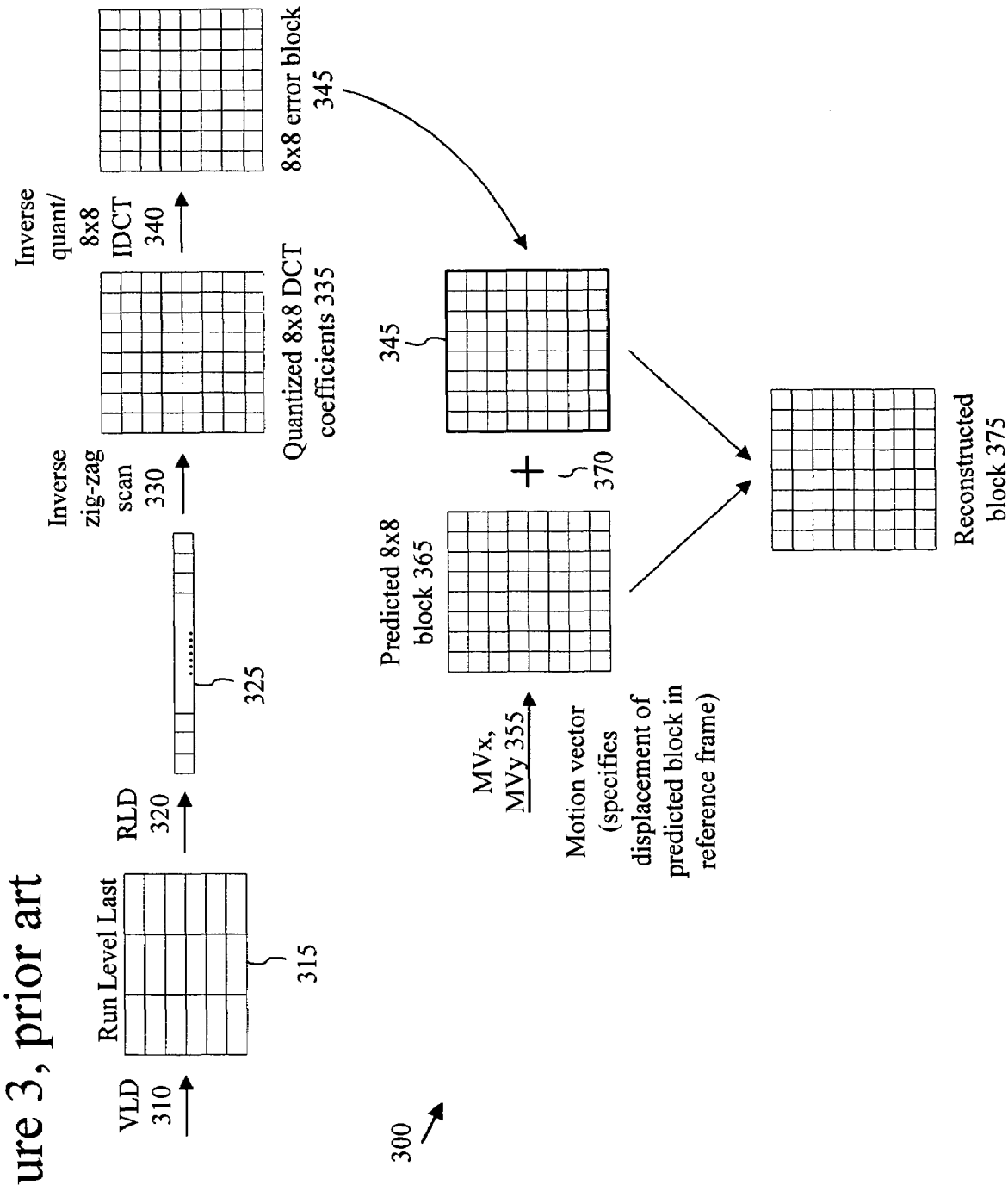
Figure 3, prior art

Figure 5A,
prior art
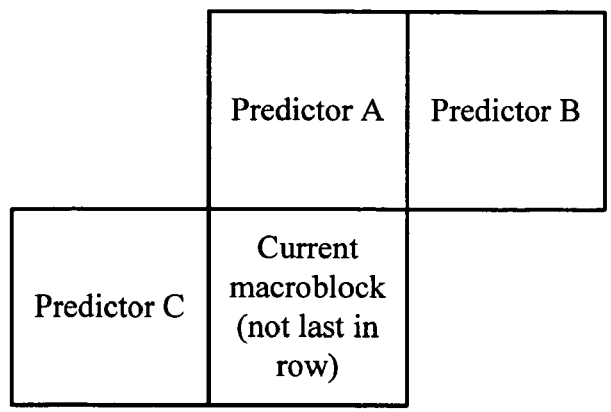
Figure 5B,
prior art
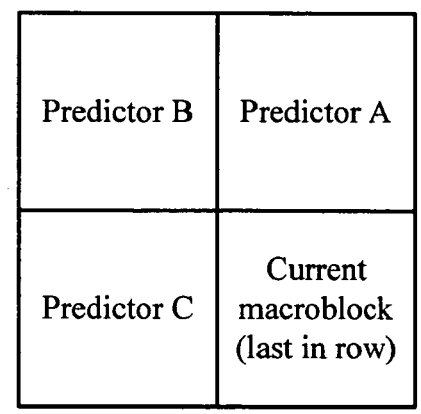
Figure 6A,
prior art
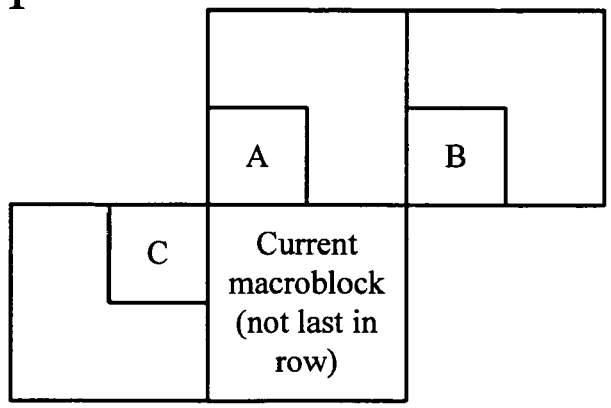
Figure 6B,
prior art
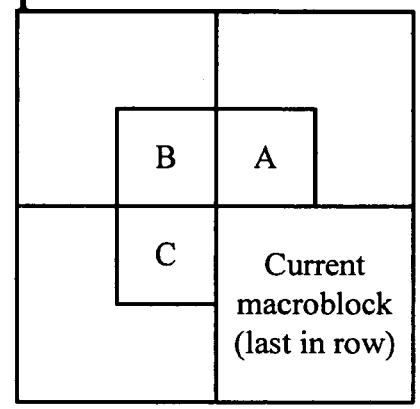

Figure 7A, prior art
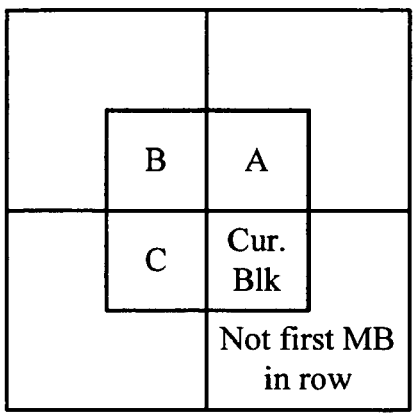
Figure 7B, prior art
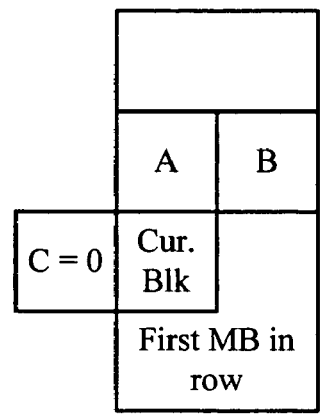
Figure 8A, prior art
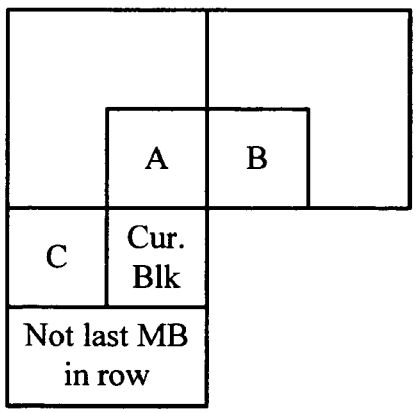
Figure 8B, prior art
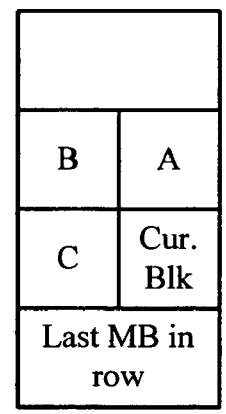
Figure 9, prior art
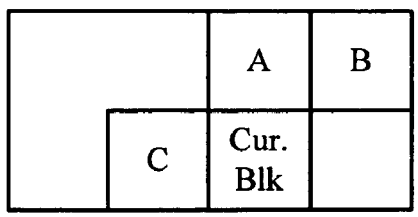
Figure 10, prior art
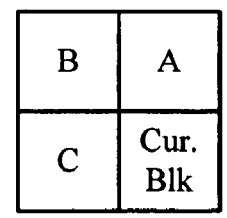

Figure 11, prior art

| Predictor A (compute average if field-coded) | Predictor B (compute average if field-coded) |
|---|---|
| Predictor C (compute average if field-coded) / Current macroblock | |

Figure 12A, prior art

|  |  |
|---|---|
| Predictor A | Predictor B |
|  |  |
| Predictor C | Current |

Figure 12B, prior art

| Predictor A | Predictor B |
|---|---|
|  |  |
| Predictor C | Current |
|  |  |

Figure 13A, prior art

```
if (predictorA is out of bounds && predictor C is out of bounds)
{
        predictor_x = 0
        predictor_y = 0
}
else
{
        if (predictorC is out of bounds)
        {
            if (predictorA is intra)
            {
                predictor_x = 0
                predictor_y = 0
            }
            else
            {
                // use top predictor
                predictor_x = predictorA_x
                predictor_y = predictorA_y
            }
        }
        else if (predictorA is out of bounds)
        {
            if (predictorC is intra)
            {
                predictor_x = 0
                predictor_y = 0
            }
            else
            {
                // use left predictor
                predictor_x = predictorC_x
                predictor_y = predictorC_y
            }
        }
        else
        {
            if (predictorB is out of bounds)
            {
                // set predictorB to inter type and motion vectors to zero
                set predictorB to inter
                predictorB_x = 0
                predictorB_y = 0
            }
```
continued in 13B

Figure 13B, prior art continued from 13A

```
            num_intra = 0
            if (predictorA is intra)
            {
                    predictorA_x = 0
                    predictorA_y = 0
                    num_intra = num_intra + 1
            }
            if (predictorB is intra)
            {
                    predictorB_x = 0
                    predictorB_y = 0
                    num_intra = num_intra + 1
            }
            if (predictorC is intra)
            {
                    predictorC_x = 0
                    predictorC_y = 0
                    num_intra = num_intra + 1
            } if (num_intra > 1)
            {
                    predictor_x = 0
                    predictor_y = 0
            }
            else
            {
                    // calculate predictor from A, B and C predictor
candidates
                    predictor_x  =  median3(predictorA_x,  predictorB_x,
predictorC_x)
                    predictor_y  =  median3(predictorA_y,  predictorB_y,
predictorC_y)
            }
        }
}
```

Figure 13C, prior art

```
median3 (a, b, c) {
    if (a > b) {
        if (b > c)
            median = b
        else if (a > c)
            median = c
        else
            median = a
    }
    else if (a > c)
        median = a
    else if (b > c)
        median = c
    else median = b
    return median
}
```

Figure 16C, prior art

```
median4 (a, b, c, d)
{
    max = min = a
    if (b > max)
        max = b
    else if (b < min)
        min = b
    if (c > max)
        max = c
    else if (c < min)
        min = c
    if (d > max)
        max = d
    else if (d < min)
        min = d
    median = (a + b + c + d - max - min) / 2
    return median
}
```

Figure 14A, prior art

```
if ((predictorA is out of bounds) || (predictorC is out of bounds))
{
    predictor_post_x = predictor_pre_x
    predictor_post_y = predictor_pre_y
}
else
{
    if (predictorA is intra)
        sum = abs(predictor_pre_x) + abs(predictor_pre_y)
    else
        sum = abs(predictor_pre_x - predictorA_x) + abs(predictor_pre_y - predictorA_y)
    if (sum > 32)
    {
        // read next bit to see which predictor candidate to use
        if (get_bits(1) == 0)           // HYBRIDPRED field
        {
            // use top predictor
            predictor_post_x = predictorA_x
            predictor_post_y = predictorA_y
        }
        else
        {
            // use left predictor
            predictor_post_x = predictorC_x
            predictor_post_y = predictorC_y
        }
    }
}
``` continued in 14B

Figure 14B, prior art continued from 14A

```
    else
    {
        if (predictorC is intra)
            sum = abs(predictor_pre_x) + abs(predictor_pre_y)
        else
            sum = abs(predictor_pre_x - predictorC_x) + abs(predictor_pre_y - predictorC_y)
        if (sum > 32)
        {
            // read next bit to see which predictor candidate to use
            if (get_bits(1) == 0)
            {
                // use top predictor
                predictor_post_x = predictorA_x
                predictor_post_y = predictorA_y
            }
            else
            {
                // use left predictor
                predictor_post_x = predictorC_x
                predictor_post_y = predictorC_y
            }
        }
    }
}
```

Figure 15A, prior art

```
index = vlc_decode()      // Use the Huffman table indicated by MVTAB in the
picture layer
index = index + 1
if (index >= 37)
{
      last_flag = 1
      index = index - 37
}
else
      last_flag = 0 intra_flag = 0
if (index == 0)
{
      dmv_x = 0
      dmv_y = 0
}
else if (index == 35)
{
      dmv_x = get_bits(k_x - halfpel_flag)
      dmv_y = get_bits(k_y - halfpel_flag)
}
else if (index == 36)
{
      intra_flag = 1
      dmv_x = 0
      dmv_y = 0
}
else
{
   index1 = index % 6
   if (halfpel_flag == 1 && index1 == 5)
      hpel = 1
   else
      hpel = 0
   val = get_bits (size_table[index1] - hpel)
   sign = 0 - (val & 1)
   dmv_x = sign ^ ((val >> 1) + offset_table[index1])
   dmv_x = dmv_x - sign
``` continued in 15B

Figure 15B, prior art continued from 15A

```
    index1 = index / 6
    if (halfpel_flag == 1 && index1 == 5)
       hpel = 1
    else
       hpel = 0
    val = get_bits (size_table[index1] - hpel)
    sign = 0 - (val & 1)
    dmv_y = sign ^ ((val >> 1) + offset_table[index1])
    dmv_y = dmv_y- sign
}
```

Figure 15C, prior art

| MVRANGE | k_x | k_y | range_x | range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 |

Figure 16A, prior art

```
// s_RndTbl[0] = 0, s_RndTbl[1] = 0, s_RndTbl[2] = 0, s_RndTbl[3] = 1
cmv_x = (lmv_x + s_RndTbl[lmv_x & 3]) >> 1
cmv_y = (lmv_y + s_RndTbl[lmv_y & 3]) >> 1
```

Figure 16B, prior art

```
if (all 4 luminance blocks are Inter-coded)
{
        // lmv0_x, lmv0_y is the motion vector for block 0
        // lmv1_x, lmv1_y is the motion vector for block 1
        // lmv2_x, lmv2_y is the motion vector for block 2
        // lmv3_x, lmv3_y is the motion vector for block 3
        ix = median4(lmv0_x, lmv1_x, lmv2_x, lmv3_x)
        iy = median4(lmv0_y, lmv1_y, lmv2_y, lmv3_y)
}
else if (3 of the luminance blocks are Inter-coded)
{
        // lmv0_x, lmv0_y is the motion vector for the first Inter-coded block
        // lmv1_x, lmv1_y is the motion vector for the second Inter-coded block
        // lmv2_x, lmv2_y is the motion vector for the third Inter-coded block
        ix = median3(lmv0_x, lmv1_x, lmv2_x)
        iy = median3(lmv0_y, lmv1_y, lmv2_y)
}
else if (2 of the luminance blocks are Inter-coded)
{
        // lmv0_x, lmv0_y is the motion vector for the first Inter-coded block
        // lmv1_x, lmv1_y is the motion vector for the second Inter-coded block
        ix = (lmv0_x + lmv1_x) / 2
        iy = (lmv0_y + lmv1_y) / 2
}
else
        Chroma blocks are coded as Intra
// s_RndTbl[0] = 0, s_RndTbl[1] =  0, s_RndTbl[2] = 0, s_RndTbl[3] = 1
cmv_x = (ix + s_RndTbl[ix & 3]) >> 1
cmv_y = (iy + s_RndTbl[iy & 3]) >> 1
```

Figure 17, prior art

```
frac_x4 = (lmv_x << 2) % 16;
int_x4= (lmv_x << 2) - frac_x;

ChromaMvRound [16] = {0, 0, 0, .25, .25, .25, .5, .5, .5, .5, .5,
.75, .75, .75, 1, 1};
cmv_y = lmv_y;
cmv_x = Sign (lmv_x) * (int_x4 >> 2) + ChromaMvRound [frac_x4];
```

Figure 18, prior art

```
if (LUMSCALE == 0)
{
        iScale = - 64
        iShift = 255 * 64 + 32 - LUMSHIFT *2 * 64
}
else {
        iScale = LUMSCALE + 32
        if (LUMSHIFT > 31)
              iShift = LUMSHIFT * 64 - 64 * 64;
              else
              iShift = LUMSHIFT * 64;
      }

// build LUTs
for (i = 0; i < 256; i++)
{
        j = (iScale * i + iShift + 32) >> 6
        if (j > 255)
              j = 255
        else if (j < 0)
                    j = 0
        LUTY[i] = j
        j = (iScale * (i - 128) + 128 * 64 + 32) >>6
        if (j > 255)
              j = 255
        else if (j < 0)
              j = 0
        LUTUV[i] =   j
}
```

Software 1980 implementing video encoder and/or decoder

Figure 26

| Index | Macroblock Type | CBP Present | MV Present |
|---|---|---|---|
| 0 | Intra | No | NA |
| 1 | Intra | Yes | NA |
| 2 | 1MV | No | No |
| 3 | 1MV | No | Yes |
| 4 | 1MV | Yes | No |
| 5 | 1MV | Yes | Yes |

Figure 27

| Index | Macroblock Type | CBP Present | MV Present |
|---|---|---|---|
| 0 | Intra | No | NA |
| 1 | Intra | Yes | NA |
| 2 | 1MV | No | No |
| 3 | 1MV | No | Yes |
| 4 | 1MV | Yes | No |
| 5 | 1MV | Yes | Yes |
| 6 | 4MV | No | NA |
| 7 | 4MV | Yes | NA |

Figure 29

```
samefieldcount = 0
oppfieldcount = 0
if (predictorA is not out of bounds and predictorA is not Intra) {
    if (predictorA is from same field)
    {
        samefieldcount = samefieldcount + 1
    }
    else
    {
        oppositefieldcount = oppfieldcount + 1
    }
}
if (predictorB is not out of bounds and predictorB is not Intra) {
    if (predictorB is from same field)
    {
        samefieldcount = samefieldcount + 1
    }
    else
    {
        oppositefieldcount = oppfieldcount + 1
    }
}
if (predictorC is not out of bounds and predictorC is not Intra) {
    if (predictorC is from same field)
    {
        samefieldcount = samefieldcount + 1
    }
    else
    {
        oppositefieldcount = oppfieldcount + 1
    }
}

If (samfieldcount > oppfieldcount) {
    dominantpredictor = samefield
    nondominantpredictor = oppfield
}
else
{
    dominantpredictor = oppfield
    nondominantpredictor = samefield
}
```

Figure 30
```
if ((dominantpredictor is samefield and current reference is samefield)
or
    (dominantpredictor is oppfield and current reference is oppfield))
{
    DMVY = (MVY - PMVY) * 2
}
else {
    DMVY = (MVY - PMVY) * 2 + 1
}
```
Figure 31A
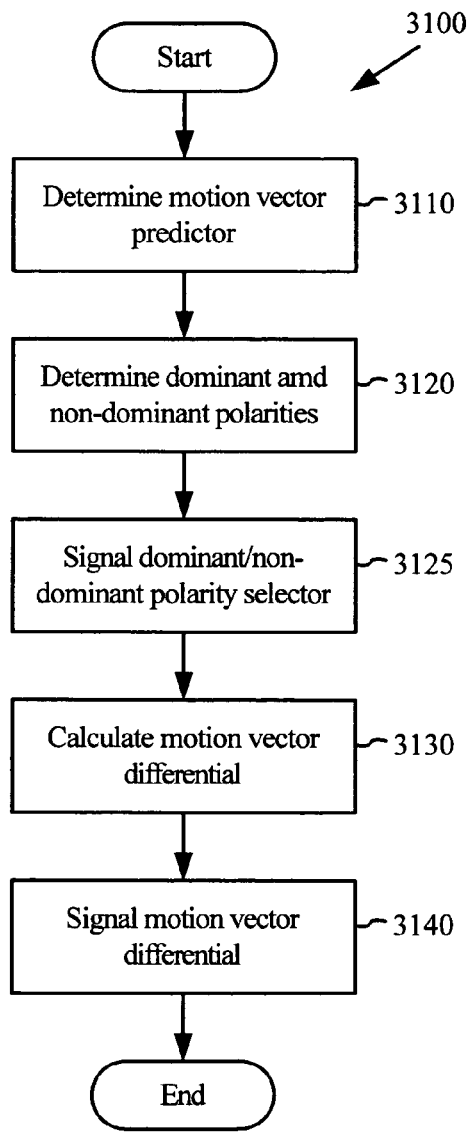
Figure 31B
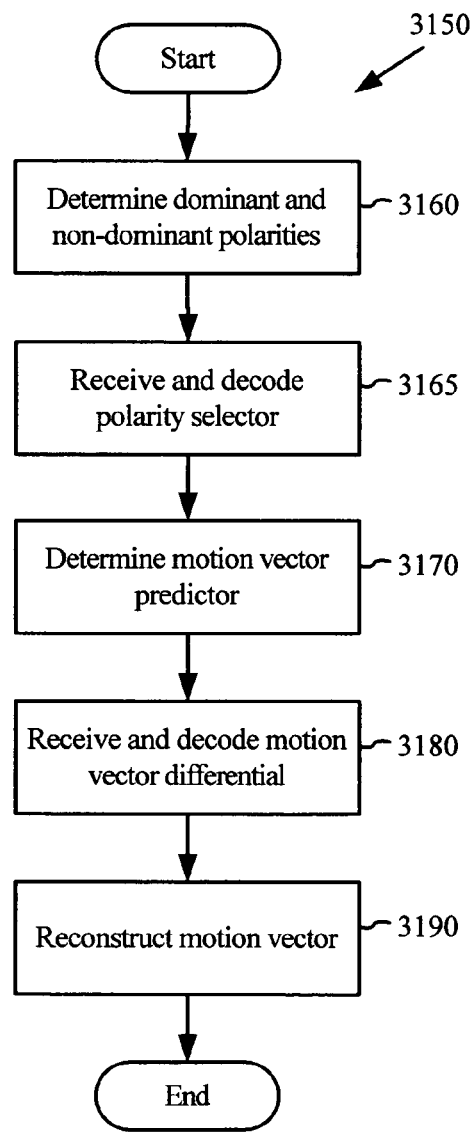

Figure 32

```
if ((predictorA is out of bounds) || (predictorC is out of bounds)) {
    predictor_post_x = predictor_pre_x
    predictor_post_y = predictor_pre_y
}
else {
    if (predictorA is intra)
        sum = abs(predictor_pre_x) + abs(predictor_pre_y)
    else
        sum = abs(predictor_pre_x - predictorA_x) + abs(predictor_pre_y - predictorA_y)
    if (sum > 32) {
        // read next bit to see which predictor candidate to use
        if (ReadTheHybridBit == 1) { // HYBRIDPRED field
            // use top predictor (predictorA)
            predictor_post_x = predictorA_x
            predictor_post_y = predictorA_y
        }
        else {
            // use left predictor (predictorC)
            predictor_post_x = predictorC_x
            predictor_post_y = predictorC_y
        }
    }
    else {
        if (predictorC is intra)
            sum = abs(predictor_pre_x) + abs(predictor_pre_y)
        else
            sum = abs(predictor_pre_x - predictorC_x) + abs(predictor_pre_y - predictorC_y)
        if (sum > 32) {
            // read next bit to see which predictor candidate to use
            if (ReadTheHybridBit == 1) { // HYBRIDPRED field
                // use top predictor (predictorA)
                predictor_post_x = predictorA_x
                predictor_post_y = predictorA_y
            }
            else {
                // use left predictor (predictorC)
                predictor_post_x = predictorC_x
                predictor_post_y = predictorC_y
            }
        }
    }
}
```

Figure 34

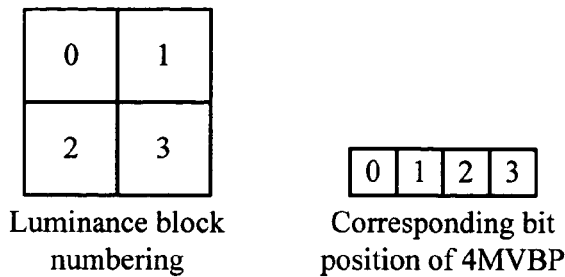

Luminance block numbering

Corresponding bit position of 4MVBP

Figure 36

```
// Coding a DMVX, DMVY motion vector differential pair:
// Horizontal Range is -RX to +RX - 1
// Vertical Range is -RY to + RY - 1
// Absolute value of RX = 2^MX
// Absolute value of RY = 2^MY
// AX = absolute value of DMVX
// AY = absolute value of DMVY
// SX = sign of DMVX: SX = 1 if DMVX < 0 and SX = 0 if DMVX is greater than
or equal to 0
// SY = sign of DMVY: SY = 1 if DMVY < 0 and SY = 0 if DMVY is greater than
or equal to 0
// ESCX = 2^KX
// ESCY = 2^KY
// R = The polarity of the reference field relative to the predicted
reference field (0 = same as predictor, 1 = opposite from predictor)

if (AX > ESCX or AY > ESCY)
{
    SendBits (VLC_CODE [ESCAPE,R], VLC_SIZE [ESCAPE,R])
    SendBits (DMVX, MX+1)
    SendBits (DMVY, MY+1)
}
else
{
    SendBits (VLC_CODE [NX, NY,R], VLC_SIZE [NX, NY,R])
    SendBits (AX, NX)
    SendBits (SX, 1)
    SendBits (AY NY)
    SendBits (SY, 1)
}
```

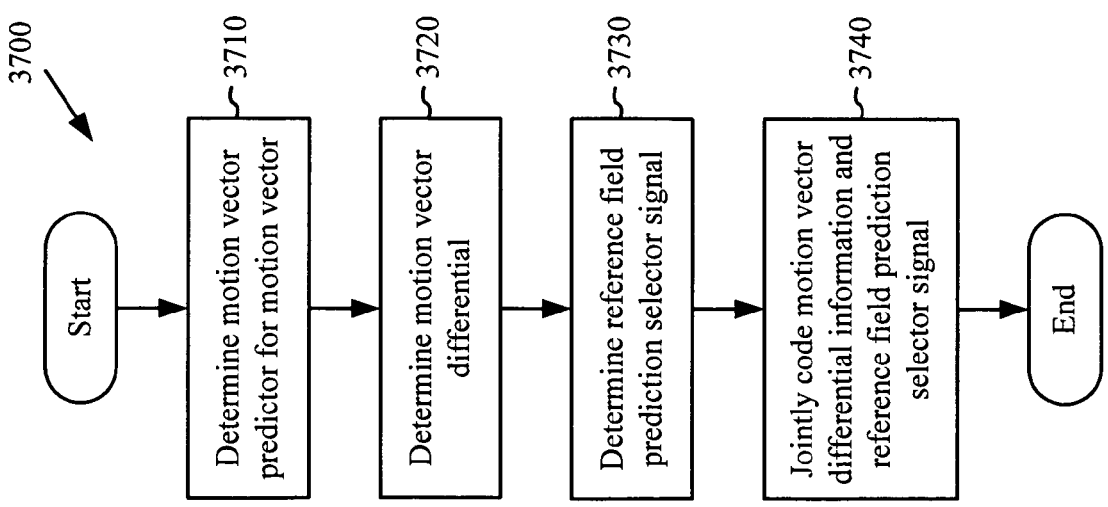
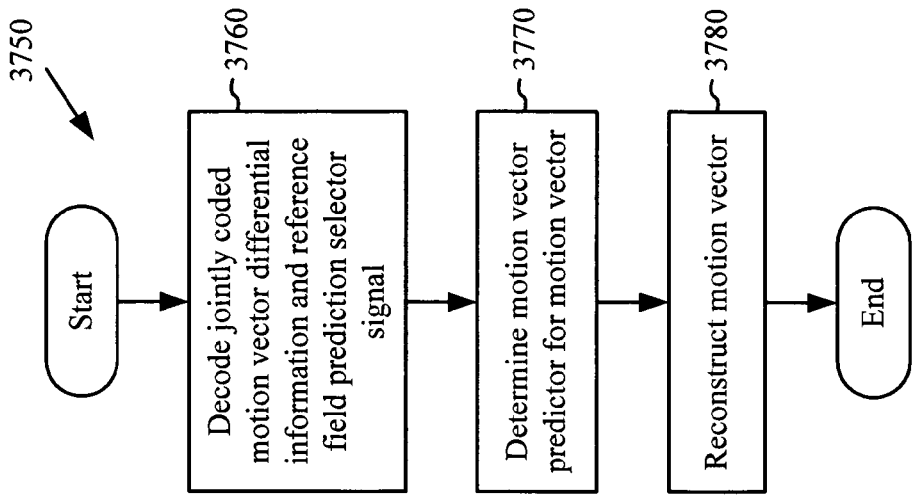
Figure 37B
Figure 37A

□ luma sample

○ chroma sample

○ actual luma or chroma sample at integer pixel position x interpolated sample at sub-pixel position Current field is top, reference field is bottom Current field is bottom, reference field is top Current and reference fields are of same polarity

Figure 40

```
MotionVector SelectChromaMVFrom4MV ()
{
    MotionVector SelectedMV;

if the corresponding MB used 1 MV
    then use that MV
    else    // 4 MV's to pick from
    {

Count the number of same field and opposite field MV's if (OppFieldCount > SameFieldCount)
            then use only the opposite field MV's in next step
            // i.e. opposite is the chosen polarity
            else use only the same field MV's in the next step
            // i.e. same is the chosen polarity Count the number of MV's of the chosen polarity
            if (Chosen MVs = 3) {
                SelectedMV = Median of 3 of the chosen MV's
            }
            else if (Chosen MVs = 2) {
                SelectedMV = Average of the chosen MV's
            }
            else if (Chosen MVs = 1) {
                SelectedMV = The chosen MV
            }
            else { // all 4 are of the chosen polarity
                SelectedMV = Median of 4 of the chosen MV's
            }
        }
    } return (SelectedMV);
}
```

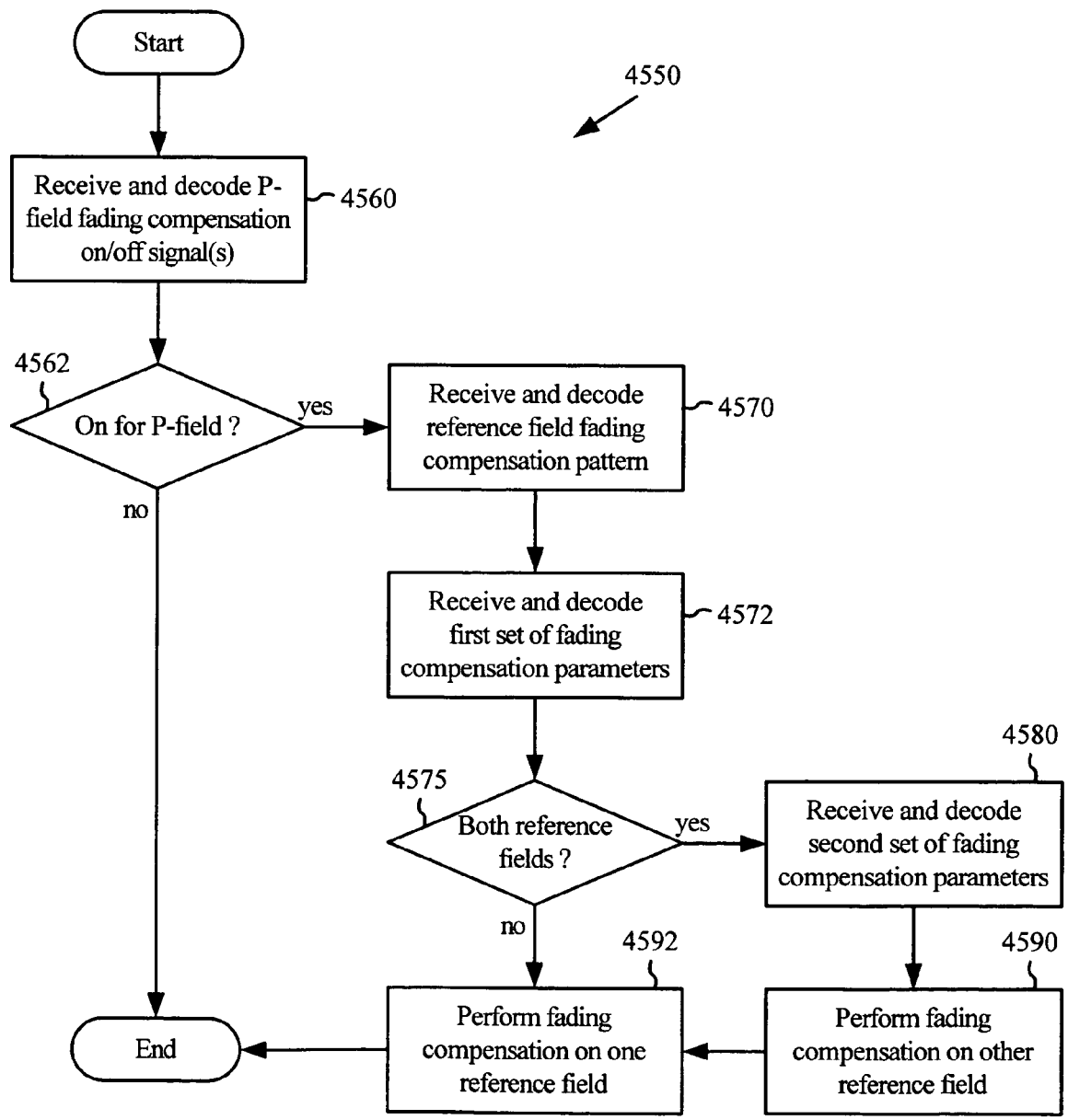

Sequence layer bitstream syntax

Macroblock Layer
Interlace P-field
Bitstream Syntax

Figure 47A

| FCM | Picture Coding Type |
|---|---|
| 0 | Progressive |
| 10 | Frame-Interlace |
| 11 | Field-Interlace |

Figure 47B

| FPTYPE FLC | First Field Picture Type | Second Field Picture Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

Figure 47C

| Reference Frame Distance | VLC (Binary) | VLC Size |
|---|---|---|
| 0 | 00 | 2 |
| 1 | 01 | 2 |
| 2 | 10 | 2 |
| N | 11[(N-3) 1s]0 | N |

Figure 47D

| Extended Horizontal Differential MV Range | Extended Vertical Differential MV Range | VLC (Binary) | VLC Size |
|---|---|---|---|
| No | No | 0 | 1 |
| Yes | No | 10 | 2 |
| No | Yes | 110 | 3 |
| Yes | Yes | 111 | 3 |

Figure 47E

P Picture Low rate (PQUANT > 12) MVMODE table

| MVMODE VLC | Mode |
| --- | --- |
| 1 | 1 MV Half-pel bilinear |
| 01 | 1 MV |
| 001 | 1 MV Half-pel |
| 0000 | Mixed MV |
| 0001 | Intensity Compensation |

P Picture High rate (PQUANT <= 12) MVMODE table

| MVMODE VLC | Mode |
| --- | --- |
| 1 | 1 MV |
| 01 | Mixed MV |
| 001 | 1 MV Half-pel |
| 0000 | 1 MV Half-pel bilinear |
| 0001 | Intensity Compensation |

Figure 47F

P Picture Low rate (PQUANT > 12) MVMODE2 table

| MVMODE2 VLC | Mode |
| --- | --- |
| 1 | 1 MV Half-pel bilinear |
| 01 | 1 MV |
| 001 | 1 MV Half-pel |
| 000 | Mixed MV |

P Picture High rate (PQUANT <= 12) MVMODE2 table

| MVMODE2 VLC | Mode |
| --- | --- |
| 1 | 1 MV |
| 01 | Mixed MV |
| 001 | 1 MV Half-pel |
| 000 | 1 MV Half-pel bilinear |

Figure 47G

| INTCOMPFIELD VLC | Intensity Compensation Applied to: |
| --- | --- |
| 1 | Both fields |
| 00 | Top field |
| 01 | Bottom field |

Figure 47H

Mixed-MV MB Mode Table 0

| MB Mode | VLC | VLC Size |
|---|---|---|
| 0 | 16 | 6 |
| 1 | 17 | 6 |
| 2 | 3 | 2 |
| 3 | 3 | 3 |
| 4 | 0 | 2 |
| 5 | 5 | 4 |
| 6 | 9 | 5 |
| 7 | 2 | 2 |

Mixed-MV MB Mode Table 3

| MB Mode | VLC | VLC Size |
|---|---|---|
| 0 | 56 | 6 |
| 1 | 57 | 6 |
| 2 | 15 | 4 |
| 3 | 4 | 3 |
| 4 | 5 | 3 |
| 5 | 6 | 3 |
| 6 | 29 | 5 |
| 7 | 0 | 1 |

Mixed-MV MB Mode Table 6

| MB Mode | VLC | VLC Size |
|---|---|---|
| 0 | 16 | 5 |
| 1 | 17 | 5 |
| 2 | 6 | 3 |
| 3 | 7 | 3 |
| 4 | 0 | 2 |
| 5 | 1 | 2 |
| 6 | 9 | 4 |
| 7 | 5 | 3 |

Mixed-MV MB Mode Table 1

| MB Mode | VLC | VLC Size |
|---|---|---|
| 0 | 8 | 5 |
| 1 | 9 | 5 |
| 2 | 3 | 3 |
| 3 | 6 | 3 |
| 4 | 7 | 3 |
| 5 | 0 | 2 |
| 6 | 5 | 4 |
| 7 | 2 | 2 |

Mixed-MV MB Mode Table 4

| MB Mode | VLC | VLC Size |
|---|---|---|
| 0 | 52 | 6 |
| 1 | 53 | 6 |
| 2 | 27 | 5 |
| 3 | 14 | 4 |
| 4 | 15 | 4 |
| 5 | 2 | 2 |
| 6 | 12 | 4 |
| 7 | 0 | 1 |

Mixed-MV MB Mode Table 7

| MB Mode | VLC | VLC Size |
|---|---|---|
| 0 | 56 | 6 |
| 1 | 57 | 6 |
| 2 | 0 | 1 |
| 3 | 5 | 3 |
| 4 | 6 | 3 |
| 5 | 29 | 5 |
| 6 | 4 | 3 |
| 7 | 15 | 4 |

Mixed-MV MB Mode Table 2

| MB Mode | VLC | VLC Size |
|---|---|---|
| 0 | 16 | 6 |
| 1 | 17 | 6 |
| 2 | 5 | 4 |
| 3 | 3 | 3 |
| 4 | 0 | 2 |
| 5 | 3 | 2 |
| 6 | 9 | 5 |
| 7 | 2 | 2 |

Mixed-MV MB Mode Table 5

| MB Mode | VLC | VLC Size |
|---|---|---|
| 0 | 56 | 6 |
| 1 | 57 | 6 |
| 2 | 29 | 5 |
| 3 | 5 | 3 |
| 4 | 6 | 3 |
| 5 | 0 | 1 |
| 6 | 15 | 4 |
| 7 | 4 | 3 |

Figure 47I

1MV MB Mode Table 0

| MB Mode | VLC | VLC Size |
|---|---|---|
| 0 | 0 | 5 |
| 1 | 1 | 5 |
| 2 | 1 | 1 |
| 3 | 1 | 3 |
| 4 | 1 | 2 |
| 5 | 1 | 4 |

1MV MB Mode Table 1

| MB Mode | VLC | VLC Size |
|---|---|---|
| 0 | 0 | 5 |
| 1 | 1 | 5 |
| 2 | 1 | 1 |
| 3 | 1 | 2 |
| 4 | 1 | 3 |
| 5 | 1 | 4 |

1MV MB Mode Table 2

| MB Mode | VLC | VLC Size |
|---|---|---|
| 0 | 16 | 5 |
| 1 | 17 | 5 |
| 2 | 3 | 2 |
| 3 | 0 | 1 |
| 4 | 9 | 4 |
| 5 | 5 | 3 |

1MV MB Mode Table 3

| MB Mode | VLC | VLC Size |
|---|---|---|
| 0 | 20 | 5 |
| 1 | 21 | 5 |
| 2 | 3 | 2 |
| 3 | 11 | 4 |
| 4 | 0 | 1 |
| 5 | 4 | 3 |

1MV MB Mode Table 4

| MB Mode | VLC | VLC Size |
|---|---|---|
| 0 | 4 | 4 |
| 1 | 5 | 4 |
| 2 | 2 | 2 |
| 3 | 3 | 3 |
| 4 | 3 | 2 |
| 5 | 0 | 2 |

1MV MB Mode Table 5

| MB Mode | VLC | VLC Size |
|---|---|---|
| 0 | 4 | 4 |
| 1 | 5 | 4 |
| 2 | 3 | 3 |
| 3 | 2 | 2 |
| 4 | 0 | 2 |
| 5 | 3 | 2 |

1MV MB Mode Table 6

| MB Mode | VLC | VLC Size |
|---|---|---|
| 0 | 0 | 5 |
| 1 | 1 | 5 |
| 2 | 1 | 3 |
| 3 | 1 | 4 |
| 4 | 1 | 1 |
| 5 | 1 | 2 |

1MV MB Mode Table 7

| MB Mode | VLC | VLC Size |
|---|---|---|
| 0 | 16 | 5 |
| 1 | 17 | 5 |
| 2 | 9 | 4 |
| 3 | 5 | 3 |
| 4 | 3 | 2 |
| 5 | 0 | 1 |

Figure 47J

4MV Block Pattern Table 0

| 4MV Coded Pattern | VLC | VLC Size |
|---|---|---|
| 0 | 14 | 5 |
| 1 | 58 | 6 |
| 2 | 59 | 6 |
| 3 | 25 | 5 |
| 4 | 12 | 5 |
| 5 | 26 | 5 |
| 6 | 15 | 5 |
| 7 | 15 | 4 |
| 8 | 13 | 5 |
| 9 | 24 | 5 |
| 10 | 27 | 5 |
| 11 | 0 | 3 |
| 12 | 28 | 5 |
| 13 | 1 | 3 |
| 14 | 2 | 3 |
| 15 | 2 | 2 |

4MV Block Pattern Table 1

| 4MV Coded Pattern | VLC | VLC Size |
|---|---|---|
| 0 | 8 | 4 |
| 1 | 18 | 5 |
| 2 | 19 | 5 |
| 3 | 4 | 4 |
| 4 | 20 | 5 |
| 5 | 5 | 4 |
| 6 | 30 | 5 |
| 7 | 11 | 4 |
| 8 | 21 | 5 |
| 9 | 31 | 5 |
| 10 | 6 | 4 |
| 11 | 12 | 4 |
| 12 | 7 | 4 |
| 13 | 13 | 4 |
| 14 | 14 | 4 |
| 15 | 0 | 2 |

4MV Block Pattern Table 2

| 4MV Coded Pattern | VLC | VLC Size |
|---|---|---|
| 0 | 15 | 4 |
| 1 | 6 | 4 |
| 2 | 7 | 4 |
| 3 | 2 | 4 |
| 4 | 8 | 4 |
| 5 | 3 | 4 |
| 6 | 28 | 5 |
| 7 | 9 | 4 |
| 8 | 10 | 4 |
| 9 | 29 | 5 |
| 10 | 4 | 4 |
| 11 | 11 | 4 |
| 12 | 5 | 4 |
| 13 | 12 | 4 |
| 14 | 13 | 4 |
| 15 | 0 | 3 |

4MV Block Pattern Table 3

| 4MV Coded Pattern | VLC | VLC Size |
|---|---|---|
| 0 | 0 | 2 |
| 1 | 11 | 4 |
| 2 | 12 | 4 |
| 3 | 4 | 4 |
| 4 | 13 | 4 |
| 5 | 5 | 4 |
| 6 | 30 | 5 |
| 7 | 16 | 5 |
| 8 | 14 | 4 |
| 9 | 31 | 5 |
| 10 | 6 | 4 |
| 11 | 17 | 5 |
| 12 | 7 | 4 |
| 13 | 18 | 5 |
| 14 | 19 | 5 |
| 15 | 10 | 4 |

Figure 47K

Interlace Frame 2 MVP Block Pattern Table 0

| Top | Bottom | VLC | VLC Size |
|-----|--------|-----|----------|
| 0 | 0 | 2 | 2 |
| 0 | 1 | 1 | 2 |
| 1 | 0 | 0 | 2 |
| 1 | 1 | 3 | 2 |

Interlace Frame 2 MVP Block Pattern Table 1

| Top | Bottom | VLC | VLC Size |
|-----|--------|-----|----------|
| 0 | 0 | 1 | 1 |
| 0 | 1 | 0 | 2 |
| 1 | 0 | 2 | 3 |
| 1 | 1 | 3 | 3 |

Interlace Frame 2 MVP Block Pattern Table 2

| Top | Bottom | VLC | VLC Size |
|-----|--------|-----|----------|
| 0 | 0 | 2 | 3 |
| 0 | 1 | 0 | 2 |
| 1 | 0 | 3 | 3 |
| 1 | 1 | 1 | 1 |

Interlace Frame 2 MVP Block Pattern Table 3

| Top | Bottom | VLC | VLC Size |
|-----|--------|-----|----------|
| 0 | 0 | 1 | 1 |
| 0 | 1 | 3 | 3 |
| 1 | 0 | 2 | 3 |
| 1 | 1 | 0 | 2 |

Figure 49A

```
index = vlc_decode()    // Use the table indicated by MVTAB in the
picture layer
if (index == 71)
{
      dmv_x = get_bits(k_x)
      dmv_y = get_bits(k_y)
}
else
{
      if (extend_x == 1)
   offset_table = offset_table2
      else
   offset_table = offset_table1
    index1 = (index + 1) % 9
      if (index1 != 0)
      {
          val = get_bits (index1 + extend_x)
          sign = 0 - (val & 1)
          dmv_x = sign ^ ((val >> 1) + offset_table[index1])
          dmv_x = dmv_x - sign
      }
      else
          dmv_x = 0 if (extend_y == 1)
   offset_table = offset_table2
      else
   offset_table = offset_table1
    index1 = (index + 1) / 9
      if (index1 != 0)
      {
          val = get_bits (index1 + extend_y)
          sign = 0 - (val & 1)
          dmv_y = sign ^ ((val >> 1) + offset_table[index1])
          dmv_y = dmv_y - sign
      }
      else
          dmv_y = 0
}
```

Figure 49B

| MVRANGE | k_x | k_y | range_x | range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 |

Figure 50

```
index = vlc_decode()      // Use the table indicated by MVTAB in the
picture layer
if (index == 125)
{
      dmv_x = get_bits(k_x)
      dmv_y = get_bits(k_y)
      predictor_flag = dmv_y & 1
      dmv_y = (dmv_y + predictor_flag) >> 1
}
else
{
        if (extend_x == 1)
      offset_table = offset_table2
        else
      offset_table = offset_table1
        index1 = (index + 1) % 9
        if (index1 != 0)
        {
            val = get_bits (index1 + extend_x)
            sign = 0 - (val & 1)
            dmv_x = sign ^ ((val >> 1) + offset_table[index1])
            dmv_x = dmv_x - sign
        }
        else
            dmv_x = 0 if (extend_y == 1)
      offset_table = offset_table2
        else
      offset_table = offset_table1
        index1 = (index + 1) / 9
        if (index1 != 0)
        {
            val = get_bits (size_table[index1 + 2 * extend_y])
            sign = 0 - (val & 1)
            dmv_y = sign ^ ((val >> 1) + offset_table[index1 >> 1])
            dmv_y = dmv_y - sign
            predictor_flag = index1 & 1
        }
        else
        {
            dmv_y = 0
            predictor_flag = 0
        }
}
```

Figure 51A

```
if (predictorA is not out of bounds) {
    if (predictorC is not out of bounds) {
        if (predictorA is intra) {
            predictorA_x = 0
            predictorA_y = 0
        }
        if (predictorB is intra) {
            predictorB_x = 0
            predictorB_y = 0
        }
        if (predictorC is intra) {
            predictorC_x = 0
            predictorC_y = 0
        }
        fieldpred_x = median (predictorA_x, predictorB_x, predictorC_x)
        fieldpred_y = median (predictorA_y, predictorB_y, predictorC_y)
    }
    else {
        // predictorC is out of bounds
        if (only 1 macroblock per row) {
            if (predictorA is intra) {
                fieldpred_x = 0
                fieldpred_y = 0
            }
            else {
                // Use predictorA
                fieldpred_x = predictorA_x
                fieldpred_y = predictorA_y
            }
        }
        else {
            // Predictor C is out of bounds, use Predictor and PredictorB
            predictorC_x = 0
            predictorC_y = 0
            if (predictorA is intra) {
                predictorA_x = 0
                predictorA_y = 0
            }
            if (predictorB is intra) {
                predictorB_x = 0
                predictorB_y = 0
            }
``` continued in 51B

Figure 51B continued from 51A

```
            if (predictorC is intra) {
                predictorC_x = 0
                predictorC_y = 0
            }
            fieldpred_x = median (predictorA_x, predictorB_x, predictorC_x)
            fieldpred_y = median (predictorA_y, predictorB_y, predictorC_y)
        }
    }
}
else {
    // Predictor A is out of bounds
    if (predictorC is out of bounds) {
        fieldpred_x = 0
        fieldpred_y = 0
    }
    else {
        // Use predictorC
        fieldpred_x = predictorC_x
        fieldpred_y = predictorC_y
    }
}
```

Figure 52A

```
samecount = 0;
oppositecount = 0;
if (predictorC is not out of bounds) {
    if (predictorC is not out of bounds) {
        if (predictorA is intra) {
            samefieldpred_x = oppositefieldpred_x = samefieldpredA_x = oppositefieldpredA_x = 0
            samefieldpred_y = oppositefieldpred_y = samefieldpredA_y = oppositefieldpredA_y = 0
        }
        if (predictorB is intra) {
            samefieldpred_x = oppositefieldpred_x = samefieldpredB_x = oppositefieldpredB_x = 0
            samefieldpred_y = oppositefieldpred_y = samefieldpredB_y = oppositefieldpredB_y = 0
        }
        if (predictorC is intra) {
            samefieldpred_x = oppositefieldpred_x = samefieldpredC_x = oppositefieldpredC_x = 0
            samefieldpred_y = oppositefieldpred_y = samefieldpredC_y = oppositefieldpredC_y = 0
        }
        if (predictorA is not intra) {
            if (predictorA is from same field) {
                samecount = samecount + 1
                samefieldpred_x = samefieldpredA_x = predictorA_x
                samefieldpred_y = samefieldpredA_y = predictorA_y
                oppositefieldpred_x = oppositefieldpredA_x = scaleforopposite_x(predictorA_x)
                oppositefieldpred_y = oppositefieldpredA_y = scaleforopposite_y(predictorA_y)
            }
            else {
                oppositecount = oppositecount + 1
                oppositefieldpred_x = oppositefieldpredA_x = predictorA_x
                oppositefieldpred_y = oppositefieldpredA_y = predictorA_y
                samefieldpred_x = samefieldpredA_x = scaleforsame_x(predictorA_x)
                samefieldpred_y = samefieldpredA_y = scaleforsame_y(predictorA_y)
            }
        }
    }
``` continued in 52B

Figure 52B continued from 52A

```
if (predictorB is not intra) {
    If (predictorB is from same field) {
        samecount = samecount + 1
        samefieldpredB_x = predictorB_x
        samefieldpredB_y = predictorB_y
        oppositefieldpredB_x = scaleforopposite_x(predictorB_x)
        oppositefieldpredB_y = scaleforopposite_y(predictorB_y)
    }
    else {
        oppositecount = oppositecount + 1
        oppositefieldpredB_x = predictorB_x
        oppositefieldpredB_y = predictorB_y
        samefieldpredB_x = scaleforsame_x(predictorB_x)
        samefieldpredB_y = scaleforsame_y(predictorB_y)
    }
}
if (predictorC is not intra) {
    if (predictorC is from same field) {
        samecount = samecount + 1
        samefieldpredC_x = predictorC_x
        samefieldpredC_y = predictorC_y
        oppositefieldpredC_x = scaleforopposite_x(predictorC_x)
        oppositefieldpredC_y = scaleforopposite_y(predictorC_y)
    }
    else {
        oppositecount = oppositecount + 1
        oppositefieldpredC_x = predictorC_x
        oppositefieldpredC_y = predictorC_y
        samefieldpredC_x = scaleforsame_x(predictorC_x)
        samefieldpredC_y = scaleforsame_y(predictorC_y)
    }
}
``` continued in 52C

Figure 52C continued from 52B

```
    if ((samecount + oppositecount) > 1) {
        samefieldpred_x = median (samefieldpredA_x, samefieldpredB_x, samefieldpredC_x)
        samefieldpred_y = median (samefieldpredA_y, samefieldpredB_y, samefieldpredC_y)
        oppositefieldpred_x = median (oppositefieldpredA_x, oppositefieldpredB_x, oppositefieldpredC_x)
        oppositefieldpred_y = median (oppositefieldpredA_y, oppositefieldpredB_y, oppositefieldpredC_y)
    } if (samecount > oppositecount)
        dominantpredictor = samefield
    else
        dominantpredictor = oppositefield
}
else {
    // predictorC is out of bounds
    if (only 1 macroblock per row) {
        if (predictorA is intra) {
            samefieldpred_x = oppositefieldpred_x = 0
            samefieldpred_y = oppositefieldpred_y = 0
            dominantpredictor = oppositefield
        }
        else {
            // Use predictorA
            if (predictorA is from same field) {
                samefieldpred_x = predictorA_x
                samefieldpred_y = predictorA_y
                oppositefieldpred_x = scaleforopposite_x(predictorA_x)
                oppositefieldpred_y = scaleforopposite_y(predictorA_y)
                dominantpredictor = samefield
            }
``` continued in 52D

Figure 52D

```
                                                     continued from 52C
    else {
        oppositefieldpred_x = predictorA_x
        oppositefieldpred_y = predictorA_y
        samefieldpred_x = scaleforsame_x(predictorA_x)
        samefieldpred_y = scaleforsame_y(predictorA_y)
        dominantpredictor = oppositefield
    }
}
else {
    // Predictor C is out of bounds, use Predictor and PredictorB
    predictorC_x = 0
    predictorC_y = 0
    if (predictorA is intra) {
        samefieldpred_x = oppositefieldpred_x = samefieldpredA_x = oppositefieldpredA_x = 0
        samefieldpred_y = oppositefieldpred_y = samefieldpredA_y = oppositefieldpredA_y = 0
    }
    if (predictorB is intra) {
        samefieldpred_x = oppositefieldpred_x = samefieldpredB_x = oppositefieldpredB_x = 0
        samefieldpred_y = oppositefieldpred_y = samefieldpredB_y = oppositefieldpredB_y = 0
    }
    if (predictorC is intra) {
        samefieldpred_x = oppositefieldpred_x = samefieldpredC_x = oppositefieldpredC_x = 0
        samefieldpred_y = oppositefieldpred_y = samefieldpredC_y = oppositefieldpredC_y = 0
    }
    if (predictorA is not intra) {
        if (predictorA is from same field) {
            samecount = samecount + 1
            samefieldpred_x = samefieldpredA_x = predictorA_x
            samefieldpred_y = samefieldpredA_y = predictorA_y
            oppositefieldpred_x = oppositefieldpredA_x = scaleforopposite_x(predictorA_x)
            oppositefieldpred_y = oppositefieldpredA_y = scaleforopposite_y(predictorA_y)
        } continued in 52E
```

Figure 52E

```
                                        continued from 52D
else {
    oppositecount = oppositecount + 1
    oppositefieldpredA_x = oppositefieldpredA_x = predictorA_x
    oppositefieldpredA_y = oppositefieldpredA_y = predictorA_y
    samefieldpredA_x = scaleforsame_x(predictorA_x)
    samefieldpredA_y = scaleforsame_y(predictorA_y)
} if (predictorB is not intra) {
    if (predictorB is from same field) {
        samecount = samecount + 1
        samefieldpred_x = samefieldpredB_x = predictorB_x
        samefieldpred_y = samefieldpredB_y = predictorB_y
        oppositefieldpredB_x = oppositefieldpredB_x = scaleforopposite_x(predictorB_x)
        oppositefieldpredB_y = oppositefieldpredB_y = scaleforopposite_y(predictorB_y)
    }
    else {
        oppositecount = oppositecount + 1
        oppositefieldpredB_x = oppositefieldpredB_x = predictorB_x
        oppositefieldpredB_y = oppositefieldpredB_y = predictorB_y
        samefieldpred_x = samefieldpredB_x = scaleforsame_x(predictorB_x)
        samefieldpred_y = samefieldpredB_y = scaleforsame_y(predictorB_y)
    }
} if ((samecount + oppositecount) > 1) {
    samefieldpred_x = median (samefieldpredA_x, samefieldpredB_x, samefieldpredC_x)
    samefieldpred_y = median (samefieldpredA_y, samefieldpredB_y, samefieldpredC_y)
    oppositefieldpred_x = median (oppositefieldpredA_x, oppositefieldpredB_x, oppositefieldpredC_x)
    oppositefieldpred_y = median (oppositefieldpredA_y, oppositefieldpredB_y, oppositefieldpredC_y)
}
``` continued in 52F

Figure 52F continued from 52E

```
                if (samecount > oppositecount)
                    dominantpredictor = samefield
                else
                    dominantpredictor = oppsositefield
            }
        }
        else {
            // Predictor A is out of bounds
            if (predictorC is out of bounds) {
                samefieldpred_x = oppositefieldpred_x = 0
                samefieldpred_y = oppositefieldpred_y = 0
                dominantpredictor = oppositefield
            }
            else {
                // Use predictorC
                if (predictorC is from same field) {
                    samefieldpred_x = predictorC_x
                    samefieldpred_y = predictorC_y
                    oppositefieldpred_x = scaleforopposite_x(predictorC_x)
                    oppositefieldpred_y = scaleforopposite_y(predictorC_y)
                    dominantpredictor = samefield
                }
                else {
                    oppositefieldpred_x = predictorC_x
                    oppositefieldpred_y = predictorC_y
                    samefieldpred_x = scaleforsame_x(predictorC_x)
                    samefieldpred_y = scaleforsame_y(predictorC_y)
                    dominantpredictor = oppositefield
                }
            }
        }
    }
```

Figure 52G

```
scaleforopposite_x (n)  {
    int scaledvalue
    scaledvalue = (n * SCALEOPP) >> 8
    return scaledvalue
} scaleforopposite_y (n)  {
    int scaledvalue
    if (current field is top)
        scaledvalue = ((n * SCALEOPP) >> 8) - 2
    else //current field is bottom
        scaledvalue = ((n * SCALEOPP) >> 8) + 2
    return scaledvalue
} scaleforsame_x (n)  {
    if (abs (n) < SCALEZONE1_X)
        scaledvalue = (n * SCALEZONE1_X) >> 8
    else {
        if (n < 0)
            scaledvalue = ((n * SCALESAME2) >> 8) - ZONE1OFFSET_X
        else
            scaledvalue = ((n * SCALESAME2) >> 8) + ZONE1OFFSET_X
    }
    return scaledvalue
}
```

Figure 52H

```
scaleforsame_y (n) {
    if (current field is top) {
        if (abs (n) < SCALEZONE1_Y)
            scaledvalue = (n * SCALEZONE1_Y) >> 8
        else {
            if (n < 0)
                scaledvalue = ((n * SCALESAME2) >> 8) - ZONE1OFFSET_Y
            else
                scaledvalue = ((n * SCALESAME2) >> 8) + ZONE1OFFSET_Y
        }
    }
    else {    //current field is bottom
        if (abs (n) < SCALEZONE1_Y)
            scaledvalue = (n * SCALESAME1) >> 8
        else {
            if (n < 0)
                scaledvalue = ((n * SCALESAME2) >> 8) - ZONE1OFFSET_Y
            else
                scaledvalue = ((n * SCALESAME2) >> 8) + ZONE1OFFSET_Y
        }
    }
    return scaledvalue
}
```

P-Field MV Predictor Scaling Values When Current Field Is First Field

|  | Reference Frame Distance | | | |
|---|---|---|---|---|
|  | 1 | 2 | 3 | 4 or greater |
| SCALEOPP | 128 | 192 | 213 | 224 |
| SCALESAME1 | 512 | 341 | 307 | 293 |
| SCALESAME2 | 219 | 236 | 242 | 245 |
| SCALEZONE1_X | 32 | 48 | 53 | 56 |
| SCALEZONE1_Y | 8 | 12 | 13 | 14 |
| ZONE1OFFSET_X | 37 | 20 | 14 | 11 |
| ZONE1OFFSET_Y | 10 | 5 | 4 | 3 |

Figure 52I

P-Field MV Predictor Scaling Values When Current Field Is Second Field

|  | Reference Frame Distance | | | |
|---|---|---|---|---|
|  | 1 | 2 | 3 | 4 or greater |
| SCALEOPP | 128 | 64 | 43 | 32 |
| SCALESAME1 | 512 | 1024 | 1536 | 2048 |
| SCALESAME2 | 219 | 204 | 200 | 198 |
| SCALEZONE1_X | 32 | 16 | 11 | 8 |
| SCALEZONE1_Y | 8 | 4 | 3 | 2 |
| ZONE1OFFSET_X | 37 | 52 | 56 | 11 |
| ZONE1OFFSET_Y | 10 | 5 | 4 | 3 |

```
scaleforsame_y (n) {
    if (current field is top) {
        if (abs (n) < SCALEZONE1_Y)
            scaledvalue = ((n + 2) * SCALESAME1) >> 8
        else {
            if (n < 0)
                scaledvalue = (((n + 2) * SCALESAME2) >> 8) - ZONE1OFFSET_Y
            else
                scaledvalue = (((n + 2) * SCALESAME2) >> 8) + ZONE1OFFSET_Y
        }
    }
    else {      //current field is bottom
        if (abs (n) < SCALEZONE1_Y)
            scaledvalue = ((n - 2) * SCALESAME1) >> 8
        else {
            if (n < 0)
                scaledvalue = (((n - 2) * SCALESAME2) >> 8) - ZONE1OFFSET_Y
            else
                scaledvalue = (((n - 2) * SCALESAME2) >> 8) + ZONE1OFFSET_Y
        }
    }
    return scaledvalue
}
```

Scaling parameters when the current P-field is the first field

| | Reference Frame Distance | | | |
|---|---|---|---|---|
| | 1 | 2 | 3 | 4 or greater |
| SCALEOPP | 128 | 192 | 213 | 224 |
| SCALESAME1 | 512 | 341 | 307 | 293 |
| SCALESAME2 | 219 | 236 | 242 | 245 |
| SCALEZONE1_X | 32 * N | 48 * N | 53 * N | 56 * N |
| SCALEZONE1_Y | 8 * N | 12 * N | 13 * N | 14 * N |
| ZONE1OFFSET_X | 37 * N | 20 * N | 14 * N | 11 * N |
| ZONE1OFFSET_Y | 10 * N | 5 * N | 4 * N | 3 * N |

Figure 52L

Scaling parameters when the current P-field is the second field

| | Reference Frame Distance | | | |
|---|---|---|---|---|
| | 1 | 2 | 3 | 4 or greater |
| SCALEOPP | 128 | 64 | 43 | 32 |
| SCALESAME1 | 512 | 1024 | 1536 | 2048 |
| SCALESAME2 | 219 | 204 | 200 | 198 |
| SCALEZONE1_X | 32 * N | 16 * N | 11 * N | 8 * N |
| SCALEZONE1_Y | 8 * N | 4 * N | 3 * N | 2 * N |
| ZONE1OFFSET_X | 37 * N | 52 * N | 56 * N | 11 * N |
| ZONE1OFFSET_Y | 10 * N | 5 * N | 4 * N | 3 * N |

Figure 52M

| MVRANGE | N |
|---|---|
| 0 or default | 1 |
| 10 | 2 |
| 110 | 8 |
| 111 | 16 |

```
if ((predictorA is out of bounds) || (predictorC is out of bounds) ||
(predictorA is intra) || (predictorC is intra)) {
    predictor_post_x = predictor_pre_x
    predictor_post_y = predictor_pre_y
}
else {
    sumA = abs(predictor_pre_x - predictorA_x) + abs(predictor_pre_y - predictorA_y)
    sumC = abs(predictor_pre_x - predictorC_x) + abs(predictor_pre_y - predictorC_y)
    if (sumA > 32) {
        // read next bit to see which predictor candidate to use
        if (get_bits(1) == 1) { // HYBRIDPRED field
            // use top predictor (predictorA)
            predictor_post_x = predictorA_x
            predictor_post_y = predictorA_y
        }
        else {
            // use left predictor (predictorC)
            predictor_post_x = predictorC_x
            predictor_post_y = predictorC_y
        }
    }
    else if (sumC > 32){
        if (get_bits(1) == 1) {
            // use top predictor (predictorA)
            predictor_post_x = predictorA_x
            predictor_post_y = predictorA_y
        }
        else {
            // use left predictor (predictorC)
            predictor_post_x = predictorC_x
            predictor_post_y = predictorC_y
        }
    }
    else {
        predictor_post_x = predictor_pre_x
        predictor_post_y = predictor_pre_y
    }
}
```

Figure 54

```
if (predictor_flag == 0) {
    if (dominantpredictor == samefield)
        reference is from same field as current field
    else
        reference is from opposite field as current field
}
else {
    // predictor_flag == 1
    if (dominantpredictor == samefield)
        reference is from opposite field as current field
    else
        reference is from same field as current field
}
```

Figure 55A

```
// lmv0_x, lmv0_y is the motion vector for block 0
// lmv1_x, lmv1_y is the motion vector for block 1
// lmv2_x, lmv2_y is the motion vector for block 2
// lmv3_x, lmv3_y is the motion vector for block 3
ix = median4(lmv0_x, lmv1_x, lmv2_x, lmv3_x)
iy = median4(lmv0_y, lmv1_y, lmv2_y, lmv3_y)
cmv_x = (ix + round[ix & 3]) >> 1
cmv_y = (iy + round[iy & 3]) >> 1

Where round[0] = 0, round[1] = 0, round[2] = 0 and round[3] = 1
```

Figure 55B

```
if (all 4 luma block motion vectors are from same field)
{
        // lmv0_x, lmv0_y is the motion vector for block 0
        // lmv1_x, lmv1_y is the motion vector for block 1
        // lmv2_x, lmv2_y is the motion vector for block 2
        // lmv3_x, lmv3_y is the motion vector for block 3
        ix = median4(lmv0_x, lmv1_x, lmv2_x, lmv3_x)
        iy = median4(lmv0_y, lmv1_y, lmv2_y, lmv3_y)
}
else if (3 of the luma block motion vectors are from same field)
{
        // lmv0_x, lmv0_y,
        // lmv1_x, lmv1_y,
        // lmv2_x, lmv2_y are the 3 motion vectors from the same field
        ix = median3(lmv0_x, lmv1_x, lmv2_x)
        iy = median3(lmv0_y, lmv1_y, lmv2_y)
}
else if (2 of the luma block motion vectors are from same field)
{
        // Use the 2 motion vectors from the field which has the same
polarity as the current field.
        // lmv0_x, lmv0_y,
        // lmv1_x, lmv1_y  are the motion vectors that have the same
polarity as the current field
        ix = (lmv0_x + lmv1_x) / 2
        iy = (lmv0_y + lmv1_y) / 2
} cmv_x = (ix + round[ix & 3]) >> 1
cmv_y = (iy + round[iy & 3]) >> 1

Where round[0] = 0, round[1] = 0, round[2] = 0 and round[3] = 1
```

Figure 56

```
if (LUMSCALE1 == 0)
{
        iScale = - 64
        iShift = 255 * 64   - LUMSHIFT1 *2 * 64
                if (LUMSHIFT1 > 31)
                        iShift += 128 * 64;
}
else {
        iScale = LUMSCALE1 + 32
        if (LUMSHIFT1 > 31)
                iShift = LUMSHIFT1 * 64 - 64 * 64;
                else
                iShift = LUMSHIFT1 * 64;
          }

// build LUTs
for (i = 0; i < 256; i++)
{
        j = (iScale * i + iShift + 32) >> 6
        if (j > 255)
                j = 255
        else if (j < 0)
                        j = 0
        LUTY[i] = j
        j = (iScale * (i - 128) + 128 * 64 + 32) >>6
        if (j > 255)
                j = 255
        else if (j < 0)
                j = 0
        LUTUV[i] =  j
}
```

Macroblock Layer Interlace P-field Bitstream Syntax

Figure 58A

```
index = vlc_decode()      // Use the Huffman table indicated by MVTAB in
the picture layer
if (index == 0) {
      dmv_x = 1 - 2 * get_bits(1)
      dmv_y = 0
}
if (index == 125)
{
      dmv_x = get_bits(k_x - halfpel_flag)
      dmv_y = get_bits(k_y - halfpel_flag)
}
else
{
    index1 = (index + 1) % 9
       val = get_bits (index1)
       sign = 0 - (val & 1)
       dmv_x = sign ^ ((val >> 1) + offset_table[index1])
       dmv_x = dmv_x - sign index1 = (index + 1) / 9
       val = get_bits (index1)
       sign = 0 - (val & 1)
       dmv_y = sign ^ ((val >> 1) + offset_table[index1])
       dmv_y = dmv_y - sign
}
```

Figure 58B

| MVRANGE | k_x | k_y | range_x | range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 |

Figure 59

```
index = vlc_decode()    // Use the Huffman table indicated by MVTAB in
the picture layer
if (index == 0) {
      dmv_x = 1 - 2 * get_bits(1)
      dmv_y = 0
      predictor_flag = 0
}
if (index == 125)
{
      dmv_x = get_bits(k_x - halfpel_flag)
      dmv_y = get_bits(k_y - halfpel_flag)
      predictor_flag = dmv_y & 1
      dmv_y = dmv_y >> 1
}
else
{
    index1 = (index + 1) % 9
        val = get_bits (index1)
        sign = 0 - (val & 1)
        dmv_x = sign ^ ((val >> 1) + offset_table[index1])
        dmv_x = dmv_x - sign index1 = (index + 1) / 9
        val = get_bits (size_table[index1])
        sign = 0 - (val & 1)
        dmv_y = sign ^ ((val >> 1) + offset_table[index1])
        dmv_y = dmv_y - sign
        predictor_flag = index1 & 1
}
```

Figure 60A

```
if (predictorA is not out of bounds) {
    if (predictorC is not out of bounds) {
        if (predictorA is intra) {
            predictorA_x = 0
            predictorA_y = 0
        }
        if (predictorB is intra) {
            predictorB_x = 0
            predictorB_y = 0
        }
        if (predictorC is intra) {
            predictorC_x = 0
            predictorC_y = 0
        }
        fieldpred_x = median (predictorA_x, predictorB_x, predictorC_x)
        fieldpred_y = median (predictorA_y, predictorA_y, predictorC_y)
    }
    else {
        // predictorC is out of bounds
        if (only 1 macroblock per row) {
            if (predictorA is intra) {
                fieldpred_x = oppositefieldpred_x = 0
                fieldpred_y = oppositefieldpred_y = 0
            }
            else {
                // Use predictorA
                fieldpred_x = predictorA_x
                fieldpred_y = predictorA_y
            }
        }
        else {
            // Predictor C is out of bounds, use Predictor and PredictorB
            predictorC_x = 0
            predictorC_y = 0
            if (predictorA is intra) {
                predictorA_x = 0
                predictorA_y = 0
            }
``` continued in 60B

Figure 60B continued from 60A

```
            if (predictorB is intra) {
                predictorB_x = 0
                predictorB_y = 0
            }
            if (predictorC is intra) {
                predictorC_x = 0
                predictorC_y = 0
            }
            fieldpred_x = median(predictorA_x, predictorB_x, predictorC_x)
            fieldpred_y = median(predictorA_y, predictorB_y, predictorC_y)
        }
    }
}
else {
    // Predictor A is out of bounds
    if (predictorC is out of bounds) {
        fieldpred_x = 0
        fieldpred_y = 0
    }
    else {
        // Use predictorC
        samefieldpred_x = predictorC_x
        samefieldpred_y = predictorC_y
    }
}
```

Figure 61A

```
if (predictorA is not out of bounds) {
    if (predictorC is not out of bounds) {
        if (predictorA is intra) {
            predictorA_x = 0
            predictorA_y = 0
        }
    }
    if (predictorB is intra) {
        predictorB_x = 0
        predictorB_y = 0
    }
    if (predictorC is intra) {
        predictorC_x = 0
        predictorC_y = 0
    }
    if (predictorA is from same field) {
        samecount = samecount + 1
        samefieldpredA_x = predictorA_x
        samefieldpredA_y = predictorA_y
        oppositefieldpredA_x = scaleforopposite_x(predictorA_x)
        oppositefieldpredA_y = scaleforopposite_y(predictorA_y)
    }
    else {
        oppositecount = oppositecount + 1
        oppositefieldpredA_x = predictorA_x
        oppositefieldpredA_y = predictorA_y
        samefieldpredA_x = scaleforsame_x(predictorA_x)
        samefieldpredA_y = scaleforsame_y(predictorA_y)
    }
}
``` continued in 61B

Figure 61B continued from 61A

```
    if (predictorB is from same field) {
        samecount = samecount + 1
        samefieldpredB_x = predictorB_x
        samefieldpredB_y = predictorB_y
        oppositefieldpredB_x = scaleforopposite_x(predictorB_x)
        oppositefieldpredB_y = scaleforopposite_y(predictorB_y)
    }
    else {
        oppositecount = oppositecount + 1
        oppositefieldpredB_x = predictorB_x
        oppositefieldpredB_y = predictorB_y
        samefieldpredB_x = scaleforsame_x(predictorB_x)
        samefieldpredB_y = scaleforsame_y(predictorB_y)
    }
    if (predictorC is from same field) {
        samecount = samecount + 1
        samefieldpredC_x = predictorC_x
        samefieldpredC_y = predictorC_y
        oppositefieldpredC_x = scaleforopposite_x(predictorC_x)
        oppositefieldpredC_y = scaleforopposite_y(predictorC_y)
    }
    else {
        oppositecount = oppositecount + 1
        oppositefieldpredC_x = predictorC_x
        oppositefieldpredC_y = predictorC_y
        samefieldpredC_x = scaleforsame_x(predictorC_x)
        samefieldpredC_y = scaleforsame_y(predictorC_y)
    }
}
``` continued in 61C

Figure 61C continued from 61B

```
samefieldpred_x = median(samefieldpredA_x, samefieldpredB_x, samefieldpredC_x)
samefieldpred_y = median(samefieldpredA_y, samefieldpredB_y, samefieldpredC_y)
oppositefieldpred_x = median(oppositefieldpredA_x, oppositefieldpredB_x, oppositefieldpredC_x)
oppositefieldpred_y = median(oppositefieldpredA_y, oppositefieldpredB_y, oppositefieldpredC_y)

if (samecount > oppositecount)
    dominantpredictor = samefield
else
    dominantpredictor = oppositefield
}
else {
    // predictorC is out of bounds
    if (only 1 macroblock per row) {
        if (predictorA is intra) {
            samefieldpred_x = oppositefieldpred_x = 0
            samefieldpred_y = oppositefieldpred_y = 0
            dominantpredictor = oppositefield
        }
        else {
            // Use predictorA
            if (predictorA is from same field) {
                samefieldpred_x = predictorA_x
                samefieldpred_y = predictorA_y
                oppositefieldpred_x = scaleforopposite_x(predictorA_x)
                oppositefieldpred_y = scaleforopposite_x(predictorA_y)
                dominantpredictor = samefield
            }
            else {
                oppositefieldpred_x = predictorA_x
                oppositefieldpred_y = predictorA_y
``` continued in 61D

Figure 61D

*continued from 61C*

```
            samefieldpred_x = scaleforsame_x(predictorA_x)
            samefieldpred_y = scaleforsame_x(predictorA_y)
            dominantpredictor = oppositefield
        }
    }
    else {
        // Predictor C is out of bounds, use Predictor and PredictorB
        predictorC_x = 0
        predictorC_y = 0
        if (predictorA is intra) {
            predictorA_x = 0
            predictorA_y = 0
        }
        if (predictorB is intra) {
            predictorB_x = 0
            predictorB_y = 0
        }
        if (predictorC is intra) {
            predictorC_x = 0
            predictorC_y = 0
        }
        if (predictorA is from same field) {
            samecount = samecount + 1
            samefieldpredA_x = predictorA_x
            samefieldpredA_y = predictorA_y
            oppositefieldpredA_x = scaleforopposite_x(predictorA_x)
            oppositefieldpredA_y = scaleforopposite_y(predictorA_y)
        }
```

*continued in 61E*

Figure 61E continued from 61D

```
else {
    oppositecount = oppositecount + 1
    oppositefieldpredA_x = predictorA_x
    oppositefieldpredA_y = predictorA_y
    samefieldpredA_x = scaleforsame_x(predictorA_x)
    samefieldpredA_y = scaleforsame_y(predictorA_y)

if (predictorB is from same field) {
    samecount = samecount + 1
    samefieldpredB_x = predictorB_x
    samefieldpredB_y = predictorB_y
    oppositefieldpredB_x = scaleforopposite_x(predictorB_x)
    oppositefieldpredB_y = scaleforopposite_y(predictorB_y)
}
else {
    oppositecount = oppositecount + 1
    oppositefieldpredB_x = predictorB_x
    oppositefieldpredB_y = predictorB_y
    samefieldpredB_x = scaleforsame_x(predictorB_x)
    samefieldpredB_y = scaleforsame_y(predictorB_y)
} samefieldpred_x = median(samefieldpredA_x, samefieldpredB_x, samefieldpredC_x)
samefieldpred_y = median(samefieldpredA_y, samefieldpredB_y, samefieldpredC_y)
oppositefieldpred_x = median(oppositefieldpredA_x,oppositefieldpredB_x,oppositefieldpredC_x)
oppositefieldpred_y = median(oppositefieldpredA_y,oppositefieldpredB_y,oppositefieldpredC_y)
if (samecount > oppositecount)
    dominantpredictor = samefield
else
    dominantpredictor = oppositefield
``` continued in 61F

Figure 61F continued from 61E

```
else {
    // Predictor A is out of bounds
    if (predictorC is out of bounds) {
        samefieldpred_x = oppositefieldpred_x = 0
        samefieldpred_y = oppositefieldpred_y = 0
        dominantpredictor = oppositefield
    }
    else {
        // Use predictorC
        if (predictorC is from same field) {
            samefieldpred_x = predictorC_x
            samefieldpred_y = predictorC_y
            oppositefieldpred_x = scaleforopposite_x(predictorC_x)
            oppositefieldpred_y = scaleforopposite_x(predictorC_y)
            dominantpredictor = samefield
        }
        else {
            oppositefieldpred_x = predictorC_x
            oppositefieldpred_y = predictorC_y
            samefieldpred_x = scaleforsame_x(predictorC_x)
            samefieldpred_y = scaleforsame_x(predictorC_y)
            dominantpredictor = oppositefield
```

JOINT CODING AND DECODING OF A REFERENCE FIELD SELECTION AND DIFFERENTIAL MOTION VECTOR INFORMATION

RELATED APPLICATION INFORMATION

This application claims the benefit of U.S. Provisional Patent Application No. 60/501,081, filed Sep. 7, 2003, the disclosure of which is hereby incorporated by reference. This application is a continuation-in-part of U.S. patent application Ser. No. 10/857,473, filed May 27, 2004, which claims the benefit of U.S. Provisional Patent Application No. 60/501,081, filed Sep. 7, 2003, the disclosures of which are hereby incorporated by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Techniques and tools for interlaced video coding and decoding are described. For example, a video encoder and decoder use joint coding and decoding, respectively, of reference field selection information and differential motion vector information.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an eight-bit luminance sample (also called a luma sample, as the terms "luminance" and "luma" are used interchangeably herein) that defines the grayscale component of the pixel and two eight-bit chrominance samples (also called chroma samples, as the terms "chrominance" and "chroma" are used interchangeably herein) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to a preceding and/or following frame (typically called a reference or anchor frame) or frames (for B-frames).

Inter-picture compression techniques often use motion estimation and motion compensation. For motion estimation, for example, an encoder divides a current predicted frame into 8×8 or 16×16 pixel units. For a unit of the current frame, a similar unit in a reference frame is found for use as a predictor. A motion vector indicates the location of the predictor in the reference frame. In other words, the motion vector for a unit of the current frame indicates the displacement between the spatial location of the unit in the current frame and the spatial location of the predictor in the reference frame. The encoder computes the sample-by-sample difference between the current unit and the predictor to determine a residual (also called error signal). If the current unit size is 16×16, the residual is divided into four 8×8 blocks. To each 8×8 residual, the encoder applies a reversible frequency transform operation, which generates a set of frequency domain (i.e., spectral) coefficients. A discrete cosine transform ["DCT"] is a type of frequency transform. The resulting blocks of spectral coefficients are quantized and entropy encoded. If the predicted frame is used as a reference for subsequent motion compensation, the encoder reconstructs the predicted frame. When reconstructing residuals, the encoder reconstructs transforms coefficients (e.g., DCT coefficients) that were quantized and performs an inverse frequency transform such as an inverse DCT ["IDCT"]. The encoder performs motion compensation to compute the predictors, and combines the predictors with the residuals. During decoding, a decoder typically entropy decodes information and performs analogous operations to reconstruct residuals, perform motion compensation, and combine the predictors with the residuals.

I. Inter Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

Inter compression in the WMV8 encoder uses block-based motion-compensated prediction coding followed by transform coding of the residual error. FIGS. 1 and 2 illustrate the block-based inter compression for a predicted frame in the WMV8 encoder. In particular, FIG. 1 illustrates motion estimation for a predicted frame (110) and FIG. 2 illustrates compression of a prediction residual for a motion-compensated block of a predicted frame.

For example, in FIG. 1, the WMV8 encoder computes a motion vector for a macroblock (115) in the predicted frame (110). To compute the motion vector, the encoder searches in a search area (135) of a reference frame (130). Within the search area (135), the encoder compares the macroblock (115) from the predicted frame (110) to various candidate macroblocks in order to find a candidate macroblock that is a good match. The encoder outputs information specifying the motion vector (entropy coded) for the matching macroblock.

Since a motion vector value is often correlated with the values of spatially surrounding motion vectors, compression of the data used to transmit the motion vector information can be achieved by determining or selecting a motion vector predictor from neighboring macroblocks and predicting the motion vector for the current macroblock using the motion vector predictor. The encoder can encode the differential between the motion vector and the motion vector predictor. For example, the encoder computes the difference between the horizontal component of the motion vector and the horizontal component of the motion vector predictor, computes the difference between the vertical component of the motion vector and the vertical component of the motion vector predictor, and encodes the differences.

After reconstructing the motion vector by adding the differential to the motion vector predictor, a decoder uses the motion vector to compute a prediction macroblock for the macroblock (115) using information from the reference frame (130), which is a previously reconstructed frame available at the encoder and the decoder. The prediction is rarely perfect, so the encoder usually encodes blocks of pixel differences (also called the error or residual blocks) between the prediction macroblock and the macroblock (115) itself.

FIG. 2 illustrates an example of computation and encoding of an error block (235) in the WMV8 encoder. The error block (235) is the difference between the predicted block (215) and the original current block (225). The encoder applies a discrete cosine transform ["DCT"] (240) to the error block (235), resulting in an 8×8 block (245) of coefficients. The encoder then quantizes (250) the DCT coefficients, resulting in an 8×8 block of quantized DCT coefficients (255). The encoder scans (260) the 8×8 block (255) into a one-dimensional array (265) such that coefficients are generally ordered from lowest frequency to highest frequency. The encoder entropy encodes the scanned coefficients using a variation of run length coding (270). The encoder selects an entropy code from one or more run/level/last tables (275) and outputs the entropy code.

FIG. 3 shows an example of a corresponding decoding process (300) for an inter-coded block. In summary of FIG. 3, a decoder decodes (310, 320) entropy-coded information representing a prediction residual using variable length decoding 310 with one or more run/level/last tables (315) and run length decoding (320). The decoder inverse scans (330) a one-dimensional array (325) storing the entropy-decoded information into a two-dimensional block (335). The decoder inverse quantizes and inverse discrete cosine transforms (together, 340) the data, resulting in a reconstructed error block (345). In a separate motion compensation path, the decoder computes a predicted block (365) using motion vector information (355) for displacement from a reference frame. The decoder combines (370) the predicted block (365) with the reconstructed error block (345) to form the reconstructed block (375).

II. Interlaced Video and Progressive Video

A video frame contains lines of spatial information of a video signal. For progressive video, these lines contain samples starting from one time instant and continuing in raster scan fashion through successive lines to the bottom of the frame. A progressive I-frame is an intra-coded progressive video frame. A progressive P-frame is a progressive video frame coded using forward prediction, and a progressive B-frame is a progressive video frame coded using bi-directional prediction.

The primary aspect of interlaced video is that the raster scan of an entire video frame is performed in two passes by scanning alternate lines in each pass. For example, the first scan is made up of the even lines of the frame and the second scan is made up of the odd lines of the scan. This results in each frame containing two fields representing two different time epochs. FIG. 4 shows an interlaced video frame (400) that includes top field (410) and bottom field (420). In the frame (400), the even-numbered lines (top field) are scanned starting at one time (e.g., time t), and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

III. Previous Coding and Decoding in a WMV Encoder and Decoder

Previous software for a WMV encoder and decoder, released in executable form, has used coding and decoding of progressive and interlaced P-frames. While the encoder and decoder are efficient for many different encoding/decoding scenarios and types of content, there is room for improvement in several places.

A. Reference Pictures for Motion Compensation

The encoder and decoder use motion compensation for progressive and interlaced forward-predicted frames. For a progressive P-frame, motion compensation is relative to a single reference frame, which is the previously reconstructed I-frame or P-frame that immediately precedes the current P-frame. Since the reference frame for the current P-frame is known and only one reference frame is possible, information used to select between multiple reference frames is not needed.

The macroblocks of an interlaced P-frame may be field-coded or frame-coded. In a field-coded macroblock, up to two motion vectors are associated with the macroblock, one for the top field and one for the bottom field. In a frame-coded macroblock, up to one motion vector is associated with the macroblock. For a frame-coded macroblock in an interlaced P-frame, motion compensation is relative to a single reference frame, which is the previously reconstructed I-frame or P-frame that immediately precedes the current P-frame. For a field-coded macroblock in an interlaced P-frame, motion compensation is still relative to the single reference frame, but only the lines of the top field of the reference frame are considered for a motion vector for the top field of the field-coded macroblock, and only the lines of the bottom field of the reference frame are considered for a motion vector for the bottom field of the field-coded macroblock. Again, since the reference frame is known and only one reference frame is possible, information used to select between multiple reference frames is not needed.

In certain encoding/decoding scenarios (e.g., high bit rate interlaced video with lots of motion), limiting motion compensation for forward prediction to be relative to a single reference can hurt overall compression efficiency.

B. Signaling Macroblock Information

The encoder and decoder use signaling of macroblock information for progressive or interlaced P-frames.

1. Signaling Macroblock Information for Progressive P-frames

Progressive P-frames can be 1MV or mixed-MV frames. A 1MV progressive P-frame includes 1MV macroblocks. A 1MV macroblock has one motion vector to indicate the displacement of the predicted blocks for all six blocks in the macroblock. A mixed-MV progressive P-frame includes 1MV and/or 4MV macroblocks. A 4MV macroblock has from 0 to 4 motion vectors, where each motion vector is for one of the up to four luminance blocks of the macroblock. Macroblocks in progressive P-frames can be one of three possible types: 1MV, 4MV, and skipped. In addition, 1MV and 4MV macroblocks may be intra coded. The macroblock type is indicated by a combination of picture and macroblock layer elements.

Thus, 1MV macroblocks can occur in 1MV and mixed-MV progressive P-frames. A single motion vector data MVDATA element is associated with all blocks in a 1MV macroblock. MVDATA signals whether the blocks are coded as intra or inter type. If they are coded as inter, then MVDATA also indicates the motion vector differential.

If the progressive P-frame is 1MV, then all the macroblocks in it are 1MV macroblocks, so there is no need to individually signal the macroblock type. If the progressive P-frame is mixed-MV, then the macroblocks in it can be 1MV or 4MV. In this case the macroblock type (1MV or 4MV) is signaled for each macroblock in the frame by a bitplane at the picture layer in the bitstream. The decoded bitplane represents the 1MV/4MV status for the macroblocks as a plane of one-bit values in raster scan order from upper left to lower right. A value of 0 indicates that a corresponding macroblock is coded in 1MV mode. A value of 1 indicates that the corresponding macroblock is coded in 4MV mode. In one coding mode, 1MV/4MV status information is signaled per macroblock at the macroblock layer of the bitstream (instead of as a plane for the progressive P-frame).

4MV macroblocks occur in mixed-MV progressive P-frames. Individual blocks within a 4MV macroblock can be coded as intra blocks. For each of the four luminance blocks of a 4MV macroblock, the intra/inter state is signaled by the block motion vector data BLKMVDATA element associated with that block. For a 4MV macroblock, the coded block pattern CBPCY element indicates which blocks have BLKMVDATA elements present in the bitstream. The inter/intra state for the chroma blocks is derived from the luminance inter/intra states. If two or more of the luminance blocks are coded as intra then the chroma blocks are also coded as intra.

In addition, the skipped/not skipped status of each macroblock in the frame is also signaled by a bitplane for the progressive P-frame. A skipped macroblock may still have associated information for hybrid motion vector prediction.

CBCPY is a variable-length code ["VLC"] that decodes to a six-bit field. CBPCY appears at different positions in the bitstream for 1MV and 4MV macroblocks and has different semantics for 1MV and 4MV macroblocks.

CBPCY is present in the 1MV macroblock layer if: (1) MVDATA indicates that the macroblock is inter-coded, and (2) MVDATA indicates that at least one block of the 1MV macroblock contains coefficient information (indicated by the "last" value decoded from MVDATA). If CBPCY is present, then it decodes to a six-bit field indicating which of the corresponding six blocks contain at least one non-zero coefficient.

CBPCY is always present in the 4MV macroblock layer. The CBPCY bit positions for the luminance blocks (bits 0-3) have a slightly different meaning than the bit positions for chroma blocks (bits 4 and 5). For a bit position for a luminance block, a 0 indicates that the corresponding block does not contain motion vector information or any non-zero coefficients. For such a block, BLKMVDATA is not present, the predicted motion vector is used as the motion vector, and there is no residual data. If the motion vector predictors indicate that hybrid motion vector prediction is used, then a single bit is present indicating the motion vector predictor candidate to use. A 1 in a bit position for a luminance block indicates that BLKMVDATA is present for the block. BLKMVDATA indicates whether the block is inter or intra and, if it is inter, indicates the motion vector differential. BLKMVDATA also indicates whether there is coefficient data for the block (with the "last" value decoded from BLKMVDATA). For a bit position for a chroma block, the 0 or 1 indicates whether the corresponding block contains non-zero coefficient information.

The encoder and decoder use code table selection for VLC tables for MVDATA, BLKMVDATA, and CBPCY, respectively.

2. Signaling Macroblock Information for Interlaced P-Frames

Interlaced P-frames may have a mixture of frame-coded and field-coded macroblocks. In a field-coded macroblock, up to two motion vectors are associated with the macroblock. In a frame-coded macroblock, up to one motion vector is associated with the macroblock. If the sequence layer element INTERLACE is 1, then a picture layer element INTRLCF is present in the bitstream. INTRLCF is a one-bit element that indicates the mode used to code the macroblocks in that frame. If INTRLCF=0 then all macroblocks in the frame are coded in frame mode. If INTRLCF=1 then the macroblocks may be coded in field or frame mode, and a bitplane INTRLCMB present in the picture layer indicates the field/frame coding status for each macroblock in the interlaced P-frame.

Macroblocks in interlaced P-frames can be one of three possible types: frame-coded, field-coded, and skipped. The macroblock type is indicated by a combination of picture and macroblock layer elements.

A single MVDATA is associated with all blocks in a frame-coded macroblock. The MVDATA signals whether the blocks are coded as intra or inter type. If they are coded as inter, then MVDATA also indicates the motion vector differential.

In a field-coded macroblock, a top field motion vector data TOPMVDATA element is associated with the top field blocks, and a bottom field motion vector data BOTMVDATA element is associated with the bottom field blocks. The elements are signaled at the first block of each field. More specifically, TOPMVDATA is signaled along with the left top field block and BOTMVDATA is signaled along with left bottom field block. TOPMVDATA indicates whether the top field blocks are intra or inter. If they are inter, then TOPMVDATA also indicates the motion vector differential for the top field blocks. Likewise, BOTMVDATA signals the inter/intra state for the bottom field blocks, and potential motion vector differential information for the bottom field blocks. CBPCY indicates which fields have motion vector data elements present in the bitstream.

A skipped macroblock is signaled by a SKIPMB bitplane in the picture layer. CBPCY and the motion vector data elements are used to specify whether blocks have AC coefficients. CBPCY is present for a frame-coded macroblock of an interlaced P-frame if the "last" value decoded from MVDATA indicates that there are data following the motion vector to decode. If CBPCY is present, it decodes to a six-bit field, one bit for each the four Y blocks, one bit for both U blocks (top field and bottom field), and one bit for both V blocks (top field and bottom field).

CBPCY is always present for a field-coded macroblock. CBPCY and the two field motion vector data elements are used to determine the presence AC coefficients in the blocks of the macroblock. The meaning of CBPCY is the same as for frame-coded macroblocks for bits 1, 3, 4 and 5. That is, they indicate the presence or absence of AC coefficients in the right top field Y block, right bottom field Y block, top/bottom U blocks, and top/bottom V blocks, respectively. For bit positions 0 and 2, the meaning is slightly different. A 0 in bit position 0 indicates that TOPMVDATA is not present and the motion vector predictor is used as the motion vector for the top field blocks. It also indicates that the left top field block does not contain any non-zero coefficients. A 1 in bit position 0 indicates that TOPMVDATA is present. TOPMVDATA indicates whether the top field blocks are inter or intra and, if they are inter, also indicates the motion vector differential. If the "last" value decoded from TOPMVDATA decodes to 1, then no AC coefficients are present for the left top field block, otherwise, there are non-zero AC coefficients for the left top field block. Similarly, the above rules apply to bit position 2 for BOTMVDATA and the left bottom field block.

The encoder and decoder use code table selection for VLC tables for MVDATA, TOPMVDATA, BOTMVDATA, and CBPCY, respectively.

3. Problems with Previous Signaling of Macroblock Information

In summary, various information for macroblocks of progressive P-frames and interlaced P-frames is signaled with separate codes (or combinations of codes) at the frame and macroblock layers. This separately signaled information includes number of motion vectors, macroblock intra/inter status, whether CBPCY is present or absent (e.g., with the "last" value for 1MV and frame-coded macroblocks), and whether motion vector data is present or absent (e.g., with CBPCY for 4MV and field-coded macroblocks). While this signaling provides good overall performance in many cases, it does not adequately exploit statistical dependencies between different signaled information in various common cases. Further, it does not allow and address various useftl configurations such as presence/absence of CBPCY for 4MV macroblocks, or presence/absence of motion vector data for 1MV macroblocks.

Moreover, to the extent presence/absence of motion vector data is signaled (e.g., with CBPCY for 4MV and field-coded macroblocks), it requires a confusing redefinition of the conventional role of the CBPCY element. This in turn requires signaling of the conventional CBPCY information with different elements (e.g., BLKMVDATA, TOPMVDATA, BOTMVDATA) not conventionally used for that purpose. And, the signaling does not allow and address various useful configurations such as presence of coefficient information when motion vector data is absent.

C. Motion Vector Prediction

For a motion vector for a macroblock (or block, or field of a macroblock, etc.) in an interlaced or progressive P-frame, the encoder encodes the motion vector by computing a motion vector predictor based on neighboring motion vectors, computing a differential between the motion vector and the motion vector predictor, and encoding the differential. The decoder reconstructs the motion vector by computing the motion vector predictor (again based on neighboring motion vectors), decoding the motion vector differential, and adding the motion vector differential to the motion vector predictor.

FIGS. 5A and 5B show the locations of macroblocks considered for candidate motion vector predictors for a 1MV macroblock in a 1MV progressive P-frame. The candidate predictors are taken from the left, top and top-right macroblocks, except in the case where the macroblock is the last macroblock in the row. In this case, Predictor B is taken from the top-left macroblock instead of the top-right. For the special case where the frame is one macroblock wide, the predictor is always Predictor A (the top predictor). When Predictor A is out of bounds because the macroblock is in the top row, the predictor is Predictor C. Various other rules address other special cases such as intra-coded predictors.

FIGS. 6A-10 show the locations of the blocks or macroblocks considered for the up-to-three candidate motion vectors for a motion vector for a 1MV or 4MV macroblock in a mixed-MV progressive P-frame. In the figures, the larger squares are macroblock boundaries and the smaller squares are block boundaries. For the special case where the frame is one macroblock wide, the predictor is always Predictor A (the top predictor). Various other rules address other special cases such as top row blocks for top row 4MV macroblocks, top row 1MV macroblocks, and intra-coded predictors.

Specifically, FIGS. 6A and 6B show locations of blocks considered for candidate motion vector predictors for a 1MV current macroblock in a mixed-MV progressive P-frame. The neighboring macroblocks may be 1MV or 4MV macroblocks. FIGS. 6A and 6B show the locations for the candidate motion vectors assuming the neighbors are 4MV (i.e., predictor A is the motion vector for block 2 in the macroblock above the current macroblock, and predictor C is the motion vector for block 1 in the macroblock immediately to the left of the current macroblock). If any of the neighbors is a 1 MV macroblock, then the motion vector predictor shown in FIGS. 5A and 5B is taken to be the motion vector predictor for the entire macroblock. As FIG. 6B shows, if the macroblock is the last macroblock in the row, then Predictor B is from block 3 of the top-left macroblock instead of from block 2 in the top-right macroblock as is the case otherwise.

FIGS. 7A-10 show the locations of blocks considered for candidate motion vector predictors for each of the 4 luminance blocks in a 4MV macroblock of a mixed-MV progressive P-frame. FIGS. 7A and 7B show the locations of blocks considered for candidate motion vector predictors for a block at position 0; FIGS. 8A and 8B show the locations of blocks considered for candidate motion vector predictors for a block at position 1; FIG. 9 shows the locations of blocks considered for candidate motion vector predictors for a block at position 2; and FIG. 10 show the locations of blocks considered for candidate motion vector predictors for a block at position 3. Again, if a neighbor is a 1MV macroblock, the motion vector predictor for the macroblock is used for the blocks of the macroblock.

For the case where the macroblock is the first macroblock in the row, Predictor B for block 0 is handled differently than block 0 for the remaining macroblocks in the row (see FIGS. 7A and 7B). In this case, Predictor B is taken from block 3 in the macroblock immediately above the current macroblock instead of from block 3 in the macroblock above and to the left of current macroblock, as is the case otherwise. Similarly, for the case where the macroblock is the last macroblock in the row, Predictor B for block 1 is handled differently (FIGS. 8A and 8B). In this case, the predictor is taken from block 2 in the macroblock immediately above the current macroblock instead of from block 2 in the macroblock above and to the right of the current macroblock, as is the case otherwise. In general, if the macroblock is in the first macroblock column, then Predictor C for blocks 0 and 2 are set equal to 0.

If a macroblock of a progressive P-frame is coded as skipped, the motion vector predictor for it is used as the motion vector for the macroblock (or the predictors for its blocks are used for the blocks, etc.). A single bit may still be present to indicate which predictor to use in hybrid motion vector prediction.

FIGS. 11 and 12A-B show examples of candidate predictors for motion vector prediction for frame-coded macroblocks and field-coded macroblocks, respectively, in interlaced P-frames. FIG. 11 shows candidate predictors A, B and C for a current frame-coded macroblock in an interior position in an interlaced P-frame (not the first or last macroblock in a macroblock row, not in the top row). Predictors can be obtained from different candidate directions other than those labeled A, B, and C (e.g., in special cases such as when the current macroblock is the first macroblock or last macroblock in a row, or in the top row, since certain predictors are unavailable for such cases). For a current frame-coded macroblock, predictor candidates are calculated differently depending on whether the neighboring macroblocks are field-coded or frame-coded. For a neighboring frame-coded macroblock, the motion vector for it is simply taken as the predictor candidate. For a neighboring field-coded macroblock, the candidate motion vector is determined by averaging the top and bottom field motion vectors.

FIGS. 12A-B show candidate predictors A, B and C for a current field in a field-coded macroblock in an interior position in the field. In FIG. 12A, the current field is a bottom field, and the bottom field motion vectors in the neighboring macroblocks are used as candidate predictors. In FIG. 12B, the current field is a top field, and the top field motion vectors in the neighboring macroblocks are used as candidate predictors. For each field in a current field-coded macroblock, the number of motion vector predictor candidates for each field is at most three, with each candidate coming from the same field type (e.g., top or bottom) as the current field. If a neighboring macroblock is frame-coded, the motion vector for it is used as its top field predictor and bottom field predictor. Again, various special cases (not shown) apply when the current macroblock is the first macroblock or last macroblock in a row, or in the top row, since certain predictors are unavailable for such cases. If the frame is one macroblock wide, the motion vector predictor is Predictor A. If a neighboring macroblock is intra, the motion vector predictor for it is 0.

FIGS. 13A and 13B show pseudocode for calculating motion vector predictors given a set of Predictors A, B, and C. To select a predictor from a set of predictor candidates, the encoder and decoder use a selection algorithm such as the median-of-three algorithm shown in 13C.

D. Hybrid Motion Vector Prediction for Progressive P-frames

Hybrid motion vector prediction is allowed for motion vectors of progressive P-frames. For a motion vector of a macroblock or block, whether the progressive P-frame is 1MV or mixed-MV, the motion vector predictor calculated in the previous section is tested relative to the A and C predictors to determine if a predictor selection is explicitly coded in the bitstream. If so, then a bit is decoded that indicates whether to use predictor A or predictor C as the motion vector predictor for the motion vector (instead of using the motion vector predictor computed in section C, above). Hybrid motion vector prediction is not used in motion vector prediction for interlaced P-frames or any representation of interlaced video.

The pseudocode in FIGS. 14A and 14B illustrates hybrid motion vector prediction for motion vectors of progressive P-frames. In the pseudocode, the variables predictor_pre_x and predictor_pre_y are the horizontal and vertical motion vector predictors, respectively, as calculated in the previous section. The variables predictor_post_x and predictor_post_y are the horizontal and vertical motion vector predictors, respectively, after checking for hybrid motion vector prediction.

E. Decoding Motion Vector Differentials

For macroblocks or blocks of progressive P-frames, the MVDATA or BLKMVDATA elements signal motion vector differential information. A 1MV macroblock has a single MVDATA. A 4MV macroblock has between zero and four BLKMVDATA elements (whose presence is indicated by CBPCY).

A MVDATA or BLKMVDATA jointly encodes three things: (1) the horizontal motion vector differential component; (2) the vertical motion vector differential component; and (3) a binary "last" flag that generally indicates whether transform coefficients are present. Whether the macroblock (or block, for 4MV) is intra or inter-coded is signaled as one of the motion vector differential possibilities. The pseudocode in FIGS. 15A and 15B illustrates how the motion vector differential information, inter/intra type, and last flag information are decoded for MVDATA or BLKMVDATA. In the pseudocode, the variable last_flag is a binary flag whose use is described in the section on signaling macroblock information. The variable intra_flag is a binary flag indicating whether the block or macroblock is intra. The variables dmv_x and dmv_y are differential horizontal and vertical motion vector components, respectively. The variables k_x and k_y are fixed lengths for extended range motion vectors, whose values vary as shown in the table in FIG. 15C. The variable halfpel_flag is a binary value indicating whether half-pixel of quarter-pixel precision is used for the motion vector, and whose value is set based on picture layer syntax elements. Finally, the tables size_table and offset_table are arrays defined as follows:

size_table[6]={0, 2, 3, 4, 5, 8}, and
offset_table[6]={0, 1, 3, 7, 15, 31}.

For frame-coded or field-coded macroblocks of interlaced P-frames, the MVDATA, TOPMVDATA, and BOTMVDATA elements are decoded the same way.

F. Reconstructing and Deriving Motion Vectors

Luminance motion vectors are reconstructed from encoded motion vector differential information and motion vector predictors, and chrominance motion vectors are derived from the reconstructed luminance motion vectors.

For 1MV and 4MV macroblocks of progressive P-frames, a luminance motion vector is reconstructed by adding the differential to the motion vector predictor as follows:

mv_x=(dmv_x+predictor_x) smod range_x,
mv_y=(dmv_y+predictor_y) smod range_y, where smod is a signed modulus operation defined as follows:
A smod b=((A+b) % 2 b)−b, which ensures that the reconstructed vectors are valid.

In a 1MV macroblock, there is a single motion vector for the four blocks that make up the luminance component of the macroblock. If the macroblock is intra, then no motion vectors are associated with the macroblock. If the macroblock is skipped then dmv_x=0 and dmv_y=0, so mv_x=predictor_x and mv_y=predictor_y.

Each inter luminance block in a 4MV macroblock has its own motion vector. Therefore, there will be between 0 and 4 luminance motion vectors in a 4MV macroblock. A non-coded block in a 4MV macroblock can occur if the 4MV macroblock is skipped or if CBPCY for the 4MV macroblock indicates that the block is non-coded. If a block is not coded then dmv_x=0 and dmv_0, so mv_x=predictor_x and mv_y=predictor_y.

For progressive P-frames, the chroma motion vectors are derived from the luminance motion vectors. Also, for 4MV macroblocks, the decision of whether to code chroma blocks as inter or intra is made based on the status of the luminance blocks. The chroma vectors are reconstructed in two steps.

In the first step, a nominal chroma motion vector is obtained by combining and scaling luminance motion vectors appropriately. The scaling is performed in such a way that half-pixel offsets are preferred over quarter-pixel offsets. FIG. 16A shows pseudocode for scaling when deriving a chroma motion vector from a luminance motion vector for a 1MV macroblock. FIG. 16B shows pseudocode for combining up to four luminance motion vectors and scaling when deriving a chroma motion vector for a 4MV macroblock. FIG. 13C shows pseudocode for the median3( ) function, and FIG. 16C shows pseudocode for the median4( ) function.

In the second step, a sequence level one-bit element is used to determine if further rounding of chroma motion vectors is necessary. If so, the chroma motion vectors that are at quarter-pixel offsets are rounded to the nearest full-pixel positions.

For frame-coded and field-coded macroblocks of interlaced P-frames, a luminance motion vector is reconstructed as done for progressive P-frames. In a frame-coded macroblock, there is a single motion vector for the four blocks that make up the luminance component of the macroblock. If the macroblock is intra, then no motion vectors are associated with the macroblock. If the macroblock is skipped then dmv_x=0 and dmv_y=0, so mv_x=predictor_x and mv_y=predictor_y. In a field-coded macroblock, each field may have its own motion vector. Therefore, there will be between 0 and 2 luminance motion vectors in a field-coded macroblock. A non-coded field in a field-coded macroblock can occur if the field-coded macroblock is skipped or if CBPCY for the field-coded macroblock indicates that the field is non-coded. If a field is not coded then dmv_x=0 and dmv_y=0, so mv_x=predictor_x and mv_y=predictor_y.

For interlaced P-frames, chroma motion vectors are derived from the luminance motion vectors. For a frame-coded macroblock, there is one chrominance motion vector corresponding to the single luminance motion vector. For a field-coded macroblock, there are two chrominance motion vectors. One is for the top field and one is for the bottom field, corresponding to the top and bottom field luminance motion vectors. The rules for deriving a chroma motion vector are the same for both field-coded and frame-coded macroblocks. They depend on the luminance motion vector, not the type of macroblock. FIG. 17 shows pseudocode for deriving a chroma motion vector from a luminance motion vector for a frame-coded or field-coded macroblock of an interlaced P-frame. Basically, the x component of the chrominance motion vector is scaled by four while the y component of the chrominance motion vector remains the same (because of 4:1:1 macroblock chroma sub-sampling). The scaled x component of the chrominance motion vector is also rounded to a neighboring quarter-pixel location. If cmv_x or cmv_y is out of bounds, it is pulled back to a valid range.

G. Intensity Compensation

For a progressive P-frame, the picture layer contains syntax elements that control the motion compensation mode and intensity compensation for the frame. If intensity compensation is signaled, then the LUMSCALE and LUMSHIFT elements follow in the picture layer. LUMSCALE and LUMSHIFT are six-bit values that specify parameters used in the intensity compensation process.

When intensity compensation is used for the progressive P-frame, the pixels in the reference frame are remapped prior to using them in motion-compensated prediction for the P-frame. The pseudocode in FIG. 18 illustrates how the LUMSCALE and LUMSHIFT elements are used to build the lookup table used to remap the reference frame pixels. The Y component of the reference frame is remapped using the LUTY[ ] table, and the U and V components are remapped using the LUTUV[ ] table, as follows:

$\bar{p}_Y$=LUTY[$p_Y$], and
$\bar{p}_{UV}$=LUTUV[$p_{UV}$]

where $p_Y$ is the original luminance pixel value in the reference frame, $\bar{p}_Y$ is the remapped luminance pixel value in the reference frame, $p_{UV}$ is the original U or V pixel value in the reference frame, and $\bar{p}_{UV}$ is the remapped U or V pixel value in the reference frame.

For an interlaced P-frame, a one-bit picture-layer INTCOMP value signals whether intensity compensation is used for the frame. If intensity compensation is used, then the LUMSCALE and LUMSHIFT elements follow in the picture layer, where LUMSCALE and LUMSHIFT are six-bit values which specify parameters used in the intensity compensation process for the whole interlaced P-frame. The intensity compensation itself is the same as for progressive P-frames.

VI. Standards for Video Compression and Decompression

Aside from previous WMV encoders and decoders, several international standards relate to video compression and decompression. These standards include the Motion Picture Experts Group ["MPEG"] 1, 2, and 4 standards and the H.261, H.262 (another name for MPEG 2), H.263, and H.264 standards from the International Telecommunication Union ["ITU"]. An encoder and decoder complying with one of these standards typically use motion estimation and compensation to reduce the temporal redundancy between pictures.

A. Reference Pictures for Motion Compensation

For several standards, motion compensation for a forward-predicted frame is relative to a single reference frame, which is the previously reconstructed I- or P-frame that immediately precedes the current forward-predicted frame. Since the reference frame for the current forward-predicted frame is known and only one reference frame is possible, information used to select between multiple reference frames is not needed. See, e.g., the H.261 and MPEG 1 standards. In certain encoding/decoding scenarios (e.g., high bit rate interlaced video with lots of motion), limiting motion compensation for forward prediction to be relative to a single reference can hurt overall compression efficiency.

The H.262 standard allows an interlaced video frame to be encoded as a single frame or as two fields, where the frame encoding or field encoding can be adaptively selected on a frame-by-frame basis. For field-based prediction of a current field, the motion compensation uses a previously reconstructed top field or bottom field. [H.262 standard, sections 7.6.1 and 7.6.2.1.] The H.262 standard describes selecting between the two reference fields to use for motion compensation with a motion vector for a current field. [H.262 standard, sections 6.2.5.2, 6.3.17.2, and 7.6.4.] For a given motion vector for a 16×16 macroblock (or top 16×8 half of the macroblock, or bottom 16×8 half of the macroblock), a single bit is signaled to indicate whether to apply the motion vector to the top reference field or the bottom reference field. [Id.] For additional detail, see the H.262 standard.

While such reference field selection provides some flexibility and prediction improvement in motion compensation in some cases, it has several disadvantages relating to bit rate. The reference field selection signals for the motion vectors can consume a lot of bits. For example, for a single 720×288 field with 810 macroblocks, each macroblock having 0, 1, or 2 motion vectors, the reference field selection bits for the motion vectors consume up to 1620 bits. No attempt is made to reduce the bit rate of reference field selection information by predicting which reference fields will be selected for the respective motion vectors. The signaling of reference field selection information is inefficient in terms of pure coding efficiency. Moreover, for some scenarios, however the information is encoded, the reference field selection information may consume so many bits that the benefits of prediction improvements from having multiple available references in motion compensation are outweighed. No option is given to disable reference field selection to address such scenarios.

The H.262 standard also describes dual-prime prediction, which is a prediction mode in which two forward field-based predictions are averaged for a 16×16 block in an interlaced P-picture. [H.262 standard, section 7.6.3.6.]

The MPEG-4 standard allows macroblocks of an interlaced video frame to be frame-coded or field-coded. [MPEG-4 standard, section 6.1.3.8.] For field-based prediction of top or bottom field lines of a field-coded macroblock, the motion compensation uses a previously reconstructed top field or bottom field. [MPEG-4 standard, sections 6.3.7.3 and 7.6.2.] The MPEG-4 standard describes selecting between the two reference fields to use for motion compensation. [MPEG-4 standard, sections 6.3.7.3.] For a given motion vector for top field lines or bottom field lines of a macroblock, a single bit is signaled to indicate whether to apply the motion vector to the top reference field or the bottom reference field. [Id.] For additional detail, see the MPEG-4 standard. Such signaling of reference field selection information has problems similar to those described above for H.262.

The H.263 standard describes motion compensation for progressive P-frames, including an optional reference picture selection mode. [H.263 standard, section 3.4.12, Annex N.] Normally, the most recent temporally previous anchor picture is used for motion compensation. When reference picture selection mode is used, however, temporal prediction is allowed from pictures other than the most recent reference picture. [Id.] This can improve the performance of real-time video communication over error-prone channels by allowing the encoder to optimize its video encoding for the conditions of the channel (e.g., to stop error propagation due to loss of information needed for reference in inter-frame coding). [Id.] When used, for a given group of blocks or slice within a picture, a 10-bit value indicates the reference used for prediction of the group of blocks or slice. [Id.] The reference picture selection mechanism described in H.263 is for progressive video and is adapted to address the problem of error propagation in error-prone channels, not to improve compression efficiency per se.

In draft JVT-D157 of the H.264 standard, the inter prediction process for motion-compensated prediction of a block can involve selection of the reference picture from a number of stored, previously decoded pictures. [JVT-D157, section 0.4.3.] At the picture level, one or more parameters specify the number of reference pictures that are used to decode the picture. [JVT-D157, sections 7.3.2.2 and 7.4.2.2.] At the slice level, the number of reference pictures available may be changed, and additional parameters may be received to reorder and manage which reference pictures are in a list. [JVT-D157, sections 7.3.3 and 7.4.3.] For a given motion vector (for a macroblock or sub-macroblock part), a reference index when present indicates the reference picture to be used for prediction. [JVT-D157, sections 7.3.5.1 and 7.4.5.1.] The reference index indicates the first, second, third, etc. frame or field in the list. [Id.] If there is only one active reference picture in the list, the reference index is not present. [Id.] If there are only two active reference pictures in the list, a single encoded bit is used to represent the reference index. [Id.] For additional detail, see draft JVT-D157 of the H.264 standard.

The reference picture selection of JVT-D157 provides flexibility and thereby can improve prediction for motion compensation. However, the processes of managing reference picture lists and signaling reference picture selections are complex and consume an inefficient number of bits in some scenarios.

B. Signaling Macroblock Modes

The various standards use different mechanisms to signal macroblock information. In the H.261 standard, for example, a macroblock header for a macroblock includes a macroblock type MTYPE element, which is signaled as a VLC. [H.261 standard, section 4.2.3.] A MTYPE element indicates a prediction mode (intra, inter, inter+MC, inter+MC+loop filtering), whether a quantizer MQUANT element is present for the macroblock, whether a motion vector data MVD element is present for the macroblock, whether a coded block pattern CBP element is present for the macroblock, and whether transform coefficient TCOEFF elements are present for blocks of the macroblock. [Id.] A MVD element is present for every motion-compensated macroblock. [Id.]

In the MPEG-1 standard, a macroblock has a macroblock_type element, which is signaled as a VLC. [MPEG-1 standard, section 2.4.3.6, Tables B.2a through B.2d, D.6.4.2.] For a macroblock in a forward-predicted picture, the macroblock_type element indicates whether a quantizer scale element is present for the macroblock, whether forward motion vector data is present for the macroblock, whether a coded block pattern element is present for the macroblock, and whether the macroblock is intra. [Id.] Forward motion vector data is always present if the macroblock uses forward motion compensation. [Id.]

In the H.262 standard, a macroblock has a macroblock_type element, which is signaled as a VLC. [H.261 standard, section 6.2.5.1, 6.3.17.1, and Tables B.2 through B.8.] For a macroblock in a forward-predicted picture, the macroblock_type element indicates whether a quantizer_scale_code element is present for the macroblock, whether forward motion vector data is present for the macroblock, whether a coded block pattern element is present for the macroblock, whether the macroblock is intra, and scalability options for the macroblock. [Id.] Forward motion vector data is always present if the macroblock uses forward motion compensation. [Id.] A separate code (frame_motion_type or field_motion_type) may further indicate the macroblock prediction type, including the count of motion vectors and motion vector format for the macroblock. [Id.]

In the H.263 standard, a macroblock has macroblock type and coded block pattern for chrominance MCBPC element, which is signaled as a VLC. [H.263 standard, section 5.3.2, Tables 8 and 9, and F.2.] The macroblock type gives information about the macroblock (e.g., inter, inter4V, intra). [Id.] For a coded macroblock in an inter-coded picture, MCBPC and coded block pattern for luminance are always present, and the macroblock type indicates whether a quantizer information element is present for the macroblock. A forward motion-compensated macroblock always has motion vector data for the macroblock (or blocks for inter4V type) present. [Id.] The MPEG-4 standard similarly specifies a MCBPC element that is signaled as a VLC. [MPEG-4 standard, sections 6.2.7, 6.3.7, 11.1.1.]

In JVT-D157, the mb_type element is part of the macroblock layer. [JVT-D157, sections 7.3.5 and 7.4.5.] The mb_type indicates the macroblock type and various associated information. [Id.] For example, for a P-slice, the mb_type element indicates the type of prediction (intra or forward), various intra mode coding parameters if the macroblock is intra coded, the macroblock partitions (e.g., 16×16, 16×8, 8×16, or 8×8) and hence the number of motion vectors if the macroblock is forward predicted, and whether reference picture selection information is present (if the partitions are 8×8). [Id.] The type of prediction and mb_type also collectively indicate whether a coded block pattern element is present for the macroblock. [Id.] For each 16×16, 16×8, or 8×16 partition in a forward motion-compensated macroblock, motion vector data is signaled. [Id.] For a forward-predicted macroblock with 8×8 partitions, a sub_mb_type element per 8×8 partition indicates the type of prediction (intra or forward) for it. [Id.] If the 8×8 partition is forward predicted, sub_mb_type indicates the sub-partitions (e.g., 8×8, 8×4, 4×8, or 4×4), and hence the number of motion vectors, for the 8×8 partition. [Id.] For each sub-partition in a forward motion-compensated 8×8 partition, motion vector data is signaled. [Id.]

The various standards use a large variety of signaling mechanisms for macroblock information. Whatever advantages these signaling mechanisms may have, they also have the following disadvantages. First, they at times do not efficiently signal macroblock type, presence/absence of coded block pattern information, and presence/absence of motion vector differential information for motion-compensated macroblocks. In fact, the standards typically do not signal presence/absence of motion vector differential information for motion-compensated macroblocks (or blocks or fields thereof) at all, instead assuming that the motion vector differential information is signaled if motion compensation is used. Finally, the standards are inflexible in their decisions of which code tables to use for macroblock mode information.

C. Motion Vector Prediction

Each of H.261, H.262, H.263, MPEG-1, MPEG-4, and JVT-D157 specifies some form of motion vector prediction, although the details of the motion vector prediction vary widely between the standards. Motion vector prediction is simplest in the H.261 standard, for example, in which the motion vector predictor for the motion vector of a current macroblock is the motion vector of the previously coded/decoded macroblock. [H.261 standard, section 4.2.3.4.] The motion vector predictor is 0 for various special cases (e.g., the current macroblock is the first in a row). Motion vector prediction is similar in the MPEG-1 standard. [MPEG-1 standard, sections 2.4.4.2 and D.6.2.3.]

Other standards (such as H.262) specify much more complex motion vector prediction, but still typically determine a motion vector predictor from a single neighbor. [H.262 standard, section 7.6.3.] Determining a motion vector predictor from a single neighbor suffices when motion is uniform, but is inefficient in many other cases.

So, still other standards (such as H.263, MPEG-4, JVT-D157) determine a motion vector predictor from multiple different neighbors with different candidate motion vector predictors. [H.263 standard, sections 6.1.1; MPEG-4 standard, sections 7.5.5 and 7.6.2; and F.2; JVT-D157, section 8.4.1.] These are efficient for more kinds of motion, but still do not adequately address scenarios in which there is a high degree of variance between the different candidate motion vector predictors, indicating discontinuity in motion patterns.

For additional detail, see the respective standards.

D. Decoding Motion Vector Differentials

Each of H.261, H.262, H.263, MPEG-1, MPEG-4, and JVT-D157 specifies some form of differential motion vector coding and decoding, although the details of the coding and decoding vary widely between the standards. Motion vector coding and decoding is simplest in the H.261 standard, for example, in which one VLC represents the horizontal differential component, and another VLC represents the vertical differential component. [H.261 standard, section 4.2.3.4.] Other standards specify more complex coding and decoding for motion vector differential information. For additional detail, see the respective standards.

E. Reconstructing and Deriving Motion Vectors

In general, a motion vector in H.261, H.262, H.263, MPEG-1, MPEG-4, or JVT-D157 is reconstructed by combining a motion vector predictor and a motion vector differential. Again, the details of the reconstruction vary from standard to standard.

Chrominance motion vectors (which are not signaled) are typically derived from luminance motion vectors (which are signaled). For example, in the H.261 standard, luminance motion vectors are halved and truncated towards zero to derive chrominance motion vectors. [H.261 standard, section 3.2.2.] Similarly, luminance motion vectors are halved to derive chrominance motion vector in the MPEG-1 standard and JVT-D157. [MPEG-1 standard, section 2.4.4.2; JVT-D157, section 8.4.1.4.]

In the H.262 standard, luminance motion vectors are scaled down to chroma motion vectors by factors that depend on the chrominance sub-sampling mode (e.g., 4:2:0, 4:2:2, or 4:4:4). [H.262 standard, section 7.6.3.7.]

In the H.263 standard, for a macroblock with a single luminance motion vector for all four luminance blocks, a chrominance motion vector is derived by dividing the luminance motion vector by two and rounding to a half-pixel position. [H.263 standard, section 6.1.1.] For a macroblock with four luminance motion vectors (one per block), a chrominance motion vector is derived by summing the four luminance motion vectors, dividing by eight, and rounding to a half-pixel position. [H.263 standard, section F.2.] Chrominance motion vectors are similarly derived in the MPEG-4 standard. [MPEG-4 standard, sections 7.5.5 and 7.6.2.]

F. Weighted Prediction

Draft JVT-D157 of the H.264 standard describes weighted prediction. A weighted prediction flag for a picture indicates whether or not weighted prediction is used for predicted slices in the picture. [JVT-D157, sections 7.3.2.2 and 7.4.2.2.] If weighted prediction is used for a picture, each predicted slice in the picture has a table of prediction weights. [JVT-D157, sections 7.3.3, 7.3.3.2, 7.4.3.3, and 10.4.1.] For the table, a denominator for luma weight parameters and a denominator for chroma weight parameters are signaled. [Id.] Then, for each reference picture available for the slice, a luma weight flag indicates whether luma weight and luma offset numerator parameters are signaled for the picture (followed by the parameters, when signaled), and a chroma weight flag indicates whether chroma weight and chroma offset numerator parameters are signaled for the picture (followed by the parameters, when signaled). [Id.] Numerator weight parameters that are not signaled are given default values relating to the signaled denominator values. [Id.] While JVT-D157 provides some flexibility in signaling weighted prediction parameters, the signaling mechanism is inefficient in various scenarios.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for joint coding and decoding of reference field selection information and differential motion vector information. The described techniques and tools include, but are not limited to, the following:

A tool such as a video decoder decodes a variable length code that jointly represents differential motion vector information and a motion vector predictor selection for a motion vector. The decoder then reconstructs the motion vector based at least in part on the differential motion vector information and the motion vector predictor selection.

Or, a tool such as a video encoder determines a dominant/non-dominant predictor selection for a motion vector. The encoder determines differential motion vector information for the motion vector, and jointly codes the dominant/non-dominant predictor selection with the differential motion vector information.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing motion estimation in a video encoder according to the prior art.

FIG. 2 is a diagram showing block-based compression for an 8×8 block of prediction residuals in a video encoder according to the prior art.

FIG. 3 is a diagram showing block-based decompression for an 8×8 block of prediction residuals in a video decoder according to the prior art.

FIG. 4 is a diagram showing an interlaced frame according to the prior art.

FIGS. 5A and 5B are diagrams showing locations of macroblocks for candidate motion vector predictors for a 1MV macroblock in a progressive P-frame according to the prior art.

FIGS. 6A and 6B are diagrams showing locations of blocks for candidate motion vector predictors for a 1MV macroblock in a mixed 1MV/4MV progressive P-frame according to the prior art.

FIGS. 7A, 7B, 8A, 8B, 9, and 10 are diagrams showing the locations of blocks for candidate motion vector predictors for a block at various positions in a 4MV macroblock in a mixed 1MV/4MV progressive P-frame according to the prior art.

FIG. 11 is a diagram showing candidate motion vector predictors for a current frame-coded macroblock in an interlaced P-frame according to the prior art.

FIGS. 12A-12B are diagrams showing candidate motion vector predictors for a current field-coded macroblock in an interlaced P-frame according to the prior art.

FIGS. 13A-13C are pseudocode for calculating motion vector predictors according to the prior art.

FIGS. 14A and 14B are pseudocode illustrating hybrid motion vector prediction for progressive P-frames according to the prior art.

FIG. 15A-15C are pseudocode and a table illustrating decoding of motion vector differential information according to the prior art.

FIG. 16A-16C and 13C are pseudocode illustrating derivation of chroma motion vectors for progressive P-frames according to the prior art.

FIG. 17 is pseudocode illustrating derivation of chroma motion vectors for interlaced P-frames according to the prior art.

FIG. 18 is pseudocode illustrating intensity compensation for progressive P-frames according to the prior art.

FIGS. 26 and 27 are tables showing MBMODE values.

FIG. 29 is pseudocode for determining dominant and non-dominant reference fields.

FIG. 30 is pseudocode for signaling whether a dominant or non-dominant reference field is used for a motion vector.

FIGS. 31A and 31B are flowcharts showing techniques for determining dominant and non-dominant polarities for motion vector prediction in encoding and decoding, respectively, of motion vectors for two reference field interlaced P-fields.

FIG. 32 is pseudocode for hybrid motion vector prediction during decoding.

FIG. 34 is a diagram showing an association between luma blocks and the 4MVBP element.

FIG. 36 is pseudocode for encoding motion vector differential information and a dominant/non-dominant predictor selection for two reference field interlaced P-fields.

FIGS. 37A and 37B are flowcharts showing techniques for encoding and decoding, respectively, of motion vector differential information and a dominant/non-dominant predictor selection for two reference field interlaced P-fields.

FIG. 40 is pseudocode for selecting luminance motion vectors that contribute to chroma motion vectors for motion-compensated macroblocks of interlaced P-fields.

FIG. 44 is a table showing syntax elements for signaling intensity compensation reference field patterns for interlaced P-fields.

FIGS. 45A and 45B are flowcharts showing techniques for performing fading estimation in encoding and fading compensation in decoding, respectively, for interlaced P-fields.

FIGS. 47A-47K are tables for codes in the first combined implementation.

FIGS. 49A and 49B are pseudocode and a table, respectively, for motion vector differential decoding for one reference field interlaced P-fields in the first combined implementation.

FIG. 50 is pseudocode for decoding motion vector differential information and a dominant/non-dominant predictor selection for two reference field interlaced P-fields in the first combined implementation.

FIGS. 51A and 51B are pseudocode for motion vector prediction for one reference field interlaced P-fields in the first combined implementation.

FIGS. 52A-52J are pseudocode and tables for motion vector prediction for two reference field interlaced P-fields in the first combined implementation. FIGS. 52K through 52N are pseudocode and tables for scaling operations that are alternatives to those shown in FIGS. 52H through 52J.

FIG. 53 is pseudocode for hybrid motion vector prediction for interlaced P-fields in the first combined implementation.

FIG. 54 is pseudocode for motion vector reconstruction for two reference field interlaced P-fields in the first combined implementation.

FIGS. 55A and 55B are pseudocode for chroma motion vector derivation for interlaced P-fields in the first combined implementation.

FIG. 56 is pseudocode for intensity compensation for interlaced P-fields in the first combined implementation.

FIGS. 58A and 58B are pseudocode and a table, respectively, for motion vector differential decoding for one reference field interlaced P-fields in the second combined implementation.

FIG. 59 is pseudocode for decoding motion vector differential information and a dominant/non-dominant predictor selection for two reference field interlaced P-fields in the second combined implementation.

FIGS. 60A and 60B are pseudocode for motion vector prediction for one reference field interlaced P-fields in the second combined implementation.

FIGS. 61A-61F are pseudocode for motion vector prediction for two reference field interlaced P-fields in the second combined implementation.

DETAILED DESCRIPTION

The present application relates to techniques and tools for efficient compression and decompression of interlaced video. Compression and decompression of interlaced video content are improved with various techniques and tools that are specifically designed to deal with the particular properties of interlaced video representation. In various described embodiments, a video encoder and decoder incorporate techniques for encoding and decoding interlaced forward-predicted fields, along with corresponding signaling techniques for use with a bitstream format or syntax comprising different layers or levels (e.g., sequence level, frame level, field level, slice level, macroblock level, and/or block level).

Interlaced video content is commonly used in digital video broadcasting systems, whether over cable, satellite, or DSL. Efficient techniques and tools for compressing and decompressing interlaced video content are important parts of a video codec.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used. Further, techniques and tools described with reference to interlaced forward-predicted fields may also be applicable to other types of pictures.

In various embodiments, an encoder and decoder use flags and/or signals in a bitstream. While specific flags and signals are described, it should be understood that this manner of description encompasses different conventions (e.g., 0 s rather than 1 s) for the flags and signals.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

Figure 19:
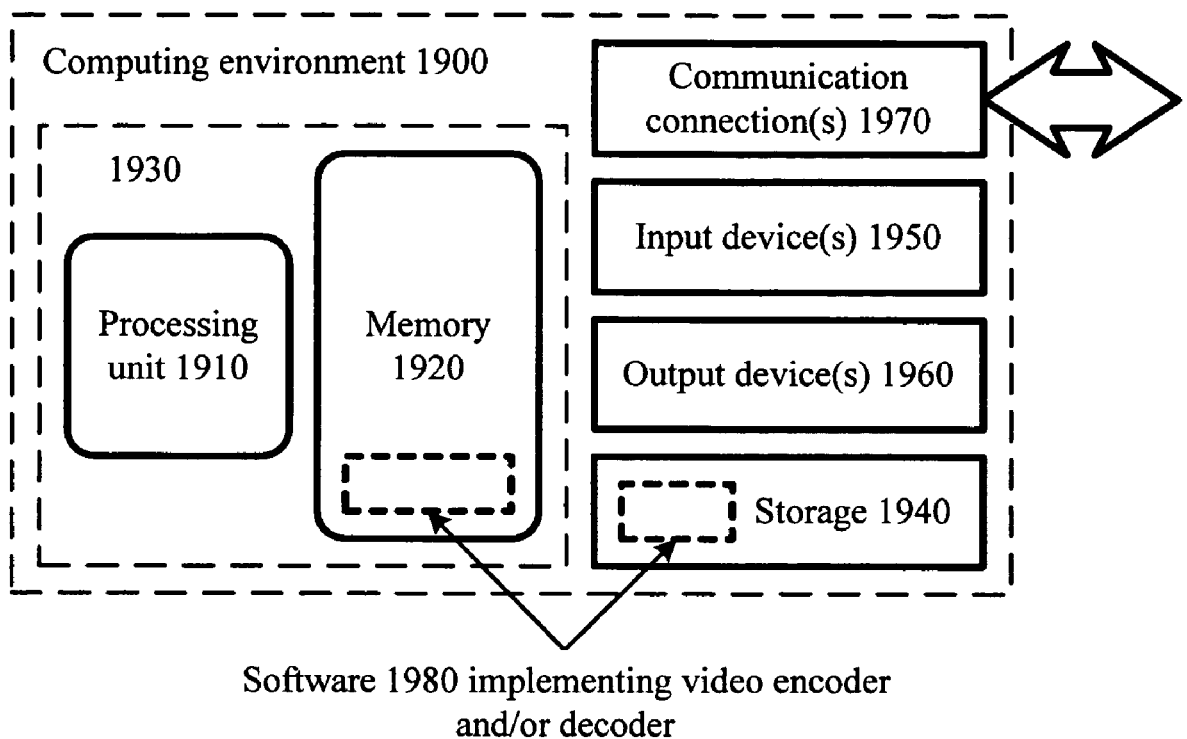
FIG. 19 is a block diagram of a suitable computing environment in conjunction with which several described embodiments may be implemented.

FIG. 19 illustrates a generalized example of a suitable computing environment (1900) in which several of the described embodiments may be implemented. The computing environment (1900) is not intended to suggest any limitation as to scope of use or functionality, as the techniques and tools may be implemented in diverse general-purpose or special-purpose computing environments.

With reference to FIG. 19, the computing environment (1900) includes at least one processing unit (1910) and memory (1920). In FIG. 19, this most basic configuration (1930) is included within a dashed line. The processing unit (1910) executes computer-executable instructions and may be a real or a virtual processor. In a multi-processing system, multiple processing units execute computer-executable instructions to increase processing power. The memory (1920) may be volatile memory (e.g., registers, cache, RAM), non-volatile memory (e.g., ROM, EEPROM, flash memory, etc.), or some combination of the two. The memory (1920) stores software (1980) implementing a video encoder or decoder.

A computing environment may have additional features. For example, the computing environment (1900) includes storage (1940), one or more input devices (1950), one or more output devices (1960), and one or more communication connections (1970). An interconnection mechanism (not shown) such as a bus, controller, or network interconnects the components of the computing environment (1900). Typically, operating system software (not shown) provides an operating environment for other software executing in the computing environment (1900), and coordinates activities of the components of the computing environment (1900).

The storage (1940) may be removable or non-removable, and includes magnetic disks, magnetic tapes or cassettes, CD-ROMs, DVDs, or any other medium which can be used to store information and which can be accessed within the computing environment (1900). The storage (1940) stores instructions for the software (1980) implementing the video encoder or decoder.

The input device(s) (1950) may be a touch input device such as a keyboard, mouse, pen, or trackball, a voice input device, a scanning device, or another device that provides input to the computing environment (1900). For audio or video encoding, the input device(s) (1950) may be a sound card, video card, TV tuner card, or similar device that accepts audio or video input in analog or digital form, or a CD-ROM or CD-RW that reads audio or video samples into the computing environment (1900). The output device(s) (1960) may be a display, printer, speaker, CD-writer, or another device that provides output from the computing environment (1900).

The communication connection(s) (1970) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (1900), computer-readable media include memory (1920), storage (1940), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "compensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 20:
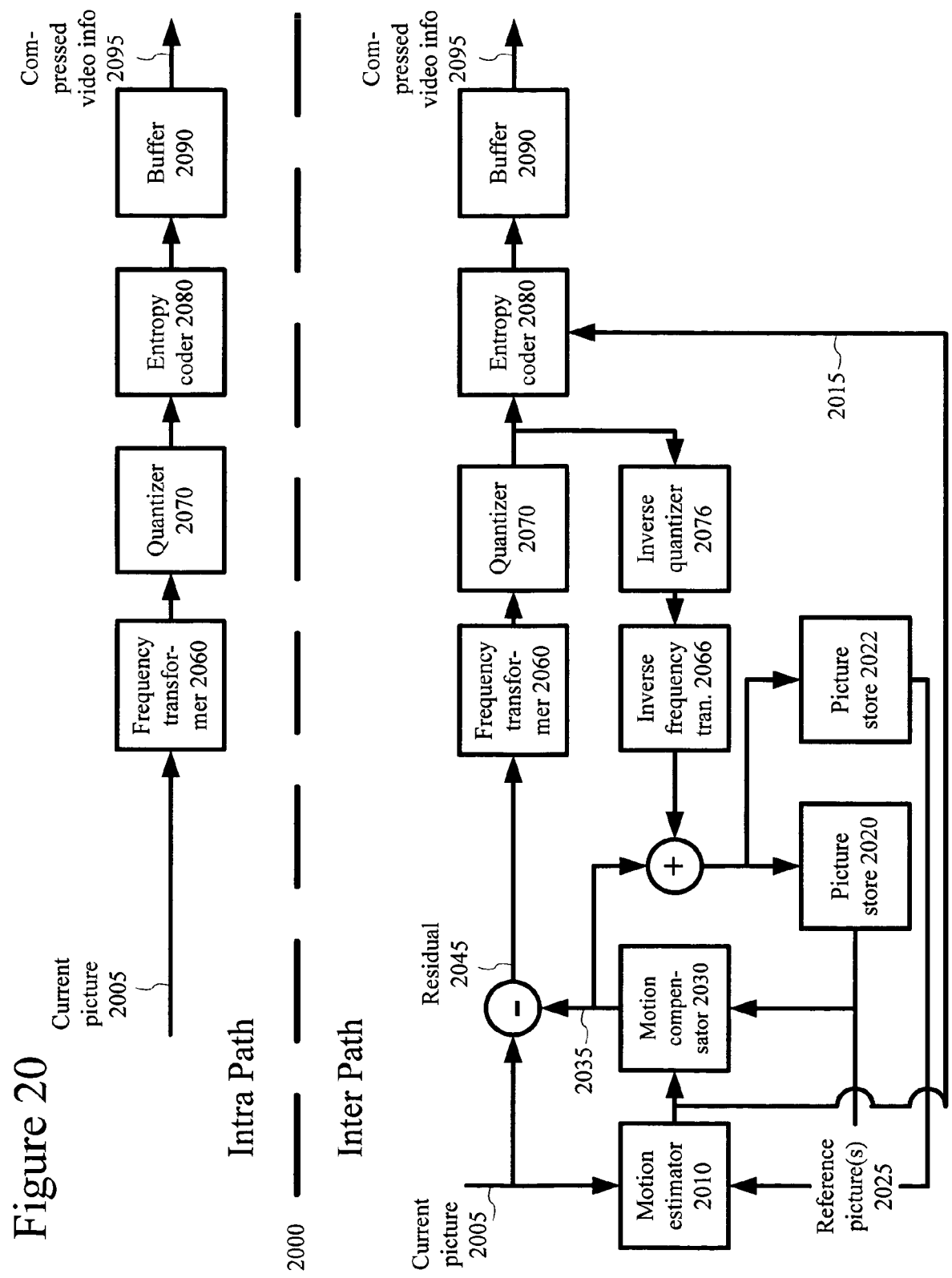
FIG. 20 is a block diagram of a generalized video encoder system in conjunction with which several described embodiments may be implemented.
Figure 21:
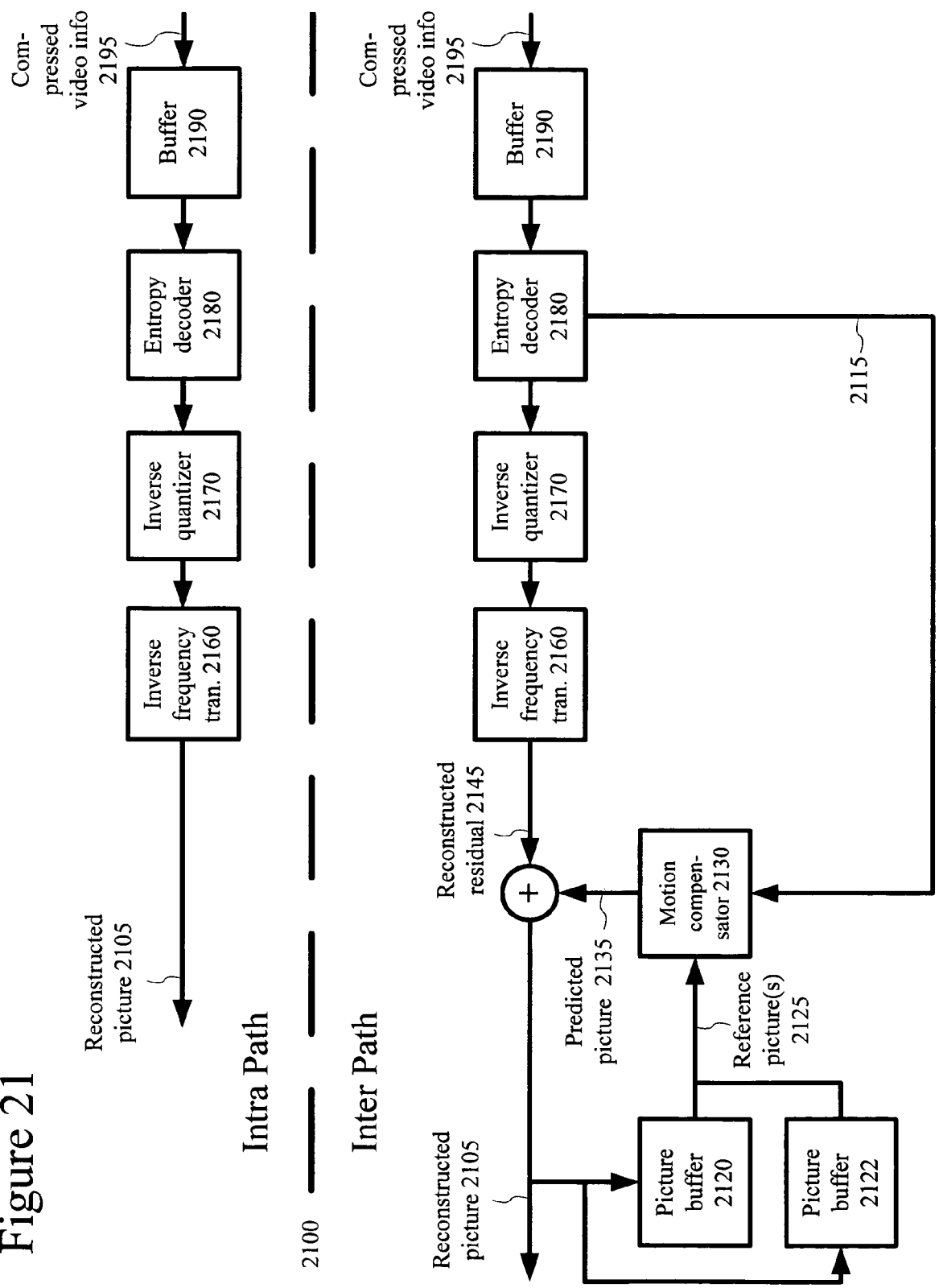
FIG. 21 is a block diagram of a generalized video decoder system in conjunction with which several described embodiments may be implemented.

FIG. 20 is a block diagram of a generalized video encoder system (2000), and FIG. 21 is a block diagram of a video decoder system (2100), in conjunction with which various described embodiments may be implemented.

The relationships shown between modules within the encoder and decoder indicate the main flow of information in the encoder and decoder; other relationships are not shown for the sake of simplicity. In particular, FIGS. 20 and 21 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (2000) and decoder (2100) process video pictures, which may be video frames, video fields or combinations of frames and fields. The bitstream syntax and semantics at the picture and macroblock levels may depend on whether frames or fields are used. There may be changes to macroblock organization and overall timing as well. The encoder (2000) and decoder (2100) are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in the next section.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder (2000) and decoder (2100) process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock (2200) shown in FIG. 22. The macroblock (2200) includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 23A:
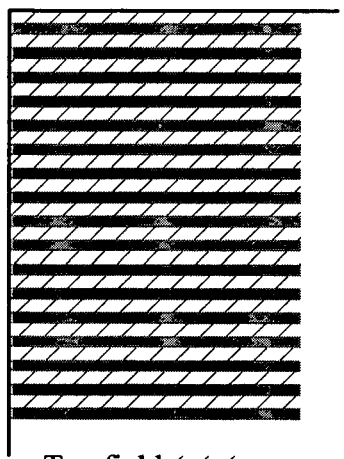
FIG. 23A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 23A shows part of an interlaced video frame (2300), including the alternating lines of the top field and bottom field at the top left part of the interlaced video frame (2300).

Figure 22:
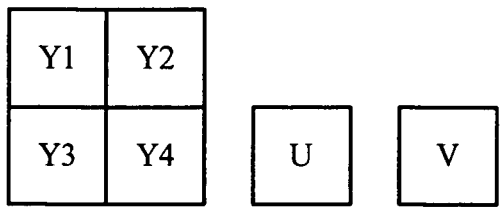
FIG. 22 is a diagram of a macroblock format used in several described embodiments.
Figure 23B:
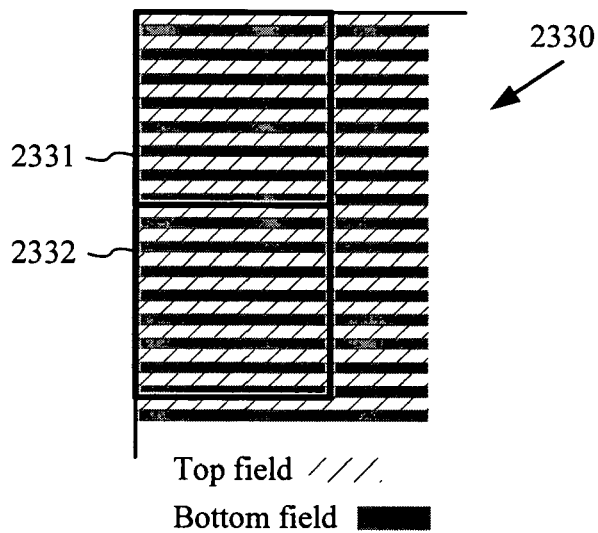
FIG. 23B is a diagram of the interlaced video frame organized for encoding/decoding as a frame.

FIG. 23B shows the interlaced video frame (2300) of FIG. 23A organized for encoding/decoding as a frame (2330). The interlaced video frame (2300) has been partitioned into macroblocks such as the macroblocks (2331) and (2332), which use a 4:2:0 format as shown in FIG. 22. In the luminance plane, each macroblock (2331, 2332) includes 8 lines from the top field alternating with 8 lines from the bottom field for 16 lines total, and each line is 16 pixels long. (The actual organization and placement of luminance blocks and chrominance blocks within the macroblocks (2331, 2332) are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P and B-frames may include intra-coded macroblocks as well as different types of predicted macroblocks.

Figure 23C:
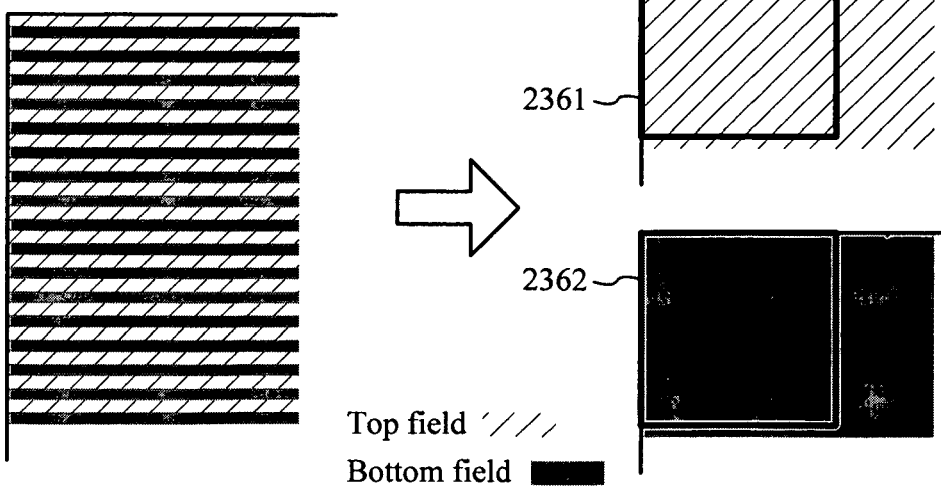
FIG. 23C is a diagram of the interlaced video frame organized for encoding/decoding as fields.

FIG. 23C shows the interlaced video frame (2300) of FIG. 23A organized for encoding/decoding as fields (2360). Each of the two fields of the interlaced video frame (2300) is partitioned into macroblocks. The top field is partitioned into macroblocks such as the macroblock (2361), and the bottom field is partitioned into macroblocks such as the macroblock (2362). (Again, the macroblocks use a 4:2:0 format as shown in FIG. 22, and the organization and placement of luminance blocks and chrominance blocks within the macroblocks are not shown.) In the luminance plane, the macroblock (2361) includes 16 lines from the top field and the macroblock (2362) includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder (2000) and decoder (2100) are object-based, use a different macroblock or block format, or perform operations on sets of pixels of different size or configuration than 8×8 blocks and 16×16 macroblocks.

B. Video Encoder

FIG. 20 is a block diagram of a generalized video encoder system (2000). The encoder system (2000) receives a sequence of video pictures including a current picture (2005) (e.g., progressive video frame, interlaced video frame, or field of an interlaced video frame), and produces compressed video information (2095) as output. Particular embodiments of video encoders typically use a variation or supplemented version of the generalized encoder (2000).

The encoder system (2000) compresses predicted pictures and key pictures. For the sake of presentation, FIG. 20 shows a path for key pictures through the encoder system (2000) and a path for forward-predicted pictures. Many of the components of the encoder system (2000) are used for compressing both key pictures and predicted pictures. The exact operations performed by those components can vary depending on the type of information being compressed.

A predicted picture (also called p-picture, b-picture for bi-directional prediction, or inter-coded picture) is represented in terms of prediction (or difference) from one or more other pictures. A prediction residual is the difference between what was predicted and the original picture. In contrast, a key picture (also called an I-picture or intra-coded picture) is compressed without reference to other pictures.

If the current picture (2005) is a forward-predicted picture, a motion estimator (2010) estimates motion of macroblocks or other sets of pixels of the current picture (2005) with respect to a reference picture, which is a reconstructed previous picture (2025) buffered in the picture store (2020). In alternative embodiments, the reference picture is a later picture or the current picture is bi-directionally predicted. The motion estimator (2010) can estimate motion by pixel, ½ pixel, ¼ pixel, or other increments, and can switch the precision of the motion estimation on a picture-by-picture basis or other basis. The precision of the motion estimation can be the same or different horizontally and vertically. The motion estimator (2010) outputs as side information motion information (2015) such as motion vectors. A motion compensator (2030) applies the motion information (2015) to the reconstructed previous picture (2025) to form a motion-compensated current picture (2035). The prediction is rarely perfect, however, and the difference between the motion-compensated current picture (2035) and the original current picture (2005) is the prediction residual (2045). Alternatively, a motion estimator and motion compensator apply another type of motion estimation/compensation.

A frequency transformer (2060) converts the spatial domain video information into frequency domain (i.e., spectral) data. For block-based video pictures, the frequency transformer (2060) applies a DCT or variant of DCT to blocks of the pixel data or prediction residual data, producing blocks of DCT coefficients. Alternatively, the frequency transformer (2060) applies another conventional frequency transform such as a Fourier transform or uses wavelet or subband analysis. The frequency transformer (2060) applies an 8×8, 8×4, 4×8, or other size frequency transforms (e.g., DCT) to prediction residuals for predicted pictures.

A quantizer (2070) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (2000) can use frame dropping, adaptive filtering, or other techniques for rate control.

If a given macroblock in a predicted picture has no information of certain types (e.g., no motion information for the macroblock and no residual information), the encoder (2000) may encode the macroblock as a skipped macroblock. If so, the encoder signals the skipped macroblock in the output bitstream of compressed video information (2095).

When a reconstructed current picture is needed for subsequent motion estimation/compensation, an inverse quantizer (2076) performs inverse quantization on the quantized spectral data coefficients. An inverse frequency transformer (2066) then performs the inverse of the operations of the frequency transformer (2060), producing a reconstructed prediction residual (for a predicted picture) or reconstructed samples (for an intra-coded picture). If the picture (2005)

being encoded is an intra-coded picture, then the reconstructed samples form the reconstructed current picture (not shown). If the picture (2005) being encoded is a predicted picture, the reconstructed prediction residual is added to the motion-compensated predictions (2035) to form the reconstructed current picture. The picture store (2020) buffers the reconstructed current picture for use in predicting a next picture. In some embodiments, the encoder applies a deblocking filter to the reconstructed frame to adaptively smooth discontinuities between the blocks of the frame.

The entropy coder (2080) compresses the output of the quantizer (2070) as well as certain side information (e.g., motion information (2015), quantization step size). Typical entropy coding techniques include arithmetic coding, differential coding, Huffman coding, run length coding, LZ coding, dictionary coding, and combinations of the above. The entropy coder (2080) typically uses different coding techniques for different kinds of information (e.g., DC coefficients, AC coefficients, different kinds of side information), and can choose from among multiple code tables within a particular coding technique.

The entropy coder (2080) puts compressed video information (2095) in the buffer (2090). A buffer level indicator is fed back to bit rate adaptive modules. The compressed video information (2095) is depleted from the buffer (2090) at a constant or relatively constant bit rate and stored for subsequent streaming at that bit rate. Therefore, the level of the buffer (2090) is primarily a function of the entropy of the filtered, quantized video information, which affects the efficiency of the entropy coding. Alternatively, the encoder system (2000) streams compressed video information immediately following compression, and the level of the buffer (2090) also depends on the rate at which information is depleted from the buffer (2090) for transmission.

Before or after the buffer (2090), the compressed video information (2095) can be channel coded for transmission over the network. The channel coding can apply error detection and correction data to the compressed video information (2095).

C. Video Decoder

FIG. 21 is a block diagram of a general video decoder system (2100). The decoder system (2100) receives information (2195) for a compressed sequence of video pictures and produces output including a reconstructed picture (2105) (e.g., progressive video frame, interlaced video frame, or field of an interlaced video frame). Particular embodiments of video decoders typically use a variation or supplemented version of the generalized decoder (2100).

The decoder system (2100) decompresses predicted pictures and key pictures. For the sake of presentation, FIG. 21 shows a path for key pictures through the decoder system (2100) and a path for forward-predicted pictures. Many of the components of the decoder system (2100) are used for decompressing both key pictures and predicted pictures. The exact operations performed by those components can vary depending on the type of information being decompressed.

A buffer (2190) receives the information (2195) for the compressed video sequence and makes the received information available to the entropy decoder (2180). The buffer (2190) typically receives the information at a rate that is fairly constant over time, and includes a jitter buffer to smooth short-term variations in bandwidth or transmission. The buffer (2190) can include a playback buffer and other buffers as well. Alternatively, the buffer (2190) receives information at a varying rate. Before or after the buffer (2190), the compressed video information can be channel decoded and processed for error detection and correction.

The entropy decoder (2180) entropy decodes entropy-coded quantized data as well as entropy-coded side information (e.g., motion information (2115), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (2180) frequently uses different decoding techniques for different kinds of information (e.g., DC coefficients, AC coefficients, different kinds of side information), and can choose from among multiple code tables within a particular decoding technique.

If the picture (2105) to be reconstructed is a forward-predicted picture, a motion compensator (2130) applies motion information (2115) to a reference picture (2125) to form a prediction (2135) of the picture (2105) being reconstructed. For example, the motion compensator (2130) uses a macroblock motion vector to find a macroblock in the reference picture (2125). A picture buffer (2120) stores previous reconstructed pictures for use as reference pictures. The motion compensator (2130) can compensate for motion at pixel, ½ pixel, ¼ pixel, or other increments, and can switch the precision of the motion compensation on a picture-by-picture basis or other basis. The precision of the motion compensation can be the same or different horizontally and vertically. Alternatively, a motion compensator applies another type of motion compensation. The prediction by the motion compensator is rarely perfect, so the decoder (2100) also reconstructs prediction residuals.

When the decoder needs a reconstructed picture for subsequent motion compensation, the picture store (2120) buffers the reconstructed picture for use in predicting a next picture. In some embodiments, the encoder applies a deblocking filter to the reconstructed frame to adaptively smooth discontinuities between the blocks of the frame.

An inverse quantizer (2170) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (2160) converts the quantized, frequency domain data into spatial domain video information. For block-based video pictures, the inverse frequency transformer (2160) applies an IDCT or variant of IDCT to blocks of the DCT coefficients, producing pixel data or prediction residual data for key pictures or predicted pictures, respectively. Alternatively, the frequency transformer (2160) applies another conventional inverse frequency transform such as a Fourier transform or uses wavelet or subband synthesis. The inverse frequency transformer (2160) applies an 8×8, 8×4, 4×8, or other size inverse frequency transforms (e.g., IDCT) to prediction residuals for predicted pictures.

III. Interlaced P-fields and Interlaced P-frames

A typical interlaced video frame consists of two fields (e.g., a top field and a bottom field) scanned at different times. In general, it is more efficient to encode stationary regions of an interlaced video frame by coding fields together ("frame mode" coding). On the other hand, it is often more efficient to code moving regions of an interlaced video frame by coding fields separately ("field mode" coding), because the two fields tend to have different motion. A forward-predicted interlaced video frame may be coded as two separate forward-predicted fields—interlaced P-fields. Coding fields separately for a forward-predicted interlaced video frame may be efficient, for example, when there is high motion throughout the interlaced video frames, and hence much difference between the fields.

Or, a forward-predicted interlaced video frame may be coded using a mixture of field coding and frame coding, as an interlaced P-frame. For a macroblock of an interlaced P-frame, the macroblock includes lines of pixels for the top and bottom fields, and the lines may be coded collectively in a frame-coding mode or separately in a field-coding mode.

An interlaced P-field references one or more previously decoded fields. For example, in some implementations, an interlaced P-field references either one or two previously decoded fields, whereas interlaced B-fields refer to up to two previous and two future reference fields (i.e., up to a total of four reference fields). (Encoding and decoding techniques for interlaced P-fields are described in detail below.) Or, for more information about interlaced P-fields and two-reference interlaced P-fields in particular, according to some embodiments, see U.S. patent application Ser. No. 10/857,473, entitled, "Predicting Motion Vectors for Fields of Forward-predicted Interlaced Video Frames," filed May 27, 2004.

IV. Number of Reference Fields in Interlaced P-Fields

In some embodiments, two previously coded/decoded fields can be used as reference fields when performing motion-compensated prediction of a single, current interlaced P-field. In general, the ability to use two reference fields results in better compression efficiency than when motion-compensated prediction is limited to one reference field. The signaling overhead is higher when two reference fields are available, however, since extra information is sent to indicate which of the two fields provides the reference for each macroblock or block having a motion vector.

In certain situations, the benefit of having more potential motion compensation predictors per motion vector (two reference fields vs. one reference field) does not outweigh the overhead required to signal the reference field selections. For example, choosing to use a single reference field instead of two can be advantageous when the best references all come from one of the two possible reference fields. This is usually due to a scene change that causes only one of the two reference fields to be from the same scene as the current field. Or, only one reference field may be available, such as at the beginning of a sequence. In these cases, it is more efficient to signal at the field level for the current P-field that only one reference field is used and what that one reference field is, and to have that decision apply to the macroblocks and blocks within the current P-field. Reference field selection information then no longer needs to be sent with every macroblock or block having a motion vector.

A. Numbers of Reference Fields in Different Schemes

One scheme allows two previously coded/decoded fields to be used as reference fields for the current P-field. The reference field that a motion vector (for a macroblock or block) uses is signaled for the motion vector, as is other information for the motion vector. For example, for a motion vector, the signaled information indicates: (1) the reference field; and (2) the location in the reference field for the block or macroblock predictor for the current block or macroblock associated with the motion vector. Or, the reference field information and motion vector information are signaled as described in one of the combined implementations in section XII.

In another scheme, only one previously coded/decoded field is used as a reference field for the current P-field. For a motion vector, there is no need to indicate the reference field that the motion vector references. For example, for a motion vector, the signaled information indicates only the location in the reference field for the predictor for the current block or macroblock associated with the motion vector. Or, the motion vector information is signaled as described in one of the combined implementations in section XII. Motion vectors in the one reference field scheme are typically coded with fewer bits than the same motion vectors in the two reference field scheme.

For either scheme, updating of the buffer or picture stores for the reference fields for subsequent motion compensation is simple. The reference field or fields for a current P-field are one or both of the most recent and second most recent I- or P-fields before the current P-field. Since the positions of the candidate reference fields are known, an encoder and decoder may automatically and without buffer management signals update the reference picture buffer for motion compensation of the next P-field.

Alternatively, an encoder and decoder use one or more additional schemes for numbers of reference fields for interlaced P-fields.

B. Signaling Examples

Specific examples of signaling, described in this section and in the combined implementations in section XII, signal how many reference fields are used for a current P-field and, when one reference field is used, which candidate reference field is used. For example, a one-bit field (called NUMREF) in a P-field header indicates whether the P-field uses one or two previous fields as references. If NUMREF=0, then only one reference field is used. If NUMREF=1, then two reference fields are used. If NUMREF=0, then another one-bit field (called REFFIELD) is present and indicates which of the two fields is used as the reference. If REFFIELD=0, then the temporally closer field is used as a reference field. If REFFIELD=1, then the temporally further of the two candidate reference fields is used as the reference field for the current P-field. Alternatively, the encoder and decoder use other and/or additional signals for reference field selection.

C. Positions of Reference Fields

FIGS. 24A-24F illustrate positions of reference fields available for use in motion-compensated prediction for interlaced P-fields. A P-field can use either one or two previously coded/decoded fields as references. Specifically, FIGS. 24A-24F show examples of reference fields for NUMREF=0 and NUMREF=1.

Figure 24A:
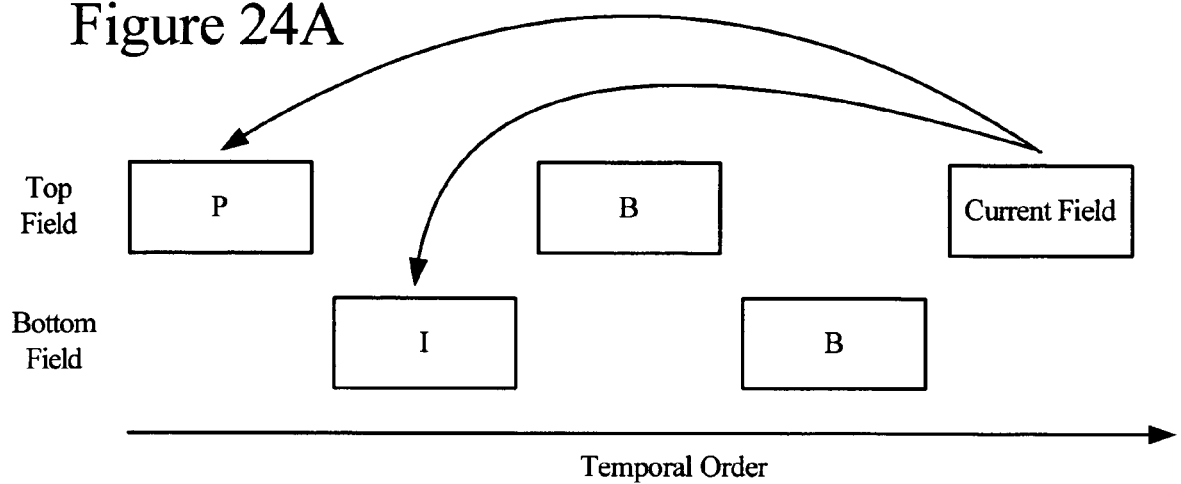
FIGS. 24A-24F are charts showing examples of reference fields for an interlaced P-field.
Figure 24B:
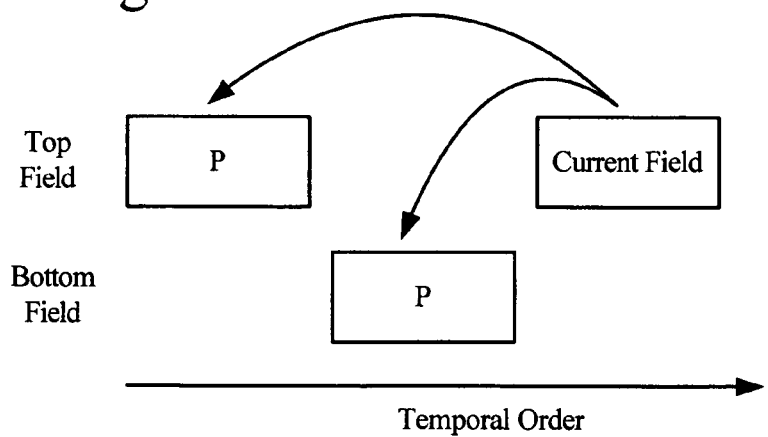

FIGS. 24A and 24B show examples where two reference fields are used for a current P-field. (NUMREF=1.) In FIG. 24A, the current field refers to a top field and bottom field in a temporally previous interlaced video frame. Intermediate interlaced B-fields are not used as reference fields. In FIG. 24B, the current field refers to a top field and bottom field in an interlaced video frame immediately before the interlaced video frame containing the current field.

Figure 24C:
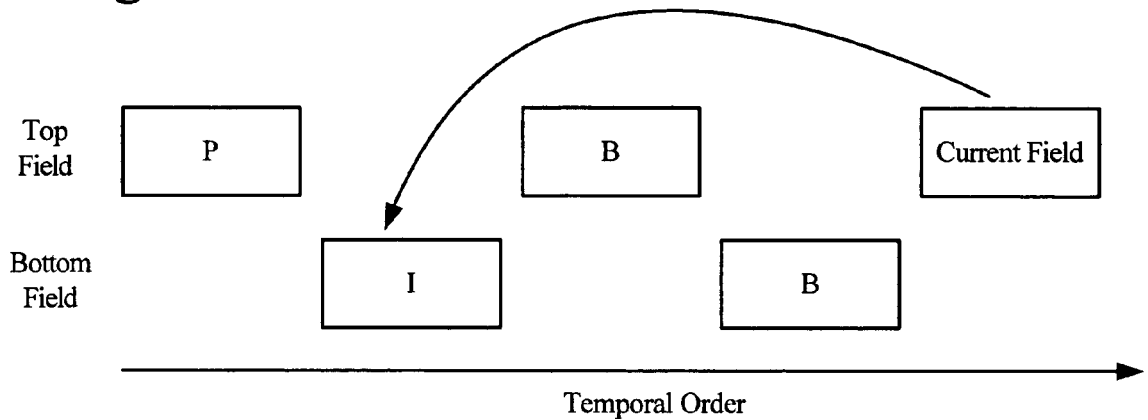
Figure 24D:
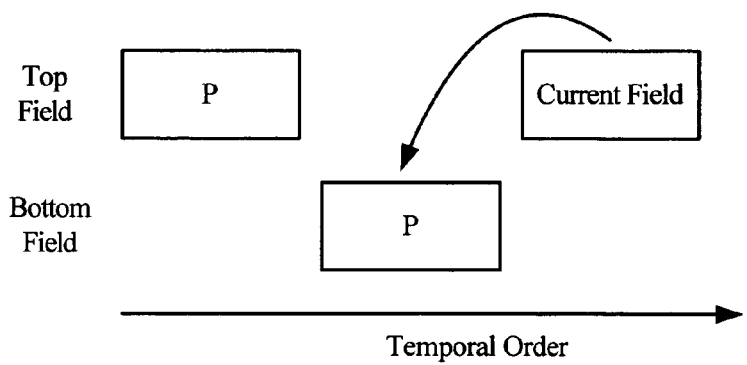

FIGS. 24C and 24D show examples where one reference field is used for a current P-field (NUMREF=0), and the one reference field is the temporally most recent reference field (REFFIELD=0). The polarity of the reference field is opposite the polarity of the current P-field, meaning, for example, that if the current P-field is from even lines then the reference field is from odd lines. In FIG. 24C, the current field refers to a bottom field in a temporally previous interlaced video frame, and does not refer to the less recent top field in the interlaced video frame. Again, intermediate interlaced B-fields are not allowable reference fields. In FIG. 24D, the current field refers to bottom field in an interlaced video frame immediately before the interlaced video frame containing the current field, rather than the less recent top field.

Figure 24E:
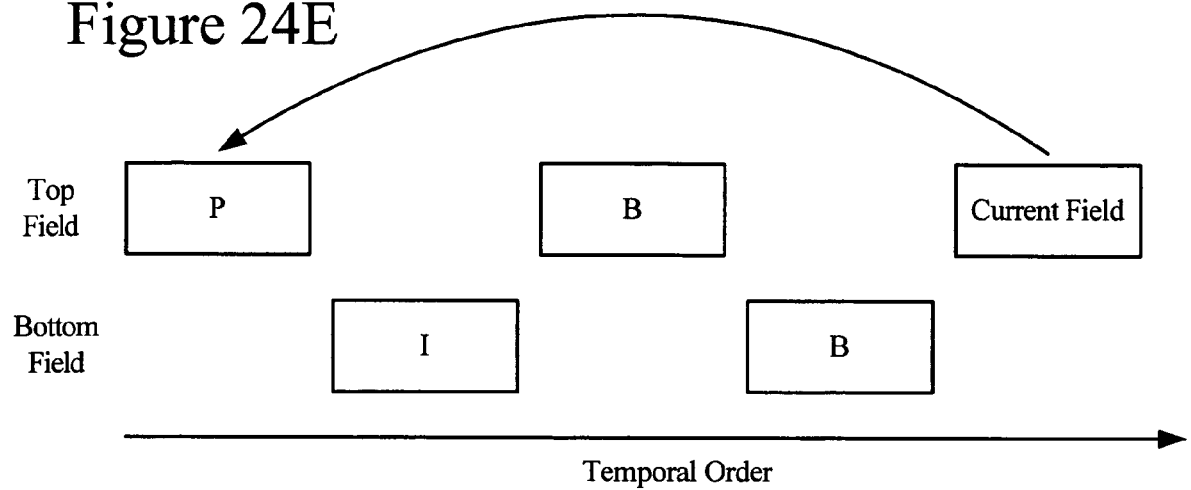
Figure 24F:
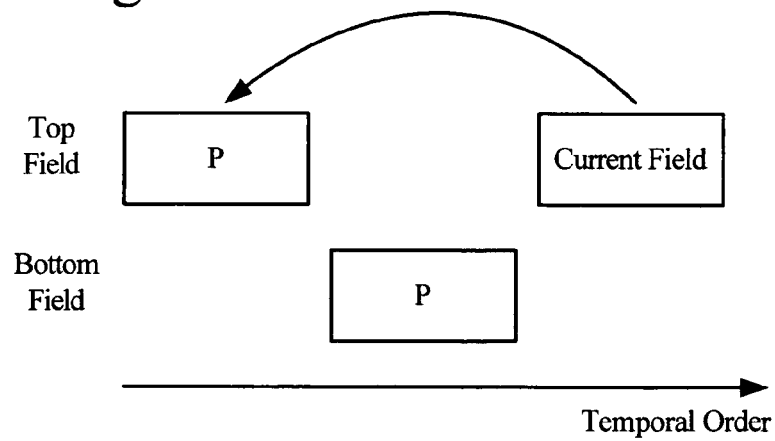

FIGS. 24E and 24F show examples where one reference field is used for a current P-field (NUMREF=0), and the one reference field is the temporally second-most recent reference field (REFFIELD=1). The polarity of the reference field is the same as the polarity of the current field, meaning, for example, that if the current field is from even lines then the reference field is also from even lines. In FIG. 24E, the current field refers to a top field in a temporally previous interlaced video frame, but does not refer to the more recent bottom field. Again, intermediate interlaced B-fields are not allowable reference fields. In FIG. 24F, the current field refers to top field rather than the more recent bottom field.

Alternatively, an encoder and decoder use reference fields at other and/or additional positions or timing for motion-compensated prediction for interlaced P-fields. For example, reference fields within the same frame as a current P-field are allowed. Or, either the top field or bottom field of a frame may be coded/decoded first.

D. Encoding Techniques

An encoder such as the encoder (2000) of FIG. 20 signals which of multiple reference field schemes is used for coding interlaced P-fields. For example, the encoder performs the technique (2500) shown in FIG. 25A.

For a given interlaced P-field, the encoder signals (2510) the number of reference fields used in motion-compensated prediction for the interlaced P-field. For example, the encoder uses a single bit to indicate whether one or two reference fields are used. Alternatively, the encoder uses another signaling/encoding mechanism for the number of reference fields.

The encoder determines (2520) whether one or two reference fields are used. If one reference field is used, the encoder signals (2530) a reference field selection for the interlaced P-field. For example, the encoder uses a single bit to indicate whether the temporally most recent or the temporally second most recent reference field (previous I- or P-field) is used. Alternatively, the encoder uses another signaling/encoding mechanism for the reference field selection for the P-field.

If two reference fields are used, the encoder signals (2540) a reference field selection for a motion vector of a block, macroblock, or other portion of the interlaced P-field. For example, the encoder jointly codes a reference field selection for a motion vector with differential motion vector information for the motion vector. Alternatively, the encoder uses another signaling/encoding mechanism for the reference field selection for a motion vector. The encoder repeats (2545, 2540) the signaling for the next motion vector until there are no more motion vectors to signal for the P-field. (For the sake of simplicity, FIG. 25A does not show the various stages of macroblock and block encoding and corresponding signaling that can occur after or around the signaling (2540) of a reference field selection. Instead, FIG. 25A focuses on the repeated signaling of the reference field selections for multiple motion vectors in the P-field.)

Alternatively, the encoder performs another technique to indicate which of multiple reference field schemes is used for coding interlaced P-fields. For example, the encoder has more and/or different options for the number of reference fields.

Figure 25B:
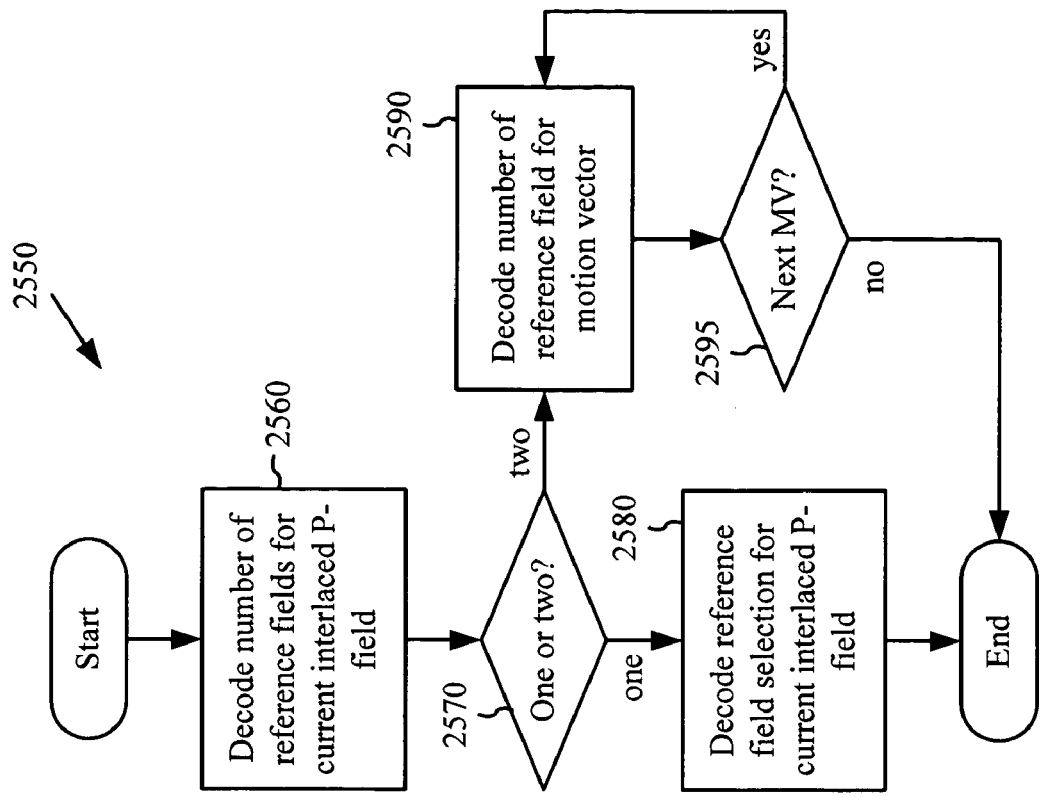
FIGS. 25A and 25B are flowcharts showing techniques for encoding and decoding, respectively, of reference field number and selection information.
Figure 25A:
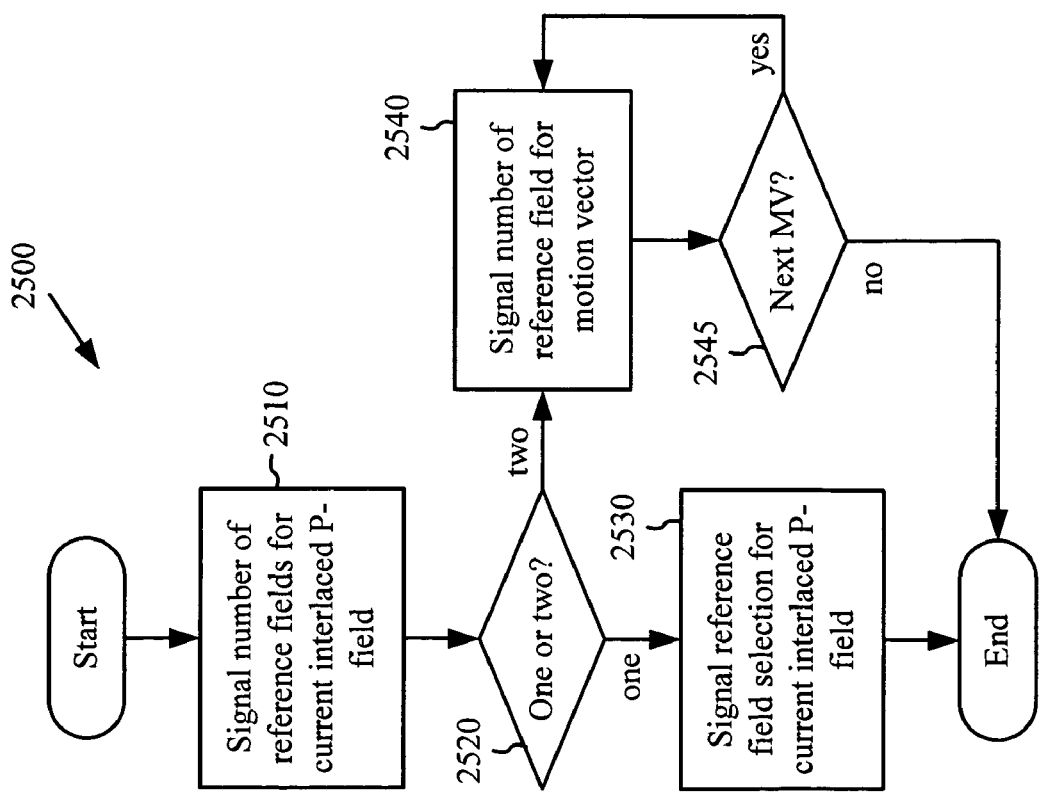

For the sake of simplicity, FIG. 25A does not show the various ways in which the technique (2500) may be integrated with other aspects of encoding and decoding. Various combined implementations are described in detail in section XII.

E. Decoding Techniques

A decoder such as the decoder (2100) of FIG. 21 receives and decodes signals that indicate which of multiple schemes to use for decoding interlaced P-fields. For example, the decoder performs the technique (2550) shown in FIG. 25B.

For a given interlaced P-field, the decoder receives and decodes (2560) a signal for the number of reference fields used in motion-compensated prediction for the interlaced P-field. For example, the decoder receives and decodes a single bit to indicate whether one or two reference fields are used. Alternatively, the decoder uses another decoding mechanism for the number of reference fields.

The decoder determines (2570).whether one or two reference fields are used. If one reference field is used, the decoder receives and decodes (2580) a signal for a reference field selection for the interlaced P-field. For example, the decoder receives and decodes a single bit to indicate whether the temporally most recent or the temporally second most recent reference field (previous I- or P-field) is used. Alternatively, the decoder uses another decoding mechanism for the reference field selection for the P-field.

If two reference fields are used, the decoder receives and decodes (2590) a signal for a reference field selection for a motion vector of a block, macroblock, or other portion of the interlaced P-field. For example, the decoder decodes a reference field selection for a motion vector jointly coded with differential motion vector information for the motion vector. Alternatively, the decoder uses another decoding mechanism for the reference field selection for a motion vector. The decoder repeats (2595, 2590) the receiving and decoding for the next motion vector until there are no more motion vectors signaled for the P-field. (For the sake of simplicity, FIG. 25B does not show the various stages of macroblock and block decoding that can occur after or around the receiving and decoding (2590) of a reference field selection. Instead, FIG. 25B focuses on the repeated receiving/decoding of the reference field selections for multiple motion vectors in the P-field.)

Alternatively, the decoder performs another technique to determine which of multiple reference field schemes is used for decoding interlaced P-fields. For example, the decoder has more and/or different options for the number of reference fields.

For the sake of simplicity, FIG. 25B does not show the various ways in which the technique (2550) may be integrated with other aspects of encoding and decoding. Various combined implementations are described in detail in section XII.

V. Signaling Macroblock Mode Information for Interlaced P-Fields

In some embodiments, various macroblock mode information for macroblocks of interlaced P-fields is jointly grouped for signaling. A macroblock of an interlaced P-field may be encoded in many different modes, with any of several different syntax elements being present or absent. In particular, the type of motion compensation (e.g., 1MV, 4MV, or intra), whether a coded block pattern is present in the bitstream for the macroblock, and (for the 1MV case) whether motion vector data is present in the bitstream for the macroblock, are jointly coded. Different code tables may be used for different scenarios for the macroblock mode information, which result in more efficient overall compression of the information.

Specific examples of signaling, described in this section and in the combined implementations in section XII, signal macroblock mode information with a variable length coded MBMODE syntax element. Table selection for MBMODE is signaled through a field-level element MBMODETAB, which is fixed length coded. Alternatively, an encoder and decoder use other and/or additional signals for signaling macroblock mode information.

A. Macroblock Modes for Different Types of Interlaced P-Fields

In general, the macroblock mode indicates the macroblock type (1MV, 4MV or intra), the presence/absence of a coded block pattern for the macroblock, and the presence/absence of motion vector data for the macroblock. The information indicated by the macroblock mode syntax element depends on whether the interlaced P-field is encoded as a 1MV field (having intra and/or 1MV macroblocks) or a mixed-MV field (having intra, 1MV, and/or 4MV macroblocks).

In a 1MV interlaced P-field, the macroblock mode element for a macroblock jointly represents the macroblock type (intra or 1MV), the presence/absence of a coded block pattern element for the macroblock, and the presence/absence of motion vector data (when the macroblock type is 1MV, but not when it is intra). The table in FIG. 26 shows the complete event space for macroblock information signaled by MBMODE in 1MV interlaced P-fields.

In a mixed-MV interlaced P-field, the macroblock mode element for a macroblock jointly represents the macroblock type (intra or 1MV or 4MV), the presence/absence of a coded block pattern for the macroblock, and the presence/absence of motion vector data (when the macroblock type is 1MV, but not when it is intra or 4MV). The table in FIG. 27 shows the complete event space for macroblock information signaled by MBMODE in mixed-MV interlaced P-fields.

If macroblock mode indicates that motion vector data is present, then the motion vector data is present in the macroblock layer and signals the motion vector differential, which is combined with the motion vector predictor to reconstruct the motion vector. If the macroblock mode element indicates that motion vector data is not present then the motion vector differential is assumed to be zero, and therefore the motion vector is equal to the motion vector predictor. The macroblock mode element thus efficiently signals when motion compensation with a motion vector predictor only (not modified by any motion vector differential) is to be used.

One of multiple different VLC tables is used to signal the macroblock mode element for an interlaced P-field. For example, eight different code tables for MBMODE for macroblocks of mixed-MV interlaced P-fields are shown in FIG. 47H, and eight different code tables for MBMODE for macroblocks of 1MV interlaced P-fields are shown in FIG. 47I. The table selection is indicated by a MBMODETAB element signaled at the field layer. Alternatively, an encoder and decoder use other and/or additional codes for signaling macroblock mode information and table selections.

B. Encoding Techniques

An encoder such as the encoder (2000) of FIG. 20 encodes macroblock mode information for macroblocks of interlaced P-fields. For example, the encoder performs the technique (2800) shown in FIG. 28A.

For a given interlaced P-field, the encoder selects (2810) the code table to be used to encode macroblock mode information for macroblocks of the interlaced P-field. For example, the encoder selects one of the VLC tables for MBMODE shown in FIG. 47H or 47I. Alternatively, the encoder selects from among other and/or additional tables.

The encoder signals (2820) the selected code table in the bitstream. For example, the encoder signals a FLC indicating the selected code table, given the type of the interlaced P-field. Alternatively, the encoder uses a different signaling mechanism for the code table selection, for example, using a VLC for the code table selection.

The encoder selects (2830) the macroblock mode for a macroblock from among multiple available macroblock modes. For example, the encoder selects a macroblock mode that indicates a macroblock type, whether or not a coded block pattern is present, and (if applicable for the macroblock type) whether or not motion vector data is present. Various combinations of options for MBMODE are listed in FIGS. 26 and 27. Alternatively, the encoder selects from among other and/or additional macroblock modes for other and/or additional combinations of macroblock options.

The encoder signals (2840) the selected macroblock mode using the selected code table. Typically, the encoder signals the macroblock mode as a VLC using a selected VLC table. The encoder repeats (2845, 2830, 2840) the selection and signaling of macroblock mode until there are no more macroblock modes to signal for the P-field. (For the sake of simplicity, FIG. 28A does not show the various stages of macroblock and block encoding and corresponding signaling that can occur after or around the signaling (2840) of the selected macroblock mode. Instead, FIG. 28A focuses on the repeated signaling of macroblock modes for macroblocks in the P-field using the selected code table for the P-field.)

Figure 28B:
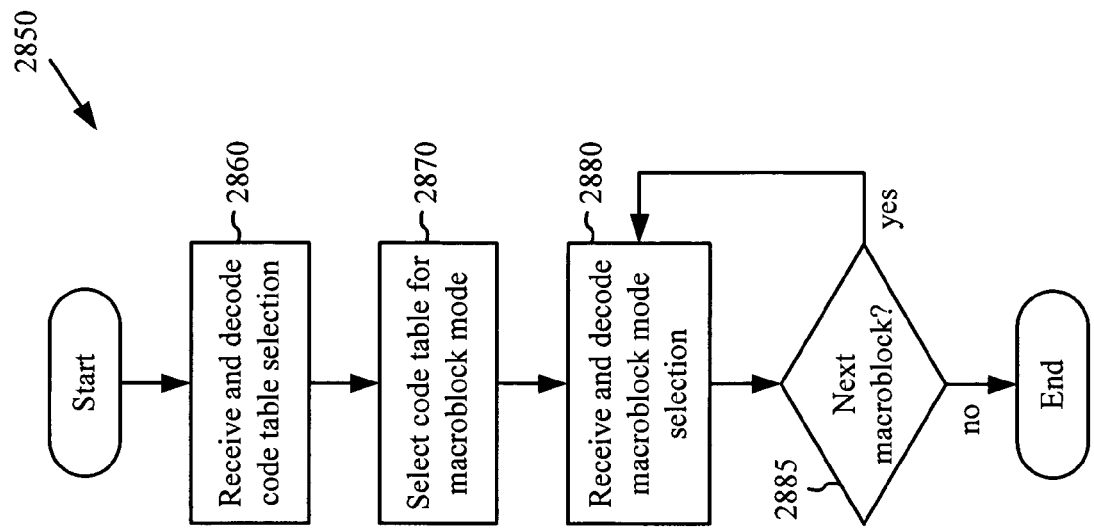
FIGS. 28A and 28B are flowcharts showing techniques for encoding and decoding, respectively, of macroblock mode information for macroblocks of interlaced P-fields.
Figure 28A:
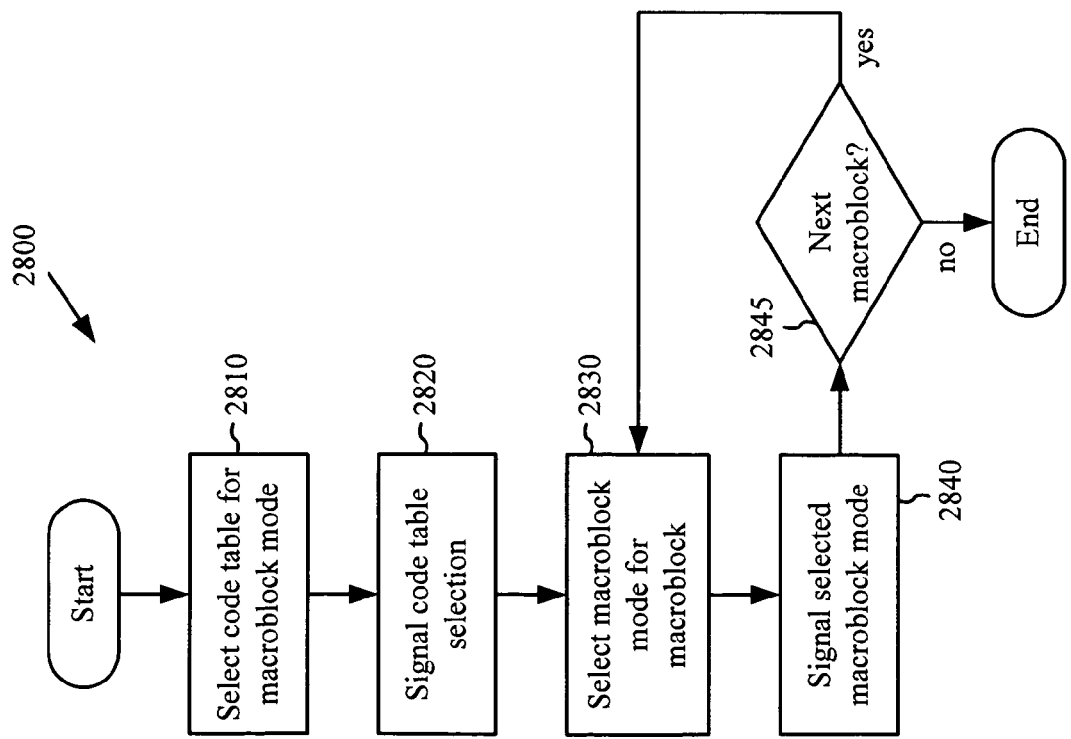

Alternatively, the encoder performs another technique to encode macroblock mode information for macroblocks of interlaced P-fields. For example, although FIG. 28A shows the code table selection before the mode selection, in many common encoding scenarios, the encoder first selects the macroblock modes for the macroblocks, then selects a code table for efficiently signaling those selected macroblock modes, then signals the code table selection and the modes. Moreover, although FIG. 28A shows the code table selection occurring per interlaced P-field, alternatively the code table is selected on a more frequent, less frequent, or non-periodic basis, or the encoder skips the code table selection entirely (always using the same code table). Or, the encoder may select a code table from contextual information (making signaling the code table selection unnecessary).

For the sake of simplicity, FIG. 28A does not show the various ways in which the technique (2800) may be integrated with other aspects of encoding and decoding. Various combined implementations are described in detail in section XII.

C. Decoding Techniques

A decoder such as the decoder (2100) of FIG. 21 receives and decodes macroblock mode information for macroblocks of interlaced P-fields. For example, the decoder performs the technique (2850) shown in FIG. 28B.

For a given interlaced P-field, the decoder receives and decodes (2860) a code table selection for a code table to be used to decode macroblock mode information for macroblocks of the interlaced P-field. For example, the decoder receives and decodes a FLC indicating the selected code table, given a type of the interlaced P-field. Alternatively, the decoder works with a different signaling mechanism for the code table selection, for example, one that uses a VLC for the code table selection.

The decoder selects (2870) the code table based upon the decoded code table selection (and potentially other information). For example, the decoder selects one of the VLC tables for MBMODE shown in FIG. 47H or 47I. Alternatively, the decoder selects from among other and/or additional tables.

The decoder receives and decodes (2880) a macroblock mode selection for a macroblock. For example, the macroblock mode selection indicates a macroblock type, whether or not a coded block pattern is present, and (if applicable for the macroblock type) whether or not motion vector data is present. Various combinations of these options for MBMODE are listed in FIGS. 26 and 27. Alternatively, the macroblock mode is one of other and/or additional macroblock modes for other and/or additional combinations of macroblock options. The decoder repeats (2885, 2880) the receiving and decoding for a macroblock mode for the next macroblock until there are no more macroblock modes to receive and decode for the P-field. (For the sake of simplicity, FIG. 28B does not show the various stages of macroblock and block decoding that can occur after or around the receiving and decoding (2880) of the macroblock mode selection. Instead, FIG. 28B focuses on the repeated receiving/decoding of macroblock mode selections for macroblocks in the P-field using the selected code table for the P-field.)

Alternatively, the decoder performs another technique to decode macroblock mode information for macroblocks of interlaced P-fields. For example, although FIG. 28B shows the code table selection occurring per interlaced P-field, alternatively a code table is selected on a more frequent, less frequent, or non-periodic basis, or the decoder skips the code table selection entirely (always using the same code table). Or, the decoder may select a code table from contextual information (making the receiving and decoding of the code table selection unnecessary).

For the sake of simplicity, FIG. 28B does not show the various ways in which the technique (2850) may be integrated with other aspects of encoding and decoding. Various combined implementations are described in detail in section XII.

VI. Reference Field Selection in Two Reference Field Interlaced P-Fields

In some embodiments, two previously coded/decoded fields are used as reference fields when performing motion-compensated prediction for a single, current interlaced P-field. (For example, see section IV.) Signaled information indicates which of the two fields provides the reference for each macroblock (or block) having a motion vector.

In this section, various techniques and tools are described for efficiently signaling which of multiple previously coded/decoded reference fields are used to provide motion-compensated prediction information when coding or decoding a current macroblock or block. For example, an encoder and decoder implicitly derive dominant and non-dominant reference fields for the current macroblock or block based on previously coded motion vectors in the interlaced P-field. (Or, correspondingly, the encoder and decoder derive dominant and non-dominant motion vector predictor polarities.) Signaled information then indicates whether the dominant or non-dominant reference field is used for motion compensation of the current macroblock or block.

A. Dominant and Non-dominant Reference Fields and Predictors

Interlaced fields may be coded using no motion compensation (I-fields), forward motion compensation (P-fields), or forward and backward motion compensation (B-fields). Interlaced P-fields may reference two reference fields, which are previously coded/decoded I- or P-fields. FIGS. 24A and 24B show examples where two reference fields are used for a current P-field. The two reference fields are of opposite polarities. One reference field represents odd lines of a video frame, and the other reference field represents even lines of a video frame (which is not necessarily the same frame that includes the odd lines reference field). The P-field currently being coded or decoded can use either one or both of the two previously coded/decoded fields as references in motion compensation. Thus, motion vector data for a macroblock or block of the P-field typically indicates in some way: (1) which field to use as a reference field in motion compensation; and (2) the displacement/location in that reference field of sample values to use in the motion compensation.

Signaling reference field selection information can consume an inefficient number of bits. The number of bits may be reduced, however, by predicting, for a given motion vector, which reference field will be used for the motion vector, and then signaling whether or not the predicted reference field is actually used as the reference field for the motion vector.

For example, for each macroblock or block that uses motion compensation in an interlaced P-field, an encoder or decoder analyzes up to three previously coded/decoded motion vectors from neighboring macroblocks or blocks. From them, the encoder or decoder derives a dominant and non-dominant reference field. In essence, the encoder or decoder determines which of the two possible reference fields is used by the majority of the motion vectors of the neighboring macroblocks or blocks. The field that is referenced by more of the motion vectors of neighbors is the dominant reference field, and the other reference field is the non-dominant reference field. Similarly, the polarity of the dominant reference field is the dominant motion vector predictor polarity, and the polarity of the non-dominant reference field is the non-dominant motion vector predictor polarity.

The pseudocode in FIG. 29 shows one technique for an encoder or decoder to determine dominant and non-dominant reference fields. In the pseudocode, the terms "same field" and "opposite field" are relative to the current interlaced P-field. If the current P-field is an even field, for example, the "same field" is the even line reference field, and the "opposite field" is the odd line reference field. FIGS. 5A through 10 show locations of neighboring macroblocks and blocks from which the Predictors A, B, and C are taken. In the pseudocode of FIG. 29, the dominant field is the field referenced by the majority of the motion vector predictor candidates. In the case of a tie, the motion vector derived from the opposite field is considered to be the dominant motion vector predictor. Intra-coded macroblocks are not considered in the calculation of the dominant/non-dominant predictor. If all candidate predictor macroblocks are intra-coded, then the dominant and non-dominant motion vector predictors are set to zero, and the dominant predictor is taken to be from the opposite field.

Alternatively, the encoder and decoder analyze other and/or additional motion vectors from neighboring macroblock or blocks, and/or apply different decision logic to determine dominant and non-dominant reference fields. Or, the encoder and decoder use a different mechanism to predict which reference field will be selected for a given motion vector in an interlaced P-field.

In some cases, the one bit of information that indicates whether the dominant or non-dominant field is used is jointly coded with the differential motion vector information. Therefore, the bits/symbol for this one bit of information can more accurately match the true symbol entropy. For example, the dominant/non-dominant selector is signaled as part of the vertical component of a motion vector differential as shown in the pseudocode in FIG. 30. In it, MVY is the vertical component of the motion vector, and PMVY is the vertical component of the motion vector predictor. In essence, the vertical motion vector differential jointly codes the reference field selector and vertical offset differential as follows:

$$DMVY=(MVY-PMVY)*2+p,$$

where p=0 if the dominant reference field is used, and p=1 if the non-dominant reference field is used. As a numerical example: suppose a current block is even polarity, the actual reference field for the motion vector is even polarity, and the dominant predictor is oppfield (in other words, the dominant reference field is the odd polarity reference field). Also, suppose the vertical displacement of the motion vector is 7 units (MVY=7) and the vertical component of the motion vector predictor is 4 units (PMVY=4). Since the current reference field and the dominant predictor are of opposite polarity, DMVY=(7−4)*2+1=7.

Alternatively, the dominant/non-dominant selector is jointly coded with motion vector differential information in some other way. Or, the dominant/non-dominant selector is signaled with another mechanism.

B. Encoding Techniques

An encoder such as the encoder (2000) of FIG. 20 determines dominant and non-dominant reference field polarities for motion vector predictor candidates during encoding of motion vectors for two reference field interlaced P-fields. For example, the encoder performs the technique (3100) shown in FIG. 31A for a motion vector of a current macroblock or block. Typically, the encoder performs some form of motion estimation in the two reference fields to obtain the motion vector and reference field. The motion vector is then coded according to the technique (3100).

The encoder determines (3110) a motion vector predictor of the same reference field polarity as the motion vector. For example, the encoder determines the motion vector predictor as described in section VII for the reference field associated with the motion vector. Alternatively, the encoder determines the motion vector predictor with another mechanism.

The encoder determines (3120) the dominant and non-dominant reference field polarities of the motion vector. For example, the encoder follows the pseudocode shown in FIG. 29. Alternatively, the encoder uses another technique to determine the dominant and non-dominant polarities.

The encoder signals (3125) a dominant/non-dominant polarity selector in the bitstream, which indicates whether the dominant or non-dominant polarity should be used for the motion vector predictor and reference field associated with the motion vector. For example, the encoder jointly encodes the dominant/non-dominant polarity selector with other information using a joint VLC. Alternatively, the encoder signals the selector using another mechanism, for example, arithmetic coding of a bit that indicates the selector. Prediction of reference field polarity for motion vector predictors lowers the entropy of the selector information, which enables more efficient encoding of the selector information.

The encoder calculates (3130) a motion vector differential from the motion vector predictor and motion vector, and signals (3140) information for the motion vector differential information.

Alternatively, the encoder performs another technique to determine dominant and non-dominant polarities for motion vector prediction during encoding of motion vectors for two reference field interlaced P-fields. Moreover, although FIG. 31A shows separate signaling of the dominant/non-dominant selector and the motion vector differential information, in various embodiments, this exact information is jointly signaled. Various other reordering is possible, including determining the motion vector after determining the dominant/non-dominant polarity (so as to factor the cost of selector signaling overhead into the motion vector selection process).

For the sake of simplicity, FIG. 31A does not show the various ways in which the technique (3100) may be integrated with other aspects of encoding and decoding. Various combined implementations are described in detail in section XII.

C. Decoding Techniques

A decoder such as the decoder (2100) of FIG. 21 determines dominant and non-dominant reference field polarities for motion vector predictor candidates during decoding of motion vectors for two reference field interlaced P-fields. For example, the decoder performs the technique (3150) shown in FIG. 31B.

The decoder determines (3160) the dominant and non-dominant reference field polarities of a motion vector of a current macroblock or block. For example, the decoder follows the pseudocode shown in FIG. 29. Alternatively, the decoder uses another technique to determine the dominant and non-dominant polarities.

The decoder receives and decodes (3165) a dominant/non-dominant polarity selector in the bitstream, which indicates whether the dominant or non-dominant polarity should be used for the motion vector predictor and reference field associated with the motion vector. For example, the decoder receives and decodes a dominant/non-dominant polarity selector that has been jointly coded with other information using a joint VLC. Alternatively, the decoder receives and decodes a selector signaled using another mechanism, for example, arithmetic decoding of a bit that indicates the selector.

The decoder determines (3170) the motion vector predictor for the reference field to be used with the motion vector. For example, the decoder determines the motion vector predictor as described in section VII for the signaled polarity. Alternatively, the decoder determines the motion vector predictor with another mechanism.

The decoder receives and decodes (3180) information for a motion vector differential, and reconstructs (3190) the motion vector from the motion vector differential and the motion vector predictor.

Alternatively, the decoder performs another technique to determine dominant and non-dominant polarities for motion vector prediction during decoding of motion vectors for two reference field interlaced P-fields. For example, although FIG. 31B shows separate signaling of the dominant/non-dominant selector and the motion vector differential information, alternatively, this information is jointly signaled. Various other reordering is also possible.

For the sake of simplicity, FIG. 311B does not show the various ways in which the technique (3150) may be integrated with other aspects of encoding and decoding. Various combined implementations are described in detail in section XII.

VII. Hybrid Motion Vector Prediction for Interlaced P-Fields

In some embodiments, motion vectors are signaled as differentials relative to motion vector predictors so as to reduce the bit rate associated with signaling the motion vectors. The performance of the motion vector differential signaling depends in part on the quality of the motion vector prediction, which usually improves when multiple candidate motion vector predictors are considered from the area around a current macroblock, block, etc. In some cases, however, the use of multiple candidate predictors hurts the quality of motion vector prediction. This occurs, for example, when a motion vector predictor is computed as the median of a set of candidate predictors that are diverse (e.g., have a high variance between the motion vector predictors).

Therefore, in some embodiments, an encoder and decoder perform hybrid motion vector prediction for motion vectors of interlaced P-fields. When the vectors that make up the causal neighborhood of the current macroblock or block are diverse according to some criteria, the hybrid motion vector prediction mode is employed. In this mode, instead of using the median of the set of candidate predictors as the motion vector predictor, a specific motion vector from the set (e.g., top predictor, left predictor) is signaled by a selector bit or codeword. This helps improve motion vector prediction at motion discontinuities in an interlaced P-field. For two reference field interlaced P-fields, the dominant polarity is also taken into consideration when checking the hybrid motion vector prediction condition.

A. Motion Vector Prediction for Interlaced P-fields

Hybrid motion vector prediction is a special case of normal motion vector prediction for interlaced P-fields. As previously explained, a motion vector is reconstructed by adding a motion vector differential (which is signaled in the bitstream) to a motion vector predictor. The predictor is computed from up to three neighboring motion vectors. FIGS. 5A through 10 show locations of neighboring macroblocks and blocks from which Predictors A, B, and C are taken for motion vector prediction. (These figures show macroblocks and blocks of progressive P-frames, but also apply to macroblocks and blocks of interlaced P-fields, as described in section VI.)

If an interlaced P-field refers to only one previous field, a single motion vector predictor is calculated for each motion vector of the P-field. For example, the pseudocode in FIGS. 51A and 51B (or, alternatively, FIGS. 60A and 60B) shows how motion vector predictors are calculated for motion vectors of a one reference field interlaced P-field, as discussed in detail in section XII.

If two reference fields are used for an interlaced P-field, then two motion vector predictors are possible for each motion vector of the P-field. Both motion vector predictors may be computed then one selected, or only one motion vector predictor may be computed by determining the predictor selection first. One potential motion vector predictor is from the dominant reference field and another potential motion vector predictor is from the non-dominant reference field, where the terms dominant and non-dominant are as described in section VI, for example. The dominant and non-dominant reference fields have opposite polarities, so one motion vector predictor is from a reference field of the same polarity as the current P-field, and the other motion vector predictor is from a reference field with the opposite polarity. For example, the pseudocode and tables in FIGS. 52A through 52N illustrate the process of calculating the motion vector predictors for motion vectors of two reference field P-fields, as discussed in detail section XII. The variables samefieldpred_x and samefieldpred_y represent the horizontal and vertical components, respectively, of the motion vector predictor from the same field, and the variables oppositefieldpred_x and oppositefieldpred_y represent the horizontal and vertical components, respectively, of the motion vector predictor from the opposite field. The variable dominantpredictor indicates which field contains the dominant predictor. A predictor_flag indicates whether the dominant or non-dominant predictor is used for the motion vector. Alternatively, the pseudocode in FIGS. 61A through 61F is used.

B. Hybrid Motion Vector Prediction for Interlaced P-fields

For hybrid motion vector prediction for a motion vector, the encoder and decoder check a hybrid motion vector prediction condition for the motion vector. In general, the condition relates to the degree of variation in motion vector predictors. The evaluated predictors may be the candidate motion vector predictors and/or the motion vector predictor calculated using normal motion vector prediction. If the condition is satisfied (e.g., the degree of variation is high), one of the original candidate motion vector predictors is typically used instead of the normal motion vector predictor. The encoder signals which hybrid motion vector predictor to use, and the decoder receives and decodes the signal. Hybrid motion vector predictors are not used when inter-predictor variation is low, which is the common case.

The encoder and decoder check the hybrid motion vector condition for each motion vector of an interlaced P-field, whether the motion vector is for a macroblock, block, etc. In other words, the encoder and decoder determine for each motion vector whether the condition is triggered and a predictor selection signal is thus to be expected. Alternatively, the encoder and decoder check the hybrid motion vector condition for only some motion vectors of interlaced P-fields.

An advantage of the hybrid motion vector prediction for interlaced P-fields is that it uses computed predictors and the dominant polarity to select a good motion vector predictor. Extensive experimental results suggest hybrid motion vector prediction as described below offers significant compression/quality improvements over motion vector prediction without it, and also over earlier implementations of hybrid motion vector prediction. Moreover, the additional computations for the hybrid vector prediction checking are not very expensive.

In some embodiments, the encoder or decoder tests the normal motion vector predictor (as determined by a technique described in section VII.A.) against the set of original candidate motion vector predictors. The normal motion vector predictor is a component-wise median of Predictors A, B, and/or C, and the encoder or decoder tests it relative to Predictor A and Predictor C. The test checks whether the variance between the normal motion vector predictor and the candidates is high. If so, the true motion vector is likely to be closer to one of these candidate predictors (A, B or C) than to the predictor derived from the median operation. When the candidate predictors are far apart, their component-wise median does not provide good prediction, and it is more efficient to send an additional signal that indicates whether the true motion vector is closer to A or to C. If predictor A is the closer one, then it is used as the motion vector predictor for the current motion vector, and if predictor C is the closer one, then it is used as the motion vector predictor for the current motion vector.

The pseudocode in FIG. 32 illustrates such hybrid motion vector prediction during decoding. The variables predictor_pre_x and predictor_prey are horizontal and vertical motion vector predictors, respectively, as calculated using normal hybrid motion vector prediction. The variables predictor_post_x and predictor_post_y are horizontal and vertical motion vector predictors, respectively, after hybrid motion vector prediction. In the pseudocode, the normal motion vector predictor is tested relative to predictors A and C to see if a motion vector predictor selection is explicitly coded in the bitstream. If so, then a single bit is present in the bitstream that indicates whether to use predictor A or predictor C as the motion vector predictor. Otherwise, the normal motion vector predictor is used. Various other conditions (e.g., the magnitude of the normal motion vector if A or C is intra) may also be checked. When either A or C is intra, the motion corresponding to A or C respectively is deemed to be zero.

For a motion vector of a two reference field P-field, all of the predictors are of identical polarity. The reference field polarity is determined, in some embodiments, by a dominant/non-dominant predictor polarity and a selector signal obtained in the differential motion vector decoding process. For example, if the opposite field predictor is used then: predictor_pre_x=oppositefieldpred_x, predictor_pre_x=oppositefieldpred_y, predictorA_x=oppositefieldpredA_x, predictorA_y=oppositefieldpredA_y, predictorC_x=oppositefieldpredC_x, and predictorC_y=oppositefieldpredC_y. If the same field predictor is used then: predictor_pre_x=samefieldpred_x, predictor_pre_x=samefieldpred_y, predictorA_x=samefieldpredA_x, predictorA_y=samefieldpredA_y, predictorC_x=samefieldpredC_x, and predictorC_y=samefieldpredC_y. The values of opposite-fieldpred and samefieldpred are calculated as in the pseudocode of FIGS. 52A through 52J or 61A through 61F, for example. FIG. 53 shows alternative pseudocode for hybrid motion vector prediction in a combined implementation (see section XII).

Alternatively, an encoder and decoder test a different hybrid motion vector prediction condition, for example, one that considers other and/or additional predictors, one that uses different decision logic to detect motion discontinuities, and/or one that uses a different threshold for variation (other than 32).

A simple signal for selecting between two candidate predictors (e.g., A and C) is a single bit per motion vector. Alternatively, the encoder and decoder use a different signaling mechanism, for example, jointly signaling a selector bit with other information such as motion vector data.

C. Encoding Techniques

Figure 33B:
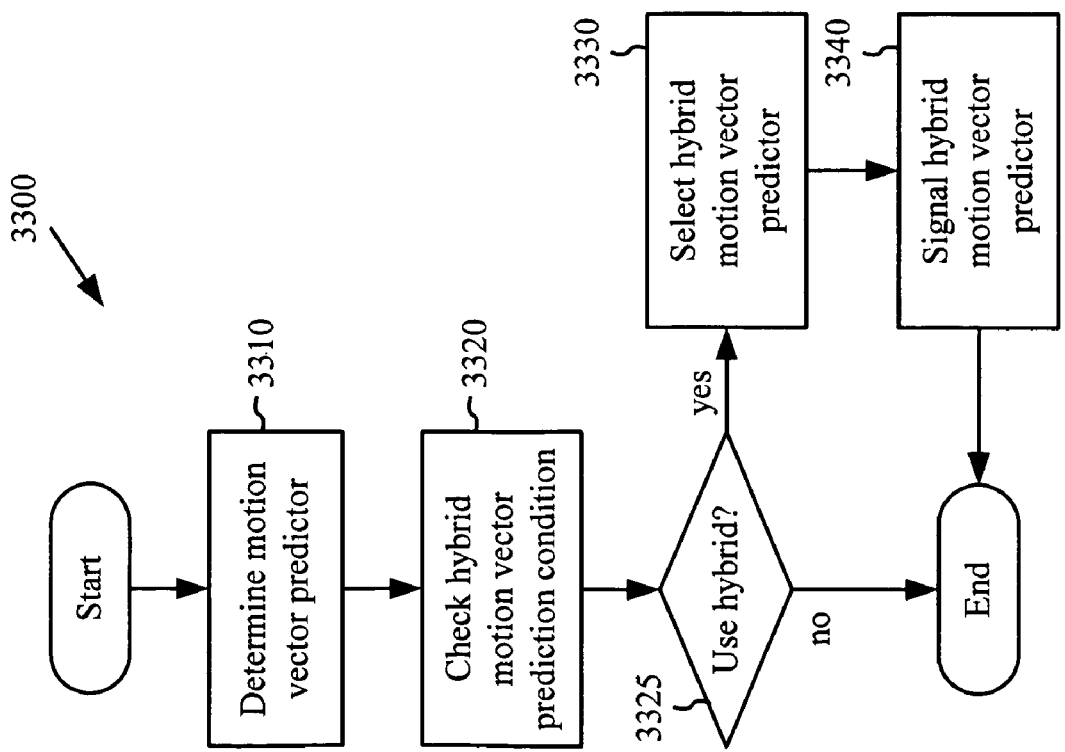
FIGS. 33A and 33B are flowcharts showing techniques for hybrid motion vector prediction during encoding and decoding, respectively.
Figure 33A:
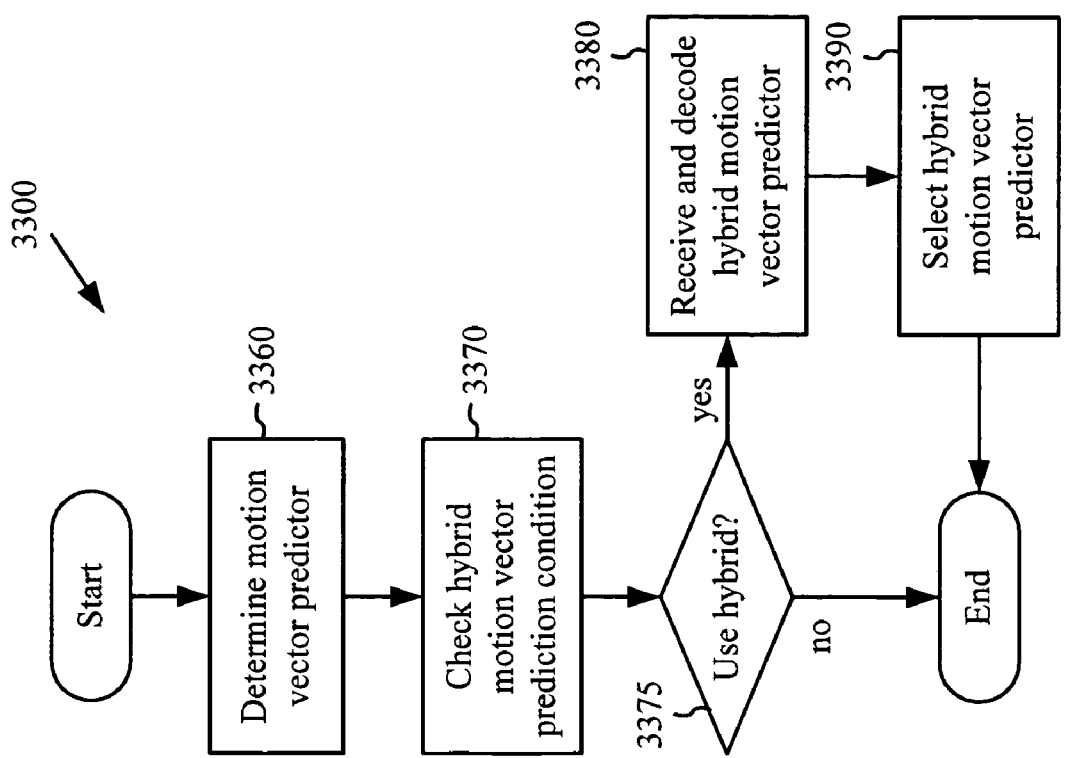

An encoder such as the encoder (2000) of FIG. 20 performs hybrid motion vector prediction during encoding of motion vectors for interlaced P-fields. For example, the encoder performs the technique (3300) shown in FIG. 33A for a motion vector of a current macroblock or block.

The encoder determines (3310) a motion vector predictor for the motion vector. For example, the encoder uses a technique described in section VII.A to determine the motion vector predictor. Alternatively, the encoder determines the motion vector predictor with another technique.

The encoder then checks (3320) a hybrid motion vector prediction condition for the motion vector predictor. For example, the encoder uses a technique that mirrors the decoder-side pseudocode shown in FIG. 32. Alternatively, the encoder checks a different hybrid motion vector prediction condition. (A corresponding decoder checks the same hybrid motion vector prediction condition as the encoder, whatever that condition is, since the presence/absence of predictor signal information is implicitly derived by the encoder and corresponding decoder.)

If the hybrid motion vector condition is not triggered (the "No" path out of decision 3325), the encoder uses the initially determined motion vector predictor.

On the other hand, if the hybrid motion vector condition is triggered (the "Yes" path out of decision 3325), the encoder selects (3330) a hybrid motion vector predictor to use. For example, the encoder selects between a top candidate predictor and left candidate predictor that are neighbor motion vectors. Alternatively, the encoder selects between other and/or additional predictors.

The encoder then signals (3340) the selected hybrid motion vector predictor. For example, the encoder transmits a single bit that indicates whether a top candidate predictor or left candidate predictor is to be used as the motion vector predictor. Alternatively, the encoder uses another signaling mechanism.

The encoder performs the technique (3300) for every motion vector of an interlaced P-field, or only for certain motion vectors of the interlaced P-field (for example, depending on macroblock type). For the sake of simplicity, FIG. 33A does not show the various ways in which the technique (3300) may be integrated with other aspects of encoding and decoding. Various combined implementations are described in detail in section XII.

D. Decoding Techniques

A decoder such as the decoder (2100) of FIG. 21 performs hybrid motion vector prediction during decoding of motion vectors for interlaced P-fields. For example, the decoder performs the technique (3350) shown in FIG. 33B for a motion vector of a current macroblock or block.

The decoder determines (3360) a motion vector predictor for the motion vector. For example, the decoder uses a technique described in section VII.A to determine the motion vector predictor. Alternatively, the decoder determines the motion vector predictor with another technique.

The decoder then checks (3370) a hybrid motion vector prediction condition for the motion vector predictor. For example, the decoder follows the pseudocode shown in FIG. 32. Alternatively, the decoder checks a different hybrid motion vector prediction condition. (The decoder checks the same hybrid motion vector prediction condition as a corresponding encoder, whatever that condition is.) If the hybrid motion vector condition is not triggered (the "No" path out of decision 3375), the decoder uses the initially determined motion vector predictor.

On the other hand, if the hybrid motion vector condition is triggered (the "Yes" path out of decision 3375), the decoder receives and decodes (3380) a signal that indicates the selected hybrid motion vector predictor. For example, the decoder gets a single bit that indicates whether a top candidate predictor or left candidate predictor is to be used as the motion vector predictor. Alternatively, the decoder operates in conjunction with another signaling mechanism.

The decoder then selects (3390) the hybrid motion vector predictor to use. For example, the decoder selects between a top candidate predictor and left candidate predictor that are neighbor motion vectors. Alternatively, the decoder selects between other and/or additional predictors.

The decoder performs the technique (3350) for every motion vector of an interlaced P-field, or only for certain motion vectors of the interlaced P-field (for example, depending on macroblock type). For the sake of simplicity, FIG. 33B does not show the various ways in which the technique (3350) may be integrated with other aspects of encoding and decoding. Various combined implementations are described in detail in section XII.

VIII. Motion Vector Block Patterns

In some embodiments, a macroblock may have multiple motion vectors. For example, a macroblock of a mixed-MV interlaced P-field may have one motion vector, four motion vectors (one per luminance block of the macroblock), or be intra coded (no motion vectors). Similarly, a field-coded macroblock of an interlaced P-frame may have two motion vectors (one per field) or four motion vectors (two per field), and a frame-coded macroblock of an interlaced P-frame may have one motion vector or four motion vectors (one per luminance block).

A 2MV or 4MV macroblock may be signaled as "skipped" if the macroblock has no associated motion vector data (e.g., differentials) to signal. If so, motion vector predictors are typically used as the motion vectors of the macroblock. Or, the macroblock may have non-zero motion vector data to signal for one motion vector, but not for another motion vector (which has a (0, 0) motion vector differential). For a 2MV or 4MV macroblock that has (0, 0) differentials for at least one but not all motion vectors, signaling the motion vector data can consume an inefficient number of bits.

Therefore, in some embodiments, an encoder and decoder use a signaling mechanism that efficiently signals the presence or absence of motion vector data for a macroblock with multiple motion vectors. A motion vector coded block pattern (or "motion vector block pattern," for short) for a macroblock indicates, on a motion vector by motion vector basis, which blocks, fields, halves of fields, etc. have motion vector data signaled in a bitstream, and which do not. The motion vector block pattern jointly signals the pattern of motion vector data for the macroblock, which allows the encoder and decoder to exploit the spatial correlation that exists between blocks. Moreover, signaling the presence/absence of motion vector data with motion vector block patterns provides a simple way to signal this information, in a manner decoupled from signaling about presence/absence of transform coefficient data (such as with a CBPCY element).

Specific examples of signaling, described in this section and in the combined implementations in section XII, signal motion vector block patterns with variable length coded 2MVBP and 4MVBP syntax elements. Table selections for 2MVBP and 4MVBP are signaled through the 2MVBPTAB and 4MVBPTAB elements, respectively, which are fixed length coded. Alternatively, an encoder and decoder use other and/or additional signals for signaling motion vector block patterns.

A. Motion Vector Block Patterns

A motion vector block pattern indicates which motion vectors are "coded" and which are "not coded" for a macroblock that has multiple motion vectors. A motion vector is coded if the differential motion vector for it is non-zero (i.e., the motion vector to be signaled is different from its motion vector predictor). Otherwise, the motion vector is not coded.

If a macroblock has four motion vectors, then a motion vector block pattern has 4 bits, one for each of the four motion vectors. The ordering of the bits in the motion vector block pattern follows the block order shown in FIG. 34 for a 4 MV macroblock in an interlaced P-field or 4MV frame-coded macroblock in an interlaced P-frame. For a 4MV field-coded macroblock in an interlaced P-frame, the bit ordering of the motion vector block pattern is top-left field motion vector, top-right field motion vector, bottom-left field motion vector, and bottom-right field motion vector.

If a macroblock has two motion vectors, then a motion vector block pattern has 2 bits, one for each of the two motion vectors. For a 2MV field-code macroblock of an interlaced P-frame, the bit ordering of the motion vector block pattern is simply top field motion vector then bottom field motion vector.

One of multiple different VLC tables may be used to signal the motion vector block pattern elements. For example, four different code tables for 4MVBP are shown in FIG. 47J, and four different code tables for 2MVBP are shown in FIG. 47K. The table selection is indicated by a 4MVBPTAB or 2MVBPTAB element signaled at the picture layer. Alternatively, an encoder and decoder use other and/or additional codes for signaling motion vector block pattern information and table selections.

An additional rule applies for determining which motion vectors are coded for macroblocks of two reference field interlaced P-fields. A "not coded" motion vector has the dominant predictor, as described in section VI. A "coded" motion vector may have a zero-value motion vector differential but signal the non-dominant predictor. Or, a "coded" motion vector may have a non-zero differential motion vector and signal either the dominant or non-dominant predictor.

Alternatively, an encoder and decoder use motion vector block patterns for other and/or additional kinds of pictures, for other and/or additional kinds of macroblocks, for other and/or additional numbers of motion vectors, and/or with different bit positions.

B. Encoding Techniques

An encoder such as the encoder (2000) of FIG. 20 encodes motion vector data for a macroblock using a motion vector block pattern. For example, the encoder performs the technique (3500) shown in FIG. 35A.

For a given macroblock with multiple motion vectors, the encoder determines (3510) the motion vector block pattern for the macroblock. For example, the encoder determines a four motion vector block pattern for a 4MV macroblock in an interlaced P-field, or for a 4MV field-coded or frame-coded macroblock in an interlaced P-frame. Or, the encoder determines a two motion vector block pattern for a 2MV field-coded macroblock in an interlaced P-frame. Alternatively, the encoder determines a motion vector block pattern for another kind macroblock and/or number of motion vectors.

The encoder then signals (3520) the motion vector block pattern. Typically, the encoder signals a VLC for the motion vector block pattern using a code table such as one shown in FIGS. 47J and 47K. Alternatively, the encoder uses another mechanism for signaling the motion vector block pattern.

If there is at least one motion vector for which motion vector data is to be signaled (the "Yes" path out of decision 3525), the encoder signals (3530) the motion vector data for the motion vector. For example, the encoder encodes the motion vector data as a BLKMVDATA, TOPMVDATA, or BOTMVDATA element using a technique described in section IX. Alternatively, the encoder uses a different signaling technique.

The encoder repeats (3525, 3530) the encoding of motion vector data until there are no more motion vectors for which motion vector data is to be signaled (the "No" path out of decision 3525).

Figure 35B:
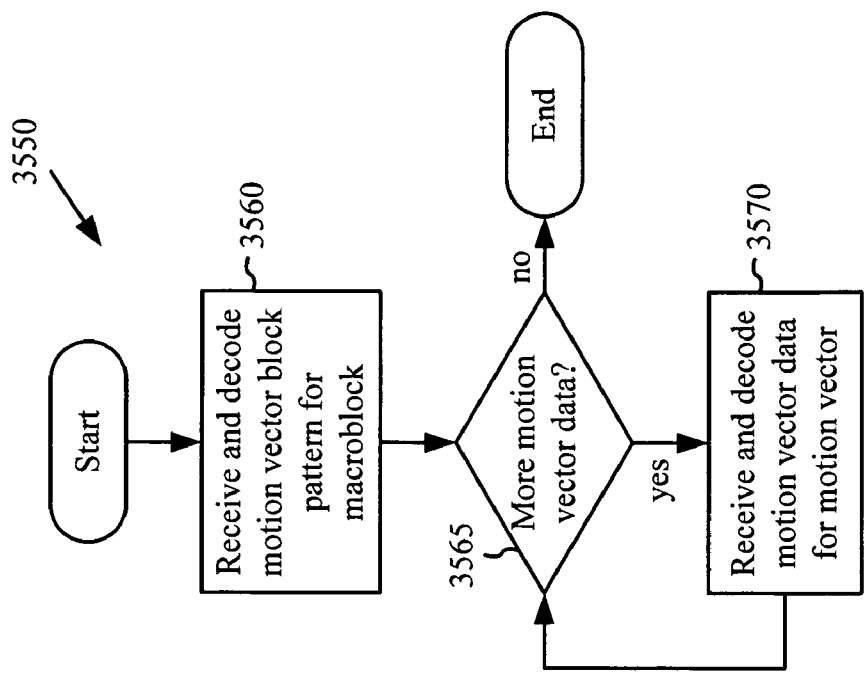
FIGS. 35A and 35B are flowcharts showing techniques for encoding and decoding, respectively, using a motion vector block pattern.
Figure 35A:
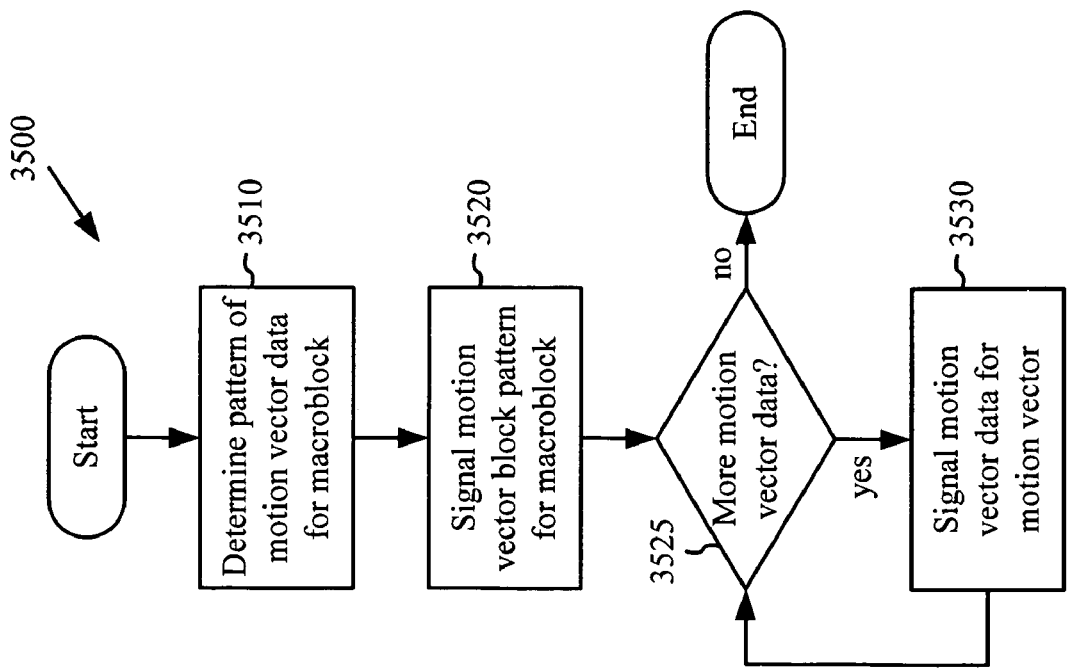

The encoder may select between multiple code tables to encode the motion vector block pattern (not shown in FIG. 35A). For example, the encoder selects a code table for the interlaced P-field or P-frame, then use the table for encoding motion vector block patterns for macroblocks in the picture. Alternatively, the encoder selects a code table on a more frequent, less frequent, or non-periodic basis, or the encoder skips the code table selection entirely (always using the same code table). Or, the encoder may select a code table from contextual information (making signaling the code table selection unnecessary). The code tables may be the tables shown in FIGS. 47J and 47K, other tables, and/or additional tables. The encoder signals the selected code table in the bitstream, for example, with a FLC indicating the selected code table, with a VLC indicating the selected code table, or with a different signaling mechanism.

Alternatively, the encoder performs another technique to encode motion vector data for a macroblock using a motion vector block pattern. For the sake of simplicity, FIG. 35A does not show the various ways in which the technique (3500) may be integrated with other aspects of encoding and decoding. Various combined implementations are described in detail in section XII.

C. Decoding Techniques

A decoder such as the decoder (2100) of FIG. 21 receives and decodes motion vector data for a macroblock of an interlaced P-field or interlaced P-frame using a motion vector block pattern. For example, the decoder performs the technique (3550) shown in FIG. 35B.

For a given macroblock with multiple motion vectors, the decoder receives and decodes (3560) a motion vector block pattern for the macroblock. For example, the decoder receives and decodes a four motion vector block pattern, two motion vector block pattern, or other motion vector block pattern described in the previous section. Typically, the decoder receives a VLC for the motion vector block pattern and decodes it using a code table such as one shown in FIGS. 47J and 47K. Alternatively, the decoder receives and decodes the motion vector block pattern in conjunction with another signaling mechanism.

If there is at least one motion vector for which motion vector data is signaled (the "Yes" path out of decision 3565), the decoder receives and decodes (3570) the motion vector data for the motion vector. For example, the decoder receives and decodes motion vector data encoded as a BLKMVDATA, TOPMVDATA, or BOTMVDATA element using a technique described in section IX. Alternatively, the decoder uses a different decoding technique.

The decoder repeats (3565, 3570) the receiving and decoding of motion vector data until there are no more motion vectors for which motion vector data is signaled (the "No" path out of decision 3565).

The decoder may select between multiple code tables to decode the motion vector block pattern (not shown in FIG. 35B). For example, the table selection and table selection signaling options mirror those described for the encoder in the previous section.

Alternatively, the decoder performs another technique to decode motion vector data for a macroblock using a motion vector block pattern. For the sake of simplicity, FIG. 35B does not show the various ways in which the technique (3550) may be integrated with other aspects of encoding and decoding. Various combined implementations are described in detail in section XII.

IX. Motion Vector Differentials in Interlaced P-Fields

In some embodiments, two previously coded/decoded fields are used as reference fields when performing motion-compensated prediction for a single, current interlaced P-field. (For examples, see sections IV, VI, and VII.) Signaled information for a motion vector in the P-field indicates: (1) which of the two fields provides the reference for the motion vector; and (2) the motion vector value. The motion vector value is typically signaled as a differential relative to a motion vector predictor. The selection between the two possible reference fields may be signaled with a single additional bit for the motion vector, but that manner of signaling is inefficient in many cases. Usually, the two reference fields are not equally likely for a given motion vector, and the selection for the motion vector is not independent of the selection for other (e.g., neighboring) motion vectors. Thus, in practice, signaling reference field selections with a single bit per selection is usually inefficient.

Therefore, in some embodiments, an encoder jointly encodes motion vector differential information and reference field selection information. A decoder performs corresponding decoding of the jointly coded information.

A. Theory and Experimental Results

For a two reference field interlaced P-field, the two reference fields have the following spatial and temporal relationships to the P-field. The polarity of the closest reference field in temporal order is opposite the polarity of the current P-field. For example, if the current P-field is an even field (made up of the even lines of the interlaced frame), then the closest reference field in temporal order is an odd field, and the other reference field (the farther field in temporal order) is an even field.

The encoder and decoder predict the reference field selection for a current motion vector using causal information. For example, reference field selection information from neighboring, previously coded motion vectors is used to predict the reference field used for the current motion vector. Then, a binary value indicates whether the predicted reference field is used or not. One value indicates that the actual reference field for the current motion vector is the predicted reference field, and the other value indicates that the actual reference field for the current motion vector is the other reference field. In some implementations, the reference field prediction is expressed in terms of the polarities of the previously used reference fields and expected reference field for the current motion vector (for example, as dominant or non-dominant polarity, see section VI). In most scenarios, with such prediction, the probability distribution of the binary value reference field selector is consistent and skewed towards the predicted reference field. In experiments, the predicted reference field is used for around 70% of the motion vectors, with around 30% of the motion vectors using the other reference field.

Transmitting a single bit to signal reference field selection information with such a probability distribution is not efficient. A more efficient method is to jointly code the reference field selection information with the differential motion vector information.

B. Examples of Signaling Mechanisms

Various examples of signaling mechanisms for jointly encoding and decoding motion vector differential information and reference field selection information are provided. Alternatively, an encoder and decoder jointly encode and decode the information in conjunction with another mechanism.

The pseudocode in FIG. 36 shows joint coding of motion vector differential information and reference field selection information according to a generalized signaling mechanism. In the pseudocode, the variables DMVX and DMVY are horizontal and vertical differential motion vector components, respectively. The variables AX and AY are the absolute values of the differential components, and the variables SX and SY are the signs of the differential components. The horizontal motion vector range is from $-RX$ to $RX+1$, and the vertical motion vector range is from $-RY$ to $RY+1$. RX and RY are powers of two, with exponents of MX and MY, respectively. The variables ESCX and ESCY (which are powers of two with exponents KX and KY, respectively) indicate the thresholds above which escape coding is used. The variable R is a binary value for a reference field selection.

When the escape condition is triggered (AX>ESCX or AY>ESCY), the encoder sends a VLC that jointly represents the escape mode signal and R. The encoder then sends DMVX and DMVY as fixed length codes of lengths MX+1 and MY+1, respectively. Thus, two elements in the VLC table are used to signal (1) that DMVX and DMVY are coded using (MX+MY+2) bits collectively, and (2) the associated R value. In other words, the two elements are escape codes corresponding to R=0 and R=1.

For other events, the variables NX and NY indicate how many bits are used to signal different values of AX and AY, respectively. AX is in the interval $(2^{NX}<=AX<2^{NX+1})$, where NX=0, 1, 2, ... KX−1, and AX=0 when NX=−1. AY is in the interval $(2^{NY}<=AY<2^{NY+1})$, where NY=0, 1, 2, ... KY−1, and AY=0 when NY=−1.

The VLC table used to code the size information NX and NY and the field reference information R is a table of (KX+1)*(KY+1)*2+1 elements, where each element is a (codeword, codesize) pair. Of the elements in the table, all but two are used to jointly signal values of NX, NY, and R. The other two elements are the escape codes.

For events signaled with NX and NY, the encoder sends a VLC indicating a combination of NX, NY, and R values. The encoder then sends AX as NX bits, sends SX as one bit, sends AY as NY bits, and sends SY as one bit. If NX is 0 or −1, AX does not need to be sent, and the same is true for NY and AY, since the value of AX or AY may be directly derived from NX or NY in those cases.

The event where AX=0, AY=0, and R=0 is signaled by another mechanism such as a skip macroblock mechanism or motion vector block pattern (see section VIII). The [0,0,0] element is not present in the VLC table for the pseudocode in FIG. 36 or addressed in the pseudocode.

A corresponding decoder performs joint decoding that mirrors the encoding shown in FIG. 36. For example, the decoder receives bits instead of sending bits, performs variable length decoding instead of variable length encoding, etc.

The pseudocode in FIG. 50 shows decoding of motion vector differential information and reference field selection information that have been jointly coded according to a signaling mechanism in one combined implementation. The pseudocode in FIG. 59 shows decoding of motion vector differential information and reference field selection information that have been jointly coded according to a signaling mechanism in another combined implementation. The pseudocode in FIGS. 50 and 59 is explained in detail in section XII. In particular, the pseudocode illustrates joint coding and decoding of a prediction selector with a vertical differential value, or with sizes of vertical and horizontal differential values.

A corresponding encoder performs joint encoding that mirrors the decoding shown in FIG. 50 or 59. For example, the encoder sends bits instead of receiving bits, performs variable length encoding instead of variable length decoding, etc.

C. Encoding Techniques

An encoder such as the encoder (2000) of FIG. 20 jointly codes reference field prediction selector information and differential motion vector information. For example, the encoder performs the technique (3700) shown in FIG. 37A to jointly encode the information. Typically, the encoder performs some form of motion estimation in the two reference fields to obtain the motion vector and reference field. The motion vector is then coded according to the technique (3700), at which point one of the two possible reference fields is associated with the motion vector by jointly coding the selector information with, for example, a vertical motion vector differential.

The encoder determines (3710) a motion vector predictor for the motion vector. For example, the encoder determines the motion vector predictor as described in section VII. Alternatively, the encoder determines the motion vector predictor with another mechanism.

The encoder determines (3720) the motion vector differential for the motion vector relative to the motion vector predictor. Typically, the differential is the component-wise differences between the motion vector and the motion vector predictor.

The encoder also determines (3730) the reference field prediction selector information. For example, the encoder determines the dominant and non-dominant polarities for the motion vector (and hence the dominant reference field, dominant polarity for the motion vector predictor, etc., see section VI), in which case the selector indicates whether or not the dominant polarity is used. Alternatively, the encoder uses a different technique to determine the reference field prediction selector information. For example, the encoder uses a different type of reference field prediction.

The encoder then jointly codes (3740) motion vector differential information and the reference field prediction selector information for the motion vector. For example, the encoder encodes the information using one of the mechanisms described in the previous section. Alternatively, the encoder uses another mechanism.

For the sake of simplicity, FIG. 37A does not show the various ways in which the technique (3700) may be integrated with other aspects of encoding and decoding. Various combined implementations are described in detail in section XII.

D. Decoding Techniques

A decoder such as the decoder (2100) of FIG. 21 decodes jointly coded reference field prediction selector information and differential motion vector information. For example, the decoder performs the technique (3750) shown in FIG. 37B to decode such jointly coded information.

The decoder decodes (3760) jointly coded motion vector differential information and the reference field prediction selector information for a motion vector. For example, the decoder decodes information signaled using one of the mechanisms described in section IX.B. Alternatively, the decoder decodes information signaled using another mechanism.

The decoder then determines (3770) the motion vector predictor for the motion vector. For example, the decoder determines dominant and non-dominant polarities for the motion vector (see section VI), applies the selector information, and determines the motion vector predictor as described in section VII for the selected polarity. Alternatively, the decoder uses a different mechanism to determine the motion vector predictor. For example, the decoder uses a different type of reference field prediction.

Finally, the decoder reconstructs (3780) the motion vector by combining the motion vector differential with the motion vector predictor.

For the sake of simplicity, FIG. 37B does not show the various ways in which the technique (3750) may be integrated with other aspects of encoding and decoding. Various combined implementations are described in detail in section XII.

X. Deriving Chroma Motion Vectors in Interlaced P-Fields

In some embodiments, an encoder and decoder derive chroma motion vectors from luma motion vectors that are signaled for macroblocks of interlaced P-fields. The chroma motion vectors are not explicitly signaled in the bitstream. Rather, they are determined from the luma motion vectors for the macroblocks. The encoder and decoder may use chroma motion vector derivation adapted for progressive P-frames or interlaced P-frames, but this typically provide inadequate performance for interlaced P-fields. So, the encoder and decoder use chroma motion vector derivation adapted to the reference field organization of interlaced P-fields.

Chroma motion vector derivation has two phases: (1) selection, and (2) sub-sampling and chroma rounding. Of these phases, the selection phase in particular is adapted for chroma motion vector derivation in interlaced P-fields. The output of the selection phase is an initial chroma motion vector, which depends on the number (and potentially the polarities) of the luma motion vectors for the macroblock. If no luma motion is used for the macroblock (an intra macroblock), no chroma motion vector is derived. If a single luma motion vector is used for the macroblock (a 1MV macroblock), the single luma motion vector is selected for use in the second and third phases. If four luma motion vectors are used for the macroblock (a 4MV macroblock), an initial chroma motion vector is selected using logic that favors the more common polarity among the four luma motion vectors.

A. Chroma Sub-sampling and Motion Vector Representations

Chroma motion vector derivation for macroblocks of interlaced P-fields depends on the type of chroma sub-sampling used for the macroblocks and also on the motion vector representation.

Figure 38:
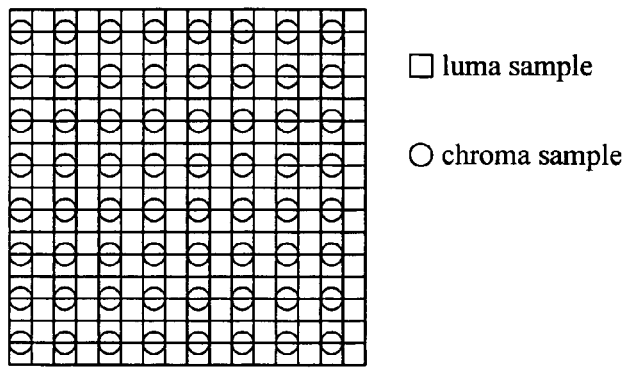
FIG. 38 is a diagram of the chroma sub-sampling pattern for a 4:2:0 macroblock.

Some common chroma sub-sampling formats are 4:2:0 and 4:1:1. FIG. 38 shows a sampling grid for a YUV 4:2:0 macroblock, according to which chroma samples are sub-sampled with respect to luma samples in a regular 4:1 pattern. FIG. 38 shows the spatial relationships between the luma and chroma samples for a 16×16 macroblock with four 8×8 luma blocks, one 8×8 chroma "U" block, and one 8×8 chroma "V" block (such as represented in FIG. 22). Overall, the resolution of the chroma grid is half the resolution of the luma grid in both x and y directions, which is the basis for downsampling in chroma motion vector derivation. In order to scale motion vector distances for the luma grid to corresponding distances on the chroma grid, motion vector values are divided by a factor of 2. The selection phase techniques described herein may be applied to YUV 4:2:0 macroblocks or to macroblocks with another chroma sub-sampling format.

The representation of luma and chroma motion vectors for interlaced P-fields depends in part on the precision of the motion vectors and motion compensation. Typical motion vector precisions are ½ pixel and ¼ pixel, which work with ½ pixel and. ¼ pixel interpolation in motion compensation, respectively.

In some embodiments, a motion vector for an interlaced P-field may reference a reference field of top or bottom, or same or opposite, polarity. The vertical displacement specified by a motion vector value depends on the polarities of the current P-field and reference field. Motion vector units are typically expressed in field picture units. For example, if the vertical component of a motion vector is +6 (in ¼-pixel units), this generally indicates a vertical displacement of 1½ field picture lines (before adjusting for different polarities of the current P-field and reference field, if necessary).

Figure 39:
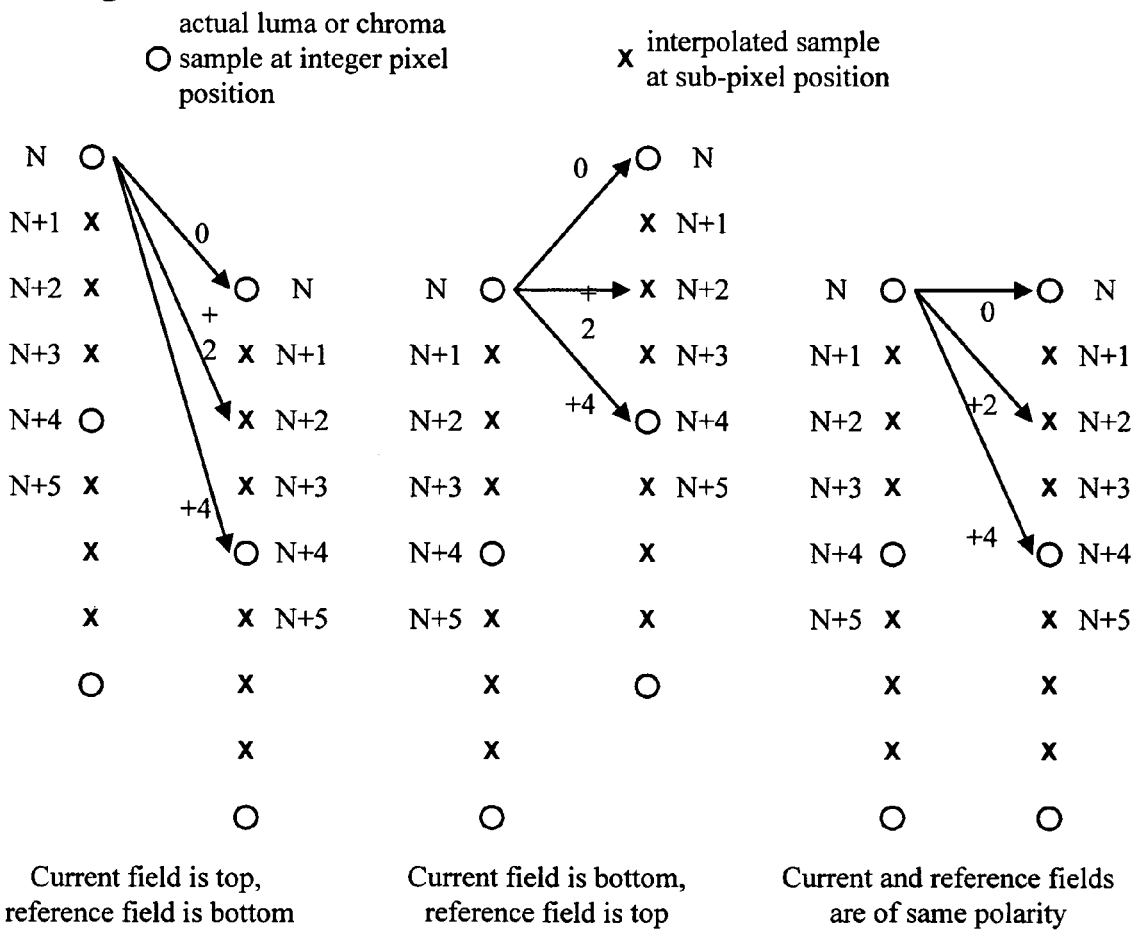
FIG. 39 is a diagram showing relationships between current and reference fields for vertical motion vector components

For various vertical motion vector component values and combinations of field polarities, FIG. 39 shows corresponding spatial locations in current and reference fields according to a first convention. Each combination of field polarities has a pair of columns, one (left column) for pixels for the lines in the current field (numbered line N=0, 1, 2, etc.) and another (right column) for pixels for the lines in a reference field (also numbered line N=0, 1, 2, etc.). The circles represent samples at integer pixel positions, and the Xs represent interpolated samples at sub-pixel positions. With this convention, a vertical motion vector component value of 0 references an integer pixel position (i.e., a sample on an actual line) in a reference field. If the current field and reference field have the same polarity, a vertical component value of 0 from line N of the current field references line N in the reference field, which is at the same actual offset in a frame. If the current field and reference field have opposite polarities, a vertical component value of 0 from line N in the current field still references line N in the reference frame, but the referenced location is at a ½-pixel actual offset in the frame due to the interlacing of the odd and even lines.

Figure 48:
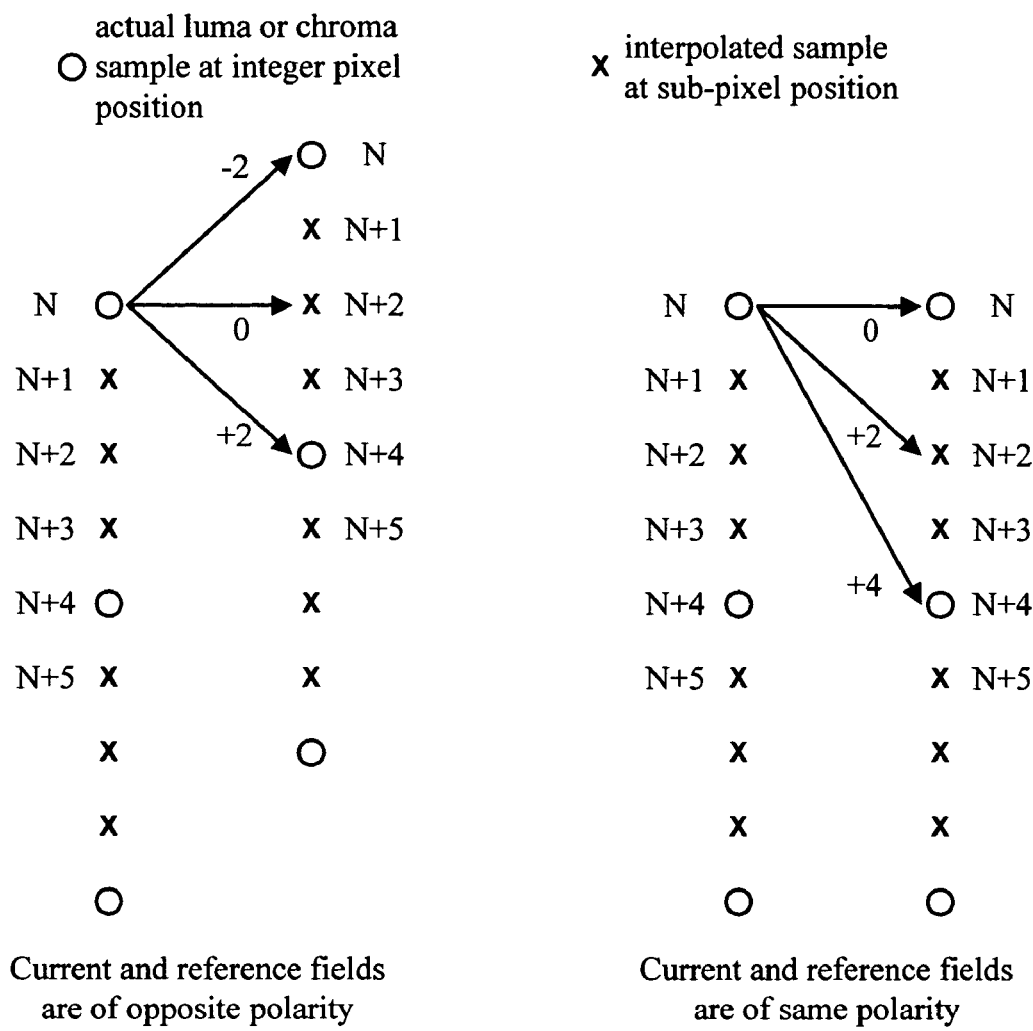
FIG. 48 is a diagram showing relationships between current and reference fields for vertical motion vector components in the first combined implementation.

FIG. 48 shows corresponding spatial locations in current and reference fields according to a second convention. With this convention, a vertical motion vector component value of 0 references a sample at the same actual offset in an interlaced frame. The referenced sample is at an integer-pixel position in a same polarity reference field, or at a ½-pixel position in an opposite reference field.

Alternatively, motion vectors for interlaced P-fields use another representation and/or follow another convention for handling vertical displacements for polarity.

B. Selection Phase Examples

In some embodiments, the selection phase of chroma motion vector derivation is adapted to the reference field patterns used in motion compensation for interlaced P-fields with one or two reference fields. For example, the result of the selection phase for a macroblock depends on the number and the polarities of the luma motion vectors for the macroblock.

The simplest case is when an entire macroblock is intra coded. In this case, there is no chroma motion vector, and the second and third phases of chroma motion vector derivation are skipped. The chroma blocks of the macroblock are intra coded/decoded, not motion compensated.

The next simplest case is when the macroblock has a single luma motion vector for all four luma blocks. Whether the current P-field has one reference field or two reference fields, there is no selection operation per se, as the single luma motion vector is simply carried forward to the rounding and sub-sampling.

When the macroblock is has up to four luma motion vectors, the selection phase is more complex. Overall, the selection phase favors the dominant polarity among the luma motion vectors of the macroblock. If the P-field has only one reference field, the polarity is identical for all of the luma motion vectors of the macroblock. If the P-field has two reference fields, however, different luma motion vectors of the macroblock may point to different reference fields. For example, if the polarity of the current P-field is odd, the macroblock may have two opposite polarity luma motion vectors (referencing the even polarity reference field) and two same polarity luma motion vectors (referencing the odd polarity reference field). An encoder or decoder determines the dominant polarity for the luma motion vectors of the macroblock and determines an initial chroma motion vector from the luma motion vectors of the dominant polarity.

In some implementations, a 4MV macroblock has from zero to four motion vectors. A luma block of such a 4MV macroblock is intra coded, or has an associated same polarity luma motion vector, or has an associated same polarity luma motion vector. In other implementations, a 4MV macroblock always has four luma motion vectors, even if some of them are not signaled (e.g., because they have a (0, 0) differential). A luma block of such a 4MV macroblock has either an opposite polarity motion vector or a same polarity motion vector. The selection phase logic is slightly different for these different implementations.

1. 4MV Macroblocks with 0 to 4 Luma Motion Vectors

The pseudocode in FIG. 40 shows one example of selection phase logic, which applies for 4MV macroblocks that have between 0 and 4 luma motion vectors. Of the luma motion vectors, if the number of luma motion vectors that reference the same polarity reference field is greater than the number that reference the opposite polarity reference field, the encoder/decoder derives the initial chroma motion vector from the luma motion vectors that reference the same polarity reference field. Otherwise, the encoder/decoder derives the initial chroma motion vector from the luma motion vectors that reference the opposite polarity reference field.

If four luma motion vectors have the dominant polarity (e.g., all odd reference field or all even reference field), the encoder/decoder computes the median of the four luma motion vectors. If only three luma motion vectors have the dominant polarity (e.g., because one luma block is intra or has a non-dominant polarity motion vector), the encoder/decoder computes the median of the three luma motion vectors. If two luma motion vectors have the dominant polarity, the encoder/decoder computes the average of the two luma motion vectors. (In case of a tie between same and opposite polarity counts, the same polarity (as the current P-field) is favored.) Finally, if there is only one luma motion vector of the dominant polarity (e.g., because three luma blocks are intra), the one luma motion vector is taken as the output of the selection phase. If all luma blocks are intra, the macroblock is intra, and the pseudocode in FIG. 40 does not apply.

2. 4MV Macroblocks with 4 Luma Motion Vectors

The pseudocode in FIGS. 55A and 55B shows another example of selection phase logic, which applies for 4MV macroblocks that always have 4 luma motion vectors (e.g., because intra coded luma blocks are not allowed). FIG. 55A addresses chroma motion vector derivation for such 4MV macroblocks in one reference field interlaced P-fields, and FIG. 55B addresses chroma motion vector derivation for such 4MV macroblocks in two reference field interlaced P-fields.

With reference to FIG. 55B, an encoder/decoder determines which polarity predominates among the four luma motion vectors of a 4MV macroblock (e.g., odd or even). If all four luma motion vectors are from the same field (e.g., all odd or all even), the median of the four luma motion vectors is determined. If three of the four are from the same field, the median of the three luma motion vectors is determined. Finally, if there are two luma motion vectors for each of the polarities, the two luma motion vectors that have the same polarity as the current P-field are favored, and their average is determined. (The cases of only one luma motion vector and no luma motion vector having the dominant polarity are not possible if a 4MV macroblock always has four luma motion vectors.)

Alternatively, an encoder or decoder uses different selection logic when deriving a chroma motion vector from multiple luma motion vectors of a macroblock of an interlaced P-field. Or, an encoder or decoder considers luma motion vector polarity in chroma motion vector derivation for another type of macroblock (e.g., a macroblock with a different number of luma motion vectors and/or in a type of picture other than interlaced P-field).

C. Sub-sampling/Rounding Phase

For the second phase of chroma motion vector derivation, the encoder or decoder typically applies rounding logic to eliminate certain pixel positions from initial chroma motion vectors (e.g., to round up ¾-pixel positions so that such chroma motion vectors after downsampling do not indicate ¼-pixel displacements). The use of rounding may be adjusted to tradeoff quality of prediction vs. complexity of interpolation. With more aggressive rounding, for example, the encoder or decoder eliminate all ¼-pixel chroma displacements in the resultant chroma motion vectors, so that just integer-pixel and ½-pixel displacements are allowed, which simplifies interpolation in motion compensation for the chroma blocks.

In the second phase, the encoder and decoder also downsample the initial chroma motion vector to obtain a chroma motion vector at the appropriate scale for the chroma resolution. For example, if the chroma resolution is ½ the luma resolution both horizontally and vertically, the horizontal and vertical motion vector components are downsampled by a factor of two.

Alternatively, the encoder or decoder applies other and/or additional mechanisms for rounding, sub-sampling, pull-back, or other adjustment of the chroma motion vectors.

D. Derivation Techniques

An encoder such as the encoder (2000) of FIG. 20 derives chroma motion vectors for macroblocks of interlaced P-fields. Or, a decoder such as the decoder (2100) of FIG. 21 derives chroma motion vectors for macroblocks of interlaced P-fields. For example, the encoder/decoder performs the technique (4100) shown in FIG. 41 to derive a chroma motion vector.

The encoder/decoder determines (4110) whether or not a current macroblock is an intra macroblock. If so, the encoder/decoder skips chroma motion vector derivation and, instead of motion compensation, intra coding/decoding is used for the macroblock.

If the macroblock is not an intra macroblock, the encoder/decoder determines (4120) whether or not the macroblock is a 1MV macroblock. If so, the encoder/decoder uses the single luma motion vector for the macroblock as the initial chroma motion vector passed to the later adjustment stage(s) (4150) of the technique (4100).

If the macroblock is not a 1MV macroblock, the encoder/decoder determines (4130) the dominant polarity among the luma motion vectors of the macroblock. For example, the encoder/decoder determines the prevailing polarity among the one or more luma motion vectors of the macroblock as described in FIG. 40 or 55A and 55B. Alternatively, the encoder/decoder applies other and/or additional decision logic to determine the prevailing polarity. If the P-field that includes the macroblock has only one reference field, the dominant polarity among the luma motion vectors is simply the polarity of that one reference field.

The encoder/decoder then determines (4140) an initial chroma motion vector from those luma motion vectors of the macroblock that have the dominant polarity. For example, the encoder/decoder determines the initial chroma motion vector as shown in FIG. 40 or 55A and 55B. Alternatively, the encoder/decoder determines the initial chroma motion vector as the median, average, or other combination of the dominant polarity motion vectors using other and/or additional logic.

Finally, the encoder/decoder adjusts (4150) the initial chroma motion vector produced by one of the preceding stages. For example, the encoder/decoder performs rounding and sub-sampling as described above. Alternatively, the encoder/decoder performs other and/or additional adjustments.

Alternatively, the encoder/decoder checks the various macroblock type and polarity conditions in a different order. Or, the encoder/decoder derives chroma motion vectors for other and/or additional types of macroblocks in interlaced P-fields or other types of pictures.

Figure 41:
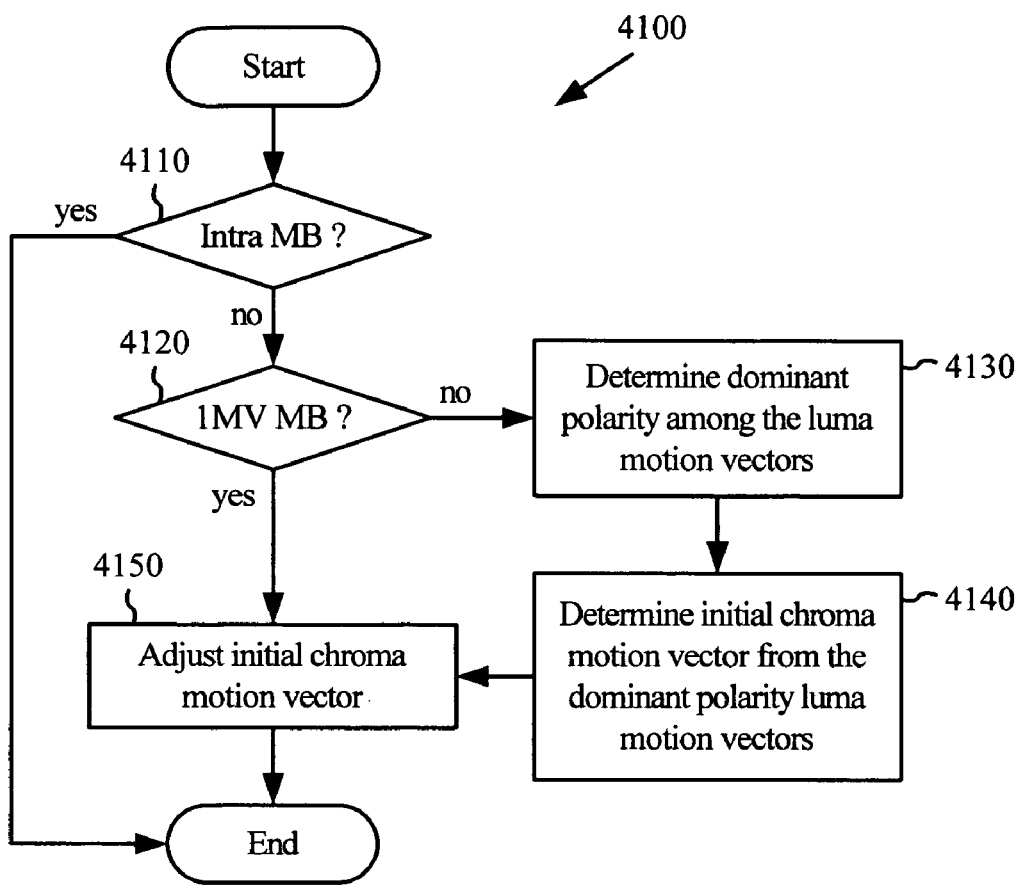
FIG. 41 is a flowchart showing a technique for deriving chroma motion vectors from luma motion vectors for macroblocks of interlaced P-fields.

For the sake of simplicity, FIG. 41 does not show the various ways in which the technique (4100) may be integrated with other aspects of encoding and decoding. Various combined implementations are described in detail in section XII.

XI. Intensity Compensation for Interlaced P-Fields

Fading, morphing, and blending are widely used in the creation and editing of video content. These techniques smooth the visual evolution of video across content transitions. In addition, certain video sequences include fading naturally due to changes in illumination. For a predicted picture affected by fading, morphing, blending, etc., global changes in luminance compared to a reference picture reduce the effectiveness of conventional motion estimation and compensation. As a result, motion-compensated prediction is worse, and the predicted picture requires more bits to represent it. This problem is further complicated for interlaced P-fields that have either one reference field or multiple reference fields.

In some embodiments, an encoder and decoder perform fading compensation (also called intensity compensation) on reference fields for interlaced P-fields. The encoder performs corresponding fading estimation. The fading estimation and compensation, and the signaling mechanism for fading compensation parameters, are adapted to the reference field organization of interlaced P-fields. For example, for an interlaced P-field that has one reference field or two reference fields, the decision whether or not to perform fading compensation is made separately for each of the reference fields. Each reference field that uses fading compensation may have its own fading compensation parameters. The signaling mechanism for the fading compensation decisions and parameters efficiently represents this information. As a result, the quality of the interlaced video is improved and/or the bit rate is reduced.

A. Fading Estimation and Compensation on Reference Fields

Fading compensation involves performing a change to one or more reference fields to compensate for fading, blending, morphing, etc. Generally, fading compensation includes any compensation for fading (i.e., fade-to-black or fade-from-black), blending, morphing, or other natural or synthetic lighting effects that affect pixel value intensities. For example, a global luminance change may be expressed as a change in the brightness and/or contrast of the scene. Typically, the change is linear, but it can also be defined as including any smooth, nonlinear mapping within the same framework. A current P-field is then predicted by motion estimation/compensation from the adjusted one or more reference fields.

For a reference field in YUV color space, adjustments occur by adjusting samples in the luminance and chrominance channels. The adjustments may include scaling and shifting luminance values and scaling and shifting chrominance values. Alternatively, the color space is different (e.g., YIQ or RGB) and/or the compensation uses other adjustment techniques.

An encoder/decoder performs fading estimation/compensation on a field-by-field basis. Alternatively, an encoder/decoder performs fading estimation/compensation on some other basis. So, fading compensation adjustments affect a defined region, which may be a field or a part of a field (e.g., an individual block or macroblock, or a group of macroblocks), and fading compensation parameters are for the defined region. Or, fading compensation parameters are for an entire field, but are applied selectively and as needed to regions within the field.

B. Reference Field Organization for Interlaced P-fields

In some embodiments, an interlaced P-field has either one or two reference fields for motion compensation. (For example, see section IV.) FIGS. 24A-24F illustrate positions of reference fields available for use in motion-compensated prediction for interlaced P-fields. An encoder and decoder may use reference fields at other and/or additional positions or timing for motion-compensated prediction for P-fields. For example, reference fields within the same frame as a current P-field are allowed. Or, either the top field or bottom field of a frame may be coded/decoded first.

For interlaced P-fields that have either one or two reference fields for motion compensation, a P-field have only one reference field. Or, a P-field may have two reference fields and switch between the two reference fields for different motion vectors or on some other basis.

Alternatively, a P-field has more reference fields and/or reference fields at different positions.

C. Encoders and Decoders

Figure 42:
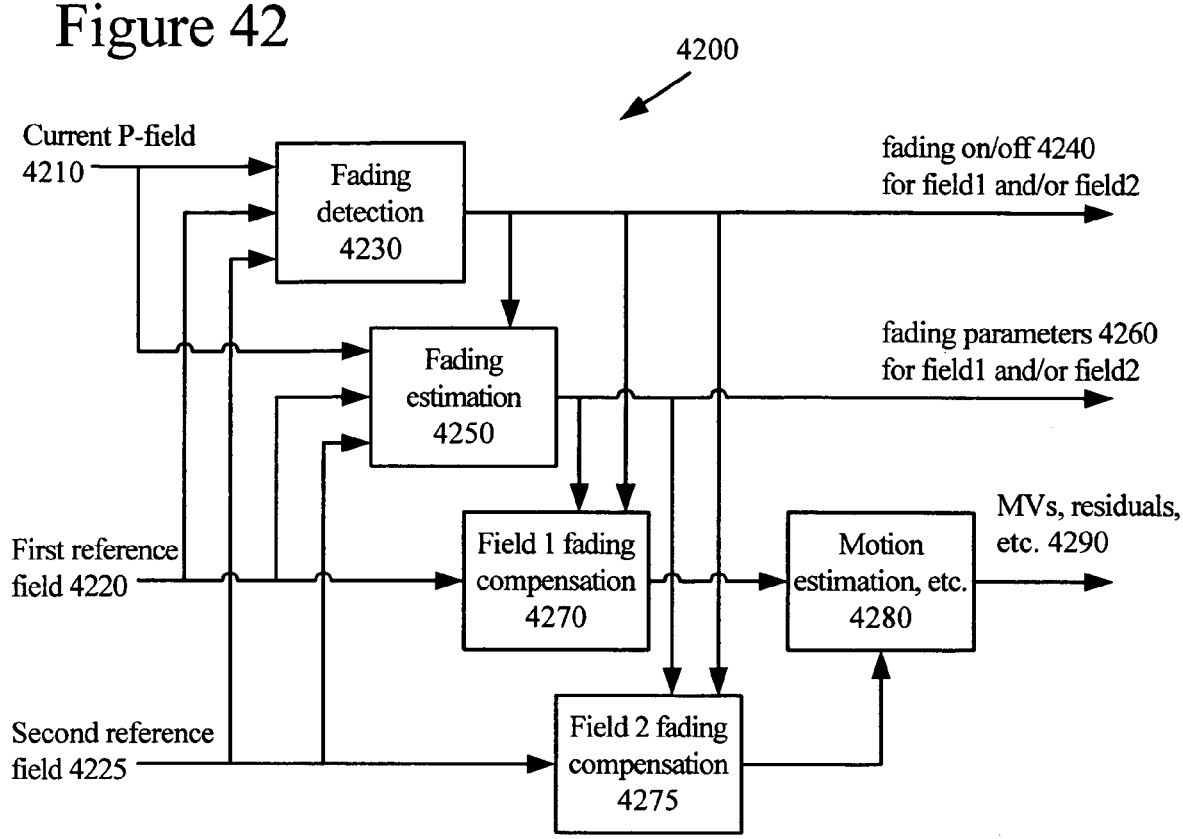
FIGS. 42 and 43 are diagrams of an encoder framework and decoder framework, respectively, in which intensity compensation is performed for interlaced P-fields.

FIG. 42 shows an exemplary encoder framework (4200) for performing intensity estimation and compensation for interlaced P-fields that have one or two reference fields. In this framework (4200), the encoder conditionally remaps a reference field using parameters obtained by fading estimation. The encoder performs remapping, or fading compensation, when the encoder detects fading with a good degree of certainty and consistency across the field. Otherwise, fading compensation is an identity operation (i.e., output=input).

Referring to FIG. 42, the encoder compares a current P-field (4210) with a first reference field (4220) using a fading detection module (4230) to determine whether fading occurs between the fields (4220, 4210). The encoder separately compares the current P-field (4210) with a second reference field (4225) using the fading detection module (4230) to determine whether fading occurs between those fields (4225, 4210). The encoder produces a "fading on" or "fading off" signal or signals (4240) based on the results of the fading detection. The signal(s) indicate whether fading compensation will be used at all and, if so, whether on only the first, only the second, or both of the reference fields (4220, 4225).

If fading compensation is on for the first reference field (4220), the fading estimation module (4250) estimates fading parameters (4260) for the first reference field (4220). (Fading estimation details are discussed below.) Similarly, if fading compensation is on for the second reference field (4225), the fading estimation module (4250) separately estimates fading parameters (4260) for the second reference field.

The fading compensation modules (4270, 4275) use the fading parameters (4260) to remap one or both of the reference fields (4220). Although FIG. 42 shows two fading compensation modules (4270, 4275) (one per reference field), alternatively, the encoder framework (4200) includes a single fading compensation module that operates on either reference field (4220, 4225).

Other encoder modules (4280) (e.g., motion estimation and compensation, frequency transformer, and quantization modules) compress the current P-field (4210). The encoder outputs motion vectors, residuals and other information (4290) that define the encoded P-field (4210). Aside from motion estimation/compensation with translational motion vectors, the framework (4200) is applicable across a wide variety of motion compensation-based video codecs.

Figure 43:
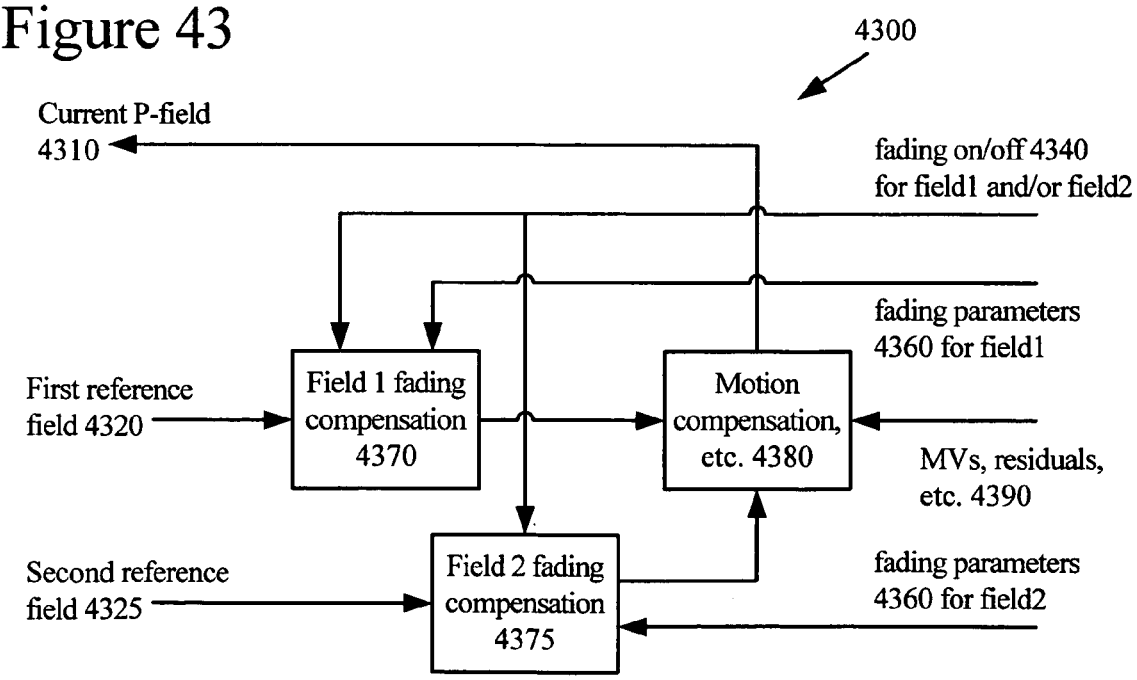

FIG. 43 shows an exemplary decoder framework (4300) for performing intensity compensation. The decoder produces a decoded P-field (4310). To decode an encoded fading-compensated P-field, the decoder performs fading compensation on one or two previously decoded reference fields (4320, 4325) using fading compensation modules (4370, 4375). Alternatively, the decoder framework (4300) includes a single fading compensation module that operates on either reference field (4320, 4325).

The decoder performs fading compensation on the first reference field (4320) if the fading on/off signal(s) (4340) indicate that fading compensation is used for the first reference field (4320) and P-field (4310). Similarly, the decoder performs fading compensation on the second reference field (4325) if the fading on/off signal(s) (4340) indicate that fading compensation is used for the second reference field (4325) and P-field (4310). The decoder performs fading compensation (as done in the encoder) using the respective sets of fading parameters (4360) obtained during fading estimation for the first and second reference fields (4320, 4325). If fading compensation is off, fading compensation is an identity operation (i.e., output=input).

Other decoder modules (4360) (e.g., motion compensation, inverse frequency transformer, and inverse quantization modules) decompress the encoded P-field (4310) using motion vectors, residuals and other information (4390) provided by the encoder.

D. Parameterization and Compensation

Between a P-field and a first reference field and/or between the P-field and a second reference field, parameters represent the fading, blending, morphing, or other change. The parameters are then applied in fading compensation.

In video editing, synthetic fading is sometimes realized by applying a simple, pixel-wise linear transform to the luminance and chrominance channels. Likewise, cross-fading is sometimes realized as linear sums of two video sequences, with the composition changing over time. Accordingly, in some embodiments, fading or other intensity compensation adjustment is parameterized as a pixel-wise linear transform, and cross-fading is parameterized as a linear sum.

Suppose I(n) is P-field n and I(n−1) is one reference field. Where motion is small, simple fading is modeled by the first order relationship in following equation. The relation in the equation is approximate because of possible motion in the video sequence.

$$I(n) \approx C1 I(n-1) + B1,$$

where the fading parameters B1 and C1 correspond to brightness and contrast changes, respectively, for the reference field. (Parameters B2 and C2 correspond to brightness and contrast changes, respectively, for the other reference field.) When nonlinear fading occurs, the first order component typically accounts for the bulk of the change.

Cross-fades from an image sequence U(n) to an image sequence V(n) can be modeled by the relationship in the following equation. Again, the relation in the equation is approximate because of possible motion in the sequences.

$$\begin{aligned} I(n) &\approx \alpha n V + (1 - \alpha n) U \\ &\approx I(n-1) + \alpha(V - U) \\ &\approx \begin{cases} (1-\alpha) I(n-1) & n \approx 0 \\ (1+\alpha) I(n-1) & n \approx 1/\alpha \end{cases} \end{aligned}$$

where n≈0 represents the beginning of the cross-fade, and n≈1/α represents the end of the cross-fade. For cross-fades spanning several fields, α is small. At the start of the cross-fade, the $n^{th}$ field is close to an attenuated (contrast<1) version of the n−$1^{th}$ field. Towards the end, the $n^{th}$ field is an amplified (contrast>1) version of the n−$1^{th}$ field.

The encoder carries out intensity compensation by remapping a reference field. The encoder remaps the reference field on a pixel-by-pixel basis, or on some other basis. The original, un-remapped reference field is essentially discarded (although in certain implementations, the un-remapped reference field may still be used for motion compensation).

The following linear rule remaps the luminance values of a reference field R to the remapped reference field $\hat{R}$ in terms of the two parameters B1 and C1:

$$\hat{R} \approx C1 R + B1,$$

The luminance values of the reference field are scaled (or, "weighted") by the contrast value and shifted (i.e., by adding an offset) by the brightness value. For chrominance, the remapping follows the rule:

$$\hat{R} \approx C1(R-\mu)+\mu,$$

where μ is the mean of the chrominance values. In one embodiment, 128 is assumed to be the mean for unsigned eight-bit representation of chrominance values. This rule for chrominance remapping does not use a brightness component. In some embodiments, the two-parameter linear remapping is extended to higher order terms. For example, a second-order equation that remaps the luminance values of R to $\hat{R}$ is:

$$\hat{R} \approx C1_1 R^2 + C1_2 R + B1.$$

Other embodiments use other remapping rules. In one category of such remapping rules, for non-linear fading, linear mappings are replaced with non-linear mappings.

The fading compensation may be applied to a reference field before motion compensation. Or, it may be applied to the reference field as needed during motion compensation, e.g., only to those areas of the reference field that are actually referenced by motion vectors.

E. Estimation of Parameters

Estimation is the process of computing compensation parameters during the encoding process. An encoder such as one shown in the framework (4200) of FIG. 42 computes brightness (B1, B2) and contrast (C1, C2) parameters during the encoding process. Alternatively, such an encoder computes other compensation parameters.

To speed up estimation, the encoder considers and estimates parameters for each reference field independently. Also, the encoder analyzes only the luminance channel. Alternatively, the encoder includes chrominance in the analysis when more computational resources are available. For example, the encoder solves for C1 (or C2) in the luminance and chrominance remapping equations for the first reference field, not just the luminance one, to make C1 (or C2) more robust.

Motion in the scene is ignored during the fading estimation process. This is based on the observations that: (a) fades and cross fades typically happen at still or low-motion scenes, and (b) the utility of intensity compensation in high motion scenes is very low. Alternatively, the encoder jointly solves for fading compensation parameters and motion information. Motion information is then used to refine the accuracy of fading compensation parameters at the later stages of the technique or at some other time. One way to use motion information is to omit from the fading estimation computation those portions of the reference field in which movement is detected.

The absolute error sums of $\Sigma abs(I(n)-R)$ or $\Sigma abs(I(n)-\hat{R})$ serve as metrics for determining the existence and parameters of fading. Alternatively, the encoder uses other or additional metrics such as sum of squared errors or mean squared error over the same error term, or the encoder uses a different error term.

The encoder may end estimation upon satisfaction of an exit condition such as described below. For another exit condition, the encoder checks whether the contrast parameter C1 (or C2) is close to 1.0 (in one implementation, 0.99<C<1.02) at the start or at an intermediate stage of the estimation and, if so, ends the technique.

The encoder begins the estimation by downsampling the current field and the selected reference field (first or second). In one implementation, the encoder downsamples by a factor of 4 horizontally and vertically. Alternatively, the encoder downsamples by another factor, or does not downsample at all.

The encoder then computes the absolute error sum $\Sigma abs(I_d(n)-R_d)$ over the lower-resolution versions $I_d(n)$ and $R_d$ of the current and reference fields. The absolute error sum measures differences in values between the downsampled current field and the downsampled reference field. If the absolute error sum is smaller than a certain threshold (e.g., a pre-determined difference measure), the encoder concludes that no fading has occurred and fading compensation is not used.

Otherwise, the encoder estimates brightness B1 (or B2) and contrast C1 (or C2) parameters. First cut estimates are obtained by modeling $I_d(n)$ in terms of $R_d$ for different parameter values. For example, the brightness and contrast parameters are obtained through linear regression over the entire downsampled field. Or, the encoder uses other forms of statistical analysis such as total least squares, least median of squares, etc. for more robust analysis. For example, the encoder minimizes the MSE or SSE of the error term $I_d(n) - R_d$. In some circumstances, MSE and SSE are not robust, so the encoder also tests the absolute error sum for the error term. The encoder discards high error values for particular points (which may be due to motion rather than fading).

The first cut parameters are quantized and dequantized to ensure that they lie within the permissible range and to test for compliance. In some embodiments, for typical eight-bit depth imagery, the parameters are quantized to 6 bits each. B1 (or B2) takes on integer values from −32 to 31 represented as a signed six-bit integer. C1 (or C2) varies from 0.5 to 1.484375, in uniform steps of 0.015625 (1/64), corresponding to quantized values 0 through 63 for C1 (or C2). Quantization is performed by rounding B1 (or B2) and C1 (or C2) to the nearest valid dequantized value and picking the appropriate bin index.

The encoder calculates the original bounded absolute error sum ($S_{OrgBnd}$) and remapped bounded absolute error sum ($S_{RmpBnd}$). In some embodiments, the encoder calculates the sums using a goodness-of-fit analysis. For a random or pseudorandom set of pixels at the original resolution, the encoder computes the remapped bounded absolute error sum $\Sigma babs(I(n) - C_fR - B_f)$, where $babs(x) = min(abs(x), M)$ for some bound M such as a multiple of the quantization parameter of the field being encoded. The bound M is higher when the quantization parameter is coarse, and lower when the quantization parameter is fine. The encoder also accumulates the original bounded absolute error sum $\Sigma babs(I(n) - R)$. If computational resources are available, the encoder may compute the bounded error sums over the entire fields.

Based on the relative values of the original and remapped bounded absolute error sums, the encoder determines whether or not to use fading compensation. For example, in some embodiments, the encoder does not perform fading compensation unless the remapped bounded absolute error sum is less than or equal to some threshold percentage σ of the original bounded absolute error sum. In one implementation, σ=0.95.

If fading compensation is used, the encoder re-computes the fading parameters, this time based on a linear regression between I(n) and R, but at the full resolution. To save computation time, the encoder can perform the repeated linear regression over the random or pseudorandom sampling of the field. Again, the encoder can alternatively use other forms of statistical analysis (e.g., total least squares, least median of squares, etc.) for more robust analysis.

In some implementations, the encoder allows a special case in which the reconstructed value of C1 (or C2) is −1. The special case is signaled by the syntax element for C1 (or C2) being equal to 0. In this "invert" mode, the reference field is inverted before shifting by B1 (or B2), and the range of B1 (or B2) is 193 to 319 in uniform steps of two. Alternatively, some or all of the fading compensation parameters use another representation, or other and/or additional parameters are used.

F. Signaling

At a high level, signaled fading compensation information includes (1) compensation on/off information and (2) compensation parameters. The on/off information may in turn include: (a) whether or not fading compensation is allowed or not allowed overall (e.g., for an entire sequence); (b) if fading compensation is allowed, whether or not fading compensation is used for a particular P-field; and (c) if fading compensation is used for a particular P-field, which reference fields should be adjusted by fading compensation. When fading compensation is used for a reference field, the fading compensation parameters to be applied follow.

1. Overall On/Off Signaling

At the sequence level, one bit indicates whether or not fading compensation is enabled for the sequence. If fading compensation is allowed, later elements indicate when and how it is performed. Alternatively, fading compensation is enabled/disabled at some other syntax level. Or, fading compensation is always allowed and the overall on/off signaling is skipped.

2. P-field On/Off Signaling

If fading compensation is allowed, one or more additional signals indicate when to use fading compensation. Among fields in a typical interlaced video sequence, the occurrence of intensity compensation is rare. It is possible to signal use of fading compensation for a P-field by adding one bit per field (e.g., one bit signaled at field level). However, it is more economical to signal use of fading compensation jointly with other information.

One option is to signal the use of fading compensation for a P-field jointly with motion vector mode (e.g., the number and configuration of motion vectors, the sub-pixel interpolation scheme, etc.). For example, a VLC jointly indicates a least frequent motion vector mode and the activation of fading compensation for a P-field. For additional detail, see U.S. Patent Application Publication No. 2003-0206593-A1, entitled "Fading Estimation/Compensation," the disclosure of which is hereby incorporated by reference. Or, use/non-use of fading compensation for a P-field is signaled with motion vector mode information as described in several combined implementations below. See section XII, the MVMODE and MVMODE2 elements. Alternatively, another mechanism for signaling P-field fading compensation on/off information is used.

3. Reference Field On/Off Signaling

If fading compensation is used for a P-field, there may be several options for which reference fields undergo fading compensation. When a P-field uses fading compensation and has two reference fields, there are three cases. Fading compensation is performed for: (1) both reference fields; (2) only the first reference field (e.g., the temporally second-most recent reference field); or (3) only the second reference field (e.g., the temporally most recent reference field). Fading compensation reference field pattern information may be signaled as a FLC or VLC per P-field. The table in FIG. 44 shows one set of VLCs for pattern information for an element INTCOMPFIELD, which is signaled in a P-field header. Alternatively, the table shown in FIG. 47G or another table is used at the field level or another syntax level.

In some implementations, the reference field pattern for fading compensation is signaled for all P-fields. Alternatively, for a one reference field P-field that uses fading compensation, signaling of the reference field pattern is skipped, since the fading compensation automatically applies to the single reference field.

4. Fading Compensation Parameter Signaling

If fading compensation is used for a reference field, the fading compensation parameters for the reference field are signaled. For example, a first set of fading compensation parameters is present in a header for the P-field. If fading compensation is used for only one reference field, the first set of parameters is for that one reference field. If fading compensation is used for two reference fields of the P-field, however, the first set of parameters is for one reference field, and a second set of fading compensation parameters is present in the header for fading compensation of the other reference field.

Each set of fading compensation parameters includes, for example, a contrast parameter and a brightness parameter. In one combined implementation, the first set of parameters includes LUMSCALE1 and LUMSHIFT1 elements, which are present in the P-field header when intensity compensation is signaled for the P-field. If INTCOMPFIELD indicates both reference fields or only the second-most recent reference field uses fading compensation, LUMSCALE1 and LUMSHIFT1 are applied to the second-most recent reference field. Otherwise (INTCOMPFIELD indicates only the most recent reference field uses fading compensation), LUMSCALE1 and LUMSHIFT1 are applied to the most reference recent field. The second set of parameters, including the LUMSCALE2 and LUMSHIFT2 elements, is present in the P-field header when intensity compensation is signaled for the P-field and INTCOMPFIELD indicates that both reference fields use fading compensation. LUMSCALE2 and LUMSHIFT2 are applied to the more recent reference field.

LUMSHIFT1, LUMSCALE1, LUMSHIFT2, and LUMSCALE2 correspond to the parameters B1, C1, B2, and C2. LUMSCALE1, LUMSCALE2, LUMSHIFT1, and LUMSHIFT2 are each signaled using a six-bit FLC. Alternatively, the parameters are signaled using VLCs. FIG. 56 shows pseudocode for performing fading compensation on a first reference field based upon LUMSHIFT1 and LUMSCALE1. An analogous process is performed for fading compensation on a second reference field based upon LUMSHIFT2 and LUMSCALE2.

Alternatively, fading compensation parameters have a different representation and/or are signaled with a different signaling mechanism.

G. Estimation and Signaling Techniques

An encoder such as the encoder (2000) of FIG. 20 or the encoder in the framework (4200) of FIG. 42 performs fading estimation and corresponding signaling for an interlaced P-field that has two reference fields. For example, the encoder performs the technique (4500) shown in FIG. 45A.

The encoder performs fading detection (4510) on the first of the two reference fields for the P-field. If fading is detected (the "Yes" path out of decision 4512), the encoder performs fading estimation (4514) for the P-field relative to the first reference field, which yields fading compensation parameters for the first reference field. The encoder also performs fading detection (4520) on the second of the two reference fields for the P-field. If fading is detected (the "Yes" path out of decision 4522), the encoder performs fading estimation (4524) for the P-field relative to the second reference field, which yields fading compensation parameters for the second reference field. For example, the encoder performs fading detection and estimation as described in the section entitled "Estimation of Fading Parameters." Alternatively, the encoder uses a different technique to detect fading and/or obtain fading compensation parameters. If the current P-field has only one reference field, the operations for the second reference field may be skipped.

The encoder signals (4530) whether fading compensation is on or off for the P-field. For example, the encoder jointly codes the information with motion vector mode information for the P-field. Alternatively, the encoder uses other and/or additional signals to indicate whether fading compensation is on or off for the P-field. If fading compensation is not on for the current P-field (the "No" path out of decision 4532), the technique (4500) ends.

Otherwise (the "Yes" path out of decision 4532), the encoder signals (4540) the reference field pattern for fading compensation. For example, the encoder signals a VLC that indicates whether fading compensation is used for both reference fields, only the first reference field, or only the second reference field. Alternatively, the encoder uses another signaling mechanism (e.g., a FLC) to indicate the reference field pattern.

In this path, the encoder also signals (4542) a first set and/or second set of fading compensation parameters, which were computed in the fading estimation. For example, the encoder uses signaling as described in section XI.F. Alternatively, the encoder uses other signaling.

Figure 45A:
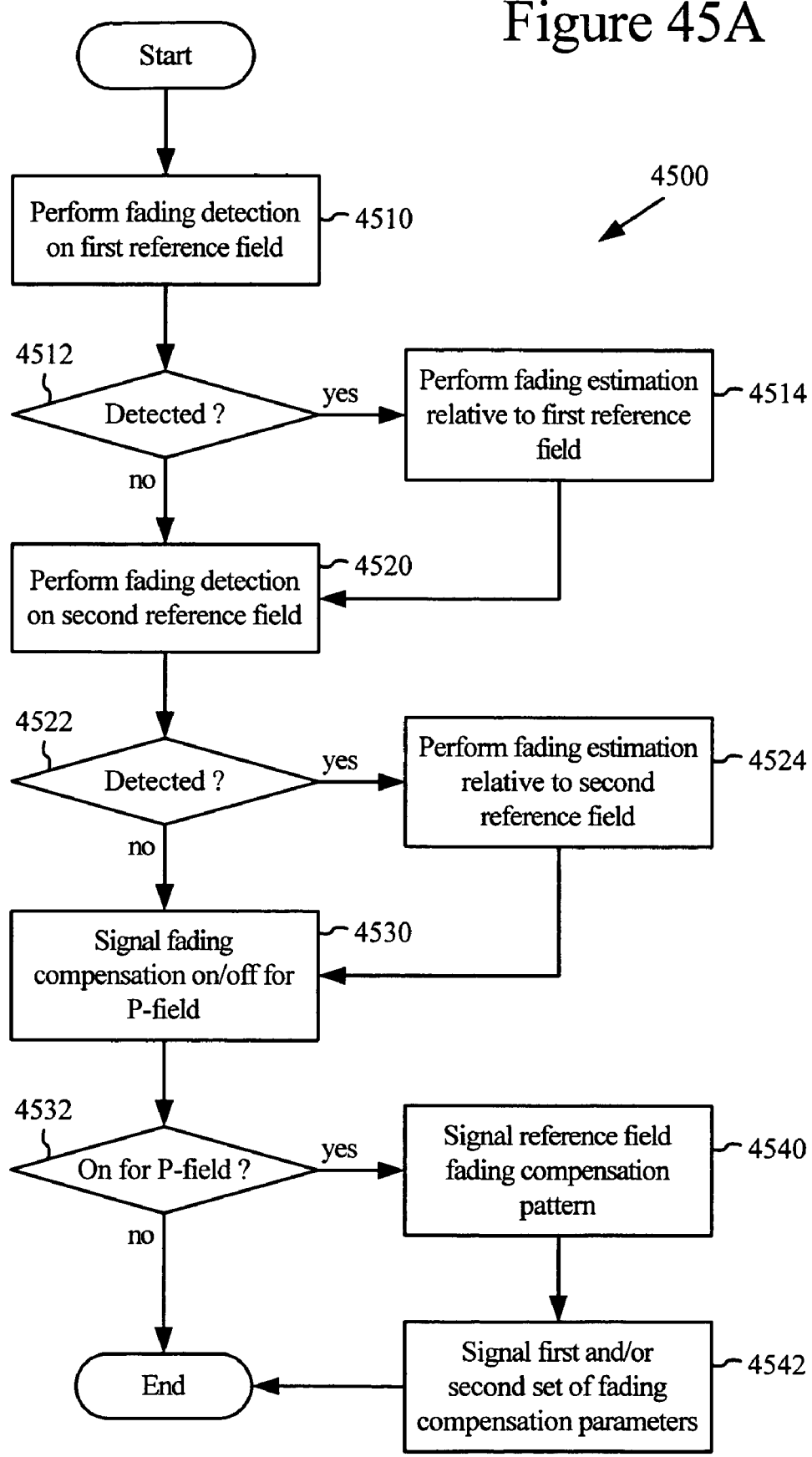

Although the encoder typically also performs fading compensation, motion estimation, and motion compensation, for the sake of simplicity, FIG. 45A does not show these operations. Moreover, fading estimation may be performed before or concurrently with motion estimation. FIG. 45A does not show the various ways in which the technique (4500) may be integrated with other aspects of encoding and decoding. Various combined implementations are described in detail in section XII.

H. Decoding and Compensation Techniques

A decoder such as the decoder (2100) of FIG. 21 or the decoder in the framework (4300) of FIG. 43 performs decoding and fading compensation for an interlaced P-field that has two reference fields. For example, the decoder performs the technique (4550) shown in FIG. 45B.

The decoder receives and decodes (4560) one or more signals that indicate whether fading compensation is on or off for the P-field. For example, the information is jointly coded with motion vector mode information for the P-field. Alternatively, the decoder receives and decodes other and/or additional signals to indicate whether fading compensation is on or off for the P-field. If fading compensation is not on for the P-field (the "No" path out of decision 4562), the technique (4550) ends.

Otherwise (the "Yes" path out of decision 4562), the decoder receives and decodes (4570) the reference field pattern for fading compensation. For example, the decoder receives and decodes a VLC that indicates whether fading compensation is used for both reference fields, only the first reference field, or only the second reference field. Alternatively, the decoder operates in conjunction with another signaling mechanism (e.g., a FLC) to determine the reference field pattern.

In this path, the decoder also receives and decodes (4572) a first set of fading compensation parameters. For example, the decoder works with signaling as described in section XI.F. Alternatively, the decoder works with other signaling.

If fading compensation is performed for only one of the two reference fields (the "No" path out of decision 4575), the first set of parameters is for the first or second reference field, as indicated by the reference field pattern. The decoder performs fading compensation (4592) on the indicated reference field with the first set of fading compensation parameters, and the technique (4500) ends.

Otherwise, fading compensation is performed for both of the two reference fields (the "Yes" path out of decision 4575), and the decoder receives and decodes (4580) a second set of fading compensation parameters. For example, the decoder works with signaling as described in section XI.F. Alternatively, the decoder works with other signaling. In this case, the first set of parameters is for one of the two reference fields, and the second set of parameters is for the other. The decoder performs fading compensation (4592) on one reference field with the first set of parameters, and performs fading compensation (4582) on the other reference field with the second set of parameters.

For the sake of simplicity, FIG. 45B does not show the various ways in which the technique (4550) may be integrated with other aspects of encoding and decoding. Various combined implementations are described in detail in section XII.

XII. Combined Implementations

Detailed combined implementations for bitstream syntaxes, semantics, and decoders are now described, with an emphasis on interlaced P-fields. The following description includes a first combined implementation and an alternative, second combined implementation. In addition, U.S. patent application Ser. No. 10/857,473, filed May 27, 2004, discloses aspects of a third combined implementation.

Although the emphasis is on interlaced P-fields, in various places in this section, the applicability of syntax elements, semantics, and decoding for other picture types (e.g., interlaced P- and B-frames, interlaced I, BI, PI, and B-fields) is addressed.

A. Sequence and Semantics in the First Combined Implementation

In the first combined implementation, a compressed video sequence is made up of data structured into hierarchical layers: the picture layer, macroblock layer, and block layer. A sequence layer precedes the sequence, and entry point layers may be interspersed in the sequence. FIGS. 46A through 46E show the bitstream elements that make up various layers.

1. Sequence Layer Syntax and Semantics

A sequence-level header contains sequence-level parameters used to decode the sequence of compressed pictures. In some profiles, the sequence-related metadata is communicated to the decoder by the transport layer or other means. For the profile with interlaced P-fields (the advanced profile), however, this header syntax is part of the video data bitstream.

Figure 46A:
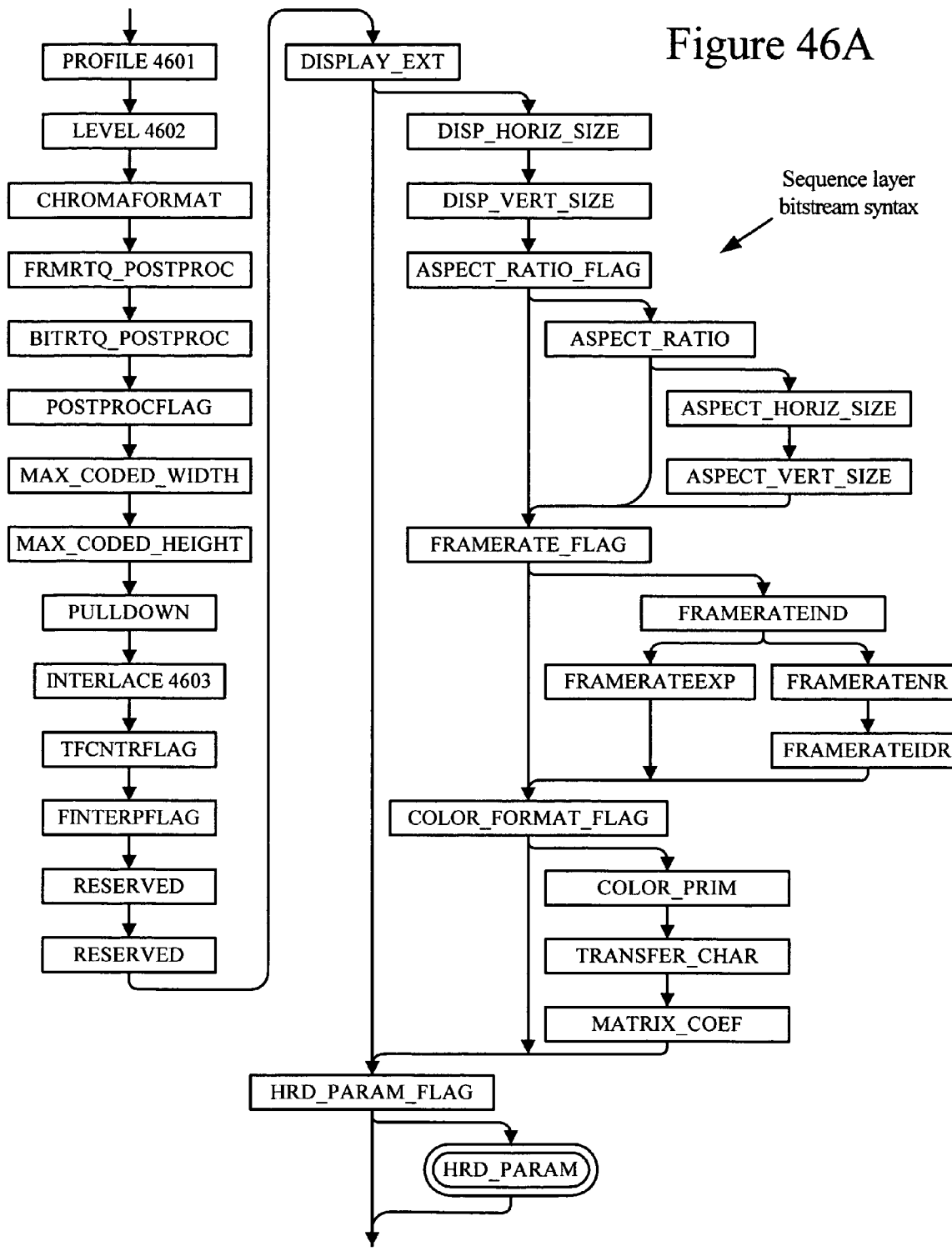
FIGS. 46A-46E are syntax diagrams for layers of a bitstream according to a first combined implementation.

FIG. 46A shows the syntax elements that make up the sequence header for the advanced profile. The PROFILE (4601) and LEVEL (4602) elements specify the profile used to encode the sequence and the encoding level in the profile, respectively. Of particular interest for interlaced P-fields, the INTERLACE (4603) element is a one-bit syntax element that signals whether the source content is progressive (INTERLACE=0) or interlaced (INTERLACE=1). The individual frames may still be coded using the progressive or interlaced syntax when INTERLACE=1.

2. Entry-point Layer Syntax and Semantics

An entry-point header is present in the advanced profile. The entry point has two purposes. First, it is used to signal a random access point within the bitstream. Second, it is used to signal changes in the coding control parameters.

Figure 46B:
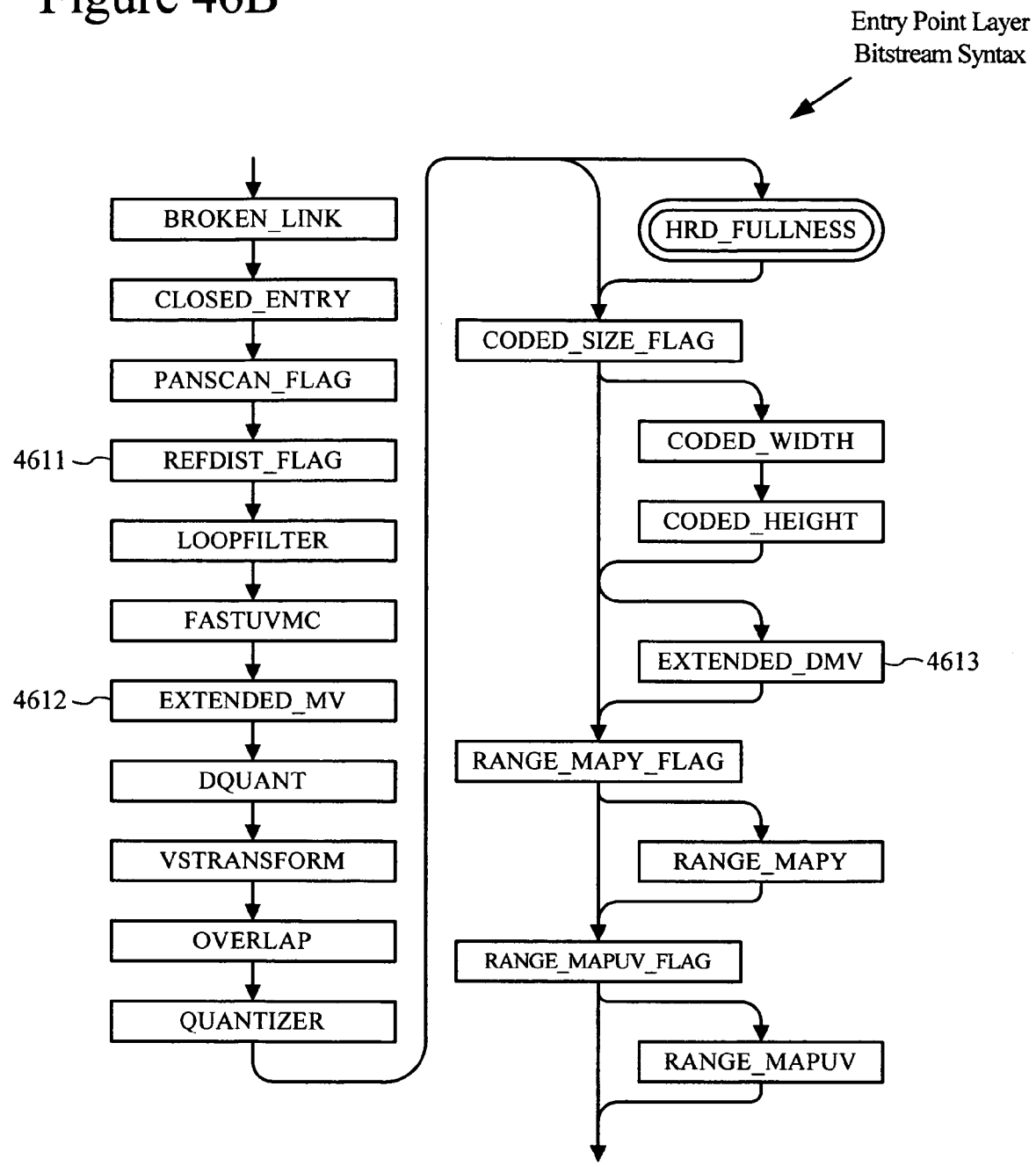

FIG. 46B shows the syntax elements that make up the entry-point layer. Of particular interest for interlaced P-fields, the reference frame distance flag REFDIST_FLAG (4611) element is a one-bit syntax element. REFDIST_FLAG=1 indicates that the REFDIST (4624) element is present in I/I, I/P, P/I or P/P field picture headers. REFDIST_FLAG=0 indicates that the REFDIST (4624) element is not present in I/I, I/P, P/I or P/P field picture headers.

The extended motion vector flag EXTENDED_MV (4612) element is a one-bit element that indicates whether extended motion vector capability is turned on (EXTENDED_MV=1) or off (EXTENDED_MV=0). The extended differential motion vector range flag EXTENDED_DMV (4613) element is a one-bit syntax element that is present if EXTENDED_MV=1. If EXTENDED_DMV=1, motion vector differentials in an extended differential motion vector range are signaled at the picture layer within the entry point segment. If EXTENDED_DMV=0, motion vector differentials in the extended differential motion vector range are not signaled. Extended differential motion vector range is an option for interlaced P- and B-pictures, including interlaced P-fields and P-frames and interlaced B-fields and B-frames.

3. Picture Layer Syntax and Semantics

Figure 46C:
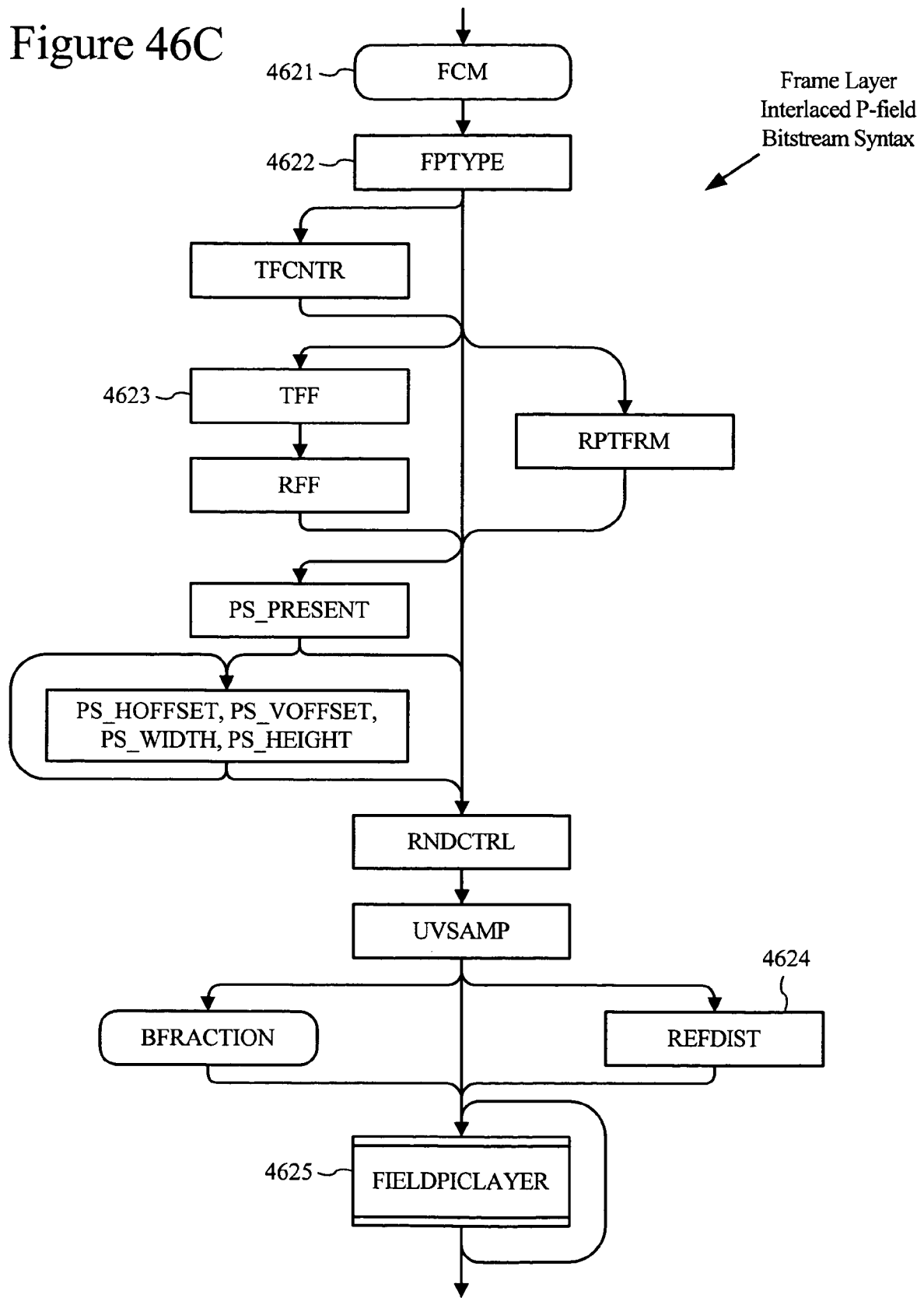

Data for a picture consists of a picture header followed by data for the macroblock layer. FIG. 46C shows the bitstream elements that make up the frame header for interlaced field pictures. In the following description, emphasis is placed on elements used with interlaced P-fields, but the header shown in FIG. 46C is applicable to various combinations of interlaced I-, P-, B-, and BI-fields.

The frame coding mode FCM (4621) element is present only in the advanced profile and only if the sequence layer INTERLACE (4603) has the value 1. FCM (4621) indicates whether the picture is coded as progressive, interlace-field or interlace-frame. The table in FIG. 47A includes the VLCs used to indicate picture coding type with FCM.

The field picture type FPTYPE (4622) element is a three-bit syntax element present in picture headers for interlaced field pictures. FPTYPE is decoded according to the table in FIG. 47B. As the table shows, an interlaced frame may include two interlaced I-fields, one interlaced I-field and one interlaced P-field, two interlaced P-fields, two interlaced B-fields, one interlaced B-field and one interlaced BI-field, or two interlaced BI-fields.

The top field first TFF (4623) element is a one-bit element present in advanced profile picture headers if the sequence header element PULLDOWN=1 and the sequence header element INTERLACE=1. TFF=1 implies that the top field is the first decoded field. If TFF=0, the bottom field is the first decoded field.

The P reference distance REFDIST (4624) element is a variable-size syntax element present in interlaced field picture headers if the entry-level flag REFDIST_FLAG=1 and if the picture type is not B/B, B/BI, BI/B, BI/BI. If REFDIST_FLAG=0, REFDIST (4624) is set to the default value of 0. REFDIST (4624) indicates the number of frames between the current frame and the reference frame. The table in FIG. 47C includes the VLCs used for REFDIST (4624) values. The last row in the table indicates the codewords used to represent reference frame distances greater than 2. These are coded as (binary) 11 followed by N-3 1 s, where N is the reference frame distance. The last bit in the codeword is 0. The value of REFDIST (4624) is less than or equal to 16. For example:

N=3, VLC Codeword=110, VLC Size=3,
N=4, VLC Codeword=1110, VLC Size=4, and
N=5, VLC Codeword=11110, VLC Size=5.

Figure 46D:
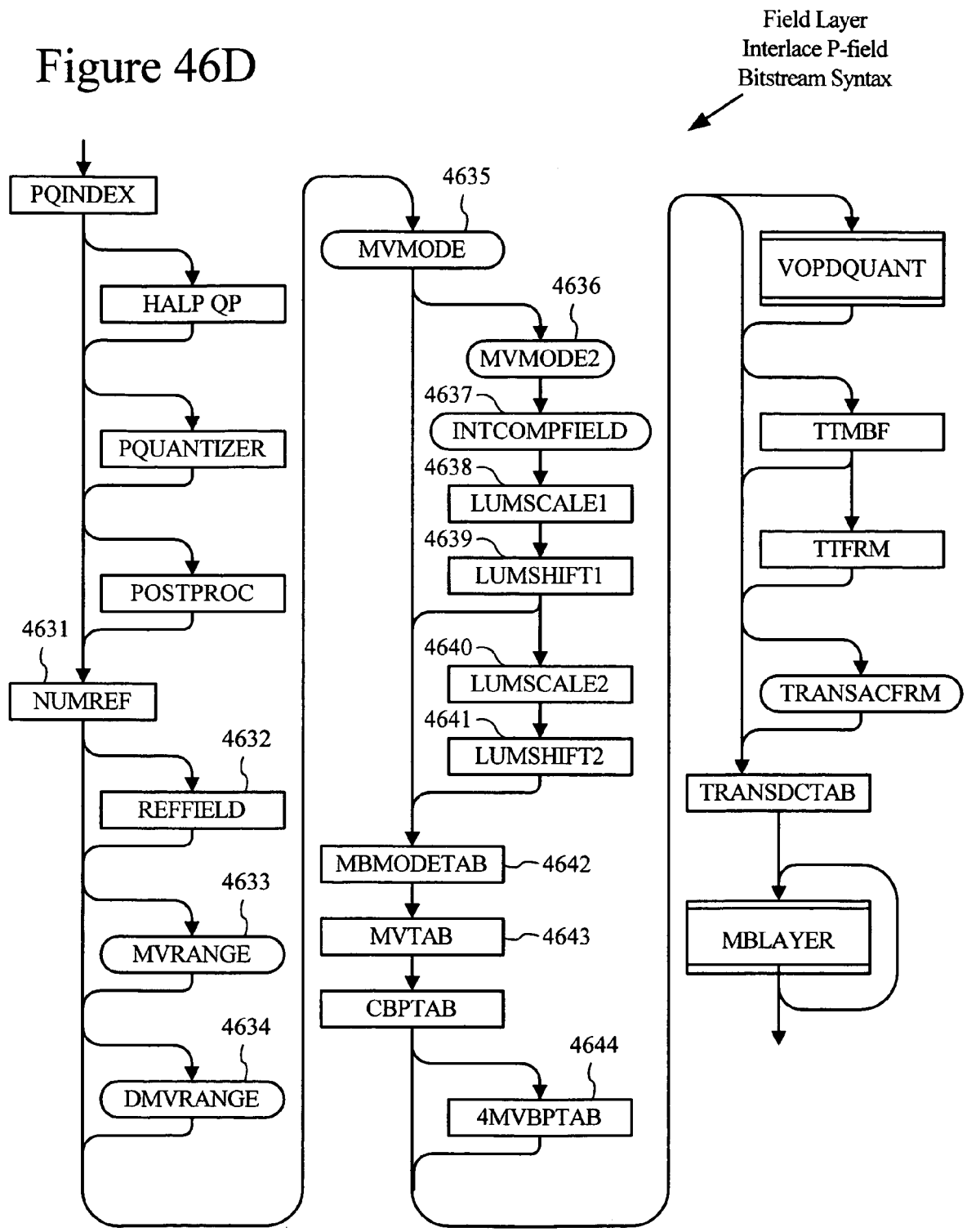

The field picture layer FIELDPICLAYER (4625) element is data for one of the separate interlaced fields of the interlaced frame. If the interlaced frame is a P/P frame (FPTYPE=011), the bitstream includes two FIELDPICLAYER (4625) elements for the two interlaced P-fields. FIG. 46D shows the bitstream elements that make up the field picture header for an interlaced P-field picture.

The number of reference pictures NUMREF (4631) element is a one-bit syntax element present in interlaced P-field headers. It indicates whether an interlaced P-field has 1 (NUMREF=0) or 2 (NUMREF=1) reference pictures. The reference field picture indicator REFFIELD (4632) is a one-bit syntax element present in interlaced P-field headers if NUMREF=0. It indicates which of two possible reference pictures the interlaced P-field uses.

The extended MV range flag MVRANGE (4633) is a variable-size syntax element that, in general, indicates an extended range for motion vectors (i.e., longer possible horizontal and/or vertical displacements for the motion vectors). The extended differential MV range flag DMVRANGE (4634) is a variable-size syntax element present if EXTENDED_DMV=1. The table in FIG. 47D is used for the DMVRANGE (4634) element. Both MVRANGE (4633) and DMVRANGE (4634) are used in decoding motion vector differentials and extended differential motion vector range is an option for interlaced P-fields, interlaced P-frames, interlaced B-fields and interlaced B-frames.

The motion vector mode MVMODE (4635) element is a variable-size syntax element that signals one of four motion vector coding modes or one intensity compensation mode. The motion vector coding modes include three "1MV" modes with different sub-pixel interpolation rules for motion compensation. The 1MV signifies that each macroblock in the picture has at most one motion vector. In the "mixed-MV" mode, each macroblock in the picture may have either one or four motion vectors, or be skipped. Depending on the value of PQUANT (a quantization factor for the picture), either one of the tables shown in FIG. 47E is used for the MVMODE (4635) element.

The motion vector mode 2 MVMODE2 (4636) element is a variable-size syntax element present in interlaced P-field headers if MVMODE (4635) signals intensity compensation. Depending on the value of PQUANT, either of the tables shown in FIG. 47F is used to for the MVMODE (4635) element.

The intensity compensation field INTCOMPFIELD (4637) is a variable-size syntax element present in interlaced P-field picture headers. As shown in the table in FIG. 47G, INTCOMPFIELD (4637) is used to indicate which reference field(s) undergoes intensity compensation. INTCOMPFIELD (4637) is present even if NUMREF=0.

The field picture luma scale 1 LUMSCALE1 (4638), field picture luma shift 1 LUMSHIFT1 (4639), field picture luma scale 2 LUMSCALE2 (4640), and field picture luma shift 2 LUMSHIFT2 (4641) elements are each a six-bit value used in intensity compensation. The LUMSCALE1 (4638) and LUMSHIFT1 (4639) elements are present if MVMODE (4635) signals intensity compensation. If the INTCOMPFIELD (4637) element is '1' or '00', then LUMSCALE1 (4638) and LUMSHIFT1 (4639) are applied to the top field. Otherwise, LUMSCALE1 (4638) and LUMSHIFT1 (4639) are applied to the bottom field. The LUMSCALE2 (4640) and LUMSHIFT2 (4641) elements are present if MVMODE (4635) signals intensity compensation and the INTCOMPFIELD (4637) element is '1'. LUMSCALE2 (4640) and LUMSHIFT2 (4641) are applied to the bottom field.

The macroblock mode table MBMODETAB (4642) element is a fixed length field with a three-bit value for an interlaced P-field header. MBMODETAB (4642) indicates which of eight code tables (tables 0 through 7 as specified with the three-bit value) is used to encode/decode the macroblock mode MBMODE (4661) syntax element in the macroblock layer. There are two sets of eight code tables, and the set used depends on whether 4MV macroblocks are possible or not in the picture, as indicated by MVMODE (4635). FIG. 47H shows the eight tables available for MBMODE (4661) in an interlaced P-field in mixed-MV mode. FIG. 47I shows the eight tables available for MBMODE (4661) in an interlaced P-field in a 1MV mode.

The motion vector table MVTAB (4643) element is a fixed-length field. For interlaced P-fields in which NUMREF=0, MVTAB (4643) is a two-bit syntax element that indicates which of four code tables (tables 0 through 3 as specified with the two-bit value) is used to decode motion vector data. For interlaced P-fields in which NUMREF=1, MVTAB (4643) is a three-bit syntax element that indicates which of eight code tables (tables 0 through 7 as specified with the three-bit value) is used to encode/decode the motion vector data.

In an interlaced P-field header, the 4MV block pattern table 4MVBPTAB (4644) element is a two-bit value present if MVMODE (4635) (or MVMODE2 (4636), if MVMODE (4635) is set to intensity compensation) indicates that the picture is of mixed-MV type. The 4MVBPTAB (4644) syntax element signals which of four tables (tables 0 through 3 as specified with the two-bit value) is used for the 4MV block pattern 4MVBP (4664) syntax element in 4MV macroblocks. FIG. 47J shows the four tables available for 4MVBP (4664).

An interlaced P-frame header (not shown) has many of the same elements as the field-coded interlaced frame header shown in FIG. 46C and the interlaced P-field header shown in FIG. 46D. These include FCM (4621), MVRANGE (4633), DMVRANGE (4634), MBMODETAB (4642), and MVTAB (4643), although the exact syntax and semantics for interlaced P-frames may differ from interlaced P-fields. An interlaced P-frame header also includes different elements for picture type, switching between 1MV and 4MV modes, and intensity compensation signaling.

Since an interlaced P-frame may include field-coded macroblocks with two motion vectors per macroblock, the interlaced P-frame header includes a two motion vector block pattern table 2MVBPTAB element. 2MVBPTAB is a two two-bit value present in interlaced P-frames. This syntax element signals which one of four tables (tables 0 through 3 as specified with the two-bit value) is used to decode the 2MV block pattern (2MVBP) element in 2MV field-coded macroblocks. FIG. 47K shows the four tables available for 2MVBP.

Interlaced B-fields and interlaced B-frames have many of the same elements of interlaced P-fields and interlaced P-frames. In particular, an interlaced B-field may include a 4MVBPTAB (4644) syntax element. An interlaced B-frame includes both 2MVBPTAB and 4MVBPTAB (4644) syntax elements, although the semantics of the elements can be different.

4. Macroblock Layer Syntax and Semantics

Figure 46E:
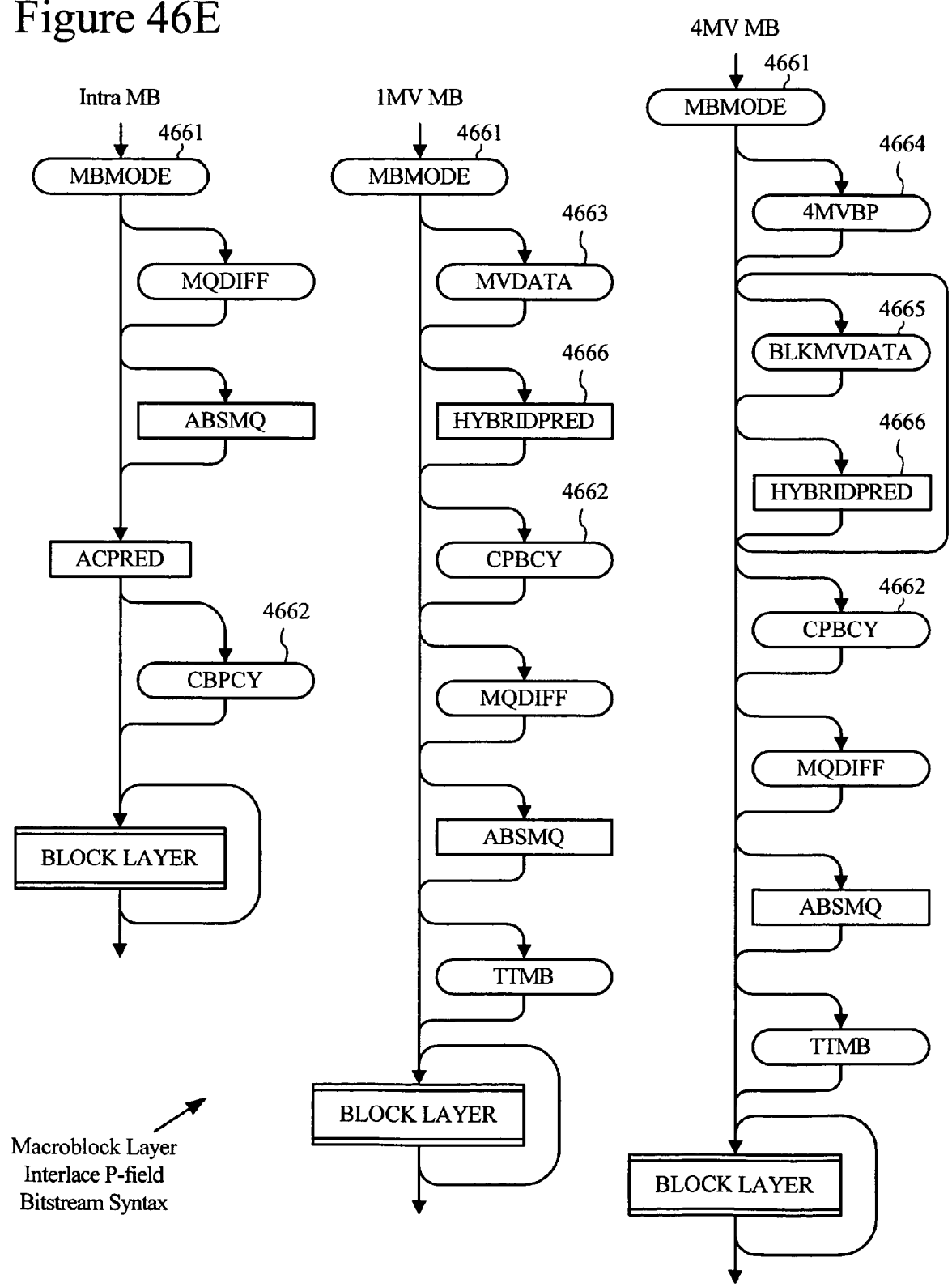

Data for a macroblock consists of a macroblock header followed by the block layer. FIG. 46E shows the macroblock layer structure for interlaced P-fields.

The macroblock mode MBMODE (4661) element is a variable-size element. It jointly indicates information such as the number of motion vectors for a macroblock (1MV, 4MV, or intra), whether a coded block pattern CBPCY (4662) element is present for the macroblock, and (in some cases) whether motion vector differential data is present for the macroblock. FIGS. 47H and 47I show tables available for MBMODE (4661) for an interlaced P-field.

The motion vector data MVDATA (4663) element is a variable-size element that encodes motion vector information (e.g., horizontal and vertical differentials) for a motion vector. For an interlaced P-field with two reference fields, MVDATA (4663) also encodes information for selecting between multiple possible motion vector predictors for the motion vector.

The four motion vector block pattern 4MVBP (4664) element is a variable-size syntax element that may be present in macroblocks for interlaced P-fields, B-fields, P-frames, and B-frames. In macroblocks for interlaced P-fields, B-fields, and P-frames, the 4MVBP (4664) element is present if MBMODE (4661) indicates that the macroblock has 4 motion vectors. In this case, 4MVBP (4664) indicates which of the 4 luma blocks contain non-zero motion vector differentials.

In macroblocks for interlaced B-frame, 4MVBP (4664) is present if MBMODE (4661) indicates that the macroblock contains 2 field motion vectors, and if the macroblock is an interpolated macroblock. In this case, 4MVBP (4664) indicates which of the four motion vectors (the top and bottom field forward motion vectors, and the top and bottom field backward motion vectors) are present.

The two motion vector block pattern 2MVBP element (not shown) is a variable-size syntax element present in macroblocks in interlaced P-frames and B-frames. In interlaced P-frame macroblocks, 2MVBP is present if MBMODE (4661) indicates that the macroblock has 2 field motion vectors. In this case, 2MVBP indicates which of the 2 fields (top and bottom) contain non-zero motion vector differentials. In interlaced B-frame macroblocks, 2MVBP is present if MBMODE (4661) indicates that the macroblock contains 1 motion vector and the macroblock is an interpolated macroblock. In this case, 2MVBP indicates which of the two motion vectors (forward and backward motion vectors) are present.

The block-level motion vector data BLKMVDATA (4665) element is a variable-size element present in certain situations. It contains motion information for a block of a macroblock.

The hybrid motion vector prediction HYBRIDPRED (4666) element is a one-bit syntax element per motion vector that may be present in macroblocks in interlaced P-fields. When hybrid motion vector prediction is used, HYBRIDPRED (4666) indicates which of two motion vector predictors to use.

5. Block Layer Syntax and Semantics

The block layer for interlaced pictures follows the syntax and semantics of the block layer for progressive pictures. In general, information for DC and AC coefficients of blocks and sub-blocks is signaled at the block layer.

B. Decoding in the First Combined Implementation

When a video sequence consists of interlaced video frames or includes a mix of interlaced and progressive frames, the FCM (4621) element indicates whether a given picture is coded as a progressive frame, interlaced fields or an interlaced frame. For a frame coded as interlaced fields, FPTYPE (4622) indicates whether the frame includes two interlaced I-fields, one interlaced I-field and one interlaced P-field, two interlaced P-fields, two interlaced B-fields, one interlaced B-field and one interlaced BI-field, or two interlaced BI-fields. Decoding of the interlaced fields follows. The following sections focus on the decoding process for interlaced P-fields.

1. References for Interlaced P-Field Decoding

An interlaced P-field may reference either one or two previously decoded fields in motion compensation. The NUMREF (4631) element indicates whether the current P-field may reference one or two previous reference fields. If NUMREF=0, then the current P-field may only reference one field. In this case, the REFFIELD (4632) element follows in the bitstream. REFFIELD (4632) indicates which previously decoded field is used as a reference. If REFFIELD=0, then the temporally closest (in display order) I-field or P-field is used as a reference. If REFFIELD=1, then the second most temporally recent I-field or P-field is used as reference. If NUMREF=1, then the current P-field uses the two temporally closest (in display order) I-fields or P-fields as references. The examples of reference field pictures for NUMREF=0 and NUMREF=1 shown in FIGS. 24A-24F, as described above, apply to the first combined implementation.

2. Picture Types

Interlaced P-fields may be one of two types: 1MV or mixed-MV. In 1MV P-fields, each macroblock is a 1MV macroblock. In mixed-MV P-fields, each macroblock may be encoded as a 1MV or a 4MV macroblock, as indicated by the MBMODE (4661) element at every macroblock. 1MV or mixed-MV mode is signaled for an interlaced P-field by the MVMODE (4635) and MVMODE2 (4636) elements.

3. Macroblock Modes

Macroblocks in interlaced P-fields may be one of 3 possible types: 1MV, 4MV, and intra. The MBMODE (4661) element indicates the macroblock type (1MV, 4MV or intra) and also the presence of the CBP and MV data. Depending on whether the MVMODE (4635)/MVMODE2 (4636) syntax elements indicate the interlaced P-field is mixed-MV or all 1MV, MBMODE (4661) signals the information as follows.

The table in FIG. 26 shows how MBMODE (4661) signals information about the macroblocks in all 1MV P-fields. As shown in FIG. 47I, one of 8 tables is used to encode/decode MBMODE (4661) for 1MV P-fields. The table in FIG. 27 shows how MBMODE (4661) signals information about the macroblock in mixed-MV P-fields. As shown in FIG. 47H, one of 8 tables is used encode/decode MBMODE (4661) for mixed-MV P-fields.

Thus, 1MV macroblocks may occur in 1-MV and mixed-MV interlaced P-fields. A 1MV macroblock is one where a single motion vector represents the displacement between the current and reference pictures for all 6 blocks in the macroblock. For 1MV macroblocks, the MBMODE (4661) element indicates three things: (1) that the macroblock type is 1MV; (2) whether the CBPCY (4662) element is present for the macroblock; and (3) whether the MVDATA (4663) element is present for the macroblock.

If the MBMODE (4661) element indicates that the CBPCY (4662) element is present, then the CBPCY (4662) element is present in the macroblock layer in the corresponding position. CBPCY (4662) indicates which of the 6 blocks are coded in the block layer. If the MBMODE (4661) element indicates that CBPCY (4662) is not present, then CBPCY (4662) is assumed to equal 0 and no block data is present for any of the 6 blocks in the macroblock.

If the MBMODE (4661) element indicates that the MVDATA (4663) element is present, then the MVDATA (4663) element is present in the macroblock layer in the corresponding position. The MVDATA (4663) element encodes the motion vector differential, which is combined with the motion vector predictor to reconstruct the motion vector. If the MBMODE (4661) element indicates that the MVDATA (4663) element is not present, then the motion vector differential is assumed to be zero and therefore the motion vector is equal to the motion vector predictor.

4MV macroblocks occur in mixed-MV P-fields. A 4MV macroblock is one where each of the 4 luma blocks in the macroblock may have an associated motion vector that indicates the displacement between the current and reference pictures for that block. The displacement for the chroma blocks is derived from the 4 luma motion vectors. The difference between the current and reference blocks is encoded in the block layer. For 4MV macroblocks, the MBMODE (4661) element indicates two things: (1) that the macroblock type is 4MV; and (2) whether the CBPCY (4662) element is present.

Intra macroblocks may occur in 1MV or mixed-MV P-fields. An intra macroblock is one where all six blocks are coded without referencing any previous picture data. For Intra macroblocks, the MBMODE (4661) element indicates two things: (1) that the macroblock type is intra; and (2) whether the CBPCY (4662) element is present. For intra macroblocks, the CBPCY (4662) element, when present, indicates which of the 6 blocks has AC coefficient data coded in the block layer. The DC coefficient is still present for each block in all cases.

4. Motion Vector Block Patterns

The 4MVBP (4664) element indicates which of the 4 luma blocks contain non-zero motion vector differentials. 4MVBP (4664) decodes to a value between 0 and 15, which when expressed as a binary value represents a bit syntax element that indicates whether the motion vector for the corresponding luma block is present. The table in FIG. 34 shows an association of luma blocks to bits in 4MVBP (4664). As shown in FIG. 47J, one of 4 tables is used to encode/decode 4MVBP (4664).

For each of the 4 bit positions in the 4MVBP (4664), a value of 0 indicates that no motion vector differential (in BLKMVDATA) is present for the block in the corresponding position, and the motion vector differential is assumed to be 0. A value of 1 indicates that a motion vector differential (in BLKMVDATA) is present for the block in the corresponding position. For example, if 4MVBP (4664) decodes to a binary value of 1100, then the bitstream contains BLKMVDATA (4665) for blocks 0 and 1, and no BLKMVDATA (4665) is present for blocks 2 and 3. The 4MVBP (4664) is similarly used to indicate the presence/absence of motion vector differential information for 4MV macroblocks in interlaced B-fields and interlaced P-frames.

A field-coded macroblock in an interlaced P-frame or interlaced B-frame may include 2 motion vectors. In the case of 2 field MV macroblocks, the 2MVBP element indicates which of the two fields have non-zero differential motion vectors. As shown in FIG. 47K, one of 4 tables is used to encode/decode 2MVBP.

5. Field Picture Coordinate System

In the following sections, motion vector units are expressed in field picture units. For example, if the vertical component a motion vector indicates that the displacement is +6 (in quarter-pel units), then this indicates a displacement of 1½ field picture lines.

FIG. 48 shows the relationship between the vertical component of the motion vector and the spatial location for both combinations of current and reference field polarities (opposite and same). FIG. 48 shows one vertical column of pixels in the current and reference fields. The circles represent integer pixel positions and the x's represent quarter-pixel positions. A value of 0 indicates no vertical displacement between the current and reference field positions. If the current and reference fields are of opposite polarities, then the 0 vertical vector points to a position halfway between the field lines (a ½-pixel shift) in the reference field. If the current and reference fields are of the same polarity, then the 0 vertical vector points to the corresponding field line in the reference field.

6. Decoding Motion Vector Differentials

The MVDATA (4663) and BLKMVDATA (4665) elements encode motion information for the macroblock or blocks in the macroblock. 1MV macroblocks have a single MVDATA (4663) element, and 4MV macroblocks may have between zero and four BLKMVDATA (4665). The process of computing a motion vector differential from MVDATA (4663) or BLKMVDATA (4665) is different for the one-reference (NUMREF=0) case and two-reference (NUMREF=1) case.

In field pictures that have only one reference field, each MVDATA (4663) or BLKMVDATA (4665) syntax element jointly encodes two things: (1) the horizontal motion vector differential component; and 2) the vertical motion vector differential component. The MVDATA (4663) or BLKMV-DATA (4665) element is a VLC followed by a FLC. The value of the VLC determines the size of the FLC. The MVTAB (4643) syntax element specifies the table used to decode the VLC.

FIG. 49A shows pseudocode that illustrates motion vector differential decoding for motion vectors of blocks or macroblocks in field pictures that have one reference field. In the pseudocode, the values dmv_x and dmv_y are computed, where dmv_x is the differential horizontal motion vector component and dmv_y is the differential vertical motion vector component. The variables k_x and k_y are fixed length values that depend on the motion vector range as defined by MVRANGE (4633) according to the table shown in FIG. 49B.

The variable extend_x is for an extended range horizontal motion vector differential, and the variable extend_y is for an extended range vertical motion vector differential. The variables extend_x and extend_y are derived from the DMVRANGE (4634) syntax element. If DMVRANGE (4634) indicates that extended range for the horizontal component is used, then extend_x=1. Otherwise extend_x, =0. Similarly, if DMVRANGE (4634) indicates that extended range for the vertical component is used, then extend_y=1. Otherwise, extend_y=0. The offset_table is an array defined as follows:

offset_table1[9]={0, 1, 2, 4, 8, 16, 32, 64, 128,}, and offset_table2[9]={0, 1, 3, 7, 15, 31, 63, 127, 255}, where the offset_table2[ ] is used for a horizontal or vertical component when the differential range is extended for that component. Although FIGS. 49A and 49B show extended differential motion vector decoding for interlaced P-fields, extended differential motion vector decoding is also used for interlaced B-fields, interlaced P-frames, and interlaced B-frames in the first combined implementation.

In field pictures that have two reference fields, each MVDATA (4663) or BLKMVDATA (4665) syntax element jointly encodes three things: (1) the horizontal motion vector differential component; (2) the vertical motion vector differential component; and (3) whether the dominant or non-dominant predictor is used, i.e., which of the two fields is referenced by the motion vector. As in the one reference field case, the MVDATA (4663) or BLKMVDATA (4665) element is a VLC followed by a FLC, the value of the VLC determines the size of the FLC, and the MVTAB (4643) syntax element specifies the table used to decode the VLC.

FIG. 50 shows pseudocode that illustrates motion vector differential and dominant/non-dominant predictor decoding for motion vectors of blocks or macroblocks in field pictures that have two reference fields. In the pseudocode, the value predictor_flag is a binary flag indicating whether the dominant or non-dominant motion vector predictor is used. If predictor_flag=0, the dominant predictor is used, and if predictor_flag=1, the non-dominant predictor is used. Various other variables (including dmv_x, dmv_y, k_x, k_y, extend_x, extend_y, offset_table1[ ], and offset_table2[ ]) are as described for the one reference field case. The table size_table is an array defined as follows:

size_table[16]={0, 0, 1, 1, 2, 2, 3, 3, 4, 4, 5, 5, 6, 6, 7, 7}.

7. Motion Vector Predictors

A motion vector is computed by adding the motion vector differential computed in the previous section to a motion vector predictor. The predictor is computed from up to three neighboring motion vectors. Computations for motion vector predictors are done in ¼ pixel units, even if the motion vector mode is half-pel.

In a 1MV interlaced P-field, up to three neighboring motion vectors are used to compute the predictor for the current macroblock. The locations of the neighboring macroblocks with motion vectors considered are as shown in FIGS. 5A and 5B and described for 1MV progressive P-frames.

In a mixed-MX interlaced P-field, up to three neighboring motion vectors are used to compute the predictor for the current block or macroblock. The locations of the neighboring blocks and/or macroblocks with motion vectors considered are as shown in FIGS. 6A-10 and described for mixed-MV progressive P-frames.

If the NUMREF (4631) syntax element in the picture header is 0, then the current interlaced P-field may refer to only one previously coded field. If NUMREF=1, then the current interlaced P-field may refer to the two most recent reference field pictures. In the former case, a single predictor is calculated for each motion vector. In the latter case, two motion vector predictors are calculated. The pseudocode in FIGS. 51A and 51B describes how motion vector predictors are calculated for the one reference field case. The variables fieldpred_x and fieldpred_y in the pseudocode represent the horizontal and vertical components of the motion vector predictor.

In two reference field interlaced P-fields (NUMREF=1), the current field may reference the two most recent reference fields. In this case, two motion vector predictors are computed for each inter-coded macroblock. One predictor is from the reference field of the same polarity and the other is from the reference field with the opposite polarity. Of the same polarity field and opposite polarity field, one is the dominant field and the other is the non-dominant field. The dominant field is the field containing the majority of the motion vector predictor candidates. In the case of a tie, the motion vector derived from the opposite field is considered to be the dominant predictor. Intra-coded macroblocks are not considered in the calculation of the dominant/non-dominant predictor. If all candidate predictor macroblocks are intra-coded, then the dominant and non-dominant motion vector predictors are set to zero, and the dominant predictor is taken to be from the opposite field.

The pseudocode in FIGS. 52A-52F describes how motion vector predictors are calculated for the two reference field case, given the 3 motion vector predictor candidates. The variables samefieldpred_x and samefieldpred_y represent the horizontal and vertical components of the motion vector predictor from the same field, and the variables oppositefieldpred_x and oppositefieldpred_y represent the horizontal and vertical components of the motion vector predictor from the opposite field. The variables samecount and oppositecount are initialized to 0. The variable dominantpredictor indicates which field contains the dominant predictor. The value predictor_flag (decoded from the motion vector differential) indicates whether the dominant or non-dominant predictor is used.

The pseudocode in FIGS. 52G and 52H shows the scaling operations referenced in the pseudocode in FIGS. 52A-52F, which are used to derive one field's predictor from another field's predictor. The values of SCALEOPP, SCALESAME1, SCALESAME2, SCALEZONE1_X, SCALEZONE1_Y, ZONE1OFFSET_X and ZONE1OFFSET_Y are shown in the table in FIG. 52I for the case where the current field is the first field, and in the table in FIG. 52J for the case where the current field is the second field. The reference frame distance is encoded in the REFDIST (4624) field in the picture header. The reference frame distance is REFDIST+1.

FIGS. 52K through 52N are pseudocode and tables for scaling operations that are alternatives to those shown in FIGS. 52H through 52J. In place of the scaling pseudocode and tables in FIGS. 52H through 52J (but still using the pseudocode in FIGS. 52A through 52G), the scaling pseudocode and tables in FIGS. 52K through 52N are used. The reference frame distance is obtained from an element of the field layer header. The value of N is dependent on the motion vector range, as shown in the table in FIG. 52N.

8. Hybrid Motion Vector Prediction

The motion predictor calculated in the previous section is tested relative to the A (top) and C (left) predictors to determine whether the predictor is explicitly coded in the bitstream. If so, then a bit is present that indicates whether to use predictor A or predictor C as the motion vector predictor. The pseudocode in FIG. 53 illustrates hybrid motion vector prediction decoding. In the pseudocode, the variables predictor_pre_x and predictor_pre_y are the horizontal and vertical motion vector predictors, respectively, as calculated in the previous section. The variables predictor_post_x and predictor_post_y are the horizontal and vertical motion vector predictors, respectively, after checking for hybrid motion vector prediction. The variables predictor_pre, predictor_post, predictorA, predictorB, and predictorC all represent fields of the polarity indicated by the value of predictor_flag. For example, if the predictor_flag indicates that the opposite field predictor is used then:

predictor_pre_x=oppositefieldpred_x
    predictor_pre_x=oppositefieldpred_y
    predictorA_x=oppositefieldpredA_x
    predictorA_y=oppositefieldpredA_y
    predictorB_x=oppositefieldpredB_x
    predictorB_y=oppositefieldpredB_y
    predictorC_x=oppositefieldpredC_x
    predictorC_y=oppositefieldpredC_y Likewise if predictor_flag indicates that the same field predictor is used then:

predictor_pre_x=samefieldpred_x
    predictor_pre_x=samefieldpred_y
    predictorA_x=samefieldpredA_x
    predictorA_y=samefieldpredA_y
    predictorB_x=samefieldpredB_x
    predictorB_y=samefieldpredB_y
    predictorC_x=samefieldpredC_x
    predictorC_y=samefieldpredC_y where the values of oppositefieldpred and samefieldpred are calculated as described in the previous section.

9. Reconstructing Luma Motion Vectors

For both 1MV and 4MV macroblocks, a luma motion vector is reconstructed by adding the differential to the predictor as follows, where the variables range_x and range_y depend on MVRANGE (4633) and are specified in the table shown in FIG. 49B. For NUMREF=0 (one reference field interlaced P-field):

mv_x=(dmv_x+predictor_x) smod range_x, and
    mv_y=(dmv_y+predictor_y) smod (range_y).

For NUMREF=1 (two reference field interlaced P-field):

mv_x=(dmv_x+predictor_x) smod range_x, and
    mv_y=(dmv_y+predictor_y) smod (range_y/2).

If the interlaced P-field uses two reference pictures (NUMREF=1), then the predictor_flag (derived in decoding the motion vector differential) is combined with the value of dominantpredictor (derived in motion vector prediction) to determine which field is used as reference, as shown in FIG. 54.

In a 1MV macroblock, there is a single motion vector for the 4 blocks that make up the luma component of the macroblock. If the MBMODE (4661) syntax element indicates that no MV data is present in the macroblock layer, then dmv_x=0 and dmv_y=0 (mv_x=predictor_x and mv_y=predictor_y).

In a 4MV macroblock, each of the inter-coded luma blocks in the macroblock has its own motion vector. Therefore, there are 4 luma motion vectors in each 4MV macroblock. If the 4MVBP (4664) syntax element indicates that no motion vector information is present for a block, then dmv_x=0 and dmv_y for that block (mv_x=predictor_x and mv_y=predictor_y).

10. Deriving Chroma Motion Vectors

Chroma motion vectors are derived from the luma motion vectors. The chroma motion vectors are reconstructed in two steps. As a first step, the nominal chroma motion vector is obtained by combining and scaling the luma motion vectors appropriately. The scaling is performed in such a way that half-pixel offsets are preferred over quarter-pixel offsets. In the second stage, a one-bit FASTUVMC syntax element is used to determine if further rounding of chroma motion vectors is necessary. If FASTUVMC=0, no rounding is performed in the second stage. If FASTUVMC=1, the chroma motion vectors that are at quarter-pel offsets shall be rounded to the nearest half and full-pel positions. Only bilinear filtering is used for all chroma interpolation. The variables cmv_x and cmv_y denote the chroma motion vector components, respectively, and lmv_x and lmv_y denote the luma motion vector components, respectively.

In a 1MV macroblock, the chroma motion vectors are derived from the luma motion vectors as follows:

cmv_x=(lmv_x+round[lmv_x & 3])>>1, and cmv_y=(lmv_y+round[lmv_y & 3])>>1, where round[0]=0, round[1]=0, round[2]=0, round[3]=1.

The pseudocode in FIGS. 55A and 55B illustrates the first stage of how chroma motion vectors are derived from the motion information in the four luma blocks in 4MV macroblocks. In the pseudocode, ix and iy are temporary variables. FIG. 55A is pseudocode for chroma motion vector derivation for one reference field interlaced P-fields, and FIG. 55B is pseudocode for chroma motion vector derivation for two reference field interlaced P-fields.

11. Intensity Compensation

If MVMODE (4635) indicates that intensity compensation is used for the interlaced P-field, then the pixels in one or both of the reference fields are remapped prior to using them as predictors for the current P-field. When intensity compensation is used, the LUMSCALE1 (4638) and LUMSHIFT 1 (4639) syntax elements are present in the bitstream for a first reference field, and the LUMSCALE2 (4640) and LUMSHIFT2 (4641) elements may be present as well for a second reference field. The pseudocode in FIG. 56 illustrates how LUMSCALE1 (4638) and LUMSHIFT1 (4639) values are used to build the lookup table used to remap reference field pixels for the first reference field. (The pseudocode is similarly applicable for LUMSCALE2 (4640) and LUMSHIFT2 (4641) for the second reference field.)

The Y component of the reference field is remapped using the LUTY[ ] table, and the $C_b/C_r$ components are remapped using the LUTUV[ ] table as follows:

$\bar{p}_Y$=LUTY[$p_Y$], and $\bar{p}_{UV}$=LUTUV[$p_{UV}$], where $p_Y$ is the original luma pixel value in the reference field, $\bar{p}_Y$ is the remapped luma pixel value in the reference field, $p_{UV}$ is the original $C_b$ or $C_r$ pixel value in the reference field, and $\bar{p}_{UV}$ is the remapped $C_b$ or $C_r$ pixel value in the reference field.

12. Remaining Decoding

The decoder decodes the CBPCY (4662) element for a macroblock, when that element is present, where the CBPCY (4662) element indicates the presence/absence of coefficient data. At the block layer, the decoder decodes coefficient data for inter-coded blocks and intra-coded blocks (except for 4MV macroblocks). To reconstruct an inter-coded block, the decoder: (1) selects a transform type (8×8, 8×4, 4×8, or 4×4), (2) decodes sub-block pattern(s), (3) decodes coefficients, (4) performs an inverse transform, (5) performs inverse quantization, (6) obtains the prediction for the block, and (7) adds the prediction and the error block.

C. Sequence and Semantics in the Second Combined Implementation

Figure 57A:
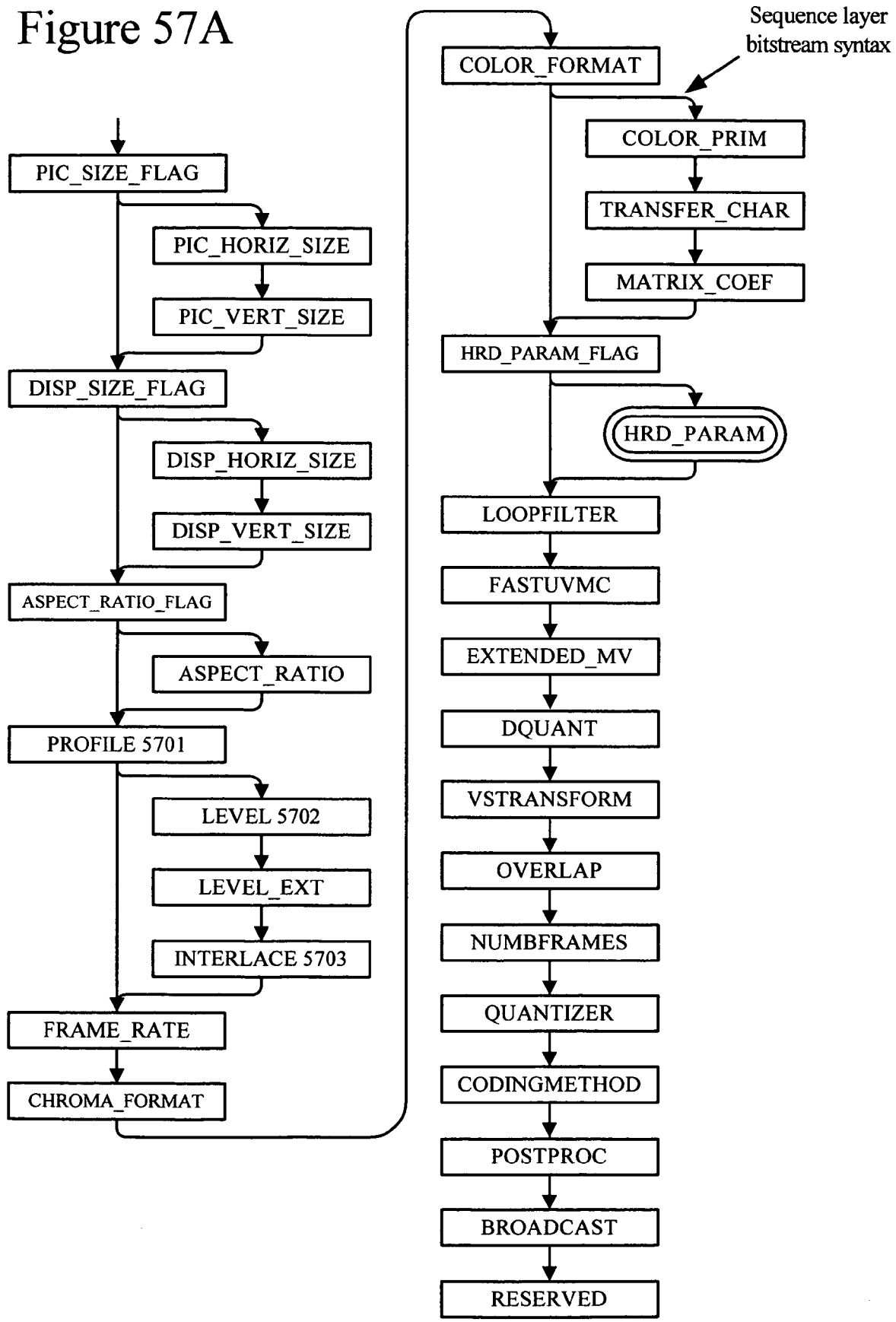
FIGS. 57A-57C are syntax diagrams for layers of a bitstream according to a second combined implementation.
Figure 57B:
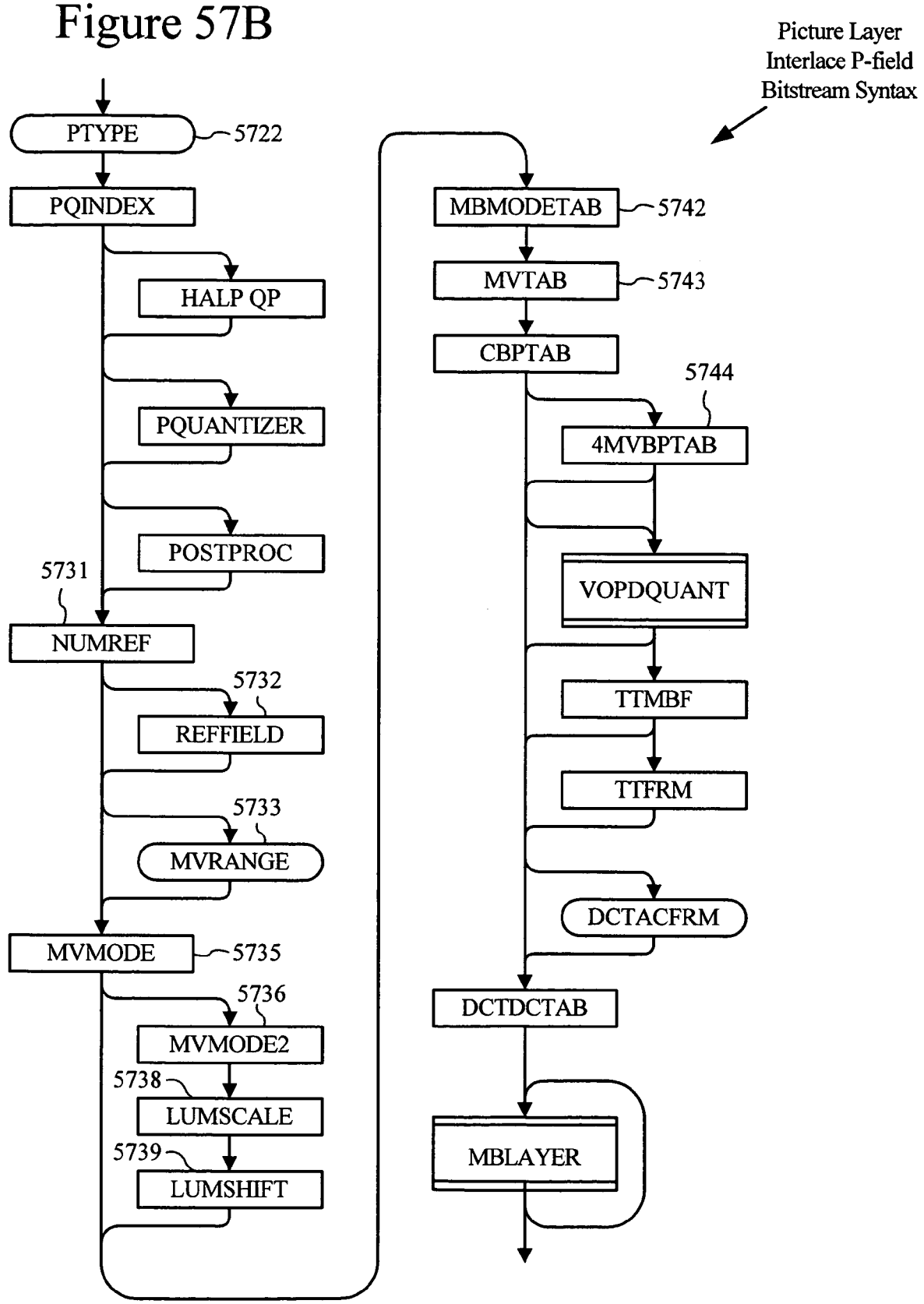
Figure 57C:
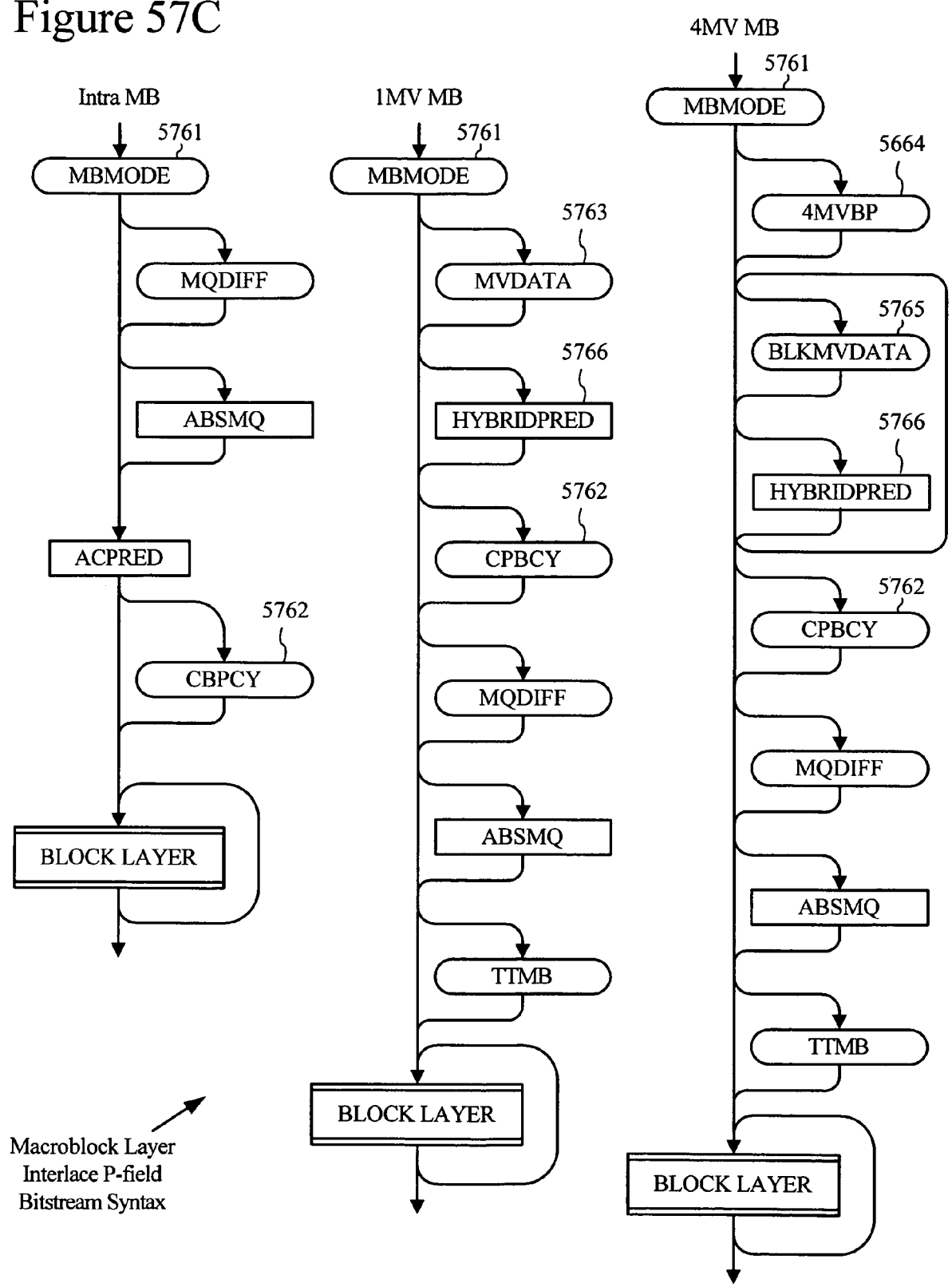

In the second combined implementation, a compressed video sequence is made up of data structured into hierarchical layers. From top to bottom the layers are: the picture layer, macroblock layer, and block layer. A sequence layer precedes the sequence. FIGS. 57A through 57C show the bitstream elements that make up various layers.

1. Sequence Layer Syntax and Semantics

A sequence-level header contains sequence-level parameters used to decode the sequence of compressed pictures. This header is made available to the decoder either as externally communicated decoder configuration information or as part of the video data bitstream. FIG. 57A is a syntax diagram for the sequence layer bitstream that shows the elements that make up the sequence layer. The clip profile PROFILE (5701) element specifies the encoding profile used to produce the clip. If the PROFILE is the "advanced" profile, the clip level LEVEL (5702) element specifies the encoding level for the clip. Alternatively (e.g., for other profiles), the clip level is communicated to the decoder by external means.

The INTERLACE (5703) element is a one-bit field that is present if the PROFILE is the advanced profile. INTERLACE (5703) specifies whether the video is coded in progressive or interlaced mode. If INTERLACE=0, then the video frames are coded in progressive mode. If INTERLACE=1, then the video frames are coded in interlaced mode. If the PROFILE (5701) is not the advanced profile, the video is coded in progressive mode.

The extended motion vectors EXTENDED_MV (5704) element is a one-bit field that indicates whether extended motion vector capability is turned on or off. If EXTENDED_MV=1, the motion vectors have extended range. If EXTENDED_MV=0, the motion vectors do not have extended range.

2. Picture Layer Syntax and Semantics

Data for a picture consists of a picture header followed by data for the macroblock layer. FIG. 57B is a syntax diagram for the picture layer bitstream that shows the elements that make up the picture layer for an interlaced P-field.

The picture type PTYPE (5722) element is either a one-bit field or a variable-size field. If there are no B-pictures, then only I- and P-pictures are present in the sequence, and PTYPE is encoded with a single bit. If PTYPE=0, then the picture type is I. If PTYPE=1, then the picture type is P. If the number of B-pictures is greater than 0, then PTYPE (5722) is a variable sized field indicating the picture type of the frame. If PTYPE=1, then the picture type is P. If PTYPE=01 in binary, then the picture type is I. And, if PTYPE=00 in binary, then the picture type is B.

The number of reference pictures NUMREF (5731) element is a one-bit syntax element present in interlaced P-field headers. It indicates whether an interlaced P-field has 1 (NUMREF=0) or 2 (NUMREF=1) reference pictures. The reference field picture indicator REFFIELD (5732) is a one-bit syntax element present in interlaced P-field headers if NUMREF=0. It indicates which of two possible reference pictures the interlaced P-field uses.

The extended MV range flag MVRANGE (5733) is a variable-size syntax element in P-pictures of sequences coded using a particular profile ("main" profile) and for which the BROADCAST element is set to 1. In general, MVRANGE (5733) indicates an extended range for motion vectors (i.e., longer possible horizontal and/or vertical displacements for the motion vectors). MVRANGE (5733) is used in decoding motion vector differentials.

The motion vector mode MVMODE (5735) element is a variable-size syntax element that signals one of four motion vector coding modes or one intensity compensation mode. The motion vector coding modes include three "1MV" modes with different sub-pixel interpolation rules for motion compensation. The 1MV signifies that each macroblock in the picture has at most one motion vector. In the "mixed-MV" mode, each macroblock in the picture may have either one or four motion vectors, or be skipped. Depending on the value of PQUANT (a quantization factor for the picture), either one of the tables shown in FIG. 47E is used for the MVMODE (5735) element.

The motion vector mode 2 MVMODE2 (5736) element is a variable-size syntax element present in interlaced P-field headers if MVMODE (5735) signals intensity compensation. The preceding tables (minus the codes for intensity compensation) may be used for MVMODE2 (5736).

The luminance scale LUMSCALE (5738) and luminance shift LUMSHIFT (5739) elements are each a six-bit value used in intensity compensation. LUMSCALE (5738) and LUMSHIFT (5739) are present in an interlaced P-field header if MVMODE (5735) signals intensity compensation.

The macroblock mode table MBMODETAB (5742) element is a two-bit field for an interlaced P-field header. MBMODETAB (5742) indicates which of four code tables (tables 0 through 3 as specified with the two-bit value) is used to encode/decode the macroblock mode MBMODE (5761) syntax element in the macroblock layer.

The motion vector table MVTAB (5743) element is a two-bit field for interlaced P-fields. MVTAB (5743) indicates which of four code tables (tables 0 through 3 as specified with the two-bit value) is used to encode/decode motion vector data.

The 4MV block pattern table 4MVBPTAB (5744) element is a two-bit value present in an interlaced P-field if MVMODE (5735) (or MVMODE2 (5736), if MVMODE (5735) is set to intensity compensation) indicates that the picture is of mixed-MV type. 4MVBPTAB (5744) signals which of four code tables (tables 0 through 3 as specified with the two-bit value) is used to encode/decode the 4MV block pattern 4MVBP (5764) field in 4MV macroblocks.

An interlaced P-frame header (not shown) has many of the same elements as the interlaced P-field header shown in FIG. 57B. These include PTYPE (5722), MBMODETAB (5742), MVTAB (5743), and 4MVBPTAB (5744), although the exact syntax and semantics for interlaced P-frames may differ from interlaced P-fields. For example, 4MVBPTAB is again a two-bit field that indicates which of four code tables (tables 0 through 3 as specified with the two-bit value) is used to encode/decode the 4MV block pattern 4MVBP element in 4MV macroblocks. An interlaced P-frame header also includes different elements for switching between 1MV and 4MV modes and for intensity compensation signaling.

Since an interlaced P-frame may include field-coded macroblocks with two motion vectors per macroblock, the interlaced P-frame header includes a two motion vector block pattern table 2MVBPTAB element. 2MVBPTAB is a two-bit field present in interlaced P-frames. This syntax element signals which one of four tables (tables 0 through 3 as specified with the two-bit value) is used to encode/decode the 2MV block pattern (2MVBP) element in 2MV field-coded macroblocks. FIG. 47K shows four tables available for 2MVBP.

Interlaced B-fields and interlaced B-frames have many of the same elements of interlaced P-fields and interlaced P-frames. In particular, an interlaced B-frame includes both 2MVBPTAB and 4MVBPTAB (5721) syntax elements, although the semantics of the elements can be different from interlaced P-fields and P-frames.

3. Macroblock Layer Syntax and Semantics

Data for a macroblock consists of a macroblock header followed by the block layer. FIG. 57C is a syntax diagram for the macroblock layer bitstream that shows the elements that make up the macroblock layer for macroblocks of an interlaced P-field.

The macroblock mode MBMODE (5761) element is a variable-size element. It jointly indicates information such as the number of motion vectors for a macroblock (1MV, 4MV, or intra), whether a coded block pattern CBPCY (5762) element is present for the macroblock, and (in some cases) whether motion vector differential data is present for the macroblock.

The motion vector data MVDATA (5763) element is a variable-size element that encodes motion vector information (e.g., horizontal and vertical differentials) for a motion vector for a macroblock. For an interlaced P-field with two reference fields, MVDATA (5763) also encodes information for selecting between dominant and non-dominant motion vector predictors for the motion vector.

The four motion vector block pattern 4MVBP (5764) element is present if the MBMODE (5761) indicates the macroblock has four motion vectors. The 4MVBP (5764) element indicates which of the four luminance blocks contain non-zero motion vector differentials. A code table is used to decode the 4MVBP (5764) element to a value between 0 and 14. This decoded value, when expressed as a binary value, represents a bit field indicating whether the motion vector for the corresponding luminance block is present, as shown in FIG. 34.

The two motion vector block pattern 2MVBP element (not shown) is a variable-size syntax element present in macroblocks in interlaced P-frames. In interlaced P-frame macroblocks, 2MVBP is present if MBMODE (5761) indicates that the macroblock has 2 field motion vectors. In this case, 2MVBP indicates which of the 2 fields (top and bottom) contain non-zero motion vector differentials.

The block-level motion vector data BLKMVDATA (5765) element is a variable-size element present in certain situations. It contains motion information for a block of a macroblock.

The hybrid motion vector prediction HYBRIDPRED (5766) element is a one-bit syntax element per motion vector that may be present in macroblocks in interlaced P-fields. When hybrid motion vector prediction is used, HYBRIDPRED (5766) indicates which of two motion vector predictors to use.

4. Block Layer Syntax and Semantics

The block layer for interlaced pictures follows the syntax and semantics of the block layer for progressive pictures. In general, information for DC and AC coefficients of blocks and sub-blocks is signaled at the block layer.

D. Decoding in the Second Combined Implementation

The following sections focus on the decoding process for interlaced P-fields.

1. References for Interlaced P-Field Decoding

An interlaced P-field can reference either one or two previously decoded fields in motion compensation. The NUMREF (5731) field in the picture layer indicates whether the current field can reference one or two previous reference field pictures. If NUMREF=0, then the current interlaced P-field can only reference one field. In this case, the REFFIELD (5732) element follows in the picture layer bitstream and indicates which field is used as a reference. If REFFIELD=0, then the temporally closest (in display order) I or P-field is used as a reference. If REFFIELD=1 then the second most temporally recent I or P-field picture is used as reference. If NUMREF=1, then the current interlaced P-field picture uses the two temporally closest (in display order) I or P field pictures as references. The examples of reference field pictures for NUMREF=0 and NUMREF=1 shown in FIGS. 24A-24F, as described above, apply to the second combined implementation.

2. Picture Types and Picture Layer Table Selections

Interlaced P-fields can be one of two types: 1MV or mixed-MV. In 1MV P-fields, for a 1MV macroblock, a single motion vector is used to indicate the displacement of the predicted blocks for all 6 blocks in the macroblock. In mixed-MV P-fields, a macroblock can be encoded as a 1 MV or a 4MV macroblock. For a 4MV macroblock, each of the four luminance blocks may have a motion vector associated with it. 1MV mode or mixed-MV mode is signaled by the MVMODE (5735) and MVMODE2 (5736) picture layer fields.

For an interlaced P-field, the picture layer contains syntax elements that control the motion compensation mode and intensity compensation for the field. MVMODE (5735) signals either: 1) one of four motion vector modes for the field or 2) that intensity compensation is used in the field. If intensity compensation is signaled then the MVMODE2 (5736), LUMSCALE (5738) and LUMSHIFT (5739) fields follow in the picture layer. One of the two tables in FIG. 47E are used to decode the MVMODE (5735) and MVMODE2 (5736) fields, depending on whether PQUANT is greater than 12.

If the motion vector mode is mixed-MV mode, then MBMODETAB (5742) signals which of four mixed-MV MBMODE tables is used to signal the mode for each macroblock in the field. If the motion vector mode is not mixed MV (in which case all inter-coded macroblocks use 1 motion vector), then MBMODETAB (5742) signals which of four 1MV MBMODE tables is used to signal the mode of each macroblock in the field.

MVTAB (5743) indicates the code table used to decode motion vector differentials for the macroblocks in an interlaced P-field. 4MVBPTAB (5744) indicates the code table used to decode the 4MVBP (5764) for 4MV macroblocks in an interlaced P-field.

3. Macroblock Modes and Motion Vector Block Patterns

Macroblocks in interlaced P-fields can be one of 3 possible types: 1MV, 4MV, and Intra. The macroblock type is signaled by MBMODE (5761) in the macroblock layer.

1MV macroblocks can occur in 1MV and mixed-MV P-fields. A 1MV macroblock is one where a single motion vector represents the displacement between the current and reference pictures for all 6 blocks in the macroblock. The difference between the current and reference blocks is encoded in the block layer. For a 1MV macroblock, MBMODE (5761) indicates three things: (1) that the macroblock type is 1MV; (2) whether CBPCY (5762) is present; and (3) whether MVDATA (5763) is present.

If MBMODE (5761) indicates that CBPCY (5762) is present, then CBPCY (5762) is present in the macroblock layer and indicates which of the 6 blocks are coded in the block layer. If MBMODE (5761) indicates that CBPCY (5762) is not present, then CBPCY (5762) is assumed to equal 0 and no block data is present for any of the 6 blocks in the macroblock.

If MBMODE (5761) indicates that MVDATA (5763) is present, then MVDATA (5763) is present in the macroblock layer and encodes the motion vector differential, which is combined with the motion vector predictor to reconstruct the motion vector. If MBMODE (5761) indicates that MVDATA (5763) is not present then the motion vector differential is assumed to be zero and therefore the motion vector is equal to the motion vector predictor.

4MV macroblocks only occur in mixed-MV P-fields. A 4MV macroblock is one where each of the four luminance blocks in a macroblock may have an associated motion vector that indicates the displacement between the current and reference pictures for that block. The displacement for the chroma blocks is derived from the four luminance motion vectors. The difference between the current and reference blocks is encoded in the block layer. For a 4MV macroblock, MBMODE (5761) indicates three things: (1) that the macroblock type is 4MV; (2) whether CBPCY (5762) is present; and (3) whether 4MVBP (5764) is present.

If MBMODE (5761) indicates that 4MVBP (5764) is present, then 4MVBP (5764) is present in the macroblock layer and indicates which of the four luminance blocks contain non-zero motion vector differentials. 4MVBP (5764) decodes to a value between 0 and 14, which when expressed as a binary value represents a bit field that indicates whether motion vector data for the corresponding luminance blocks is present, as shown in FIG. 27. For each of the four bit positions in 4MVBP (5764), a value of 0 indicates that no motion vector differential (BLKMVDATA (5765)) is present for that block, and the motion vector differential is assumed to be 0. A value of 1 indicates that a motion vector differential (BLKMVDATA (5765)) is present for that block. If MBMODE (5761) indicates 4MVBP (5764) is not present, then it is assumed that motion vector differential data (BLKMVDATA (5765)) is present for all four luminance blocks.

A field-coded macroblock in an interlaced P-frame may include 2 motion vectors. In the case of 2 field MV macroblocks, the 2MVBP element indicates which of the two fields have non-zero differential motion vectors.

Intra macroblocks can occur in 1MV or mixed-MV P-fields. An intra macroblock is one where all six blocks are coded without referencing any previous picture data. The difference between the current block pixels and a constant value of 128 is encoded in the block layer. For an intra macroblock, MBMODE (5761) indicates two things: (1) that the macroblock type is intra; and (2) whether CBPCY (5762) is present. For intra macroblocks, CBPCY (5762), when present, indicates which of the six blocks has AC coefficient data coded in the block layer.

4. Decoding Motion Vector Differentials

The MVDATA (5763) and BLKMVDATA (5765) fields encode motion information for the macroblock or the blocks in the macroblock. 1MV macroblocks have a single MVDATA (5763) field, and 4MV macroblocks can have between zero and four BLKMVDATA (5765). Computing the motion vector differential is performed differently for the one-reference (NUMREF=0) case and the two-reference (NUMREF=1) case.

In field pictures that have only one reference field, each MVDATA (5763) or BLKMVDATA (5765) field in the macroblock layer jointly encodes two things: (1) the horizontal motion vector differential component; and (2) the vertical motion vector differential component. The MVDATA (5763) or BLKMVDATA (5765) field is a Huffman VLC followed by a FLC. The value of the VLC determines the size of the FLC. The MVTAB (5743) field in the picture layer specifies the table used to decode the VLC.

FIG. 58A shows pseudocode that illustrates motion vector differential decoding for motion vectors of blocks or macroblocks in field pictures that have one reference field. In the pseudocode, the values dmv_x and dmv_y are computed. The value dmv_x is the differential horizontal motion vector component, and the value dmv_y is the differential vertical motion vector component. The variables k_x and k_y are fixed length values for long motion vectors and depend on the motion vector range as defined by MVRANGE (5733), as shown in the table in FIG. 58B. The value halfpel_flag is a binary value indicating whether half-pel or quarter-pel precision is used for motion compensation for the picture. The value of halfpel_flag is determined by the motion vector mode. If the mode is 1MV or mixed-MV, then halfpel_flag=0 and quarter-pel precision is used for motion compensation. If the mode is 1MV half-pel or 1MV half-pel bilinear, then halfpel_flag=1 and half-pel precision is used. The offset_table is an array defined as follows:

offset_table[9]={0, 1, 2, 4, 8, 16, 32, 64, 128}.

In field pictures that have two reference fields, each MVDATA (5763) or BLKMVDATA (5765) field in the macroblock layer jointly encodes three things: (1) the horizontal motion vector differential component; (2) the vertical motion vector differential component; and (3) whether the dominant or non-dominant motion vector predictor is used. The MVDATA (5763) or BLKMVDATA (5765) field is a Huffman VLC followed by a FLC, and the value of the VLC determines the size of the FLC. The MVTAB (5743) field specifies the table used to decode the VLC.

FIG. 59 shows pseudocode that illustrates motion vector differential and dominant/non-dominant predictor decoding for motion vectors of blocks or macroblocks in field pictures that have two reference fields. In the pseudocode, the value predictor_flag is a binary flag indicating whether the dominant or non-dominant motion vector predictor is used (0=dominant predictor used, 1=non-dominant predictor used). The various other variables (including dmv_x, dmv_y, k_x, k_y, halfpel_flag, and offset_table[ ]) are as described for the one reference field case. The table size_table is an array defined as follows:

size_table[14]={0, 0, 1, 1, 2, 2, 3, 3, 4, 4, 5, 5, 6, 6}.

5. Motion Vector Predictors

A motion vector is computed by adding the motion vector differential computed in the previous section to a motion vector predictor. The predictor is computed from up to three neighboring motion vectors.

In a 1MV interlaced P-field, up to three motion vectors are used to compute the predictor for the current macroblock. The locations of neighboring predictors A, B, and C are shown in FIGS. 5A and 5B. As described for progressive P-frames, the neighboring predictors are taken from the left, top, and top-right macroblocks, except in the case where the current macroblock is the last macroblock in the row. In this case, the predictor B is taken from the top-left macroblock instead of the top-right. For the special case where the frame is one macroblock wide then the predictor is always Predictor A (the top predictor).

In a mixed-MV interlaced P-field, up to three motion vectors are used to compute the predictor for the current block or macroblock. FIGS. 6A-10 show the three candidate motion vectors for 1MV and 4MV macroblocks in mixed-MV P-fields, as described for progressive P-frames. For the special case where the frame is one macroblock wide then the predictor is always Predictor A (the top predictor).

If the NUMREF (5731) field in the picture header is 0, then the current interlaced P-field can refer to only one previously coded picture. If NUMREF=1, then the current interlaced P-field can refer to the two most recent reference field pictures. In the former case, a single predictor is calculated for each motion vector. In the latter case, two motion vector predictors are calculated. The pseudocode in FIGS. 60A and 60B shows how motion vector predictors are calculated for the one reference field case. The variables fieldpred_x and fieldpred_y represent the horizontal and vertical components of the motion vector predictor.

In two reference field interlaced P-fields (NUMREF=1), the current field can reference the two most recent reference fields. In this case, two motion vector predictors are computed for each inter-coded macroblock. One predictor is from the reference field of the same polarity and the other is from the reference field with the opposite polarity.

The pseudocode in FIGS. 61A-61F describes how motion vector predictors are calculated for the two reference field case, given the 3 motion vector predictor candidates. The variables samefieldpred_x and samefieldpred_y represent the horizontal and vertical components of the motion vector predictor from the same field, and the variables oppositefieldpred_x and oppositefieldpred_y represent the horizontal and vertical components of the motion vector predictor from the opposite field. The variable dominantpredictor indicates which field contains the dominant predictor. The value predictor_flag (decoded from the motion vector differential) indicates whether the dominant or non-dominant predictor is used.

6. Hybrid Motion Vector Prediction

If the interlaced P-field is 1MV or mixed-MV, then the motion vector predictor calculated in the previous section is tested relative to the A (top) and C (left) predictors to determine whether the predictor is explicitly coded in the bitstream. If so, then a bit is present that indicates whether to use predictor A or predictor C as the motion vector predictor. The pseudocode in FIGS. 14A and 14B illustrates the hybrid motion vector prediction decoding, using variables as follows. The variables predictor_pre_x and predictor_prey and the candidate Predictors A, B, and C are as calculated in the previous section (i.e., they are the opposite field predictors, or they are the same field predictors, as indicated by the predictor flag). The variables predictor_post_x and predictor_post_y are the horizontal and vertical motion vector predictors, respectively, after checking for hybrid motion vector prediction.

7. Reconstructing Motion Vectors

For both 1MV and 4MV macroblocks, a luminance motion vector is reconstructed by adding the differential to the predictor as follows:

mv_x=(dmv_x+predictor_x) smod range_x, and mv_y=(dmv_y+predictor_y) smod range_y, where the variables range_x and range_y depend on MVRANGE (5733) and are specified in the table shown in FIG. 58B, and where the operation "smod" is a signed modulus defined as follows:

A smod b=((A+b)% 2b)−b, which ensures that the reconstructed vectors are valid. (A smod b) lies within −b and b−1.

In a 1MV macroblock, there will be a single motion vector for the four blocks that make up the luminance component of the macroblock. If dmv_x indicates that the macroblock is intra-coded, then no motion vector is associated with the macroblock. If the macroblock is skipped, then dmv_x=0 and dmv_y=0, so mv_x=predictor_x and mv_y=predictor_y.

In a 4MV macroblock, each of the inter-coded luminance blocks in the macroblock has its own motion vector. Therefore, there will be between 0 and 4 luminance motion vectors for each 4MV macroblock. A non-coded block in a 4MV macroblock can occur in one of two ways: (1) if the macroblock is skipped and the macroblock is 4MV (all blocks in the macroblock are skipped in this case); or (2) if the CBPCY (5762) for the macroblock indicates that the block is non-coded. If a block is not coded then dmv_x=0 and dmv_y=0, so mv_x=predictor_x and mv_y=predictor_y.

8. Deriving Chroma Motion Vectors

Chroma motion vectors are derived from the luminance motion vectors. Also, for 4MV macroblocks, the decision of whether to code the chroma blocks as inter or intra is made based on the status of the luminance blocks. The chroma motion vectors are reconstructed in two steps. As a first step, the nominal chroma motion vector is obtained by combining and scaling the luminance motion vectors appropriately. The scaling is performed in such a way that half-pixel offsets are preferred over quarter-pixel offsets. In the second stage, a sequence level one-bit field FASTUVMC field is used to determine if further rounding of chroma motion vectors is necessary. If FASTUVMC=0, no rounding is performed in the second stage. If FASTUVMC=1, the chroma motion vectors that are at quarter-pel offsets will be rounded to the nearest full-pel positions. In addition, when FASTUVMC=1 only bilinear filtering will be used for all chroma interpolation.

In a 1MV macroblock, the chroma motion vectors are derived from the luminance motion vectors as follows:

```
// s_RndTbl[0] = 0, s_RndTbl[1] = 0, s_RndTbl[2] = 0,
s_RndTbl[3] = 1
cmv_x = (lmv_x + s_RndTbl[1mv_x & 3]) >> 1
cmv_y = (lmv_y + s_RndTbl[1mv_y & 3]) >> 1
```

The pseudocode in FIG. 16B illustrates the first stage of how chroma motion vectors are derived from the motion information for the four luminance blocks in 4MV macroblocks, using variables as follows. The dominant polarity among the up to four luminance motion vectors for the 4MV macroblock is determined, and the chroma motion vector is determined from the luminance motion vectors with the dominant polarity (but not from luminance motion vectors of the other polarity).

9. Intensity Compensation

If intensity compensation is used for a reference field, then the pixels in the reference field are remapped prior to using them as predictors. When intensity compensation is used, LUMSCALE (5738) and LUMSHIFT (5739) are present in the picture bitstream. The pseudocode in FIG. 18 or 56 illustrates how LUMSCALE (5738) and LUMSHIFT (5739) are used to remap the reference field pixels. The Y component of the reference is remapped using the LUTY[ ] table, and the U and V components are remapped using the LUTUV[ ] table as follows:

$\bar{p}_Y$=LUTY[$p_Y$], and $\bar{p}_{UV}$=LUTUV[$p_{UV}$]

where $p_Y$ is the original luminance pixel value in the reference field, $\bar{p}_Y$ is the remapped luminance pixel value in the reference field, $p_{UV}$ is the original U or V pixel value in the reference field, and $\bar{p}_{UV}$ is the remapped U or V pixel value in the reference field.

10. Remaining Decoding

The decoder decodes the CBPCY (5762) element for a macroblock, when that element is present, where the CBPCY (5762) element indicates the presence/absence of coefficient data. At the block layer, the decoder decodes coefficient data for inter-coded blocks and intra-coded blocks. To reconstruct an inter-coded block, the decoder: (1) selects a transform type (8×8, 8×4, 4×8, or 4×4), (2) decodes sub-block pattern(s), (3) decodes coefficients, (4) performs an inverse transform, (5) performs inverse quantization, (6) obtains the prediction for the block, and (7) adds the prediction and the error block.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer-implemented method for transforming encoded video information using a computing device that implements a video decoder, the computing device comprising a processing unit and memory, the method comprising:
    with the computing device that implements the video decoder:
        receiving encoded video information in a bitstream; and
        reconstructing a picture using the encoded video information, including:
            decoding, from the encoded video information in the bitstream, a dominant/non-dominant predictor selection jointly coded with differential motion vector information for a motion vector, wherein the decoding comprises:
            decoding a variable length code;
            determining a length of a code for a horizontal differential motion vector based at least in part on the variable length code;
            determining a length of a code for a vertical differential motion vector based at least in part on the variable length code; and
            determining the dominant/non-dominant predictor selection based at least in part on the variable length code; and
        reconstructing the motion vector based at least in part on the differential motion vector information and the dominant/non-dominant predictor selection.

2. The method of claim 1 wherein the decoding the variable length code results in a variable length code index, and wherein the determining the length of the code for the horizontal differential motion vector comprises:
    determining a code length index from the variable length code index, wherein the code length index at least in part indicates the length of the code for the horizontal differential motion vector.

3. The method of claim 1 wherein the decoding the variable length code results in a variable length code index, and wherein the determining the length of the code for the vertical differential motion vector comprises:
- determining a code length index from the variable length code index; and
- determining the length of the code for the vertical differential motion vector from a size table based at least in part on the code length index.

4. The method of claim 1 further comprising, for a second motion vector having a dominant/non-dominant predictor selection and differential motion vector information:
- decoding a variable length code that jointly represents at least a zero-value vertical differential motion vector for the second motion vector and the dominant/non-dominant predictor selection for the second motion vector.

5. A computer-implemented method for transforming encoded video information using a computing device that implements a video decoder, the computing device comprising a processing unit and memory, the method comprising:
- with the computing device that implements the video decoder:
  - receiving encoded video information in a bitstream; and
  - reconstructing a picture using the encoded video information, including:
    - decoding, from the encoded video information in the bitstream, a dominant/non-dominant predictor selection jointly coded with differential motion vector information for a motion vector, wherein the decoding comprises:
      - decoding a variable length code, resulting in an escape index;
      - decoding a first escape code that represents a horizontal differential motion vector value; and
      - decoding a second escape code that jointly represents the dominant/non-dominant predictor selection and a vertical differential motion vector value; and
    - reconstructing the motion vector based at least in part on the differential motion vector information and the dominant/non-dominant predictor selection.

6. A computer-implemented method for transforming encoded video information using a computing device that implements a video decoder, the computing device comprising a processing unit and memory, the method comprising:
- with the computing device that implements the video decoder:
  - receiving encoded video information in a bitstream; and
  - reconstructing a picture using the encoded video information, including:
    - decoding, from the encoded video information in the bitstream, a variable length code that jointly represents differential motion vector information and a motion vector predictor selection for a motion vector, wherein the variable length code jointly represents a first code length index for a horizontal differential motion vector, a second code length index for a vertical differential motion vector, and the motion vector predictor selection; and
    - reconstructing the motion vector based at least in part on the differential motion vector information and the motion vector predictor selection.

7. The method of claim 6 further comprising, for a second motion vector having a motion vector predictor selection and differential motion vector information, decoding a variable length code that jointly represents a zero-value vertical differential motion vector for the second motion vector and the motion vector predictor selection for the second motion vector.

8. The method of claim 7 wherein the variable length code for the second motion vector further jointly represents a zero-value horizontal differential motion vector for the second motion vector.

9. A computer-implemented method for transforming video information using a computing device that implements a video encoder, the computing device comprising a processing unit and memory, the method comprising:
- with the computing device that implements the video encoder:
  - determining a dominant/non-dominant predictor selection for a motion vector;
  - determining differential motion vector information for the motion vector;
  - jointly coding the dominant/non-dominant predictor selection with the differential motion vector information, wherein the coding comprises:
    - determining a first code length index for a horizontal differential motion vector;
    - determining a second code length index for a vertical differential motion vector; and
    - determining a variable length code that jointly represents the first code length index, the second code length index, and the dominant/non-dominant predictor selection; and
  - signaling the jointly coded information in an output bitstream.

10. The method of claim 9 further comprising, for a second motion vector having a dominant/non-dominant predictor selection and differential motion vector information, determining a variable length code that jointly represents a zero-value vertical differential motion vector for the second motion vector and the dominant/non-dominant predictor selection for the second motion vector.

11. The method of claim 10 wherein the variable length code for the second motion vector also represents a zero-value horizontal differential motion vector for the second motion vector.

12. The method of claim 10 further comprising determining a first code length for a horizontal differential motion vector for the second motion vector, wherein the variable length code for the second motion vector also represents the first code length for the horizontal differential motion vector for the second motion vector.

13. A computer-implemented method for transforming video information using a computing device that implements a video encoder, the computing device comprising a processing unit and memory, the method comprising:
- with the computing device that implements the video encoder:
  - determining a dominant/non-dominant predictor selection for a motion vector;
  - determining differential motion vector information for the motion vector;
  - jointly coding the dominant/non-dominant predictor selection with the differential motion vector information, wherein the coding comprises:
    - determining a variable length code that represents an escape index;
    - coding a first escape code that represents a horizontal differential motion vector value; and
    - coding a second escape code that jointly represents the dominant/non-dominant predictor selection and a vertical differential motion vector value; and signaling the jointly coded information in an output bitstream.

14. A computer-implemented method for transforming video information using a computing device that implements a video encoder, the computing device comprising a processing unit and memory, the method comprising:

with the computing device that implements the video encoder:

determining a motion vector predictor selection for a motion vector;

determining differential motion vector information for the motion vector;

coding a variable length code that jointly represents the motion vector predictor selection and the differential motion vector information for the motion vector, wherein the variable length code jointly represents a first code length index for a horizontal differential motion vector, a second code length index for a vertical differential motion vector, and the motion vector predictor selection; and signaling the jointly coded information in an output bitstream.

15. The method of claim 14 further comprising, for a second motion vector having a motion vector predictor selection and differential motion vector information, coding a variable length code that jointly represents a zero-value vertical differential motion vector for the second motion vector and the motion vector predictor selection for the second motion vector.

* * * * *

UNITED STATES PATENT AND TRADEMARK OFFICE
CERTIFICATE OF CORRECTION

PATENT NO.      : 7,620,106 B2
APPLICATION NO. : 10/933881
DATED           : November 17, 2009
INVENTOR(S)     : Holcomb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1453 days.

Signed and Sealed this

Twenty-sixth Day of October, 2010

David J. Kappos
*Director of the United States Patent and Trademark Office*